US007133846B1

(12) United States Patent
Ginter et al.

(10) Patent No.: US 7,133,846 B1
(45) Date of Patent: Nov. 7, 2006

(54) DIGITAL CERTIFICATE SUPPORT SYSTEM, METHODS AND TECHNIQUES FOR SECURE ELECTRONIC COMMERCE TRANSACTION AND RIGHTS MANAGEMENT

(75) Inventors: Karl L. Ginter, Beltsville, MD (US); Victor H. Shear, Bethesda, MD (US); Francis J. Spahn, El Cerrito, CA (US); David M. Van Wie, Sunnyvale, CA (US); Robert P. Weber, Menlo Park, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 0 days.

(21) Appl. No.: 09/398,665

(22) Filed: Sep. 17, 1999

Related U.S. Application Data

(63) Continuation of application No. 08/699,712, filed on Aug. 12, 1996, now abandoned, which is a continuation-in-part of application No. 08/388,107, filed on Feb. 13, 1995, now abandoned.

(51) Int. Cl.
*H04L 9/32* (2006.01)
(52) U.S. Cl. .................. 705/54; 713/156; 713/175
(58) Field of Classification Search .................. 705/44, 705/51, 52, 53, 54, 57, 59, 19; 713/155, 713/156, 175, 185, 202; 709/229; 726/5
See application file for complete search history.

(56) References Cited

U.S. PATENT DOCUMENTS 3,573,747 A  4/1971  Adams et al.

(Continued)

FOREIGN PATENT DOCUMENTS

AU     A-36815/97    2/1998

(Continued)

OTHER PUBLICATIONS

Microsoft Press Computer Dictionary, 1997, Microsoft Press, 3rd Ed., p. 383.*

(Continued)

*Primary Examiner*—Justin T. Darrow
(74) *Attorney, Agent, or Firm*—Finnegan, Henderson, Farabow, Garrett & Dunner LLP

(57) ABSTRACT

The present inventions provide an integrated, modular array of administrative and support services for electronic commerce and electronic rights and transaction management. These administrative and support services supply a secure foundation for conducting financial management, rights management, certificate authority, rules clearing, usage clearing, secure directory services, and other transaction related capabilities functioning over a vast electronic network such as the Internet and/or over organization internal Intranets.

These administrative and support services can be adapted to the specific needs of electronic commerce value chains. Electronic commerce participants can use these administrative and support services to support their interests, and can shape and reuse these services in response to competitive business realities.

A Distributed Commerce Utility having a secure, programmable, distributed architecture provides administrative and support services. The Distributed Commerce Utility makes optimally efficient use of commerce administration resources, and can scale in a practical fashion to accommodate the demands of electronic commerce growth.

The Distributed Commerce Utility may comprise a number of Commerce Utility Systems. These Commerce Utility Systems provide a web of infrastructure support available to, and reusable by, the entire electronic community and/or many or all of its participants.

Different support functions can be collected together in hierarchical and/or in networked relationships to suit various business models and/or other objectives. Modular support functions can combined in different arrays to form different Commerce Utility Systems for different design implementations and purposes. These Commerce Utility Systems can be distributed across a large number of electronic appliances with varying degrees of distribution.

30 Claims, 99 Drawing Sheets

Cooperation Among Commerce Utility Systems Internal and External To An Organization

U.S. PATENT DOCUMENTS

| | | |
|---|---|---|
| 3,609,697 A | 9/1971 | Blevins |
| 3,790,700 A | 2/1974 | Callais et al. ............. 178/5.1 |
| 3,796,830 A | 3/1974 | Smith |
| 3,798,359 A | 3/1974 | Feistel |
| 3,798,360 A | 3/1974 | Feistel |
| 3,798,605 A | 3/1974 | Feistel |
| 3,806,874 A | 4/1974 | Ehrat ..................... 340/149 R |
| 3,806,882 A | 4/1974 | Clarke |
| 3,829,833 A | 8/1974 | Freeny |
| 3,845,391 A | 10/1974 | Crosby ..................... 325/64 |
| 3,906,448 A | 9/1975 | Henriques |
| 3,911,397 A | 10/1975 | Freeny |
| 3,924,065 A | 12/1975 | Freeny |
| 3,931,504 A | 1/1976 | Jacoby |
| 3,946,200 A | 3/1976 | Juodikis ..................... 219/499 |
| 3,946,220 A | 3/1976 | Brobeck et al. |
| 3,956,615 A | 5/1976 | Anderson et al. |
| 3,958,081 A | 5/1976 | Ehrsam et al. |
| 3,970,992 A | 7/1976 | Boothroyd et al. |
| 3,996,449 A | 12/1976 | Attanasio et al. ...... 235/61.7 R |
| 4,020,326 A | 4/1977 | Coulthurst ............. 235/61.7 R |
| 4,048,619 A | 9/1977 | Forman et al. |
| 4,071,911 A | 1/1978 | Mazur |
| 4,104,721 A | 8/1978 | Markstein et al. .......... 364/200 |
| 4,112,421 A | 9/1978 | Freeny |
| 4,120,030 A | 10/1978 | Johnstone |
| 4,162,483 A | 7/1979 | Entenman ............... 340/147 R |
| 4,163,280 A | 7/1979 | Mori et al. |
| 4,168,396 A | 9/1979 | Best |
| 4,183,085 A | 1/1980 | Roberts et al. ............. 364/200 |
| 4,196,310 A | 4/1980 | Forman et al. |
| 4,200,913 A | 4/1980 | Kuhar et al. |
| 4,209,787 A | 6/1980 | Freeny |
| 4,217,588 A | 8/1980 | Freeny |
| 4,220,991 A | 9/1980 | Hamano et al. |
| 4,232,193 A | 11/1980 | Gerard |
| 4,232,317 A | 11/1980 | Freeny |
| 4,236,217 A | 11/1980 | Kennedy |
| 4,246,638 A | 1/1981 | Thomas ..................... 364/200 |
| 4,253,157 A | 2/1981 | Kirschner et al. |
| 4,259,720 A | 3/1981 | Campbell ................... 364/200 |
| 4,262,329 A | 4/1981 | Bright et al. |
| 4,265,371 A | 5/1981 | Desai et al. |
| 4,270,182 A | 5/1981 | Asija |
| 4,278,837 A | 7/1981 | Best |
| 4,305,131 A | 12/1981 | Best |
| 4,306,289 A | 12/1981 | Lumley |
| 4,309,569 A | 1/1982 | Merkle |
| 4,319,079 A | 3/1982 | Best |
| 4,321,672 A | 3/1982 | Braun et al. ................. 364/408 |
| 4,323,921 A | 4/1982 | Guillou |
| 4,328,544 A | 5/1982 | Baldwin et al. |
| 4,337,483 A | 6/1982 | Guillou |
| 4,361,877 A | 11/1982 | Dyer et al. |
| 4,375,579 A | 3/1983 | Davida et al. |
| 4,405,829 A | 9/1983 | Rivest et al. ............... 178/22.1 |
| 4,433,207 A | 2/1984 | Best |
| 4,434,464 A | 2/1984 | Suzuki et al. |
| 4,442,484 A | 4/1984 | Childs, Jr. et al. .......... 364/200 |
| 4,442,486 A | 4/1984 | Mayer |
| 4,446,519 A | 5/1984 | Thomas |
| 4,454,594 A | 6/1984 | Heffron et al. |
| 4,458,315 A | 7/1984 | Uchenick |
| 4,462,076 A | 7/1984 | Smith |
| 4,462,078 A | 7/1984 | Ross |
| 4,465,901 A | 8/1984 | Best |
| 4,471,163 A | 9/1984 | Donald et al. |
| 4,471,216 A | 9/1984 | Herve ....................... 235/380 |
| 4,484,217 A | 11/1984 | Block et al. |
| 4,494,156 A | 1/1985 | Kadison et al. |
| 4,513,174 A | 4/1985 | Herman |
| 4,523,271 A | 6/1985 | Levien ....................... 364/200 |
| 4,525,599 A | 6/1985 | Curran et al. ............. 178/22.08 |
| 4,528,588 A | 7/1985 | Lofberg |
| 4,528,643 A | 7/1985 | Freeny |
| 4,529,870 A | 7/1985 | Chaum ....................... 235/380 |
| 4,553,252 A | 11/1985 | Egendorf |
| 4,558,176 A | 12/1985 | Arnold et al. |
| 4,558,413 A | 12/1985 | Schmidt et al. |
| 4,562,305 A | 12/1985 | Gaffney, Jr. ............. 178/22.08 |
| 4,562,306 A | 12/1985 | Chou et al. |
| 4,562,495 A | 12/1985 | Bond et al. |
| 4,573,119 A | 2/1986 | Westheimer et al. ........ 364/200 |
| 4,577,289 A | 3/1986 | Comerford et al. |
| 4,578,530 A | 3/1986 | Zeidler ....................... 178/22.09 |
| 4,584,639 A | 4/1986 | Hardy ....................... 364/200 |
| 4,584,641 A | 4/1986 | Guglielmino |
| 4,588,991 A | 5/1986 | Atalla |
| 4,589,064 A | 5/1986 | Chiba et al. |
| 4,590,552 A | 5/1986 | Guttag et al. ............... 364/200 |
| 4,593,183 A | 6/1986 | Fukatsu |
| 4,593,353 A | 6/1986 | Pickholtz |
| 4,593,376 A | 6/1986 | Volk |
| 4,595,950 A | 6/1986 | Lofberg |
| 4,597,058 A | 6/1986 | Izumi et al. |
| 4,598,288 A | 7/1986 | Yarbrough et al. .... 340/825.34 |
| 4,599,489 A | 7/1986 | Cargile ....................... 178/22.08 |
| 4,609,777 A | 9/1986 | Cargile ....................... 178/22.08 |
| 4,609,985 A | 9/1986 | Dozier ....................... 364/200 |
| 4,621,321 A | 11/1986 | Boebert et al. ............. 364/200 |
| 4,621,334 A | 11/1986 | Garcia ....................... 364/550 |
| 4,622,222 A | 11/1986 | Horváth et al. ............... 424/89 |
| 4,634,807 A | 1/1987 | Chorley et al. |
| 4,644,493 A | 2/1987 | Chandra et al. |
| 4,646,234 A | 2/1987 | Tolman et al. |
| 4,652,990 A | 3/1987 | Pailen et al. |
| 4,658,093 A | 4/1987 | Hellman |
| 4,670,857 A | 6/1987 | Rackman |
| 4,672,572 A | 6/1987 | Alsberg |
| 4,672,605 A | 6/1987 | Hustig et al. ................. 370/76 |
| 4,677,434 A | 6/1987 | Fascenda |
| 4,677,552 A | 6/1987 | Sibley, Jr. ................... 364/408 |
| 4,680,731 A | 7/1987 | Izumi et al. |
| 4,683,553 A | 7/1987 | Mollier |
| 4,683,968 A | 8/1987 | Appelbaum et al. ........... 380/4 |
| 4,685,056 A | 8/1987 | Barnsdale et al. |
| 4,688,169 A | 8/1987 | Joshi |
| 4,691,350 A | 9/1987 | Kleijne et al. |
| 4,696,034 A | 9/1987 | Wiedemer |
| 4,700,296 A | 10/1987 | Palmer, Jr. et al. ......... 364/401 |
| 4,701,846 A | 10/1987 | Ikeda et al. |
| 4,712,238 A | 12/1987 | Gilhousen et al. |
| 4,713,753 A | 12/1987 | Boebert et al. |
| 4,727,550 A | 2/1988 | Chang et al. ................... 372/3 |
| 4,740,890 A | 4/1988 | William |
| 4,747,139 A | 5/1988 | Taaffe |
| 4,757,533 A | 7/1988 | Allen et al. |
| 4,757,534 A | 7/1988 | Matyas et al. |
| 4,768,087 A | 8/1988 | Taub et al. |
| 4,780,821 A | 10/1988 | Crossley ..................... 364/200 |
| 4,791,565 A | 12/1988 | Dunham et al. |
| 4,796,181 A | 1/1989 | Wiedemer |
| 4,796,220 A | 1/1989 | Wolfe ....................... 364/900 |
| 4,798,209 A | 1/1989 | Klingenbeck et al. ...... 128/653 |
| 4,799,156 A | 1/1989 | Shavit |
| 4,807,288 A | 2/1989 | Ugon et al. |
| 4,816,655 A | 3/1989 | Musyck et al. ............. 275/380 |
| 4,817,140 A | 3/1989 | Chandra et al. ............... 380/4 |
| 4,823,264 A | 4/1989 | Deming |
| 4,827,508 A | 5/1989 | Shear ........................... 380/4 |
| 4,858,121 A | 8/1989 | Barber et al. |
| 4,864,494 A | 9/1989 | Kobus |
| 4,864,616 A | 9/1989 | Pond et al. ................... 380/25 |
| 4,866,769 A | 9/1989 | Karp ............................. 380/4 |

| | | | | | | |
|---|---|---|---|---|---|---|
| 4,868,736 A | 9/1989 | Walker ........................ 364/200 | | 5,224,160 A | 6/1993 | Paulini et al. |
| 4,868,877 A | 9/1989 | Fischer | | 5,224,163 A | 6/1993 | Gasser et al. |
| 4,888,798 A | 12/1989 | Earnest ........................ 380/4 | | 5,227,797 A | 7/1993 | Murphy ........................ 342/22 |
| 4,893,248 A | 1/1990 | Pitts et al. ............. 364/464.01 | | 5,235,642 A | 8/1993 | Wobber et al. |
| 4,893,332 A | 1/1990 | Brown ........................ 379/97 | | 5,237,614 A * | 8/1993 | Weiss ........................ 713/159 |
| 4,903,296 A | 2/1990 | Chandra et al. | | 5,241,671 A | 8/1993 | Reed et al. |
| 4,919,545 A | 4/1990 | Yu ........................ 380/25 | | 5,245,165 A | 9/1993 | Zhang |
| 4,924,378 A | 5/1990 | Hershey et al. | | 5,247,575 A | 9/1993 | Sprague et al. |
| 4,926,480 A | 5/1990 | Chaum ........................ 380/23 | | 5,251,294 A | 10/1993 | Abelow ........................ 395/155 |
| 4,930,073 A | 5/1990 | Cina | | 5,257,369 A | 10/1993 | Skeen et al. ................. 395/200 |
| 4,937,863 A | 6/1990 | Robert et al. ................... 380/4 | | 5,260,999 A | 11/1993 | Wyman |
| 4,941,175 A | 7/1990 | Enescu et al. ................. 380/4 | | 5,263,157 A | 11/1993 | Janis ........................ 395/600 |
| 4,949,187 A | 8/1990 | Cohen | | 5,263,158 A | 11/1993 | Janis |
| 4,953,209 A | 8/1990 | Ryder, Sr. et al. ............. 380/23 | | 5,263,165 A | 11/1993 | Janis ........................ 395/725 |
| 4,962,533 A | 10/1990 | Krueger et al. ................ 380/25 | | 5,265,164 A | 11/1993 | Matyas et al. |
| 4,975,647 A | 12/1990 | Downer et al. ............. 324/425 | | 5,276,735 A | 1/1994 | Boebert et al. |
| 4,975,878 A | 12/1990 | Boddu et al. .......... 365/189.07 | | 5,276,901 A | 1/1994 | Howell et al. ............... 395/800 |
| 4,977,594 A | 12/1990 | Shear | | 5,280,479 A | 1/1994 | Mary |
| 4,995,082 A | 2/1991 | Schnorr ........................ 380/23 | | 5,283,830 A | 2/1994 | Hinsley et al. ................. 380/25 |
| 4,999,806 A | 3/1991 | Chernow et al. | | 5,285,494 A | 2/1994 | Sprecher et al. |
| 5,001,752 A | 3/1991 | Fischer | | 5,287,407 A | 2/1994 | Holmes ........................ 380/4 |
| 5,005,122 A | 4/1991 | Griffin et al. | | 5,291,598 A | 3/1994 | Grundy ........................ 395/600 |
| 5,005,200 A | 4/1991 | Fischer | | 5,301,231 A | 4/1994 | Abraham et al. |
| 5,010,571 A | 4/1991 | Katznelson | | 5,301,326 A | 4/1994 | Linnett et al. ............... 395/700 |
| 5,014,234 A | 5/1991 | Edwards, Jr. ............... 364/900 | | 5,311,591 A | 5/1994 | Fischer |
| 5,022,080 A | 6/1991 | Durst et al. .................... 380/23 | | 5,319,705 A | 6/1994 | Halter et al. |
| 5,023,907 A | 6/1991 | Johnson et al. | | 5,319,735 A | 6/1994 | Preuss et al. ................. 325/214 |
| 5,027,397 A | 6/1991 | Double et al. .................. 380/4 | | 5,319,785 A | 6/1994 | Halter et al. |
| 5,032,979 A | 7/1991 | Hecht et al. ................. 364/200 | | 5,325,524 A | 6/1994 | Black et al. ................. 395/600 |
| 5,047,928 A | 9/1991 | Wiedemer | | 5,335,169 A | 8/1994 | Chong |
| 5,048,085 A | 9/1991 | Abraham et al. | | 5,335,346 A | 8/1994 | Fabbio ........................ 395/600 |
| 5,050,213 A | 9/1991 | Shear | | 5,337,357 A | 8/1994 | Chou et al. ..................... 380/4 |
| 5,058,162 A | 10/1991 | Santon et al. ................. 380/25 | | 5,337,360 A | 8/1994 | Fischer |
| 5,065,429 A | 11/1991 | Lang ........................ 380/25 | | 5,341,429 A | 8/1994 | Stringer et al. |
| 5,079,648 A | 1/1992 | Maufe ........................ 360/31 | | 5,343,526 A | 8/1994 | Lassers ........................ 380/4 |
| 5,091,966 A | 2/1992 | Bloomberg et al. | | 5,343,527 A | 8/1994 | Moore et al. |
| 5,103,392 A | 4/1992 | Mori | | 5,347,579 A | 9/1994 | Blandford |
| 5,103,459 A | 4/1992 | Gilhousen et al. ............. 375/1 | | 5,349,642 A | 9/1994 | Kingdon ........................ 380/25 |
| 5,103,476 A | 4/1992 | Waite et al. | | 5,351,293 A | 9/1994 | Michener et al. |
| 5,109,413 A | 4/1992 | Comerford et al. ............ 380/4 | | 5,355,474 A | 10/1994 | Thuraisngham et al. |
| 5,111,390 A | 5/1992 | Ketcham | | 5,359,721 A | 10/1994 | Kempf et al. ................. 395/425 |
| 5,113,518 A | 5/1992 | Durst, Jr. et al. ........... 395/550 | | 5,361,359 A | 11/1994 | Tajalli et al. ................. 395/700 |
| 5,119,493 A | 6/1992 | Janis et al. | | 5,365,587 A | 11/1994 | Campbell et al. ............. 380/25 |
| 5,126,936 A | 6/1992 | Champion et al. | | 5,367,621 A | 11/1994 | Cohen et al. ................. 395/154 |
| 5,128,525 A | 7/1992 | Stearns et al. | | 5,369,702 A | 11/1994 | Shanton ........................ 380/4 |
| 5,129,084 A | 7/1992 | Kelly, Jr. et al. ........... 395/650 | | 5,369,707 A | 11/1994 | Follendore, III ........ 380/25 |
| 5,136,643 A | 8/1992 | Fischer | | 5,371,792 A | 12/1994 | Asai et al. ..................... 380/3 |
| 5,136,646 A | 8/1992 | Haber et al. | | 5,373,440 A | 12/1994 | Cohen et al. |
| 5,136,647 A | 8/1992 | Haber et al. | | 5,373,561 A | 12/1994 | Haber et al. |
| 5,136,716 A | 8/1992 | Harvey et al. | | 5,383,113 A | 1/1995 | Kight et al. ................. 364/401 |
| 5,138,712 A | 8/1992 | Corbin ........................ 395/700 | | 5,388,211 A | 2/1995 | Hornbuckle ................ 395/200 |
| 5,146,575 A | 9/1992 | Nolan | | 5,390,247 A | 2/1995 | Fischer |
| 5,148,481 A | 9/1992 | Abraham et al. | | 5,390,297 A | 2/1995 | Barber et al. ................. 395/200 |
| 5,150,407 A | 9/1992 | Chan ........................ 380/4 | | 5,390,330 A | 2/1995 | Talati |
| 5,155,680 A | 10/1992 | Wiedemer | | 5,392,220 A | 2/1995 | van den Hamer et al. |
| 5,163,091 A | 11/1992 | Graziano | | 5,392,390 A | 2/1995 | Crozier |
| 5,164,988 A | 11/1992 | Matyas et al. ................. 380/25 | | 5,394,469 A | 2/1995 | Nagel et al. |
| 5,168,147 A | 12/1992 | Bloomberg | | 5,410,598 A | 4/1995 | Shear |
| 5,185,717 A | 2/1993 | Mori | | 5,412,717 A | 5/1995 | Fischer |
| 5,187,787 A | 2/1993 | Skeen et al. ................. 395/800 | | 5,418,713 A | 5/1995 | Allen |
| 5,191,573 A | 3/1993 | Hair ........................ 369/84 | | 5,420,927 A | 5/1995 | Michali ........................ 380/23 |
| 5,199,066 A | 3/1993 | Logan ........................ 380/4 | | 5,421,006 A | 5/1995 | Jablon |
| 5,199,074 A | 3/1993 | Thor ........................ 380/50 | | 5,422,953 A | 6/1995 | Fischer |
| 5,201,046 A | 4/1993 | Goldberg et al. | | 5,428,606 A | 6/1995 | Moskowitz |
| 5,201,047 A | 4/1993 | Maki et al. | | 5,432,851 A | 7/1995 | Scheidt et al. ................. 380/25 |
| 5,204,897 A | 4/1993 | Wyman ........................ 380/4 | | 5,432,928 A | 7/1995 | Sherman ........................ 395/600 |
| 5,206,951 A | 4/1993 | Khoyi et al. ................. 395/650 | | 5,432,950 A | 7/1995 | Sibigtroth ................... 395/426 |
| 5,208,748 A | 5/1993 | Flores et al. | | 5,438,508 A | 8/1995 | Wyman |
| 5,214,702 A | 5/1993 | Fischer | | 5,440,634 A | 8/1995 | Jones et al. ................. 380/24 |
| 5,216,603 A | 6/1993 | Flores et al. | | 5,442,645 A | 8/1995 | Ugon |
| 5,218,605 A | 6/1993 | Low et al. ................. 371/16.1 | | 5,444,779 A | 8/1995 | Daniele |
| 5,221,833 A | 6/1993 | Hecht | | 5,449,895 A | 9/1995 | Hecht et al. |
| 5,222,134 A | 6/1993 | Waite et al. | | 5,449,896 A | 9/1995 | Hecht et al. |

| | | |
|---|---|---|
| 5,450,490 A | 9/1995 | Jensen et al. ............... 380/6 |
| 5,450,493 A | 9/1995 | Maher |
| 5,453,601 A | 9/1995 | Rosen |
| 5,453,605 A | 9/1995 | Hecht et al. |
| 5,455,407 A | 10/1995 | Rosen |
| 5,455,861 A | 10/1995 | Faucher et al. |
| 5,455,953 A | 10/1995 | Russell |
| 5,457,746 A | 10/1995 | Dolphin |
| 5,457,747 A | 10/1995 | Drexler et al. ............ 380/24 |
| 5,458,494 A | 10/1995 | Krohn et al. |
| 5,463,565 A | 10/1995 | Cookson et al. |
| 5,473,687 A | 12/1995 | Lipscomb et al. |
| 5,473,692 A | 12/1995 | Davis |
| 5,479,509 A | 12/1995 | Ugon |
| 5,485,622 A | 1/1996 | Yamaki |
| 5,490,216 A | 2/1996 | Ricahrdson, III .......... 380/4 |
| 5,491,800 A | 2/1996 | Goldsmith et al. |
| 5,497,479 A | 3/1996 | Hornbuckle |
| 5,497,491 A | 3/1996 | Mitchell et al. |
| 5,499,298 A | 3/1996 | Narasimhalu et al. |
| 5,504,757 A | 4/1996 | Cook et al. |
| 5,504,818 A | 4/1996 | Okano |
| 5,504,837 A | 4/1996 | Griffeth et al. |
| 5,505,461 A * | 4/1996 | Bell et al. ................ 463/25 |
| 5,508,913 A | 4/1996 | Yamamoto et al. |
| 5,509,070 A | 4/1996 | Schull |
| 5,513,261 A | 4/1996 | Maher |
| 5,521,815 A * | 5/1996 | Rose, Jr. ................ 705/28 |
| 5,524,933 A | 6/1996 | Kunt et al. .............. 283/67 |
| 5,530,235 A | 6/1996 | Stefik et al. |
| 5,530,752 A | 6/1996 | Rubin |
| 5,533,123 A | 7/1996 | Force et al. |
| 5,534,855 A | 7/1996 | Shockley et al. ..... 340/825.305 |
| 5,534,975 A | 7/1996 | Stefik et al. |
| 5,535,322 A | 7/1996 | Hecht |
| 5,537,526 A | 7/1996 | Anderson et al. |
| 5,539,735 A | 7/1996 | Moskowitz |
| 5,539,828 A | 7/1996 | Davis |
| 5,550,971 A | 8/1996 | Brunner et al. |
| 5,553,282 A | 9/1996 | Parrish et al. |
| 5,557,518 A | 9/1996 | Rosen |
| 5,557,798 A | 9/1996 | Skeen et al. ............. 395/650 |
| 5,563,946 A | 10/1996 | Cooper et al. |
| 5,568,552 A | 10/1996 | Davis |
| 5,572,673 A | 11/1996 | Shurts |
| 5,574,962 A | 11/1996 | Fardeau et al. ............. 455/2 |
| 5,577,209 A | 11/1996 | Boyle et al. ........... 395/200.06 |
| 5,581,800 A | 12/1996 | Fardeau et al. ............. 455/2 |
| 5,592,549 A | 1/1997 | Nagel et al. |
| 5,603,031 A | 2/1997 | White et al. ............. 395/683 |
| 5,606,609 A | 2/1997 | Houser et al. |
| 5,613,004 A | 3/1997 | Cooperman et al. |
| 5,621,797 A | 4/1997 | Rosen |
| 5,625,693 A | 4/1997 | Rohatgi et al. ............ 380/23 |
| 5,629,770 A | 5/1997 | Brassil et al. ........... 358/261.1 |
| 5,629,980 A | 5/1997 | Stefik et al. ............... 380/4 |
| 5,633,932 A | 5/1997 | Davis et al. |
| 5,634,012 A | 5/1997 | Stefik et al. |
| 5,636,276 A | 6/1997 | Brugger et al. ............ 380/4 |
| 5,636,292 A | 6/1997 | Rhoads |
| 5,638,443 A | 6/1997 | Stefik |
| 5,638,504 A | 6/1997 | Scott et al. |
| 5,640,546 A | 6/1997 | Gopinath et al. |
| 5,649,099 A | 7/1997 | Theimer et al. ......... 395/67.01 |
| 5,655,077 A | 8/1997 | Jones et al. |
| 5,671,279 A | 9/1997 | Elgamal ................. 380/23 |
| 5,678,170 A | 10/1997 | Grube et al. ............... 455/2 |
| 5,687,236 A | 11/1997 | Moskowitz et al. |
| 5,689,565 A | 11/1997 | Spies et al. ............. 380/25 |
| 5,689,566 A | 11/1997 | Nguyen ................. 380/25 |
| 5,689,587 A | 11/1997 | Bender et al. |
| 5,692,047 A | 11/1997 | McManis ............... 380/4 |
| 5,692,180 A | 11/1997 | Lee |
| 5,699,427 A | 12/1997 | Chow et al. .............. 380/3 |
| 5,710,834 A | 1/1998 | Rhoads |
| 5,715,314 A | 2/1998 | Payne et al. ............. 380/24 |
| 5,715,403 A | 2/1998 | Stefik |
| 5,717,923 A | 2/1998 | Dedrick |
| 5,721,788 A | 2/1998 | Powell et al. ............ 382/100 |
| 5,724,424 A | 3/1998 | Gifford ................ 380/24 |
| 5,724,425 A | 3/1998 | Chang |
| 5,732,398 A | 3/1998 | Tagawa |
| 5,740,549 A | 4/1998 | Reilly et al. |
| 5,745,569 A | 4/1998 | Moskowitz et al. |
| 5,745,604 A | 4/1998 | Rhoads |
| 5,745,678 A | 4/1998 | Herzberg et al. .......... 395/186 |
| 5,748,763 A | 5/1998 | Rhoads |
| 5,748,783 A | 5/1998 | Rhoads |
| 5,748,960 A | 5/1998 | Fischer |
| 5,754,849 A | 5/1998 | Dyer et al. |
| 5,757,914 A | 5/1998 | McManis |
| 5,758,152 A | 5/1998 | LeTourneau |
| 5,765,152 A | 6/1998 | Erickson |
| 5,768,426 A | 6/1998 | Rhoads |
| 5,774,872 A | 6/1998 | Golden et al. |
| 5,787,334 A | 7/1998 | Fardeau et al. ............. 455/2 |
| 5,802,590 A | 9/1998 | Draves ................. 711/164 |
| 5,819,263 A | 10/1998 | Bromley et al. |
| 5,842,173 A | 11/1998 | Strum et al. |
| 5,845,281 A | 12/1998 | Benson et al. .............. 707/9 |
| 5,892,899 A | 4/1999 | Aucsmith et al. .......... 395/186 |
| 5,892,900 A | 4/1999 | Ginter et al. ............ 395/186 |
| 5,896,454 A | 4/1999 | Cookson et al. |
| 5,910,987 A | 6/1999 | Ginter et al. ............ 380/24 |
| 5,915,019 A | 6/1999 | Ginter et al. ............. 380/4 |
| 5,917,912 A | 6/1999 | Ginter et al. ............ 380/24 |
| 5,920,861 A | 7/1999 | Hall et al. ................ 707/9 |
| 5,940,504 A | 8/1999 | Griswold ............... 380/4 |
| 5,940,505 A | 8/1999 | Kanamaru ............... 380/4 |
| 5,943,422 A | 8/1999 | Van Wie et al. ........... 380/9 |
| 5,949,876 A | 9/1999 | Ginter et al. ............. 380/4 |
| 5,956,408 A | 9/1999 | Arnold ................. 380/49 |
| 5,966,440 A | 10/1999 | Hair ................... 380/4 |
| 5,978,484 A | 11/1999 | Apperson et al. .......... 380/25 |
| 5,982,891 A | 11/1999 | Ginter et al. ............. 380/4 |
| 5,999,949 A | 12/1999 | Crandall ............... 707/532 |
| 6,009,170 A | 12/1999 | Sako et al. .............. 380/3 |
| 6,016,393 A | 1/2000 | White et al. ............ 385/683 |
| 6,102,965 A | 8/2000 | Dye et al. ............... 717/1 |
| 6,112,181 A | 8/2000 | Shear et al. ............. 705/1 |
| 6,135,646 A | 10/2000 | Kahn et al. ........... 395/200.47 |
| 6,138,119 A | 10/2000 | Hall et al. ............... 707/9 |
| 6,157,721 A | 12/2000 | Shear et al. ............ 380/255 |
| 6,185,683 B1 | 2/2001 | Ginter et al. ............ 713/176 |
| 6,237,786 B1 | 5/2001 | Ginter et al. ............ 213/183 |
| 6,240,185 B1 | 5/2001 | Van Wie et al. .......... 380/232 |
| 6,253,193 B1 | 6/2001 | Ginter et al. ............ 705/5.7 |
| 6,292,569 B1 | 9/2001 | Shear et al. ............ 380/255 |
| 6,363,488 B1 | 3/2002 | Ginter et al. ............ 713/201 |
| 6,389,402 B1 | 5/2002 | Ginter et al. ............ 705/51 |
| 6,427,140 B1 | 7/2002 | Ginter et al. ............ 705/80 |
| 6,449,367 B1 | 9/2002 | Van Wie et al. .......... 380/232 |
| 6,618,484 B1 | 9/2003 | Van Wie et al. .......... 380/232 |
| 6,640,304 B1 | 10/2003 | Ginter et al. ............ 713/193 |
| 6,658,568 B1 | 12/2003 | Ginter et al. ............ 713/193 |
| 6,668,325 B1 | 12/2003 | Collberg et al. .......... 713/194 |

FOREIGN PATENT DOCUMENTS

| | | |
|---|---|---|
| AU | A-36816/97 | 2/1998 |
| AU | A-36840/97 | 2/1998 |
| BE | 9 004 79 | 12/1984 |
| BE | 62-241061 | 12/1984 |
| DE | 29 43 436 A1 | 10/1979 |
| DE | 3 803 982 A1 | 1/1990 |
| DE | 3803982 A1 | 1/1990 |

| | | |
|---|---|---|
| EP | 0 084 441 A1 | 7/1983 |
| EP | 0 128 672 A1 | 12/1984 |
| EP | 0 135 422 A1 | 3/1985 |
| EP | 0 180 460 A1 | 5/1986 |
| EP | 0 370 146 A1 | 11/1988 |
| EP | 0 367 700 A2 | 5/1990 |
| EP | 0 398 645 A2 | 11/1990 |
| EP | 0 398 645 B1 | 11/1990 |
| EP | 0 399 822 A2 | 11/1990 |
| EP | 0 421 409 A2 | 4/1991 |
| EP | 0 456 386 A2 | 11/1991 |
| EP | 0 469 864 A2 | 2/1992 |
| EP | 0 469 864 A3 | 2/1992 |
| EP | 0 565 314 A2 | 10/1993 |
| EP | 0 567 800 A1 | 11/1993 |
| EP | 0 570 123 A1 | 11/1993 |
| EP | 0 593 305 A2 | 4/1994 |
| EP | 0 651 554 A1 | 5/1995 |
| EP | 0 653 695 A2 | 5/1995 |
| EP | 0 668 695 A2 | 8/1995 |
| EP | 0 668 695 A3 | 8/1995 |
| EP | 0 695 985 A1 | 2/1996 |
| EP | 0 696 798 A1 | 2/1996 |
| EP | 0 714 204 A2 | 5/1996 |
| EP | 0 715 243 A1 | 6/1996 |
| EP | 0 715 244 A1 | 6/1996 |
| EP | 0 715 245 A1 | 6/1996 |
| EP | 0 715 246 A1 | 6/1996 |
| EP | 0 715 247 A1 | 6/1996 |
| EP | 0 725 376 A2 | 8/1996 |
| EP | 0 763 936 A2 | 9/1996 |
| EP | 0 749 081 A1 | 12/1996 |
| EP | 0 778 513 A2 | 6/1997 |
| EP | 0 795 873 A2 | 9/1997 |
| EP | 0 800 312 A1 | 10/1997 |
| EP | 0 913 757 A2 | 5/1999 |
| GB | A2136175 | 9/1984 |
| GB | 2264796 A | 9/1993 |
| GB | 2294348 | 4/1996 |
| GB | 2295947 | 6/1996 |
| JP | 61 121145 A | 6/1986 |
| JP | 63 129564 A | 6/1988 |
| JP | 63 289646 A | 11/1988 |
| JP | 01 68853 A | 3/1989 |
| JP | 01 248891 A | 10/1989 |
| JP | 01 296363 A | 11/1989 |
| JP | 02-242352 | 9/1990 |
| JP | 02-247763 | 10/1990 |
| JP | 02-294855 | 12/1990 |
| JP | 04 117548 A | 4/1992 |
| JP | 04 504794 | 8/1992 |
| JP | 04-369068 | 12/1992 |
| JP | 05 173892 A | 7/1993 |
| JP | 05-181734 | 7/1993 |
| JP | 05-257783 | 10/1993 |
| JP | 05 258463 A | 10/1993 |
| JP | 05-268415 | 10/1993 |
| JP | 06 501120 T | 1/1994 |
| JP | 06 152585 A | 5/1994 |
| JP | 06 161719 A | 6/1994 |
| JP | 06-175794 | 6/1994 |
| JP | 06-215010 | 8/1994 |
| JP | 06 250924 A | 9/1994 |
| JP | 06-225059 A | 12/1994 |
| JP | 07-056794 | 3/1995 |
| JP | 07-084852 | 3/1995 |
| JP | 07-141138 | 6/1995 |
| JP | 07-200317 | 8/1995 |
| JP | 07-200492 | 8/1995 |
| JP | 07-244639 | 9/1995 |
| JP | 07 319681 A | 12/1995 |
| JP | 08-137795 | 5/1996 |
| JP | 08-152990 | 6/1996 |
| JP | 08-185292 | 7/1996 |
| JP | 08-185298 | 7/1996 |
| WO | WO 85/02310 | 5/1985 |
| WO | WO 85/03584 | 8/1985 |
| WO | WO 90/02382 | 3/1990 |
| WO | WO 92/06438 | 4/1992 |
| WO | WO 92/22870 | 12/1992 |
| WO | WO 93/01550 | 1/1993 |
| WO | WO 93/01550 A1 | 1/1993 |
| WO | WO 94/01821 | 1/1994 |
| WO | WO 94/03859 | 2/1994 |
| WO | WO 94/06103 | 3/1994 |
| WO | WO 94/16395 | 7/1994 |
| WO | WO 94/18620 | 8/1994 |
| WO | WO 94/22266 | 9/1994 |
| WO | WO 94/27406 | 11/1994 |
| WO | WO 95/14289 | 5/1995 |
| WO | WO 96/00963 | 1/1996 |
| WO | WO 96/03835 | 2/1996 |
| WO | WO 96/05698 | 2/1996 |
| WO | WO 96/06503 | 2/1996 |
| WO | WO 96/13013 | 5/1996 |
| WO | WO 96/21192 | 7/1996 |
| WO | WO 96/24092 | 8/1996 |
| WO | WO 96/27155 A2 | 9/1996 |
| WO | WO 97/03423 | 1/1997 |
| WO | WO 97/07656 | 3/1997 |
| WO | WO 97/25816 | 7/1997 |
| WO | WO 97/32251 | 9/1997 |
| WO | WO 97/43761 A2 | 11/1997 |
| WO | WO 97/48203 | 12/1997 |
| WO | WO 98/09209 A1 | 3/1998 |
| WO | WO 98/10381 A1 | 3/1998 |
| WO | WO 98/37481 A1 | 8/1998 |
| WO | WO 98/45768 A1 | 10/1998 |
| WO | WO 99/01815 A1 | 1/1999 |
| WO | WO 99/24928 A2 | 5/1999 |
| WO | WO 99/48296 A1 | 9/1999 |

OTHER PUBLICATIONS

David Arneke and Donna Cunningham, Document from the Internet: *AT&T encryption system protects information services*, (News Release), Jan. 9, 1995, 1 page.

Claude Baggett, *Cable's Emerging Role in the Information Superhighway,* Cable Labs, (undated), 13 slides.

Theodore Sedgwick Barassi, Document from Internet: *The Cybernotary: Public Key Registration and Certification and Authentication of International Legal Transactions,* (undated), 4 pages.

Hugh Barnes, memo to Henry LaMuth, subject: George Gilder articles, May 31, 1994, 2 pages.

*Comments in the Matter of Public Hearing and Request for Comments on the International Aspects of the National Information Infrastructure*, Before the Department of Commerce, Aug. 12, 1994, pp. 1-15 (comments of Dan Bart).

Michael Baum, "*Worldwide Electronic Commerce: Law, Policy and Controls Conference,*" Nov. 11, 1993, 18 pages.

Robert M. Best, *Preventing Software Piracy With Crypto-Microprocessors,* Digest of Papers, VLSI: New Architectural Horizons, Feb. 1980, pp. 466-469.

Richard L. Bisbey, II and Gerald J. Popek, *Encapsulation: An Approach to Operating System Security,* (USC/Information Science Institute, Marina Del Rey, CA), Oct. 1973, pp. 666-675.

Rolf Blom, Robert Forchheimer, et al., *Encryption Methods in Data Networks,* Ericsson Technics, No. 2, Stockholm, Sweden, 1978.

Rick E. Bruner, Document from the Internet: *PowerAgent, NetBot help advertisers reach Internet shoppers,* Aug. 1997, 3 pages.

Denise Caruso, *Technology, Digital Commerce: 2 plans for watermarks, which can bind proof of authorship to electronic works,* N.Y. Times, Aug. 7, 1995, p. D5.

A.K. Choudhury, N. F. Maxemchuck, et al., *Copyright Protection for Electronic Publishing Over Computer Networks,* (AT&T Bell Laboratories, Murray Hill, N. J.) Jun. 1994, 17 pages.

Tim Clark, *Ad service gives cash back,* Document from the Internet: <www.news.com,/News/Item/0,4,13050,00.html> (visited Aug. 4, 1997), 2 pages.

Frederick B. Cohen, *Operating System Protection Through Program Evolution,* 8246 Computers & Security, No. 6, (Oxford, Great Britain) Oct. 1993, pp. 565-584.

Donna Cunningham, David Arneke, et al., Document from the Internet: *AT &T, VLSI Technology join to improve info highway security,* ( News Release) Jan. 31, 1995, 3 pages.

Lorcan Dempsey and Stuart Weibel, *The Warwick Metadata Workshop: A Framework for the Deployment of Resource Description,* D-Lib Magazine, Jul. 15, 1996.

Dorothy E. Denning and Peter J. Denning, *Data Security,* 11 Computing Surveys No. 3, Sep. 1979, pp. 227-249.

Whitfield Diffie and Martin E. Hellman, *New Directions in Cryptography,* IEEE Transactions on Information Theory, vol. 22, No. 6, Nov. 1976, pp. 644-651.

Whitfield Diffie and Martin E. Hellman, *Privacy and Authentication: An Introduction to Cryptography,* Proceedings of the IEEE, vol. 67, No. 3, Mar. 1979, pp. 397-427.

Stephen R. Dusse and Burton S. Kaliski, *A Cryptographic Library for the Motorola 56000,* Advances in Cryptology-Proceedings of Eurocrypt 90, (I.M. Damgard, ed., Springer-Verlag) 1991, pp. 230-244.

Esther Dyson, *Intellectual Value,* WIRED Magazine, Jul. 1995, pp. 136-141 and 182-183.

*Science, space and technology, Hearing before Subcomm. on Technology, Environment, and Aviation,* May 26, 1994 (testimony of D. Linda Garcia).

James Gleick, *Dead as a Dollar,* The New York Times Magazine, Jun. 16, 1996, Sect. 6, pp. 26-30, 35, 42, 50, 54.

Fred Greguras, Document from Internet: *Softic Symposium '95, Copyright Clearances and Moral Rights,* Dec. 11, 1995, 3 pages.

Louis C. Guillou, *Smart Cards and Conditional Access,* Advances in Cryptography—Proceedings of EuroCrypt 84 (T. Beth et al, Ed., Springer-Verlag, 1985) pp. 480-490.

Harry H. Harman, *Modern Factor Analysis,* Third Edition Revised, University of Chicago Press, Chicago and London, 1976.

Amir Herzberg and Shlomit S. Pinter, *Public Protection of Software,* ACM Transactions on Computer Systems, vol. 5, No. 4, Nov. 1987, pp. 371-393.

Jud Hofmann, *Interfacing the NII to User Homes,* (Consumer Electronic Bus. Committee) NIST, Jul. 1994, 12 slides.

Jud Hofmann, *Interfacing the NII to User Homes, Electronic Industries Association,* (Consumer Electronic Bus Committee) (undated), 14 slides.

Stannie Holt, Document from the Internet: *Start-up promises user confidentiality in Web marketing service,* InfoWorld Electric News (updated Aug. 13, 1997).

Jay J. Jiang and David W. Conrath, *A Concept-based Approach to Retrieval from an Electronic Industrial Directory,* International Journal of Electronic Commerce, vol. 1, No. 1 (Fall 1996) pp. 51-72.

Debra Jones, Document from the Internet: *Top Tech Stories, PowerAgent Introduces First Internet 'Informediary' to Empower and Protect Consumers,* (updated Aug. 13, 1997) 3 pages.

Kevin Kelly, *E-Money,* Whole Earth Review, Summer 1993, pp. 40-59.

Stephen Thomas Kent, *Protecting Externally Supplied Software in Small Computers,* (MIT/LCS/TR-255) Sep. 1980 254 pages.

David M. Kristol, Steven H. Low and Nicholas F. Maxemchuk, *Anonymous Internet Mercantile Protocol,* (AT&T Bell Laboratories, Murray Hill, NJ) Draft: Mar. 17, 1994.

Carl Lagoze, *The Warwick Framework, A Container Architecture for Diverse Sets of Metadata,* D-Lib Magazine, Jul./Aug. 1996.

Mike Lanza, e-mail, *George Gilder's Fifth Article—Digital Darkhorse—Newspapers,* Feb. 21, 1994.

Steven Levy, *E-Money, That's What I want,* WIRED, Dec. 1994, 10 pages.

Steven H. Low and Nicholas F. Maxemchuk, *Anonymous Credit Cards,* AT&T Bell Laboratories, Proceedings of the $2^{nd}$ ACM Conference on Computer and Communication Security, Fairfax, VA, Nov. 2-4, 1994, 10 pages.

Steven H. Low, Nicholas F. Maxemchuk, and Sanjoy Paul, *Anonymous Credit Cards and its Collusion Analysis* (AT&T Bell Laboratories, Murray Hill, N.J.) Oct. 10, 1994, 18 pages.

S. H. Low, N.F. Maxemchuk, et al., *Document Marking and Identification using both Line and word Shifting* (AT&T Bell Laboratories, Murray Hill, N.J.) Jul. 29, 1994, 22 pages.

Malcolm Maclachlan, Document from the Internet: *PowerAgent Debuts Spam-Free Marketing,* TechWire, Aug. 13, 1997, 3 pages.

N.F. Maxemchuk, *Electronic Document Distribution,* (AT&T Bell Laboratories, Murray Hill, N.J.) (undated).

Eric Milbrandt, Document from the Internet: *Steganography Info and Archive,* 1996, 2 pages.

Ryoichi Mori and Masaji Kawahara, *Superdistribution: The Concept and the Architecture,* The Transactions of the EIEICE, V, E73, No. 7, Tokyo, Japan, Jul. 1990.

Walter S. Mossberg, *Personal Technology, Threats to Privacy On-Line Become More Worrisome,* The Wall Street Journal, Oct. 24, 1996.

Nicholas Negroponte, *Some Thoughts on Likely and Expected Communications Scenarios: A Rebuttal,* Telecommunications, Jan. 1993, pp. 41-42.

Nicholas Negroponte, *Electronic Word of Mouth,* WIRED, Oct. 1996, p. 218.

Peter G. Neumann, Robert S. Boyer, et al., *A Provably Secure Operating System: The System, Its Applications, and Proofs,* Computer Science Laboratory Report CSL-116, Second Edition, SRI International, Jun. 1980.

Joseph N. Pelton (Dr.), *Why Nicholas Negroponte is Wrong About the Future of Telecommunication,* Telecommunications, Jan. 1993, pp. 35-40.

Gordon Rankine (Dr.), *Thomas—A Complete Single-Chip RSA Device,* Advances in Cryptography, Proceedings of CRYPTO 86, (A.M. Odiyzko Ed., Springer-Verlag) 1987, pp. 480-487.

Arthur K. Reilly, *Input to the 'International Telecommunications Hearings,' Panel 1: Component Technologies of the*

*NII/GII*, Standards Committee T1-Telecommunications (undated).

Paul Resnick and Hal R. Varion, *Recommender Systems*, Communications of the ACM, vol. 40, No. 3, Mar. 1997 pp. 56-89.

Lance Rose, *Cyberspace and the Legal Matrix: Laws or Confusion?*, 1991.

Steve Rosenthal, *Interactive Network: Viewers Get Involved*, New Media, Dec. 1992, pp. 30-31.

Steve Rosenthal, *Interactive TV: The Gold Rush is on*, New Media, Dec. 1992, pp. 27-29.

Steve Rosenthal, *Mega Channels*, New Media, Sep. 1993, pp. 36-46.

Edward Rothstein, *Technology, Connections, Making the Internet come to you through 'push' technology*, N. Y. Times, Jan. 20, 1997, p. D5.

Ken Rutkowski, Document from Internet: *PowerAgent Introduces First Internet 'Informediary' to Empower and Protect Consumers*, Tech Talk News Story, Aug. 4, 1997, 1 page.

Ira Sager (Edited by), *Bits & Bytes*, Business Week, Sep. 23, 1996, p. 142E.

Schlosstein, Steven, *America: The G7's Comeback Kid*, International Economy, Jun./Jul. 1993, 5 pages.

Ingrid Scnaumueller-Bichl and Ernst Piller, *A Method of Software Protection Based on the Use of Smart Cards and Cryptographic Techniques*, (undated), 9 pages.

Jurgen Schurmann, *Pattern Classification, A Unified View of Statistical and Neural Approaches*, John Wiley & Sons, Inc., 1996.

Victor Shear, *Solutions for CD-ROM Pricing and Data Security Problems*, CD ROM Yearbook 1988-1989 (Microsoft Press 1988 or 1989) pp. 530-533.

Karl Siuda, *Security Services in Telecommunications Networks*, Seminar: Mapping New Applications Onto New Technologies, edited by B. Plattner and P Gunzburger; Zurich, Mar. 8-10, 1988, pp. 45-52, XP000215989.

Sean Smith and J.D. Tygar, *Signed Vector Timestamps: A Secure Protocol for Partial Order Time*, CMU-93-116, School of Computer Science Carnegie Mellon University, Pittsburgh, Pennsylvania, Oct. 1991; version of Feb. 1993, 15 pages.

Mark Stefik, *Letting Loose the Light: Igniting Commerce in Electronic Publication*, (Xerox PARC, Palo Alto, CA) 1994-1995, 35 pages.

Mark Stefik, *Letting Loose the Light: Igniting Commerce in Electronic Publication*, Internet Dreams: Archetypes, Myths, and Metaphors. Massachusetts Institute of Technology, 1996, pp. 219-253.

Mark Stefik, *Chapter 7, Classification*, Introduction to Knowledge Systems (Morgan Kaufmann Publishers, Inc., 1995) pp. 543-607.

Tom Stephenson, *The Info Infrastructure Initiative: Data Super Highways and You*, Advanced Imaging, May 1993, pp. 73-74.

Bruce Sterling, *Literary freeware: Not for Commercial Use*, remarks at Computers, Freedom and Private Conference IV, Chicago, IL, Mar. 26, 1994.

Bruno Struif, *The Use of Chipcards for Electronic Signatures and Encryption*, Proceedings for the 1989 Conference on VLSI and Computer Peripherals, IEEE Computer Society Press, 1989, pp. (4)155-(4)158.

J.D. Tygar and Bennet Yee, *Cryptography: It's Not Just For Electronic Mail Anymore*, CMU-CS-93-107, School of Computer Science Carnegie Mellon University, Pittsburgh, PA, Mar. 1, 1993, 21 pages.

J.D. Tygar and Bennet Yee, *Dyad: A System for Using Physically Secure Coprocessors*, School of Computer Science, Carnegie Mellon University, Pittsburgh, PA (undated), 41 pages.

J.D. Tygar and Bennet Yee, *Dyad: A System for Using Physically Secure Coprocessors*, School of Computer Science, Carnegie Mellon University, Pittsburgh, PA, May 1991, 36 pages.

T. Valovic, *The Role of Computer Networking in the Emerging Virtual Marketplace*, Telecommunications, (undated), pp. 40-44.

Joan Voight, *Beyond the Banner*, Wired, Dec. 1996, pp. 196, 200, 204.

Steven Vonder Haar, Document from the Internet: *PowerAgent Launches Commercial Service*, Interactive Week, Aug. 4, 1997, 1 page.

Robert Weber, *Metering Technologies for Digital Intellectual Property*, A Report to the International Federation of Reproduction Rights Organisations (Boston, MA), Oct. 1994, pp. 1-29.

Robert Weber, Document from the Internet: *Digital Rights Management Technologies*, Oct. 1995, 21 pages.

Robert Weber, *Digital Rights Management Technologies*, A Report to the International Federation of Reproduction Rights Organisations, Northeast Consulting Resources, Inc., Oct. 1995, 49 pages.

Adele Weder, *Life on the Infohighway*, INSITE, (undated), pp. 23-25.

Steve H. Weingart, *Physical Security for the ABYSS System*, (IBM Thomas J. Watson Research Center, Yorktown Heights, NY), 1987, pp. 52-58.

Daniel J Weitzner, *A Statement on EFF's Open Platform Campaign as of Nov., 1993*, 3 pages.

Steve R. White, *ABYSS: A Trusted Architecture for Software Protection*, (IBM Thomas J. Watson Research Center, Yorktown Heights, NY), 1987, pp. 38-50.

Bennet Yee, *Using Secure Coprocessors*, CMU-CS-94-149, School of Computer Science, Carnegie Mellon University, Pittsburgh, PA, 1994, 94 pages.

Frank Yellin, Document from the Internet: *Low Level Security in Java*, Sun Microsystems, 1996, 8 pages.

Symposium: *Applications Requirements for Innovative Video Programming; How to Foster (or Cripple) Program Development Opportunities for Interactive Video Programs Delivered on Optical Media: A Challenge for the Introduction of DVD (Digital Video Disc)* (Oct. 19-20, 1995, Sheraton Universal Hotel, Universal City CA).

*Argent Information, Q&A Sheet*, Document from the Internet: < http://www.digital-watermark.com/>, Copyright 1995, The DICE Company, (last modified Jun. 16, 1996), 7 pages.

*New Products, Systems and Services*, AT&T TECHNOLOGY, vol. 9, No. 4, (undated), pp. 16-19.

*Cable Television and America's Telecommunications Infrastructure*, (National Cable Television Association, Washington, D.C.), Apr. 1993, 19 pages.

CD ROM: *Introducing . . . The Workflow CD-ROM Sampler* (Creative Networks, MCIMail: Creative Networks, Inc.), (undated).

*Codercard, Basic Coder Subsystem* (Interstate Electronics Corp., Anaheim, CA), (undated) 4 pages.

Collection of documents including: *Protecting Electronically Published Properties, Increasing Publishing Profits,*

(Electronic Publishing Resources Inc.,) Jan. 1993, 25 pages.
*Communications of the ACM,* vol. 39, No. 6, Jun. 1996, 130 pages.
*Communications of the ACM,* "Intelligent Agents," vol. 37, No. 7, Jul. 1994, 170 pages.
*Computer Systems Policy Project (CSSP), Perspectives on the National Information Infrastructure: Ensuring Interoperability,* Feb. 1994, 5 slides.
*DiscStore* (Electronic Publishing Resources, Chevy Chase, MD), 1991.
*DSP56000/DSP56001 Digital Signal Processor User's Manual,* (Motorola), 1990, p. 2-2.
*A Supplement to Midrange Systems, Premenos Corp. White Paper: The Future of Electronic Commerce,* Document from Internet: <webmaster@premenos.com>, Aug. 1995, 4 pages.
*CGI Common Gateway Interface,* Document from the Internet: <cgi@ncsa.uiuc.edu>, 1996, 1 page.
*HotJava™: The Security Story,* Document from the Internet: (undated) 4 pages.
*About the Digital Notary Service,* Document from the Internet: < info@surety.com>, (Surety Technologies), 1994-5, 6 pages.
*Templar Overview: Premenos,* Document from the Internet: < info@templar.net> (undated), 4 pages.
*Templar Software and Services, Secure, Reliable, Standards-Based EDI Over the In*ternet: Document from the Internet: <info@templar.net.> (Premenos) (undated), 1 page.
*JAVASOFT, Frequently Asked Questions—Applet Security,* Document from Internet: < java@java.sun.com>, Jun. 7, 1996, 8 pages.
*News from The Document Company XEROX, Xerox Announces Software Kit for Creating 'Working Documents' with Dataglyphs* Document from Internet: Nov. 6, 1995, 13 pages.
*Premenos Announces Templar 2.0—Next Generation Software for Secure Internet EDI,* Document from Internet: <webmaster@templar.net>, Jan. 17, 1996, 1 page.
*WEPIN Store, Stenography (Hidden Writing),* Document from Internet: (Common Law), 1995, 1 page.
*Sag's durch die Blume,* Document from Internet: < marit@schulung.netuse.de,> (German), (undated), 5 pages.
*A Publication of the Electronic Frontier Foundation,* EFFector Online Vol. 6 No. 6., Dec. 6, 1993, 8 pages.
*EIA and TIA White Paper on National Information Infrastructure,* The Electronic Industries Association and the Telecommunications Industry Association, Washington, D.C., (undated).
*Electronic Currency Requirements, XIWT* Cross Industry Working Group), (undated).
*Electronic Publishing Resources Inc. Protecting Electronically Published Properties Increasing Publishing Profits* (Electronic Publishing Resources, Chevy Chase, MD) 1991, 19 pages.
*What is Firefly?,* Document from the Internet: < www.ffly.com>, (Firefly Network, Inc.) Firefly revision: 41.4, (Copyright 1995, 1996), 1 page.
*First CII Honeywell Bull International Symposium on Computer Security and Confidentiality,* Conference Text, Jan. 26-28, 1981, pp. 1-21.
*Framework for National Information Infrastructure Services,* Draft, U.S. Department of Commerce, Jul. 1994.
*Framework for National Information Infrastructure Services,* NIST, Jul. 1994, 12 Slides.

*Intellectual Property and the National Information Infrastructure, a Preliminary Draft of the Report of the Working Group on Intellectual Property Rights,* Green paper, Jul. 1994, 141 pages.
*Multimedia Mixed Object Envelopes Supporting a Graduated Fee Scheme Via Encryption,* IBM Technical Disclosure Bulletin, vol. 37, No. 3, Mar. 1, 1994, pp. 413-417, XP000441522.
*Transformer Rules Strategy for Software Distribution Mechanism-Support Products,* IBM Technical Disclosure Bulletin, vol. 37, No. 48, Apr. 1994, pp. 523-525, XP000451335.
*IISP Break Out Session Report for Group No. 3, Standards Development and Tracking System,* (undated).
*Information Infrastructure Standards Panel: NII "The Information Superhighway",* NationsBank—HGDeal—ASC X9, (undated), 15 pages.
*Invoice? What's an Invoice?,* Business Week, Jun. 10, 1996, pp. 110-112.
*Micro Card* (Micro Card Technologies, Inc., Dallas, TX), (undated), 4 pages.
*Background on the Administration's Telecommunications Policy Reform Initiative,* News Release, The White House, Office of the President, Jan. 11, 1994, 7 pages.
*NII, Architecture Requirements, XIWT,* (undated).
Symposium: *Open System Environment Architectural Framework for National Information Infrastructure Services and Standards, in Support of National Class Distributed Systems,* Distributed System Engineering Program Sponsor Group, Draft 1.0, Aug. 5, 1994, 34 pages.
*Proper Use of Consumer Information on the Internet,* Document from the Internet, White Paper, (Power Agent Inc., Menlo Park, CA) Jun. 1997, 9 pages.
*What the Experts are Reporting on PowerAgent,* Document from the Internet, PowerAgent Press Releases, Aug. 13, 1997, 6 pages.
*What the Experts are Reporting on PowerAgent,* Document from the Internet, PowerAgent Press Releases, Aug. 4, 1997, 5 pages.
*Portland Software's Ziplock,* Internet Information, Copyright Portland Software 1996-1997, 12 pages.
Press Release, National Semiconductor and EPR Partner for Information Metering/Data Security Cards (Mar. 4, 1994).
R01 (Personal Library Software, 1987 or 1988).
R01—Solving Critical Electronics Publishing Problems (Personal Library Software, 1987 or 1988).
*Serving the Community: A Public Interest Vision of the National Information Infrastructure,* Computer Professionals for Social Responsibility, Executive Summary (undated).
Special Report, *The Internet: Fulfilling the Promise;* Lynch, Clifford, *The Internet Bringing Order From Chaos;* Resnick, Paul, *Search the Internet,* Hearst, Marti A., *Filtering Information on the Internet;* Stefik, Mark, *Interfaces for Searching the Web;* Scientific American, Mar. 1997, pp. 49-56, 62-67, 68-72, 78-81.
*The 1:1 Future of the Electronic Marketplace: Return to a Hunting and Gathering Society,* (undated), 2 pages.
*The Benefits of RDI for Database Protection and usage Based Billing* (Personal Library Software, 1987 or 1988).
*The New Alexandria No. 1,* Alexandria Institute, Jul.-Aug. 1986, pp. 1-12.
*Is Advertising Really Dead?,* Wired 1.02, Part 2, 1994.
*How Can I Put an Access Counter on My Home Page?,* World Wide Web FAQ, 1996, 1 page.

XIWT Cross Industry Working Team, Jul. 1994, 5 pages.
Olin Sibert et al., *DigiBox: A Self-Protecting Container for Information Commerce,* Proceedings of the First USENIX Workshop on Electronic Commerce, New York, NY, Jul. 1995, 9 pages.
Olin Sibert et al., *Securing the Content, Not the Wire, for Information Commerce,* InterTrust Technologies Corporation, 1996, 12 pages.
"Information Society Facing a Turning Point, Information Flood, How to Stand Against Flood of Copies," *Nikkei Byte,* 92:316-319, 1991.
Garrett et al., "Toward an electronic Copyright Management System," *J. of the Amer. Soc. for Info.,* 44(8):468-473, 1993.
Kozuka et al., "Electronic Magazine Editing Software for 3DO," *National Technical Report, Matsushita Electric Industrial Co., Ltd.,* 40(6):88-97, 1994.
Rozenblit, Moshe, "Secure Software Distribution," *IEEE Network Operations and Management Symposium,* 2:486-496, 1994.
Seki et al., "A Proposal for New Software Distribution System Using a Secret Code," *Research Report of Information Processing Societies,* 93(64):19-28, 1993.
Terada, Minoru, "Exhausting Software," *bit, Kyoritsu Shuppan Co., Ltd.,* 26(10):12-18, 1994.
Torii et al., "System Architecture for Super Distribution," *Technical Research Report of Institute of Electronics, Information and Communication Engineers,* 94(240):59-66, 1994.
Ueki et al., "Accounting Processing in Right Management Mechanism for Super Distribution," *Study Report of Information Processing Societies,* 90(1):1-10, 1990.
Abadi, M. et al., "Authentication and Delegation with Smart-cards," Technical Report 67, DEC Systems Research Center, Oct. 1990, available at <http://citeseer.nj.nec.com/article/abadi92authentication.html>, 22 pages.
Abadi, M., et al., "A Calculus for Access Control in Distributed Systems", Digital Equipment Corporation, Feb. 28, 1991, revised Aug. 28, 1991.
Abrams, Marshall D, "Renewed Understanding of Access Control Policies", Proceedings of the 16th Computing Natioal Security Conference, 1993.
Aharonian, G., "Software Patents—Relative Comparison of EPO/PTO/JPO Software Searching Capabilities," Source Translation & Optimization.
Anderson, R., "Why Cryptosystems Fail," University Computer Laboratory, Cambridge, Massachusetts, (undated), pp. 1-34.
Antonelli et al, "Access Control in a Workstation-Based Distributed Computing Environment," CITI Technical Report 90-2 (Jul. 17, 1990).
Arms, W.Y., "Key Concepts in the Architecture of the Digital Library," D-Lib Magazine, (Jul. 1995).
Atkins, D., et al., "The Magic Words are Squeamish Ossifrage," (undated), 15 pages.
Atkinson, R., "Security Architecture for the Internet Protocol," Network Working Group RFC 1825 (Aug. 1995).
Aucsmith, D., et al., "Common Data Security Architecture," Intel Architecture Lab, Presentation Material, Jan. 22, 1996, pp. 1-16.
Aucsmith, David, "Tamper Resistant Software: An Implementation", IAL.
Avery, et al., "Recommender Systems for Evaluating Computer Messages," Communications of the ACM, pp. 88-89, (Mar. 1997).

Baker, R.H., *The Computer Security Handbook,* Tab Books, Inc., 1985.
Balbanovic, et al., Content-based, Collaborative Recommendation, Communications of the ACM, pp. 66-72 (Mar. 1997).
Bartock, P.F., et al., "Guide to Securing Microsoft Windows NT Networks," National Security Agency, Sep. 18, 2001, pp. 1-132.
Bellare, M., "iKP-A Family of Secure Electronic Payment Protocols," Apr. 16, 1995, pp. 1-19.
Bellovin, S.M., "Encrypted Key Exchange: Password-Based Protocols Secure Against Dictionary Attacks," Proceedings of the IEEE Symposium on Research in Security and Privacy, Oakland, California, May 1992, 13 pages.
Bellovin, S.M., "There Be Dragons," AT&T Bell Laboratories, Aug. 15, 1992, 16 pages.
Bender et al. "Techniques for Data Hiding," IBM Systems Journal, vol. 35, Nos. 3&4 (1996).
Berghal et al., "Protecting Ownership Rights Through Digital Watermarking," IEEE Computing, vol. 29, No. 7 (Jul. 1996).
Berners-Lee, T.J., et al., "Networked Information Services: The World-Wide Web," Computer Networks and ISDN Systems, 1992, pp. 454-459.
Bernstein et al., "Copyrights, Distribution Chains, Integrity, and Privacy: The Need for a Standards-Based Solution," Electronic Publishing Resources.
Bertino, Elisa, "Data Hiding and Security in Object-Oriented Databases," Dipartimento di Matematica, Universita di Genova, IEEE, 1992, pp. 338-347.
Bickel, R., et al., "Guide to Securing Microsoft Windows XP," National Security Agency, Oct. 30, 2002, pp. 1-129.
Birrell, Andrew, D., et al., "A Global Authentication Service Without Global Trust," Proceedings of the IEEE Symposium on Security and Privacy, Oakland, California, Apr. 1986, pp. 1-11.
Bishop, M., "Anatomy of a Proactive Password Changer," Department of Mathematics and Computer Science, Dartmouth College, (undated), 15 pages.
Bishop, M., "Privacy-Enhanced Electronic Mail," Privacy and Security research Group, IAB.
Blaze, M., "Key Management in an Encrypting File Systems," Proc. Summer 1994 USENIX Technical Conference (Jun. 1994).
Blaze, Matt, "A Cryptographic File System for Unix," pre-print of paper for First ACM Conference on Computer and Communications Security, Fairfax, Virginia, Nov. 3-5, 1993, 8 pages.
Blaze, Matt, et al., "Decentralized Trust Management" Proc. IEEE Conference on Security and Privacy, May 1996.
Blaze, Matt, et al., "The Architecture and Implementaiton of Network Layer Security Under Unix", Columbia University and AT&T Bell Laboratories, 1994.
Boisson, Jean-Francois, "1-Business Perspectives and Requirements, 2-The CITED Project: Keys and Knowledge," CITED 5469.
Boisson, Jean-Francois, "How to CITEDise Application: Guidelines and Examples," CITED 5469.
Boisson, Jean-Francois, "Management of Intellectual Property Rights in the Electronic Commerce: Textile Design Sales and Other Similar Initiatives," EURITIS.
Boisson, Jean-Francois, "Software Components; Deliverable Trial Offer," CITED 5469.
Boly, J.P., et al., "The ESPIRIT Project CAFÉ: High Security Digital Payment Systems," ESCORICS 94, European Symposium on Research Computer Security, Springer-Verlas Berlin, 1994, pp. 217-230.
Boone, J.V.,et al., "The Start of Digital Revolution: SIGSALY Secure Digital Voice Communications in World War II," Dec. 10, 2002.
Borenstein, N., "MIME Extensions for Mail-Enabled Applications: Application/Safe-Tel and Multipart/Enabled-Mail," Nov. 1993, 24 pages.
Born, E, et al., "Discretionary Access Control by Means of Usage Conditions," Computers & Security, vol. 13, No. 5, 1994, pp. 437-450.
Bos et al., "SmartCash: a Practical electronic payment System," Center for Mathematics and Computer Science, Report CS-R9035.
Brands, S., "Untraceable Off-line Cash in Wallets with Observers," CWI, (undated), 17 pages.
Brassil et al., "Electronic Marking and Identification Techniques to Discourage Document Copying," AT&T Bell Laboratories, Proc. Infocom 94, 1994.
Breon, R., et al., "Microsoft Office 97 Executable Content Security Risks and Countermeasures," National Security Agency, Dec. 20, 1999, pp. 1-44.
Brickell, E.F., et al., "The SKIPJACK Algorithm," Jul. 28, 1993, pp. 1-7.
Brin, Sergey, et al., "Copy Detection Mechanism for Digital Documents", Stanford University.
Brockschmidt, K., "A Primer on Designing Custom Controls," Microsoft Systems Journal, Mar./Apr. 1992, pp. 87-101.
Brockschmidt, K., "Implementing OLE 2.0, Part III: Uniform Data Transfer with Data Objects," Microsoft Systems Journal, Dec. 1993, pp. 47-77.
Brockschmidt, K., "Introducing OLE 2.0, Part 1: Windows Objects and the Component Object Model," Microsoft Systems Journal, Aug. 1993, pp. 15-23.
Brockschmidt, K., "OLE 2.0 Part II: Implementing a Simple Windows Object Using Either C or C++," Microsoft Systems Journal, Oct. 1993, pp. 45-62.
Brockschmidt, Kraig, *Inside OLE 2*, Microsoft Press Programming Series, 1994.
Brown, C.W., "Security for Minicomputers and Microcomputers," (undated), pp. 285-298.
Brown, Patrick W., "Digital Signatures: Can They Be Accepted as Legal Signatures in EDI?," 1st Conference on Computer and Communication Security, Nov. 1993, pp. 86-92.
Brumm, P., et al., *80386/80486 Assembly Language Programming*, Windcrest/McGraw-Hill, 1993.
Brunnstein et al., "Intellectual Property Rights and new Technologies," Proceedings of the KnowRight '95 Conference (Aug. 1995).
Bureau Van Dijk Management Report for Task 4.5: Feasibility Study of the Cited Agency, 1992-1993.
Bureau Van Dijk: Gestion Des Contrats; 497C.C.C.E.: CITED(SUITE), Feb. 1993.
Burns, Christopher, "AAP Draft: Local Access and Usage Controls", Association of American Publishers Report, Apr. 13, 1995.
Cabell, D., et al., "Software Protection," May 1985, pp. 35-37.
Calas, C., "Distributed File System Over a Multilevel Secure Architecture Problems and Solutions," Computer Security, ESCORICS 94, Brighton, United Kingdom, Nov. 7-9, 1994, pp. 281-297.

Case, J., "A Simple Network Management Protocol (SNMP)," Network Working Group, May 1990, pp. 1-21.
Castano, S. et al., *Database Security*, Addison-Wesley & Acm Press, 1995.
Chase, Chevy, M.D., DiscStore (Electronic Publishing Resources 1991).
Chaum et al., "Wallet Databases with Observers," CWI, Aarhus University, Advances in Cryptography, Proceedings of Crypto '92, pp. 89-105 (1992).
Chaum, D., "Privacy and Social Protection in Electronic Payment Systems," Chapter 12, The Future of Money in the Information Age.
Chaum, D., "Untraceable Electronic Cash," Extended Abstract, Center for Mathematics and Computer Science, 1988, pp. 319-327.
Chaum, D., *Smart Card 2000*, Elsevier Science Publishers, 1991.
Chaum, D.L., et al., "Implementing Capability-Based Protection Using Encryption," College of Engineering, University of California, Berkeley, Jul. 17, 1978, 12 pages.
Chaum, David, "Achieving Electronic Privacy," Scientific American, Aug. 1992, pp. 96-101.
Chaum, David, "Security Without Identification: Card Computers to Make Big Brother Obsolete," viewed on Aug. 23, 2002 at <http://www.chaum.com/articles/Security_Without_Identification.html> pp. 1-24.
Chaum, David, "Smart Card 2000," Selected Papers from the Second International Smart Card 2000 Conference, Oct. 4-6, 1989.
"List of Articles," <www.chaum.com/articles/list-of-articles.htm>, as on Aug. 23, 2002, 4 pages.
Chor et al., "Tracing Traitors," Crypto 94, p. 257 (1994).
Choudhury, A.K. et al., "Copyright Protection for Electronic Publishing Over Computer Networks," AT&T Bell Laboratories, Murray Hill, NJ, Jun. 1994, 18 pages.
Choy, D.M., et al., "A Digital Library System for Periodicals Distribution", May 1996.
Cina Jr. et al., "ABYSS: A Basic Yorktown Security System PC Software Asset Protection Concepts," IBM Research Report No. RC 12401, IBM Thomas J. Watson Research Center (Dec. 18, 1986).
Clark, Paul, C., et al., "BITS: A Smartcard Protected Operating System," Communications of the ACM, vol. 37, No. 11, Nov. 1994, 66-94.
Clarke et al., "Cryptography Issues in Plain Text," Privacy Law and Policy Reporter (1996).
Coad, Peter, "Object-Oriented Patterns," Communications of the ACM, vol. 35, No. 9, Sep. 1992, pp. 152-159.
Cohen, F.B., *Protection and Security on the Information Superhighway*, John Wiley & Sons, Inc., 1995.
Cook, S., "Net Results," PC World, Dec. 1985, pp. 270-328.
Corbato, F.J., et al., "Introduction and Overview of the Multics System," viewed on Nov. 13, 2001 at <http://www.multicians.org/fjcc1.html> pp. 1-18.
Cornish, Graham, "Copyright Management of Document Supply in an Electronic Age," The CITED™ Solution, Interlending & Document Supply, vol. 21, No. 2, 1993, pp. 13-20.
Cousins, Steve B. et al., "InterPay: Managing Multiple Payment Mechanisms in Digital Libraries."
Coutrot, Francois, et al., "A Single FConditional Access System for Satellite-Cable and Terrestrial TV", IEEE Transactions on Consumer Electronics, vol. 35, No. 3, Aug. 1989.
Cox, B., "Superdistribution," Wired, Sep. 1994, 2 pages.

Cox, Benjamin et al., "NetBill Security and Transaction Protocol," Carnegie Mellon University.

Cox, Brad, "What If There is a Silver Bullet and the Competition Gets it First?," Journal of Object-Oriented Programming, Jun. 1992.

Crocker et al., "MIME Object Security Services," Network Working Group RFC 1848 (Oct. 1995).

Curry, D.A., UNIX System Security: *A Guide for Users and System Administrators*, Addison-Wesley Publishing Company, Inc., 1992.

Curry, David A., "Improving the Security of Your Unix System," Final Report Apr. 1990, pp. 1-74.

Custer, H. *Inside Windows NT*, Microsoft Press, Redmond WA, 1993.

Custer, H., *Inside the Windows NT File System*, Microsoft Press, 1994.

Cybenko, G, et al., "Cognitive Hacking: A Battle for the Mind," Computer, Aug. 2002, 0018-9162/02©2002 IEEE, pp. 50-56.

Date, C.J., "An Introduction to Database Systems," 4th. Ed., vol. 1, Addison-Wesley Publishing Company, 1987.

Davies, D. et al., Security for Computer Networks, 2nd ed., John Wiley & Sons, 1989, 22 introductory pages and pp. 1-377.

Davies, D.W.; Price, W.L.; *Security for Computer Networks*, John Wiley & Sons, 1984.

Davin, J., et al., "SNMP Administrative Model," Network Working Group, Jul. 1992, pp. 1-22.

Davis, D., et al., "Network Security via Private-Key Certificates," MIT Project Athena, (undated), pp. 1-4.

Deering, S.E., "Host Extensions for IP Multicasting," Network Working Group, RFC 1112 (Aug. 1989).

Denning, A., *OLE Controls Inside Out*, Microsoft Press, 1995.

Denning, D. E., "Secure Personal Computing in an Insecure Network," Communications of the ACM, Aug. 1979, vol. 22, No. 8, pp. 476-482.

Denning, D., *Crytography and Data Security*, Addison-Wesley Publishing Company, Inc., 1982.

Denning, Dorothy E.R., *Cryptography and Data Security*, Addison-Wesley Publishing Company, 1982, Reprinted with corrections, Jan. 1983.

Denning, P.J., *Computer Under Attack: Intruders, Worms, and Viruses*, ACM Press, 1990.

Deutsch, P., "GZIP File Format Specification Version 4.3," Network Working Group, May 1996, pp. 12.

Diffie, et al., *Privacy on the Line: The Politics of Wiretapping and Encryption*, Massachusetts Institute of Technology, 1998.

Diffie, Whitfield, "Authentication and Authenticated Key Exchanges", Sun Microsystems and Bell-Northern Research, Mar. 6, 1992.

Diffie, Whitfield, "The First Ten Years of Public-Key Cryptography", Proceedings of the IEEE, vol. 76, No. 5, May 1988.

Diffie, Whitfield, et al., "New Directions in Cryptography", Stanford University, 1976.

DiLascia, Paul, "OLE Made Almost Easy: Creating Containers and Servers Using MFC 2.5," Microsoft Systems Journal, Apr. 1994, pp. 13-33.

Doster et al., "Third-Party Authentication in the Institutional File System," Center for Information Technology Integration.

Dougherty, D., et al., *The Mosaic Handbook for the X Window System*, O' Reilly & Associates, 1994.

Downs, D.D., et al., "Issues in Discretionary Access Control," Proceedings of the 1985 Symposium on Security and Privacy, Apr. 22-24, 1985, Oakland, California, pp. 208-218.

Dukach, S., "SNPP: A Simple Network Payment Protocol," MIT Laboratory for Computer Science, (undated), 7 pages.

Eastlake III et al., "Randomness Recommendations for Security," Network Working Group RFC 1750, Dec. 1994.

Eastlake III, D., "Physical Link Security Type of Service," Network Working Group RFC 1455 (May, 1993).

Ebersol, Joseph, "Protecting Intellectual Property Rights on the Information Superhighways," Mar. 1994.

Eizenberg, G., "Contribution of Information Technology Security to Intellectual Property Protection," CERT-DERI.

Epstein, J., "A Trusted X Window System Server for Trusted Mach," Usenix Assciation Proceedings, Mach Workshop, Oct. 4-5, 1990, Burlington, Vermont, pp. 141-155.

Erickson, John S., "A Copyright Management System for Networke Interactive Multimedia", Proceedings of the 1995 Dartmouth Institute for Advanced Graduate Studies, 1995.

Erickson, John S., "Rights Management Through Enhanced Attribution", Presented at INET 96 Proceedings, Jun. 1996.

Everett, David B., "Smart Card Tutorial-Part 1," Sep. 1992.

Farmer, D., "The COPS Security Checker System," Jul. 10, 1992.

Feistel, H. "Cryptographic Coding for Data-Bank Privacy," IBM document RC 2827 (Mar. 18, 1970).

Ferraiolo, D., et al., "Role-Based Access Control," Reprinted from the Proceedings of the 15th National Computer Security Conference, 1992, pp. 1-11.

Fine, T.,et al, "Assuring Distributed Trusted Mach," Secure Computing Corporation, 1993, 13 pages.

Finin et al., "A Language and Protocol to Support Intelligent Agent Interoperability," Proceedings of the CE & CALS, Washington '92 Conference (Apr. 1992).

Forcht, K.A., *Computer Security Management*, Boyd & Fraser Publishing Company, 1994.

Franklin, M., et al., "An Overview of Secure Distribution Computing," Mar. 24, 1992, pp. 1-46.

Franz, M., "Technological Steps Toward a Software Component Industry," Institut fur Computersysteme, Zurich, Switzerland, (undated), 23 pages.

Frederick, Keith P., "Certification and Accreditation Approach", Air Force Cryptologic Support Center (OL-FP).

Fuchsberger et al., "Public-key Cryptography on Smart Cards," Information Security Group.

Fugini, M., et al., "Security Management in Office Information Systems," Computer Security: A Global Challenge, 1984, pp. 487-498.

Fugini, M.G., et al., "Authorization and Access Control in the Office-Net System," Computer Security in the Age of Information, 1989, pp. 147-162.

Galvin et al., "Security Protocols for version 2 of the Simple Network Management Protocol (SNMPv2)," Network Working Group RFC 1446 (Apr. 1993).

Galvin, J., et al., "SNMP Security Protocols," Network Working Group, Jul. 1992, pp. 1-26.

Gamble, Todd, "Implementing Execution Controls in Unix," Usenix Association, Proceedings of the Seventh Systems Administration Conference, Nov. 1-5, 1993, Monterey, California, pp. 237-242.

Garfinkel, S., *PGP: Pretty Good Privacy*, O' Reilly & Associates, Inc., (undated).

Garfinkel, Simson, et al., *Practical UNIX Security*, O' Reilly & Associates, Inc., 1991.

Gasser, M., et al., "The Digital Distributed System Security Architecture," Reprint from the Proceedings of 1989 National Computer Security Conference, 1989, pp. 1-13.

Gaster, J. L., "Authors' Rights and Neighboring Rights in the Information Society," DG XV/E/4, European Commission.

Gifford, D., et al., "The Cirrus Banking Network," Communications of the ACM, vol. 28, No. 4, Aug. 1985, pp. 798-807.

Gifford, D.K., "Cryptographic Sealing for Information Secrecy and Authentication," Communications of the ACM, vol. 25, No. 4, Apr. 1982, pp. 274-286.

Glide, R., "DAT-Heads: Frequently Asked Questions," 1991, Release 3.1 (Sep. 2, 1992).

Gircys, G.R., *Understanding and Using COFF*, O'Reilly & Associates, Inc. (Nov. 1988).

Glatzer, H., "The Promise of LANs MIS Back in Control," Software News, Mar. 1985, pp. 51-58.

Gligor, V.D., et al., "Object Migration and Authentication," IEEE Transactions on Software Engineering, vol. SE-5, No. 6, Nov. 1979, pp. 607-611.

Gong, Li, "A Secure Identity-Based Capability System," University of Cambridge Computer Laboratory, Jan. 1989, pp. 1-15.

Goodman, Bill, "Compactor Pro."

Gosler, James, "Software Protection: Myth of Reality", *Lecture Notes in Computer Science, Advances in Cryptology*—Crypto '85 Proceedings, 1985.

Gosling, J., "Oak Intermediate Bytecodes," 1995, 5 pages.

Gozani et al., "GAFFES: The Design of a Globally Distributed File System," Report No. UCB/CSD 87/361; Computer Science Division (EECS), U.C. Berkley (Jun. 1997).

Greenwald et al., "The Distributed Compartment Model for resource management and Access Control," Technical report No. TR94-035, The University of Florida (Oct. 1994).

Griswold, Gary N., "A Method for Protecting Copyright on Networks", IMA Intellectual Property Proceedings, vol. 1, Issue 1, Jan. 1994.

Gruber, R., et al., "Disconnected Operation in the Thor Object-Oriented Database System," Laboratory of Computer Science, Massachusetts Institute of Technology, (undated), pp. 1-6.

Guillou, Louis C.; "Smart Cards and Conditional Access", Springer-Verlag, 1988.

Haar, S.V., Document from the Internet: "PowerAgent Launches Commercial Service," Interactive Week, Aug. 4, 1997, 1 page.

Halfhill, T.R., et al., "Agents on the Loose," Byte.com, Feb. 1994, pp. 1-2.

Halfhill, Tom, R., et al., "Just Like Magic?," Byte.com, Feb. 12, 1994, pp. 1-5.

Haller, N., "The S/KEY One-Time Password System," Network Working Group RFC 1760 (Feb. 1995).

Hansen, S.E., et al., "Automated System Monitoring and Notification with Swatch," Proceedings of the 1993 LISA, Monterey, California, Nov. 1-5, 1993, pp. 101-108.

Hardjono, Thomas, "Record Encryption in Distributed Databases," Department of Computer Science, University of New South Wales, Jan. 1990, pp. 386-395.

Hardy, N., "The Keykos Architecture," Eighth Edition, Dec. 1990, pp. 1-8.

Harn, Lein, et al., "A Software Authentication System for the Prevention of Computer Viruses," ACM, 1992, pp. 447-450.

Harris, J., et al., "Bento Specification," Apple Computer, Inc., Jul. 15, 1993, 106 pages.

Harty, K., et al., "Case Study: The VISA Transaction Processing System," May 30, 1988, pp. 1-23.

Hauser, Ralf, "Control Information Distribution and Access," Dissertation Der Wirtschaftswissenschaftlichen Fakultat Der Universitat Zurich, May 31, 1995.

Hauser, Ralf, C., "Does Licensing Require New Access Control Techniques?," Institut fur Informatik, Universitat Zurich, Aug. 12, 1993, 9 pages.

Hauser, Ralf, et al., "LTTP Portection—A Pragmatic Approach to Licenseing", Institut fur Informatik, Universitat Zurich, Jan. 13, 1994.

Hawk, H.S., "RSA & General Magic," email to Good Guys, Jan. 6, 1994, 1 page.

Hellman, "Multi-user Cryptographic Techniques".

Herzberg, Amir, et al., "On Software Protection", Proceedings of the 4th Jerusalem Conference on Information Technology (JCIT), IEE Computer Society Proes. Apr. 1984.

Hickman, Kipp, E.B., SSL 2.0 Protocol Specificatoin.

Hill, William et al., "Edit Wear and Read Wear," Computer Graphics and Interactive Media Research Group, ACM; May 3-7, 1992.

Hill, William et al., "History-Enriched Digital Objects," Computer Graphics and Interactive Media Research Group; Bell Communications Research, 1993.

Hoffman, L.J., *Modern Methods for Computer Security and Privacy*, Prentice-Hall, Inc., 1977.

Holsinger, E., *How Music and Computers Work*, Ziff-Davis Press, 1994.

Holzner, S., *Heavy Metal OLE 2.0 Programming*, IDG Books Worldwide, Inc., 1994.

Honeyman, P., "Digest of the First UNSENIX Workshop on Electronic Commerce (EC 95)," Jul. 1995.

Horster, P., *Communications and Multimedia Security II*, Chapman & Hall, 1996.

Hsiao, D., et al., *Computer Security*, Academic Press, Inc., 1979.

Hutt, A.E., et al., *Computer Security Handbook Second Edition*, Macmillan Publishing Company, 1988, pp. 201-217.

Ioannidis, J., et al., "The Architecture and Implementation of Network-Layer Security Under Unix," Fourth USENIX Security Symposium Proceedings (Oct.), USENIX, Berkeley, Calif. 1993, pp. 1-11.

Jaeger, T, et al., "Support for the File System Security Requirements of Computational E-Mail Systems," Nov. 1994, ACM 0-89791-732-4/94/0011, 9 pages.

Johnson, H.L., et al., "A Secure Distributed Capability Based System," ACM, 1985, pp. 392-402.

Johnson, R., "Info on Telescript," 1994 Software Agents List Archieve, Dec. 6, 1994, pp. 1-4.

Jones et al., "Credentials for Privacy and Interoperation," University of Illinois at Urbana-Champaign.

Kahn, D., *The Codebreakers: The Story of Secret Writing*, The Macmillan Company, 1967.

Kahn, Robert, et al., A Framework for Distgributed Digital Object Services, Corporation for National Research Initiatives, May 13, 1995.

Kaliski, Jr., et al. "A Layman's Guide to a Subset of ASN.1, BER, and DER", RSA Laborato4ries Technical Note, 1991, Revised Nov. 1, 1993.

Kamens, J.I., "Retrofitting Network Security to Third-Party Applications-The SecureBase Experience," Symposium Proceedings, Unix Security IV, Oct. 4-6, 1993, Santa Clara, California, pp. 41-57.

Kaner, Cem et al., *Testing Computer Software*, Second Edition, Van Nostrand Reinhold, 1988.

Kaplan, M., "IBM Cryptolopes, Super Distribution and Digital Rights Management," viewed at < <http://www.research.ibm.com/people/k/kaplan/cryptolope-docs/crypap.html>on Dec. 30, 1996, pp. 1-10.

Karger, P.A., et al., "A VMM Security Kernel for the VAX Architecture," CH2884-5/90/0000/0002, IEEE 1990, pp. 2-19.

Karger, P.A., et al., "Multics Security Evaluation: Vulnerability Analysis," HQ Electronic Systems Division, Hanscom AFB, Technical Report 19, Jun. 1974, 14 pages.

Kastenholz, F., "The Definitions of Managed Objects for the Security Protocols of the Point-to-Point Protocol," Network Working Group RFC 1472 (Jun. 1993).

Katzan, Harry, Jr., *Computer Data Security*, Litton Educational Publishing Company, 1973.

Kautz, "Referral Web: Combining Social Networks and Collaborative Filtering," Communications of the ACM, pp. 63-65 (Mar. 1997).

Keefe, T.F., et al., "Prototyping the SODA Security Model," Department of Computer Science, University of Minnesota, 1990, pp. 211-235.

Kelman, Alistair, "Electronic Copyright Management: Possibilities and Problems", Scientists for Labor Presentation, Nov. 14, 1996.

Kelter, U., "Discretionary Access Controls in a High-Performance Object Management System," 1991 IEEE Computer Society Symposium on Research in Security and Privacy, May 20-22, 1991, Oakland, California, pp. 288-299.

Kelter, U., et al., "Type Level Access Controls for Distributed Structurally Object-Oriented Database Systems," Computer Security, ESCORICS 92, Second European Symposium on Research in Computer Security, Toulouse, France, Nov. 23-25, 1992, pp. 21-40.

Kent, S., "U.S. Department of Defense Security Options for the Internet Protocol," Network Working Group RFC 1108 (Nov. 1991).

Kent, S., Privacy Enhancement for Internet Electronic Mail: "Part II: Certificate-Based Key Management," Network Working Group, RFC 1422, 2002, pp. 1-29.

Ketchpel, Steve P., et al. "Shopping Models: A Flexible Architecture for Information Commerce", Stanford University.

Kim, G.H., et al., "The Design and Implementation of Tripwire: A File System Integrity Checker," Nov. 19, 1993.

Kim, Gene H., et al. "Experiences with Tripwire: Using Integrity Checkers for Intrusion Detection," Purdue Technical Report CSD-TR-94-012, Feb. 21, 1994.

Kim, L., et al., "Novell Cuisine," Proceedings of the ACM SIGUCCS User Services Conference XIX, Nov. 3-6, 1991, Seattle, Washington, pp. 183-184.

Kim, W., et al., "Features of the ORION Object-Oriented Database System," 1989, pp. 251-282.

Kim, Won, et al., *Object-Oriented Concepts, Databases, and Applications*, ACM Press, 1989.

Klemond, P., "Investigating Object Linking and Embedding, Part II: Adding Server Support," Microsoft Systems Journal, May/Jun. 1992, pp. 87-94.

Klemond, P., "Taking the Bull by the Horns: Investigating Object Linking and Embedding, Part I," Microsoft Systems Journal, Mar./Apr. 1992, pp. 19-38.

Kluepfel, H.M., "Securing a Global Village and its Resources: Baseline Security for Interconnected Signaling System #7 Telecommunications Networks," 1993, pp. 195-212.

Koenig, A., "Automatic Software Distribution," Usenix Association Software Tools Users Group, Summer Conference, Salt Lake City, Jun. 12-15, 1984, pp. 312-322.

Kohl et al., "Safeguarding Digital Library Contents and Users," IBM research Division, D-Lib magazine, (Sep. 1997).

Kohl, J. et al., "The Kerberos Network Authentication Service (V 5)," Network Working Group Request for Comments RFC-1510, Sep. 1993, 104 pages.

Kohl, J.T., et al., "The Evolution of the Kerberos Authentication Service," Digital Equipment Corporation, (undated), pp. 1-15.

Kohl, J.T., et al., "The Evolution of the Kerberos Authentication System," 1991.

Kohl, U, et al., "Safeguarding Digital Library Contents and Protecting Documents Rather Than Channels," in *D-lib Magazine*, Sep. 1997, available at <http://www.dlib.org/dlib/september97/ibm/09lotspiech.html>, pp. 1-9.

Kohnfelder, Loren M., "Towards a Practical Public-Key Cryptosystem", May 1978.

Konheim, Alan, G., et al.,*Cryptography: A Primer*, John Wiley & Sons, Inc., 1981.

Konstan, et al., "Applying Collaborative Filtering to Usenet News," Communications of the ACM, pp. 77-87 (Mar. 1997).

Krajewski, Jr., M., "Applicability of Smart Cards to Network User Authentication," Computing Systems, vol. 7, No. 1, Winter 1994, pp. 75-89.

Krajewski, Jr., M., "Smart Card Augmentation of Kerberos,". The Mitre Corporation, (undated), 6 pages.

Krajewski, Jr., M., et al., "Concept for a Smart Card Kerberos," The Mitre Corporation, (undated), 7 pages.

Kramer, M., "Strength in Numbers," PC Week, Jul. 22, 1986, pp. 57-58.

Kreutzer, A.N., "An On-Line System for Controlling and Monitoring Software Usage in a Microcomputer Laboratory," SIGUCCS Newsletter, vol. 18, No. 2, 1988, pp. 29-32.

Krol, E., *The Whole Internet User's Guide and Catalog*, 2$^{nd}$. Ed., O' Reilly & Associates, Inc., 1992.

Kurak, C., et al., "A Cautionary Note On Image Downgrading," Proceedings of the 1992 Computer Security Applications Conference, San Antonio, TX, Dec. 1992, 7 pages.

Lacy, Jack, et al., "Music on the Internet and the Intellectual Property Protection Problem".

Lagoze et al., "A Design for Inter-Operable Secure Object Stores (ISOS)," Cornell University, NCSA, CNRI (Nov. 1995).

Lagoze, Carl, "A Secure Repository Design for Digital Libraries", D-Lib Magazine, Dec. 1995.

LaLonde Wilf, R., et al., *Inside Smalltalk*: vol. 1, Prentice-Hall, Inc., 1990.

Lampson, B. et al., "Authentication in Distributed Systems: Theory and Practice," ACM Trans. Computer Systems, vol. 10, No. 4 (Nov. 1992), 46 pages.

Lampson, B., "Computer Security," Digital Equipment Corporation, 1991, pp. 1-54.

Lampson, B.W., "A Note on the Confinement Problem," Communications of the ACM, Oct., 1973, pp. 1-5.

Lampson, Butler, et al., "Authentication in Distributed Systems: Theory and Practice", Digital Equipment Corporation, 1992.

Landwehr, C.E, et al., "A Taxonomy of Computer Program Security Flaws," ACM Computer Surveys, vol. 26, No. 3, Sep. 1994, pp. 211-254.

Landwehr, C.E., "Formal Models for Computer Security," Computer Surveys, vol. 13, No. 3, Sep. 1981, pp. 247-278.

Langelaar, G.C. "An Overview of Protection Methods in Existing TV and Storage Devices," SMS-TUD-609-1, Final Ver. 1,2 Feb. 26, 1996.

Leary, P., "Are There Ciphers in Shakespeare?," 1995, pp. 1-18.

Leiss, E., "On Authorization Systems with Grantor-Controlled Propagation on Privileges," Compcon 83, Feb. 28-Mar. 3, 1983, San Francisco, California, pp. 499-502.

Lesk, M., "Digital Libraries Meet Electronic Commerce: On-Screen Intellectual Property," (Dec. 15, 1998).

Levine, P.H., et al., "Network License Server," Apollo, Oct. 1987, pp. 1-19.

Lewontin, S., et al., "The DCE Web Project: Providing Authorization and Other Distributed Services to the World Wide Web," Feb. 22, 2002.

Lin, P., "The Encapsulated Security Services Interface (ESSI)," Computer Security (A-37), 1993, pp. 119-135.

Linn, J., "Privacy Enhancement for Internet Electronic Mail: Part I—Message Encipherment and Authentication Procedures," Network Working Group, Aug. 1989, pp. 1-30.

Lipson, S., "Little Black Box 'Blocks' Illicit Software Copying," Stamford Advocate, Sep. 14, 1986, pp. E1-E2.

Lockhart, Jr., H.W., *OSF DCE Guide to Developing Distributed Applications*, McGraw-Hill, Inc., 1994.

Lord et al., "Access Management in Multi-Administration Networks," IEE 2nd International Conference on Secure Communication Systems (1986).

Lunt, Teresa, "Multilevel Security for Object-Oriented Database Systems," SRI International Computer Science Laboratory, 1990, pp. 199-209.

Mann, C.C., "Homeland Insecurity," Sep. 2002.

Mathy, Laurent, "Features of the ACCOPI Multimedia Transport Service", Lecture Notes in Computer Science, No. 1045, Proc. of European Workshop IDMS' 96, Mar. 1996.

Maude, T., et al., "Hardware Protection Against Software Piracy," Communications of the ACM, vol. 27, No. 9, Sep. 1984, pp. 951-959.

McClogbrie et al., "Management Information Base for Network Management of TCP/IP-based Internets," Network Working Group, RFC 1156 (May 1990).

McCloghrie, K., et al., "Definitions of Managed Objects for Administration of SNMP Parties," Network Working Group, Jul. 1992, pp. 1-17.

McCollum, C.J., et al., "Beyond the Pale of MAC and DAC-Defining New Forms of Access Control," Unisys Defense Systems, 1990, pp. 190-200.

McGraw, G., et al., *Java Security*, John Wiley & Sons, Inc., 1997.

Medvinsky, G., et al., "NetCash: A Design for Practical Electronic Currency on the Internet," 1st Conference on Computer and Communication Security, Nov., 1993, pp. 102-106.

Merkle, R.C., "Secure Communications Over Insecure Channels," Communications of the ACM, vol. 21, No. 4, Apr. 1978, pp. 294-296.

Merkle, Ralph C., "Protocols for Public Key Cryptosystems", IEEE, 1980.

Meyer, C.H., et al., *Cryptography: A New Dimension in Computer Data Security*, John Wiley & Sons, Inc., 1982.

Millen, J.K., et al., "Security for Object-Oriented Database Systems," Proceedings of the 1992 IEREE Computer Society Symposium on Research in Security and Privacy, May 4-6, 1992, Oakland, California, pp. 260-272.

Miller, S.P., et al., "Kerberos Authentication and Authorization System," Massachusetts Institute of Technology, Oct. 27, 1998, pp. 1-36.

Minear, S.E., "Providing Policy Control Over Object Operations in a Mach Based System," Secure Computing Corporation, Apr. 28, 1995, 15 pages.

Moens, Jan, "Case of Application of the Generic CITED Model to the CITEDisation of a Directory Database on CD-ROM, Ver. 2.0," ESPIRIT II, Project 5469, The CITED Consortium, Nov. 30, 1992.

Moens, Jan, "Report on the Users Requirements, Ver. 1.0," ESPIRIT II, Project 5469, The CITED Consortium, Nov. 27, 1991.

Moffett, J. D., "Delegation of Authority Using Domain-Based Access Rules," thesis Imperial College of Science, Technology & Medicine, University of London (Jul. 1990).

Moffett, J., et al., "Specifying Discretionary Access Control Policy for Distributed Systems," Computer Communications, vol. 13, No. 9, Nov., 1990, pp. 1-17.

Moffett, J.D., "Specification of Management Policies and Discretionary Access Control," Department of Computer Science, University of York, Jun. 28, 1994, pp. 1-28.

Moffett, J.D., et al., "The Representation of Policies as System Objects," Proceedings of the Conference on Organizational Computer Systems (COCS '91), Atlanta, Georgia, Nov. 5-8, 1991, 16 pages.

Moffett, J.D.,et al., "Policy Hierarchies for Distributed Systems Management," IEEE JSAC Special Issue on Network Management, vol. 11, No. 9, Dec. 1993, pp. 1-4.

Moffett, Jonathan, D., et al., "An Introduction to Security Distributed Systems," Department of Computer Science, University of York, England, Aug. 1993, pp. 1-14.

Montini, G, et al., "Access Control Models and Office Structures," Computer Security: A Global Challenge, 1984, pp. 473-485.

Mori, R. et al., "Superdistribution The Concept and the Architecture," The Transactions of the IEICE, vol. E73, No. 7, Tokyo Japan, Jul. 1990, pp. 1133-1146.

Muftic, Sead, *Security Mechanisms for Computer Networks*, Ellis Horwood Limited, 1989.

Mullender, S., *Distributed Systems*, ACM Press, 1989.

Needham, R.M., "Ading Capability Access to Conventional File Servers," Xerox Palo Alto Research Center, (undated), pp. 3-4.

Neuman et al. "Kerberos: An Authentication Service for Computer Networks," *IEEE Communications magazine* (Sep. 1994).

Neuman, B.C., "Proxy-Based Authorization and Accounting for Distributed Systems," Information Sciences Institute, University of Southern California, 1993, pp. 283-291.

Nguyen, Thanh et al., "Guidelines for Validation of a CITED System," CITED 5469, SA-21-40-003, Jul. 4, 1994.

O'Connor, MaryAnn, "New Distribution Option for Electronic Publishers," Information Access Co., Mar. 1994, pp. 1-6.

Olivier, M.S. et al., "Taxonomy for Secure Object-oriented Databases," ACM Transactions on Database Systems, vol. 19, No. 1, Mar. 1994, pp. 3-46.

Olivier, M.S. et al., "Building a Secure Database using Self-protecting Objects," Computers & Security, vol. 11, No. 3, 1992, 14 pages.

Olivier, M.S. et al., "DISCO: A Discretionary Security Model for Object-oriented Databases," in GG Gable and WJ Caelli, Eds., IT Security: The Need for International Cooperation, pp. 345-357, Elsevier Science Publishers B.V. (North Holland), 1992, 14 pages.

Olivier, M.S. et al., "Secure Object-oriented Databases," Ph.D. Thesis, Rand Afrikaans University, Johannesburg, Dec. 1991, pp. i to xiv and 1-183.

Olivier, M.S., "A Multilevel Secure Federated Database," Database Security, VIII (A-60), 1994, pp. 183-198.

Olson, M., et al., "Concurrent Access Licensing," vol. 6, No. 9, Unix Review, 1988, pp. 67-74.

Orfali, R., et al., *The Essential Distributed Objects Survival Guide*, John Wiley & Sons, Inc., 1996.

Organick, E.I., *The Multics System: An Examination of Its Structure*, MIT Press, 1972.

Paepcke, Andreas, "Summary of Stanford's Digital Library Testbed and Status," Stanford University, D-Lib Magazine (Jul. 1996).

Paradinas, Pierre et al., "New Directions for Integrated Circuit Cards Operating Systems."

Park, J.S., *AS/400 Security in a Client/Server Environment*, John Wiley & Sons, Inc., 1995.

Perlman, Bill, "A Working Anti-Taping System for Cable Pay-Per-View," IEEE Trans. On Consumer Electronics, vol. 35, No. 3 (Aug. 1989).

Pethia et al., "Guidelines for the Secure Operation of the Internet," Network Working Group, RFC 1281 (Nov. 1991).

Picciotto, J., et al., "Extended Labeling Policies for Enhanced Application Support," Computers & Security, vol. 13, No. 7, 1994, pp. 587-599.

Pietreck, M., *Windows Internals: The Implementation of the Windows Opeartion Environment*, Addison-Wesley (1993).

Pijenborg, Mari, F.J., "Auteursrecht En De Digitale Bibliotheek," 195 Open, Jan. 1995.

Pijnenborg, Mari F.J., "CITED Final Report," Elsevier Science B.V., Apr. 1994.

Polk, T.W., "Approximating Clark-Wilson "Access Triples" with Basic UNIX Controls," Symposium Proceedings, Unix Security IV, Oct. 4-6, 1993, Santa Clara, California, pp. 145-154.

Popek, Gerald, J., et al., "Encryption and Secure Computer Networks," Computing Surveys, vol. 11, No. 4, Dec. 1979, pp. 331-356.

Press, J., "Secure Transfer of Identity and Privilege Attributes in an Open Systems Environment," Computers & Security, vol. 10, No. 2, 1991, pp. 117-127.

Press, Jim et al, "A New Approach to Cryptographic Facility Design", ICL Mid-Range Systems Division Reading, Berks, UK.

Purdy, G.B., et al., "Software Protection Scheme," Proceedings of the 1982 Symposium on Security and Privacy, Apr. 26-28, 1982, Oakland California, pp. 99-103.

Rashid, R.F., *CMU Computer Science: A 25th Anniversary Commemorative*, Addison-Wesley Publishing Company, 1991.

Reali, Patti, "Copy Protection: The answer to pay per view's Prayers?," TVRO Dealer, Dec. 1994.

Reiher et al. "Truffles—Secure File Sharing With minimal system Administrator Intervention," UCLA, Trusted Information Systems.

Reiher et al., "Truffles—A Secure Service for Widespread File Sharing," UCLA, Trusted Information Systems.

Rescoria, E., et al., "The Secure HyperText Transfer Protocol," Enterprise Integration Technologies, Jun. 1994, pp. 1-23.

Richardson, D.W., *Electronic Money: Evolution of an Electronic Funds-Transfer System*, The MIT Press (1970).

Rindfrey J., "Security in the World Wide Web," Fraunhofer Institute for Computer Graphics (Dec. 1996).

Rindfrey, Jochen, "Towards an Equitable System for Access Control and Copyright Protection in Broadcast Image Services; The Equicrypt Approach," Fraunhofer Institute for Computer Graphics.

Rivest, R., "The MD5 Message-Digest Algorithm," Network Working Group, Apr. 1992, pp. 1-21.

Rivest, R.L., et al., "A Method for Obtaining Digital Signatures and Public-Key Cryptosystems," Communications of the ACM, vol. 21, No. 2, Feb., 1978, pp. 120-126b.

Rivest, Ronald L., et al., "SDSI—A Simple Distributed Security Infrastructure", MIT and Microsoft Corporation, Apr. 30, 1996.

Roberts, R., et al., *Compute?'s Computer Security*, Compute? Publications, Inc., 1989.

Robinson et al., "Encoding Header Field for Internet Messages," Network Working Group RPC 1154 (Apr. 1990).

Rose et al., "Structure and Identification of management Information for TCP/IP-based Internets," Network Working Group RFC 1155 (May 1990).

Rosenberry, W., et al., "Distributing Applications Across DCE and Windows NT," 1993.

Rosenberry, W., et al., *Understanding DCE*, O'Reilly & Associates, Inc., 1992.

Rosenblit, Moshe, "Secure Software Distribution", IEEE 0-7803-1811-0/94, 1994.

Rosenthal, Doug, "ElNet: A secure, Open Network for Electronic Commerce", IEEE, 1994.

Ross, P.E., "Cops versus robbers in cyberspace," Forbes (Sep. 9, 1996).

Rouaiz, F., "A Web Navigator with Applets in Caml," INRIA.

Rubin et al., "Formal Methods for he Analysis of Authentication Protocols CITI Technical Report 93-7," Center for Information Technology Integration (Nov. 8, 1993).

Rubin et al., "Long Running Jobs in an Authenticated Environment," CITI Technical Report 93-1, Center for Information Technology Integration (Mar. 1993).

Rubin, A.D., "Trusted Distribution of Software Over the Internet," Bellcore, 1995, pp. 1-9.

Rucker, et al., "Personalized Navigation for the Web," Communications of the ACM, pp. 73-75 (Mar. 1997).

Rushby, J.M., "Design and Verification of Secure Systems," ACM, 1981, pp. 12-21.

Russell, D., et al., *Computer Security Basics*, O'Reilly & Associates, Inc., 1991.

Russell, S., "Paradigms for Verification of Authorization at Source of Electronic Documents in an Integrated Environment," Computers & Security, vol. 12, No. 6, 1993, pp. 542-549.

Russell, S., "Planning for the EDI of Tomorrow Using Electronic Document Authorization," Computer Security (A-37), 1993, pp. 243-251.

Sahuguet, A. "Piracy: the Dark Side of Electronic Commerce: CIS-700/2," Univ. of Pennsylvania (May 5, 1998).

Sammer et al., "New Tools for the Internet," Jeanneum Research, Graz University of Technology.

Sandhu, R., et al., "A Secure Kernelized Architecture for Multilevel Object-Oriented Databases," Proceedings of the IEEE Computer Security Foundations Workshop IV, Jun. 1991, Franconia, NH, pp. 139-152.

Sandhu, R.S., "The Typed Access Matrix Model," Proceedings of the IEEE Symposium on Security and Privacy, Oakland California, May 4-6, 1992, pp. 122-136.

Sandhu, R.S., et al., "Data and Database Security and Controls," Handbook of Information Security Management, Auerbach Publishers, 1993, pp. 1-37.

Sandhu, Ravi, S., et al., "Implementation Considerations for the Typed Access Matrix Model in a Distributed Environment," Proceedings of the 15th NIST-SCSC National Computer Security Conference, Baltimore, Maryland, Oct. 1992, pp. 221-235.

Saydjari, O.S., et al., "LOCK Trek: Navigating Unchartered Space," National Computer security Center, 1989, pp. 167-175.

Schaumüller-Bichl, S., "IC-Cards in High-Security Applications," Voest-Alpine AG, (undated), pp. 177-199.

Schill, A., et al., "Mobility Aware Multimedia X. 400 e-mail: A Sample Application Based on a Support Platform for Distributed Mobile Computing," Dresden University of Technology, Faculty of Computer Science, (undated), pp. 1-7.

Schill, A.B., et al., "DC++: Distributed Object-Oriented System Support on top of OSF DCE," 1993.

Schill, A.B., et al., "DCE-The OSF Distributed Computing Environment Client Server Model and Beyond," Oct. 1993.

Schneier, Bruce, *Applied Cryptography: Protocols, Algorithms, and Source Code in C*, John Wiley & Sons, Inc., 1994.

Schulze, Dr. J., "Case of Application of the Generic CITED Model to the CITEDisation in the Software Distribution Process," ESPIRIT II, Project, Jan. 12, 1993.

Schutzer, D., "A Need for a Common Infrastructure: Digital Libraries and Electronic Commerce," Citibank, D-Lib Magazine (Apr. 1996).

Sebes, E.J., "Overview of the Architecture of Distributed Trusted Mach," (undated), pp. 1-10.

Sebes, E.J., et al., "The Architecture of Triad: A Distributed, Real-Time, Trusted System," (undated), pp. 1-12.

Sebes, E.J., et al., "The Triad System: The Design of a Distributed, Real-Time, Trusted System," (undated), pp. 1-12.

Shaffer, S.L., et al., *Network Security*, Academic Press, Inc., 1994.

Shirley, J., "Guide to Writing DCE Applications," 1st Ed. 1992.

Shirley, J., et al., "Guide to Writing DCE Applications," 2nd Ed. 1994.

Shneier, B., "Description of New Variable-Length Key, 64-bit block cipher (Blowfish)," Fast Software Encryption, Cambridge Security Workshop Proceedings (1994).

Short, K.L., *Microprocessors and Programmed Logic*, Prentice-Hall, Inc., 1981.

Sibert, O. et al., "DigiBox: A Self-Protecting Container for Information Commerce," Proceedings of the First USENIX Workshop on Electronic Commerce, New York, NY, Jul. 1995, 13 pages.

Sibert, O., et al., "The Intel 80x86 Processor Architecture: Pitfalls for Secure Systems," (undated), 12 pages.

Simon et al., "Digital Images Protection Management in a Broadcast Framework: Overview/TALISMAN Solution," Thomson-CSF, RTBF, ART3000, UCL.

Sirbu et al., "NetBill: An Internet Commerce System Optimized for Network Delivered Services," Carnegie Mellon University.

Smith, Mary Grace, et al., "A New Set of Rules for Information Commerce: Rights-Protection Technologies and Personalized-Information Commerce Will Affect All Knowledge Workers", CommunicationsWeek, Nov. 6, 1995.

Solomon, A., *PC Viruses: Detection, Analysis and Cure*, Springer-Verlag, (undated).

Solomon, Daniel, J., "Processing Multilevel Secure Objects," Proceedings of the 1981 Symposium on Security and Privacy, Apr. 27-29, 1981, Oakland, California, pp. 56-61.

St. Johns, M., "Draft Revised IP Security Option", Network Working Group, RFC, 1038, Jan. 1998.

Stallings, W., *Cryptography and Network Security: Principles and Practice*, Prentice-Hall, Inc., 1999.

Stefik, M., "Letting Loose the Light: Igniting Commerce in Electronic Publication," Xerox PARC, Palo Alto, CA, 1994-1995, 35 pages.

Stefik, M., "Letting Loose the Light: Igniting Commerce in Electronic Publication, in Internet Dreams: Archetypes, Myths, and Metaphors," Massachusetts Institute of Technology, 1996, pp. 219-253.

Stefik, M., Chapter 7, Classification in "Introduction to Knowledge Systems," Morgan Kaufmann Publishers, Inc., 1995, pp. 543-607.

Stepney et al., "Formal specification of an Access Control System," Software-Practice and Experience, vol. 17, No. 9 (1987).

Strack, Hermann, "Extended Access Control in UNIX System V-ACLs and Context," Usenix Association, Proceedings of the Unix Security II Workshop, Aug. 27-28, 1990, Portland, Oregon, pp. 87-101.

Strohm et al., "ABYSS: Tokens," IBM Research Report No. RC 12402 (Dec. 18, 1986).

Stubblebine, S.G., "Security Services for Multimedia Conferencing," Proceedings of the 16th National Computer Security Conference, Baltimore, Maryland, Sep. 20-23, 1993, pp. 1-5.

Swedlow, Tracy, "2000: Interactive Enhanced Television: A Historical and Critical Perspective," Interactive TV Today.

Tanenbaum et al., "Amoeba System," Communications of the ACM, vol. 33, No. 12 (Dec. 1990).

Tanenbaum et al., "Experiences with the Amoeba Distributed Operating System," Vrije Universiteit and Centrum voor Wiskunde en Informatica.

Tanenbaum et al., "Using Sparse Capabilities in a Distributed Operating System," Vrije Universiteit and Centre for Mathematics and Computer Science.

Tanenbaum, A.S., et al., "Distributed Operating Systems," Computing Surveys, vol. 17, No. 4, Dec. 1985, pp. 419-470.

Tanenbaum, A.S., et al., "Experiences with the Amoeba Distributed Operating System," 1990.

Tanenbaum, A.S., et al., "The Amoeba Distributed Operating System-A Status Report," 1991.

Tanenbaum, A.S., *Modern Operating Systems*, Prentice-Hall, Inc. 1992.

Tanenbaum, A.S., *Operating Systems: Design and Implementation*, Prentice-Hall, Inc. 1987.

Tardo et al., "Mobile Agent Security and Telescript," General Magic, Inc.

Thomas, R.K., et al., "Implementing the Message Filter Object-Oriented Security Model without Trusted Subjects," Proceedings of the IFIP Workshop on Database Security, Aug. 19-21, 1992, Vancouver, Canada, 21 pages.

Thompson, Victoria P., et al., "A Concept for Certification of an Army MLS Management Information System", Proceedings of the 16th National Computer Security Conference, Sep. 20-23, 1993.

Thor, "A Distributed Object-Oriented Database System", MIT.

Thuraisingham, B., et al., "Parallel Processing and Trusted Database Management Systems," ACM, 1993.

Thuraisingham, M.B., "Mandatory Security in Object-Oriented Database Systems," OOPSLA '89 Proceedings, Oct. 1-6, 1989, pp. 203-210.

Ting, T.C., et al., "Requirements, Capabilities and Functionalities of User Role Based Security for an Object-Oriented Design Model," Database Security, V: Status and Prospectus, 1992, pp. 275-297.

Tirkel, A.Z. et al., "Electronic Water Mark," (undated), 5 pages.

Toohey, J., *Using OLE 2.X in Application Development*, Que Corporation, 1994.

Townsend, J.E., "NIST on Internet Security," Mar. 22, 1994, pp. 1-15.

Tuck, Bill, "Electronic Copyright Management Systems: Final Report of a Scoping Study for Elib," (Jul. 1996).

Tygar, J.D., et al., "Cryptography: It's Not Just for Electronic Mail Anymore," CMU-CS-93-107, School of Computer Science Carnegie Mellon University, Pittsburgh, PA, Mar. 1, 1993, pp. 1-21.

Tygar, J.D., et al., "Dyad: A System for Using Physically Secure Coprocessors," School of Computer Science, Carnegie Mellon University, Pittsburgh, PA, pp. 1-41.

Tygar, J.D. et al., "Strongbox: A System for Self Securing Programs," CMU Computer Science: 25th Anniversary Commemorative, R. Rashid (ed.) Addison-Wesley, 1991, pp. 163-197.

Uhler, Stephen A., "PhoneStation, Moving the Telephone onto the Virtual Desktop," 1993 Winter USENIX, San Diego, California, Jan. 25-29, 1993, pp. 131-140.

van Gilluwe, F., *The Undocumented PC: A Programmer's Guide to I/O, Cpus, and Fixed Memory Areas*, Addison-Wesley Publishing Company, 1994.

van Schyndel, R.G., et al., "A Digital Watermark," (undated), 3 pages.

Van Slype, Georges et al, "The Future of CITED; a Feasibility Study," ESPIRIT II, Project 5469, The CITED Consortium, Nov. 15, 1993.

Van Slype, Georges et al., "Natural Language Version of the Generic CITED Model, Ver. 4.2, vol. I: Presentation of the Generic Model," ESPIRIT II, Project 5469, The CITED Consortium, May 8, 1995.

Van Slype, Georges et al., "The Future of CITED: A Feasibility Study, Ver. 1.0, vol. II: Full Report," ESPIRIT II, Project 5469, The CITED Consortium, Feb. 28, 1994.

Van Slype, Georges, "Draft CITED Interchange Formats, Ver. 1.0", ESPIRIT II, Project 5469, the CITED Consortium, Jan. 28, 1994.

Van Slype, Georges, "Knowledge Economy; Future Trends," CITED 5469.

Van Slype, Georges, "Natural Language Version of the Generic CITED Model, Ver. 2.1, vol. II ECMS (Electric Copyright Management System) Design for Computer Based Applications," ESPIRIT II, Project 5469, The CITED Consortium, May 8, 1995.

Van Slype, Georges, "Natural Language Version of the generic CITED model vol. I: Presentation of the generic model, ver. 3.0", and "vol. II: Citedf usage monitoring system design for computer based applications, ver. 1.0" Project 54659, The CITED Consortium, Sep. 6, 1993.

Van Slype, Georges, "PL4 RACE/ACCOPI Workshop on Conditional Access and Copyright Protection," ESPIRIT II, Project 5469, Presentation of the CITED, Nov. 9, 1994.

Van Slype, Georges, "PL4 RACE/ACCOPI Workshop on Conditional Access and Copyright Protection," ESPIRIT II, Project 5469, The CITED Consortium, Nov. 9, 1994.

Van Slype, Georges, "The CITED Approach, Ver. 4.0," ESPIRIT II, Project 5469, The CITED Consortium, Apr. 20, 1994.

Van Slype, Georges, "The Future of CITED: A Feasibility Study, Ver. 1.0, vol. 1: Summary Report and and Recommendations," ESPIRIT II, Project 5469, The CITED Consortium, Feb. 28, 1994.

Van Slype, Georges, "The Future of CITED: A Feasibility Study, Ver. 1.1, vol. III: Draft CITED Interchange Formats," ESPIRIT II, Project 5469, The CITED Consortium, Feb. 28, 1994.

Van Slype, Georges, "The Future of CITED: A Feasibility Study, Ver. 1.1, vol. I: Summary Report and Recommendations," ESPIRIT II, Project 5469, The CITED Consortium, Mar. 28, 1994.

Vickers Benzel, T.C., et al., "Identification of Subjects and Objects in a Trusted Extensible Client Server Architecture," (undated), pp. 1-17.

Vittal, J., "Active Message Processing: Messages as Messengers," Bolt, Beranek and Newman, Inc., 1980, pp. 175-195.

Voydock, V.L., et al., "Security Mechanisms in High-Level Network Protocols," Computing Surveys, vol. 15, No. 2, Jun. 1983, pp. 135-171.

Wagner, N. "Fingerprinting," Drexel University, IEEE Symp. On Info. and Privacy (Apr. 1993).

Walker, Bruce, J., et al., *Computer Security and Protection Structures*, Dowden, Hutchinson, & Ross, Inc., 1977.

Walker, S., "Notes from RSA Data Security Conference," Jan. 18, 1994, pp. 1-3.

Ware, W., Chairman RAND Corporation "Panel: The InterTrust Commerce Architecture," 1997, 6 pages.

Wayner, P., "Agents Away," Byte.com, May 1994, pp. 1-9.

Wayner, Peter, *Digital Copyright Protection*, Academic Press, 1997.

Weadon, P.D., "The SIGSALY Story," Dec. 10, 2002.

Weingart, S.H., "Physical Security for the uABYSS System", IEEE, 1987.

Wells, Rob, *Odyssey of Plastic Purchase; 20-Second Round Trip,* Associated Press, Dec. 1993.

White, J.E., "Telescript Technology: An Introduction to the Language," General Magic, Inc., (undated), pp. 1-13.

White, James E., "Telescript: The Foundation for the Electronic Marketplace", Ver. 5.0, General Magic, Inc., Nov. 30, 1993.

White, S.R., "ABYSS: A Trusted Architecture for Software Protection," (IBM Thomas J. Watson Research Center, Yorktown Heights, NY), 1987, pp. 38-50.

White, Steve R.; Comerford, Liam; ABYSS: A Trusted Architecture for Software Protection:, IEEE, Apr. 27, 1987.

White, Steve R.; Comerford, Liam; "ABYSS: An Architecture for Softweare Protection", IEEE Transations on Softwware Engineering, vol. 16, No. 6, Jun. 1990.
Willett, S., "Metered PCs: Is Your System Watching You?, Wave Systems Beta Tests New Technology," IDG Communications, Inc., May 2, 1994, pp. 1-6.
Williams, S., "An MSJ Interview with Microsoft's Chief Architect of OLE, Tony Williams," Microsoft Systems Journal, Oct. 1993, pp. 55-66.
Williams, Tony, "Microsoft Object Strategy", Microsoft PowerPoint Presentation, 1990.
Winslet et al., "Formal Query Languages for Secure Relational Databases," ACM Transactions on Database Systems, vol. 19, No. 4 (Dec. 1994).
Wobber, E. et al., "Authentication in the Taos Operating System," an extended version of a paper presented at the 14th ACM Symposium on Operating System Principles, Dec. 1993, 44 pages, (Digital Paper).
Wobber, E., et al., "Authentication in the Taos Operating System," an extended version of a paper presented at the 14$^{th}$ ACM Symposium on Operating System Principles, Dec. 1993, pp. 1-38.
Wobber, Edward, et al., "Authentication in the Taos Operating System", Digital Equipment Corporation, Dec. 10, 1993.
Wong, R., et al., "The SIDOS System: A Secure Distributed Operating System Prototype," Odyssey Research Associates, Oct. 1989, pp. 172-183.
Woo, Thomas, Y.C., et al., "A Framework for Distributed Authorization," Proceedings of the 1$^{st}$ Conference Computer and Communication Security, Nov. 1993, pp. 112-118.
Wood, P.H., et al., UNIX System Security, Pipline Associates, Inc., 1985.
Yee, B., et al., "Secure Coprocessors in Electronic Commerce Applications," Proceedings of the First Usenix Workshop on Electornic Commerce, New York, New York, Jul. 1995, 16 pages.
Young, W.D., "Verifiable Computer Security and Hardware: Issues," Technical Report, Computational Logic Inc., Sep. 1991, 43 pages.
Zeleznick, M.P., "Security Design in Distributed Computing Applications," Department of Computer Science, University of Utah, Dec. 1993, 16 pages.
Zelnick, Nate, "Keeping Business Safe on the Internet," PC Magazine, Apr. 25, 1995, pp. 1-2.
Zurko, M.E., "Panels at the 1997 IEEE Symposium on Security and Privacy," Oakland, CA, May 1997, 12 pages.
"Cryptolope Containers Technology: A White Paper", IBM InfoMarket Business Development Group.
RSA Security; News; "Hilgraeve Ships Secure Version of HyperACCESS/5," <http://rsasecurity.com/news/pr/940112-8.html.>, dated Jan. 12, 1994, pp. 1-2.
A Brief History of the Green Project, viewed on Mar. 12, 2002 at <http://java.sun.com/people/jag/green/index.html> pp. 1-2.
A2b's Recent Press Coverage, (1998).
"Access Control and Copyright Protection for Images Security Technology for Graphics and Communication Systems—RACE M1005: ACCOPI", webpage, Security Projects at Fraunhofer 1GD, 2002.
"ACCOPI RACE Project M1005 Warning of ACCOPI web pages removal," UCL Laboratoire de telecommunications et teledetection.
"Achievements Archive," www.imprimatur.net/ web pages.
"American National Standard: Specification for Financial Message Exchange Between Card Acceptor and Acquirer, X9.15," American Banker's Association, 1990.
"An Introduction to Safety and Security in Telescript," (undated), 8 pages.
"AT&T PersonaLink," Before Feb. 13, 1995.
"AT&T Smart Card Systems & Solutions," AT&T (1993).
"Automation of Securities Markets and Regulatory Implications, Financial Market Trends," No. 50, pp. 20-33, Oct. 1991. [File 148, Gale Group Trade & Industry DB, Dialog(R) commercial database].
Bell-Labs Secure Technologies, "Information Vending Encryption System (IVES)™," Lucent Technologies, May 31, 2002, pp. 1-16.
Byte.com, "Speaking the Same Language," May 1994, pp. 1-2.
CardTech/SecurTech 94 Conference Proceedings, "Building Foundations for Innovation," CardTech/SecurTech, Inc., Apr. 1994, 1,031 pages.
Carnegie Mellon University, "Internet Billing Server," Prototype Scope Document, INI Tech Report, Oct. 14, 1993, pp. 1-29.
Central Point Anti-Virus, Central Point Software, 1993.
CITED: Copyright in Transmitted Electronic Documents, Special Interest Group, CITED Meeing, Heathrow, Sep. 22, 1993.
CITED: Final Report: A Guide to CITED Documentation, ESPIRIT, Project 5469, ISBN 0-7123-2115-2, The CITED Consortium, Sep. 1994.
CITED: Preparation of the CITED Model Functional Requirements Specifications; Discussion Paper (Revision 1), Bureau Van Dijk, Jan. 16, 1991.
CITED: Preparation of the CITED Model Functional Requirements Specifications; Reports of the Interviews with Five CITED Partners, (Partners: Sagem, Telesystemes, NTE, Elsevier, Oxford University Press), Bureau Van Dijik, Apr. 5, 1991.
Coalition for Networked Information, Interactive Multimedia Association, John F. Kennedy School of Government, "Proceedings: Technological Strategies for Protecting Intellectual Property in the Networked Multimedia Environment," 1994, Journal of the Interactive Multimedia Association, available at <http://www.cni.org/docs/ima.ip-workshop>, 308 pages.
Collection of Documents Including: Protecting Electronically Published Properties, Increasing Publishing Profits, (Electronic Publishing Resources Inc.) Jan. 1993, 25 pages.
Competitive Analysis AT&T/a2b music (Jun. 16, 1998).
"Copyright Ownership Projection in Computer-Assisted Training", COPICAT—8195, ESPRIT, Dec. 1993.
COPYSMART—20517: "CITED Based Multi-media IPR Management on Cost Effective Smart Device," European Inforamtion Technology for Information Science, start date Dec. 1, 1995.
"CopySmart (CSM) suit," European Information technology for Information Science.
"CREANET—Creative Rights European Agency NETwork—Project Profile," Information Society Technologies (Feb. 18, 2000).
"Cryptographic API Specification," Version 0.6, Microsoft, Mar. 1995.
CUPID Protocols and Services (Version 1): "An Architectural Overview," Nov. 1992, available at <http//www.cni.org/projects/CUPID>, 25 pages.
CUPID, "Protocols and Services: An Architectural Overview", IP Workshop, Ver. 1, Last updated Nov. 20, 1997.

"Data Network and Open System Communications, Directory: Information Technology—Open Systems Interconnection—The Directory: Overview of Concepts, Models, and Services," ITU-T Recommendation X.500, International Telecommunication Union (Nov. 1993).

"DCE Technology at Work," Distributed Computing Environment, http://www.opengroup.org/tech/dce/tech/tech.htm, Nov. 7, 2000, pp. 1-3.

"Deliverable D3: Specification of the Infrastructure and Explanation of Trust and Confidence Building Solutions," Ver. 0.1, Telenet (Jul. 18, 2000).

Department of Defense Computer Security Center, "Department of Defense Password Management Guideline," Department of Defense Computer Security Center, Apr. 12, 1985, pp. 1-34.

Department of Defense Standard, "Department of Defense Trusted Computer System Evaluation Criteria," Dec. 1985, pp. 1-72.

Department of Defense, "Trusted Computer System Evaluation Criteria," Dec. 1985, 72 pages.

"Digital Broadband Delivery System, Phase 1.0, System Overview," Revision 1.0, Scientific Atlanta, 1997.

"Digital Rights Enforcement and Management: SuperDistribution of Cryptolopes", IBM.

"DOD" Rainbow Series.

Dynamic linking of SunOS.

EFFector Online, vol. 6, No. 6, "A Publication of the Electronic Frontier Foundation," 8 pages, Dec. 6, 1993.

"EFT Network Data Book; 1993 Edition," Bank Network News, vol. 11, No. 13, Nov. 1992.

"Electronic Reverse Copyright Management System (ERCOMS)," International Institute for Electronic Library Research, website updated by Ramsden, Anne (Jul. 22, 1996).

E-mail from Caglar Gunyakti entitled: "Private Test Needed," Apr. 28, 2001, 1 page.

Email from Chris Drost-Hansen re press release: "AT&T Launches A2B Music Trial for Delivering Songs Over the Internet," Business Wire (Nov. 3, 1997).

Email from Edmond Kouka to Jean-Francois Boisson re TELENET TELEtraining platform—Bogdan Lutkiewicz, Poland, Gdansk (Mar. 4, 2001).

"ESPIRIT Project 20676—IMPRIMATUR—Intellectual Multimedia Property Rights Model and Terminology for Universal Reference," IMPRIMATUR Consortium (Oct. 1988).

"ESPIRIT Project: 5469: Contract Amendment No. 2;" Commission of the European Communities, Sep. 16, 1993.

"ESPRIT Project 22226—MUSE—Developing Standardized Digital media Management, Signaling and encryption Systems for the European Music Sector," International Federation of the Phonographic Industry (Oct. 1998).

"ESPRIT Project 24378—MENHIR European Multimedia Network of High Quality Image Registration," Museums On Line (Feb. 1, 1997).

"Europe and The Global Information Society Recommendations to the European Council," Bamgemann Report, www.medicif.org web pages, Global Information Society (May 1994).

"Forum on Risks to the Public in Computers and Related Systems," The Risks Digest, vol. 15; Issue 39, Jan. 21, 1994, pp. 1-12.

"Forum on Technology-Based Intellectual Property Management—Electronic Commerce for Content", IMA INtellectual Property Proceedings, vol. 2, Jun. 1996.

FreeBSD System Manager's Manual "LDCONFIG", Oct. 3, 1993.

"Gemplus. MCOS: Multi Application Chip Operating System—Introduction," Gemplus Card International (1990).

Global Projects Group, "Smart Card Technology International: The Global Journal of Advanced Card Technology," undated, pp. 1-151.

"Guide to the Secure Configuration and Administration of Microsoft Exchange 5.x®'" National Security Agency, Jun. 20, 2002, pp. 1-58.

Handwritten note re: GVS and AJL, Mar. 2, 1994.

Hewlett Packard Co., "Manager's Guide to MPE/iX Security," Hewlett-Packard Company, Apr. 1994.

IBM, "Key Cryptolope Components," viewed on Mar. 13, 2002 at <http://www-3.ibm.com/software/security/cryptolope.about.html> pp. 1-2.

IBM, "OpenDoc vs. OLE 2.0: Superior by Design," IBM, Jan. 1994, pp. 1-4.

IBM,"IBM Cryptolope Technology-Executive Summary," viewed on Mar. 13, 2002 at <http://www-3.ibm.com/software/security/cryptolope.about.html> pp. 1-3.

"Imprimatur News," iMPRIMATUR (Dec. 1998).

Information Infrastructure Standards Panel: NII "The Information Superhighway," NationsBank—HGDeal—ASC X9, (undated), 15 pages.

Information Systems Audit and Control Association-Montreal Chapter, "Authentification dans les environnements de traitement distributes," viewed on Mar. 25, 2002 at <http:www.apvcsi-montreal.ca/en/publications/contact133.html> pp. 1-15.

"Intellectual Property and the National Information Infrastructure, a Preliminary Draft of the Report of the Working Group on Intellectual Property Rights," Green paper, Jul. 1994, 141 pages.

"Interchange Message Specification for Debit and Credit Card Message Exchange Among Financial Institutions," American National Standard, Accredited Standards Committee X9-Financial Services Committee, ANSI X9.2-1988, American Bankers Association, May 16, 1988.

International Infrastructure Standards Panel, "IISP Need #31-Containers or Secure Packaging," Electronic Publishing Research, Sep. 18, 1995, pp. 1-3.

International Infrastructure Standards Panel, "IISP Need #32-Authentication of Content," Electronic Publishing Research, Sep. 18, 1995, pp. 1-3.

International Infrastructure Standards Panel, "IISP Need #33-Control Enforcement," Electronic Publishing Research, Sep. 18, 1995, pp. 1-3.

International Infrastructure Standards Panel, "IISP Need #34-Billing and Payment," Electronic Publishing Research, Sep. 18, 1995, pp. 1-3.

International Infrastructure Standards Panel, "IISP Need #35-Reporting," Electronic Publishing Research, Sep. 18, 1995, pp. 1-3.

International Standard ISO8583, "Bank Card Originated Messages—Interchange Message Specifications—Content for Financial Transactions," International Organization for Standardization, Aug. 15, 1987, pp. 1-33.

"Introduction to Smart Cards v. 1.0", Gemplus Card Internatioal, Mar. 21, 1991.

"Invoice? What's an Invoice?," Business week, Jun. 10, 1996, pp. 110-112.

iOpener, Registered Trademark of National Semiconductor Corporation, Registration date Oct. 4, 1994, 1 page.

ISO 11568-1 and -2, "Key Management (retail)—Part I: Introduction to Key Management; Part II: Key Management Techniques for Symmetric Ciphers," ISO (Dec. 1, 1994).
ISO 13491-1: "Secure Cryptographic Devices (retail)—Part I: Concepts, Requirements and Evaluation Methods," ISO (Jun. 15, 1998).
ISO 7498/1: Open Systems Interconnection: Security Architecture (1988).
ISO 7498/2: Open Systems Interconnection: Security Architecture (1988).
ISO 7813-1987 Identification Cards-Financial Transaction Cards, ISO, 1987.
ISO 8583-2: "Financial Transaction Card Originated Messages—Interchange Message Specifications—Part 2: Application and registration Procedures for Institution Identification Codes (IIC)," ISO (Jul. 1, 1998).
ISO 8583-3: "Financial Transaction Card Originated Messages—Interchange Message Specifications—Part 3: Maintenance Procedures for Codes," ISO (Jul. 1, 1998).
ISO 9564-1 & -2: "Personal Identification Number (PIN) management and security—Part I: Basic Principles and Requirements for online PIN Handling in ATM and POS Systems; & -2 Approved Algorithm(s) for PIN Encipherment," ISO (Apr. 15, 2002 & Dec. 15, 1991).
ISO 9807: "Banking and related Financial Services—Requirements for Message Authentication (retail)," ISO (Dec. 15, 1991).
"JUKEBOX—Music Across Borders," LIB-JUKEBOX/4-1049.
"Key Management Using ANSI X9.17," Federal Information Processing Standards Publication 171, U.S. Department of Commerce (Apr. 1992).
"KeyKOS Principles of Operation," Key Logic document KL002-04, 1985, Fourth Edition (Jan. 1987).
Letter re: ESPIRIT III-Project 5469 (CITED) from A. Stajano at Commission of the European Communities, Oct. 7, 1993.
"Mach Books," viewed on Feb. 6, 2002 at http://www2.cs.cmu.edu/afs/cs/project/mach/public/www/doc/books.html., pp. 1-3.
"Microsoft Authenticode Technology," Microsoft Corporation, Oct. 1996.
Microsoft Internet Explorer v 2.0.
Microsoft Press, OLE 2 Programmer's Reference; vol. 1, "Working with Windows Objects," 1994.
Miscellaneous letter from Georges Van Slype at Bureau Van Dijik, Feb. 28, 1994.
Miscellaneous Letters from Georges Van Slype at Bureau Van Dijk, Mar. 30, 1995.
Miscellaneous Letters from Georges Van Slype at Bureau Van Dijk, Feb. 13, 1995 and Nov. 2, 1994.
Miscellaneous Letters from Georges Van Slype at Bureau Van Dijk, Sep. 12, 1994, May 11, 1994, May 10, 1994, May 6, 1994, May 4, 1994, Apr. 21, 1994, Apr. 20, 1994..
Miscellaneous Letters from Georges Van Slype at Bureau Van Dijk, Apr. 19, 1994, Apr. 18, 1994, Apr. 11, 1994, Apr. 6, 1994..
Miscellaneous Letters from Georges Van Slype at Bureau Van Dijk, Mar. 30, 1994, Mar. 24, 2994, Feb. 10, 1994.
Miscellaneous Letters from Georges Van Slype at Bureau Van Dijk, Feb. 9, 1994, Jan. 27, 1994, Jan. 19, 1994, Jan. 12, 1994, Dec. 22, 1993, Nov. 30, 1993, Nov. 22, 1993, Dec. 6, 1993, Nov. 16, 1993, Oct. 15, 1993, Oct. 7, 1993, Oct. 4, 1993, Sep. 20, 1993, Sep. 7, 1993, May 19, 1993, Oct. 19, 1993.

*Motorola MC68030 Enhanced 32-bit Microprocessor User's Manual, 2nd Ed.,* Prentice-Hall, 1989.
"MSDN-INF: LAN Manager 2.1 Server Autotuning (Part2)," PSS ID No. 080078, Microsoft (Feb. 1993).
"MSDN-Licence Service Application Programming Interface," API Specification v1.02, Micorsoft (Jan. 1993).
Multics, Home; viewed on Nov. 12, 2001 at <http://www.multicians.org> pp. 1-3.
"Multimedia Mixed Object Envelopes Supporting a Graduated Fee Scheme via Encryption"; IBM Technical Disclosure BUlletin, vol. 37, No. 3, Mar. 1994.
"Multimedia System Services Ver. 1.0", Hewlett-POackard, IBM, & SunSoft, 1993.
National Computer Security Center, "Trusted Unix Working Group (TRUSIX) Rationale for Selecting Access Control List Features for the UNIX (R) System," Aug. 18, 1989.
National Institute of Standards and Technology, "History of Computer Security: Early Computer Security Papers, Part 1," viewed on Sep. 4, 2002 at <http://csrc.nist.gov/publications/history/index.html> pp. 1-27.
National Security Agency, "A Guide to Understanding Security Modeling in Trusted Systems," Oct. 1992, 122 pages.
National Semiconductor "iPower Technology," (undated), 11 pages.
Netscape, "SSL 2.0 Protocol Specification," viewed at http://home.netscape.com/eng/security/SSL.2html Jan. 23, 2003.
NIST & NSA, "Federal Criteria for Information Technology Security," vol. II, Version 1.0, National Institute of Standards and Technology and National Security Agency, Dec. 1992, 270 pages.
"NSA Korean War 1950-1953 Commemoration," History Papers, National Security Agency, http://www.nsa.gov/korea/papers.htm, pp. 1-2.
"OLE 2.0 Draft Content: Object Linking & embedding", Microsoft, Jun. 5, 1991.
OMG Security Working Group, "OMG White Paper on Security," OMG Security Working Group, Apr. 1994, pp. 1-24.
OOPSLA 1993: Addendum to the Proceedings, "Security for Object-Oriented Systems," Sep. 26-Oct. 1, 1993, pp. 77-78.
Open Software Foundation, *OSF DCE Administration Guide-Core Components*, PTR Prentice Hall, 1993.
"Open System Environment Architectural Framework for National Information Infrastructure Services and Standards, in Support of National Class Distributed Systems," *Payment Systems; Strategic Choices for the Future*, Hitatchi Research Institute; Institute of Advanced Business Systems, Hitachi, Ltd., 1993.
PKCS #1:RSA Encryption Standard, RSA Laboratories Technical Note, Ver. 1.5, revised Nov. 1, 1993.
PKCS #10: Certification Request Syntax Stanard, An RSA Laboratories Technical Note, Ver. 1.0, Nov. 1, 1993.
PKCS #11: Cryptographic Token Interface Standard, An RSA Laboratories Technical Note, Ver. 2.0, Apr. 15, 1997.
PKCS #12 v 1.0: Personal Information Exchange Syntax, RSA Laboratories, Jun. 24, 1999.
PKCS #13: Elliptic Curve Crytography Standard, RSA Security, Jan. 12, 1998.
PKCS #15 v 1.0: Cryptographic Token Information Format Standard, RSA Laboratories, Apr. 23, 1999.
PKCS #3: Duffie-Hellman Key-Agreement Standard, RSA Laboratories Technical Note, Ver. 1.4, revised Nov. 1, 1993.
PKCS #5: Password-Based Encryption Standard, An RSA Laboratories Technical Note, Ver. 1.5, 1991-1993, Revised Nov. 1, 1993.

PKCS #6: Extended-Certificate Syntax Standard, RSA Laboratories Technical Note, Ver. 1.5, revised Nov. 1, 1993.
PKCS #8: Private-Key Information Syntax Standard, An RSA Laboratories Technical Note, Ver. 1.2, 1991-1993, Revised Nov. 1, 1993.
PKCS #9: Selected Attribute Types, RSA Laboratories Technical Note, Ver. 1.1, revised Nov. 1, 1993.
PowerAgent Introduces First Internet 'Infomediary' to Empower and Protect Consumers (Tech Talk Aug. 4, 1997).
PowerAgent Introduces First Internet 'Infomediary' to Empower and Protect Consumers (Techmall.com Aug. 4, 1997).
"Privacy and the NII: Safeguarding Telecommunications—Related Personal Infrmation", U.S> Dept. of Commerce, Oct. 1995.
"Proceedings: Technological Strategies for Protecting Intellectual Property in the Networked Multimedia Environment," 1994, Coalition for Networked Information, Interactive Multimedia Association, John F. Kennedy School of Government, Journal of the "Proper Use of Consumer Information on the Internet," White Paper, Power Agent Inc., Menlo Park, CA, Jun. 1997, 9 pages.
"Request for Technology: Multimedia System Services", Ver. 2.0, Interactive Multimedia Association Compatibility Project, Nov. 9, 1992.
"Request for Technology: Multimedia System Services", Draft, Ver. 1.1, Interactive Multimedia Association Compatibility Project, Oct. 16, 1992.
"Requirements for the Software License Management System", System Management Work Group, Rev. 3, Unix International, Jul. 23, 1992.
ROI, Personal Library Software, 1987 or 1988.
RSA Security; News; "Enterprise Solutions Announces RSA Mail," <http://rsasecurity.com/news/pr/940112-2.html.>, dated Jan. 12, 1994, pp. 1-2.
RSA Security; News; "General Magic Picks RSA," <http://rsasecurity.com/news/pr/940112-3.html.>, dated Jan. 12, 1994, pp. 1-2.
RSA Security; News; "Hewlett-Packard Chooses RSA," <http://rsasecurity.com/news/pr/940112-5.html.>, dated Jan. 12, 1994, pp. 1-2.
RSA Security; News; "iPower's Data Security Approach," <http://rsasecurity.com/news/pr/940112-10.html.>, dated Jan. 12, 1994.
RSA Security; News; "RSA Enters Wireless Arena," <http://rsasecurity.com/news/pr/940112-6.html.>, dated Jan. 12, 1994, pp. 1-2.
RSA Security; News; <http://rsasecurity.com/news/pr/9401.html.>, dated Jan. 12, 1994, pp. 1-2.
"S/PAY: RSA's Developer's Suite for Secure Electronic transactions (SET)," RSA Data Security, Inc. (1997).
Secure Computing, "Constructing a High Assurance Mail Guard," 1994, pp. 1-10.
Secure Electronic Transactions; Mastercard and Visa+ C345.
"Security Enhanced LINUX," National Security Agency, http://www.nsa.gov/selinux/, pp. 1-2.
"Security in KeyKOS."
Sheridan Software Systems, *Data Widgets 2.0: Programmer's Guide*, Sheridan Software Systems, Inc., 1993-1995.
"SIGSALY Secure Digital Voice Communications in World War II," National Security Agency, http://www.nsa.gov/wwii/papers/sigsaly.htm, Oct. 13, 2000, pp. 1-2.
Smart Card 1993 Conference Proceedings, "Day 1: Communications and Marketing Systems & Market Overview," Lowndes Exhibition Organisers, Ltd., 1993, pp. 1-79.

"STARFISH State of the Art Financial Services for the In Habitants of Isolated Areas—Project Profile," Information Society technologies, time schedule (Jan. 21, 2000-Jun. 30, 2002).
Stuffit Delux v 1.5, v 3.0, v. 3.5, Alladin Systems, 1988-1994.
Summaries of Projects (FP III/IV)—Part I: "ESPIRIT Project 20517—COPYSMART CITED based multi-media IPR management on cost effective smart device," European Information technology for Information Science (Oct. 1998).
Symantec Anti-Virus for Macintosh (a.k.a. SAM), Symantec, 1993.
Symantec Corporation, "THINK Pascal: The Fastest Way to Finished Software," Symantec Corporation, 1990, pp. 93-123.
"TALISMAN—Tracing Authors' Rights by Labeling Image Services and Monitoring Access Network," ACTS Project No. AC019, Doc Reference AC019-THO-RGS-FR-P 001-b1 (Sep. 25, 1998).
"TALISMAN: Tracing Authors' Rights by Labeling Image Services and Monitoring Access Network," ACTS, Swiss Participation in European Research Programs (Sep. 1, 1995, Aug. 31, 1998).
"Technical Description: Pay-Per-View Copy Protection," Macrovision, Jun. 1994.
"Technical Rationale Behind CSC-STD-003-85: Computer Security Requirements," http://www.radium.ncsc.mil/tpep/library/rainbow/CSC-STD-004-85.html, Jun. 25, 1985, pp. 1-40.
"Technical Strategies for Protecting Intellectual Property in the Networked Multimedia Environment", IMA Intellectual Property Proceedings, vol. I, Issue 1, Jan. 1994.
"TELENET TELEtraining Platform (on NETworks)—Project Profile," Information Society Technologies, time schedule (Mar. 6, 2000-Mar. 30, 2000).
"Telescript Security," BYTE.com (Oct. 1994).
"The Armide Products", web page.
"The Future of Cited: A Feasibility Study," ESPIRIT II, Project 5469, CITED Project Review, Apr. 15, 1994.
"The PowerTV White Paper", powertv.com website, Oct. 11, 1996.
The Risks Digest, "Forum on Risks to the Public in Computers and Related Systems," vol. 15; Issue 39, Jan. 21, 1994, pp. 1-12.
"The Standard Business:Time for Change," European Commision DG111 Espirit Project 5$^{th}$ Consensus Forum (Nov. 3-4, 1998).
*Think C: Object-Oriented Programming Manual*, Symantec Corporation, 1989.
Time-Life Books, *Understanding Computers: Computer Security*, 1986.
TULIP Final Report, ISBN 0-444-82540-1, 1991, revised Sep. 18, 1996.
U.S. Department of Commerce (NIST), "Security Requirements for Cryptographic Modules," Jan. 11, 1994, pp. 1-53.
Prosecution History for National Semiconductor Corporation "iOpener" Trademark, Registration date Oct. 4, 1994, 27 pages.TULIP Final Report.
*UniverCD: The InterActive, Online Library of Product Information From Cisco Systems*, Cisco Systems 1993.
*Unix System v. Release 3.2. Programmer's Guide*. vol. II, AT&T, Prentice Hall (1989).
VirusCheck and VirusScan, McAfee, 1993.

* cited by examiner

Electronic Appliances Have Protected Processing Environments

Example Distributed Commerce Utility

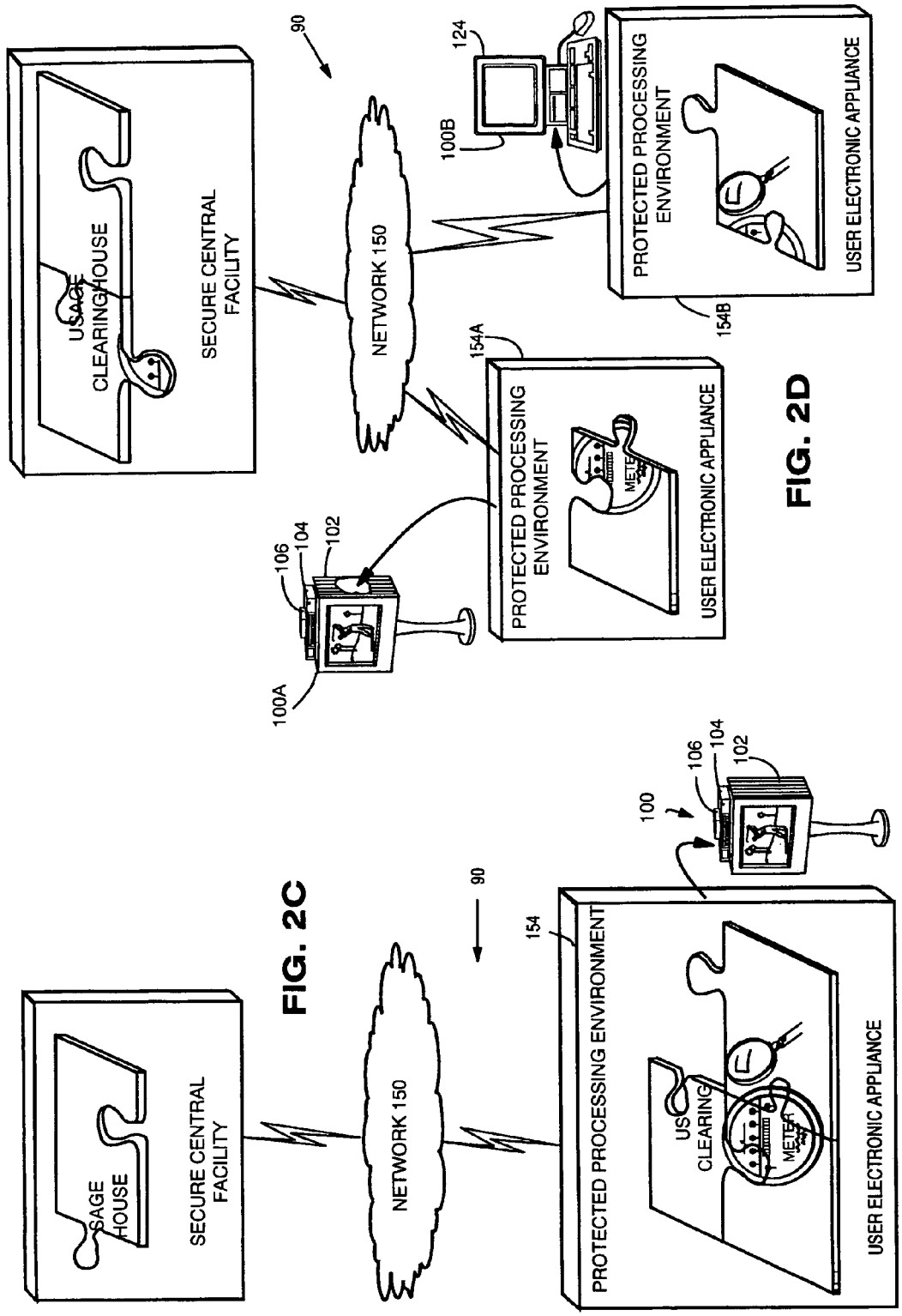

Distributed Commerce Utility Systems

Distributed Commerce Utility Systems

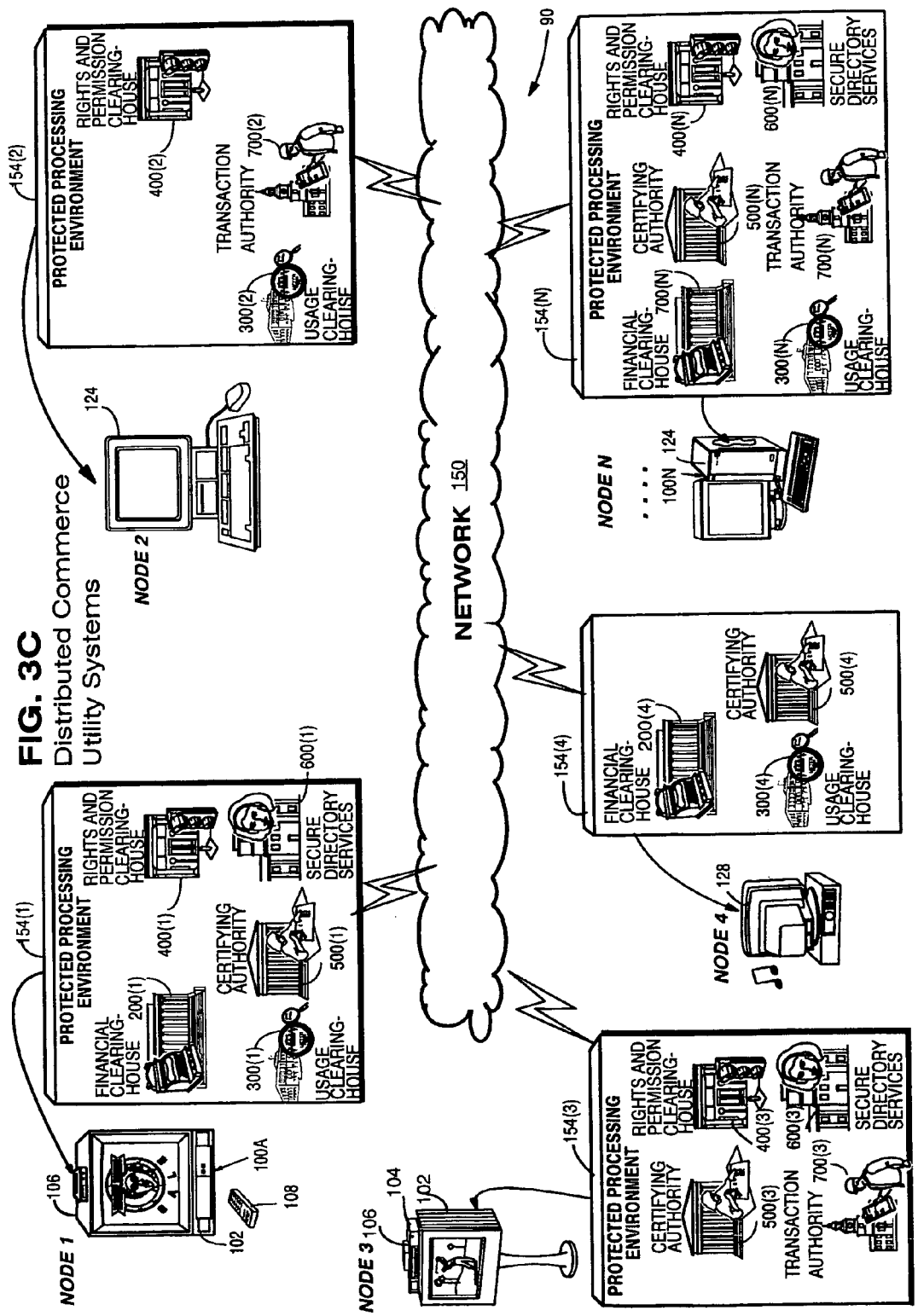

Web of Commerce
Utility Systems

Web of Commerce Utility Systems

Rights Holders Can Choose Between Commerce Utility Systems

Different Commerce Utility Systems Can Work Together

General Purpose Commerce
Utility Systems

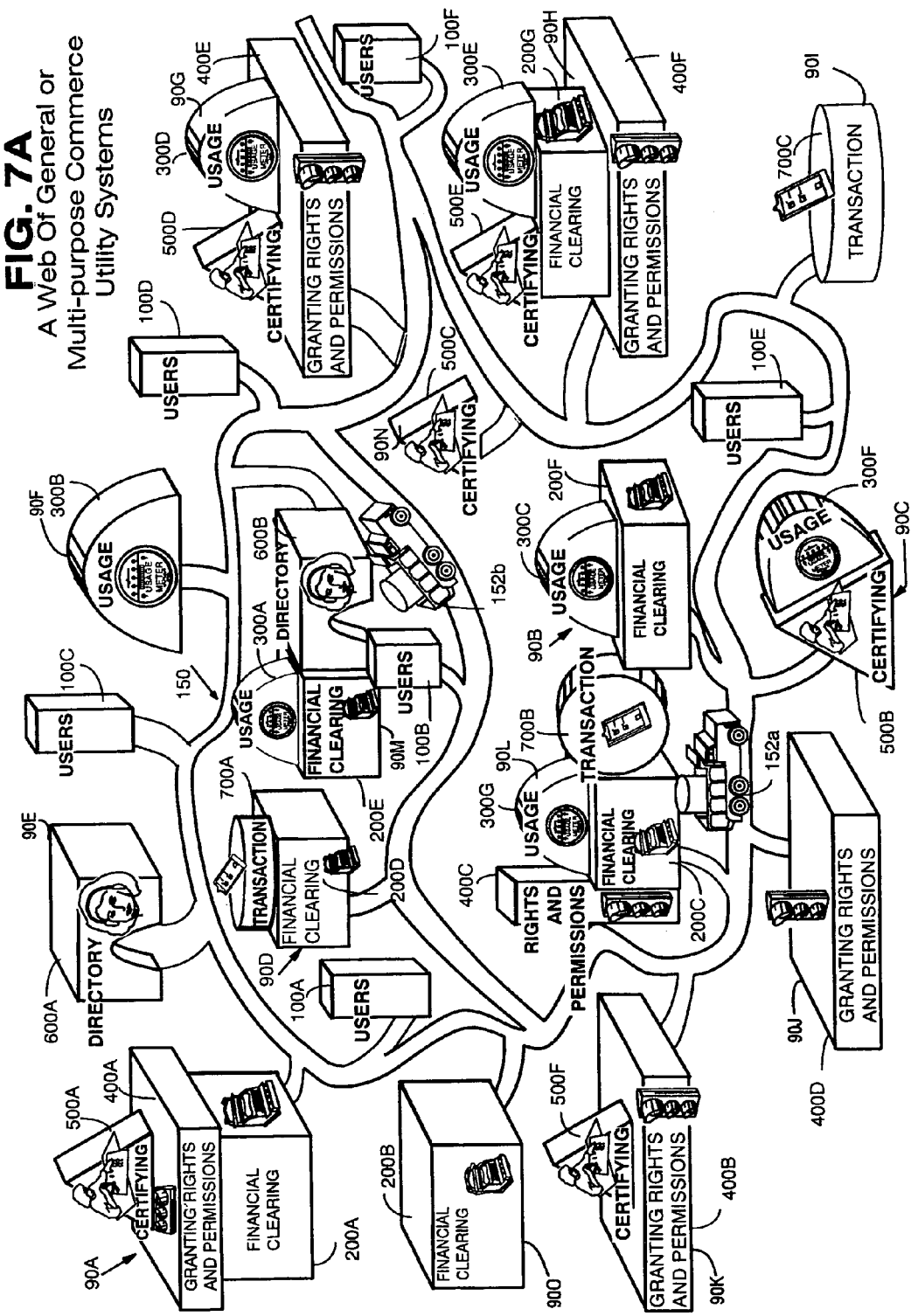

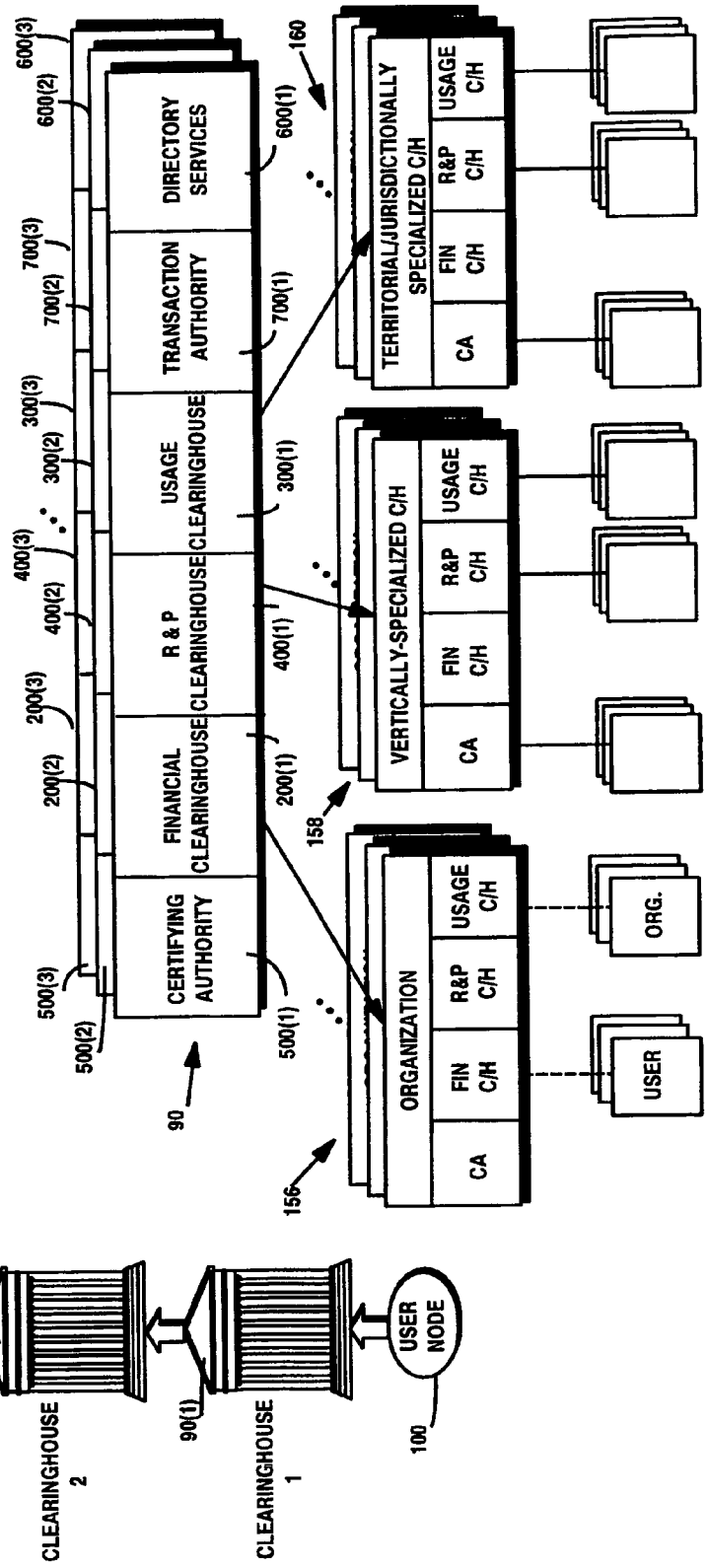

Hierarchical and/or Webbed (Peer to Peer) Commerce Utility Systems

FIG. 10 Financial Clearinghouse

FIG. 11 Usage Clearinghouse

FIG. 12 Rights and Permissions Clearinghouse

FIG. 13 Certifying Authority

FIG. 14 Secure Directory Services

Transaction Authority

EXAMPLE CONTENT DISTRIBUTION VALUE CHAIN

Commerce Utility System 90

Authentication to Proceed

Notification Model

Prior Authorization Model

Intermediation Model

Example Distributed Service Application Component

Example Financial Clearinghouse

Example Financial Clearinghouse Arrangement

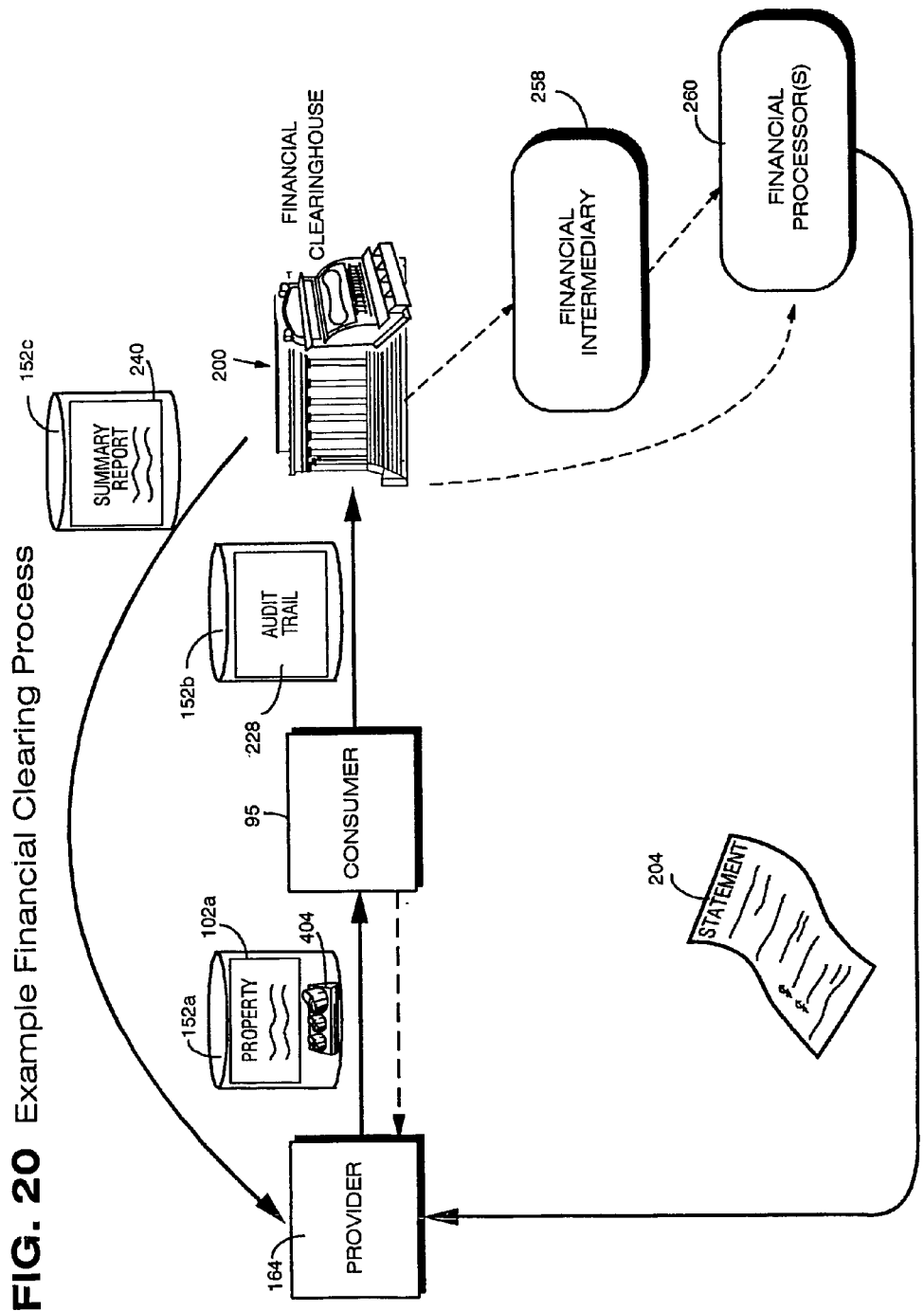
FIG. 20 Example Financial Clearing Process

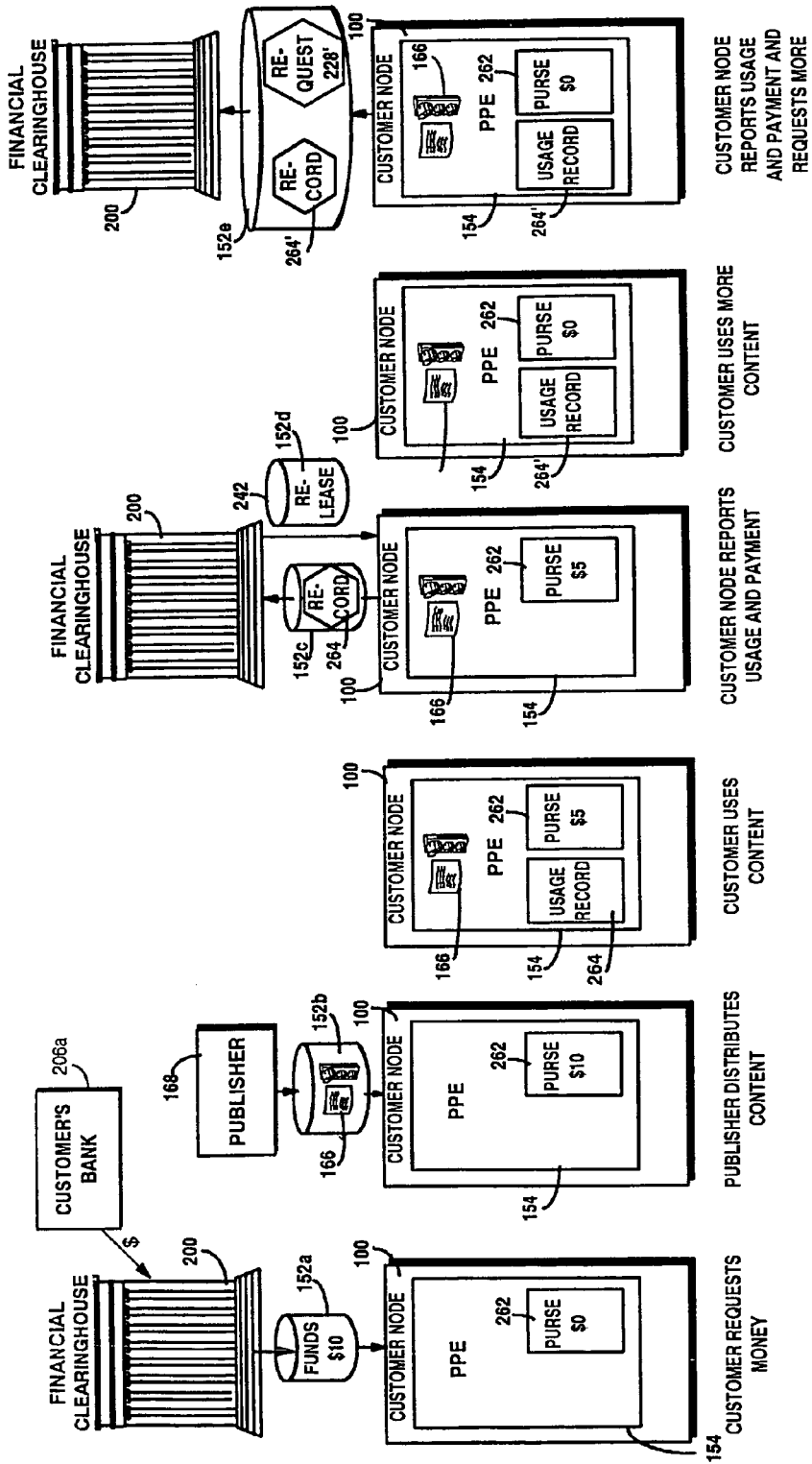

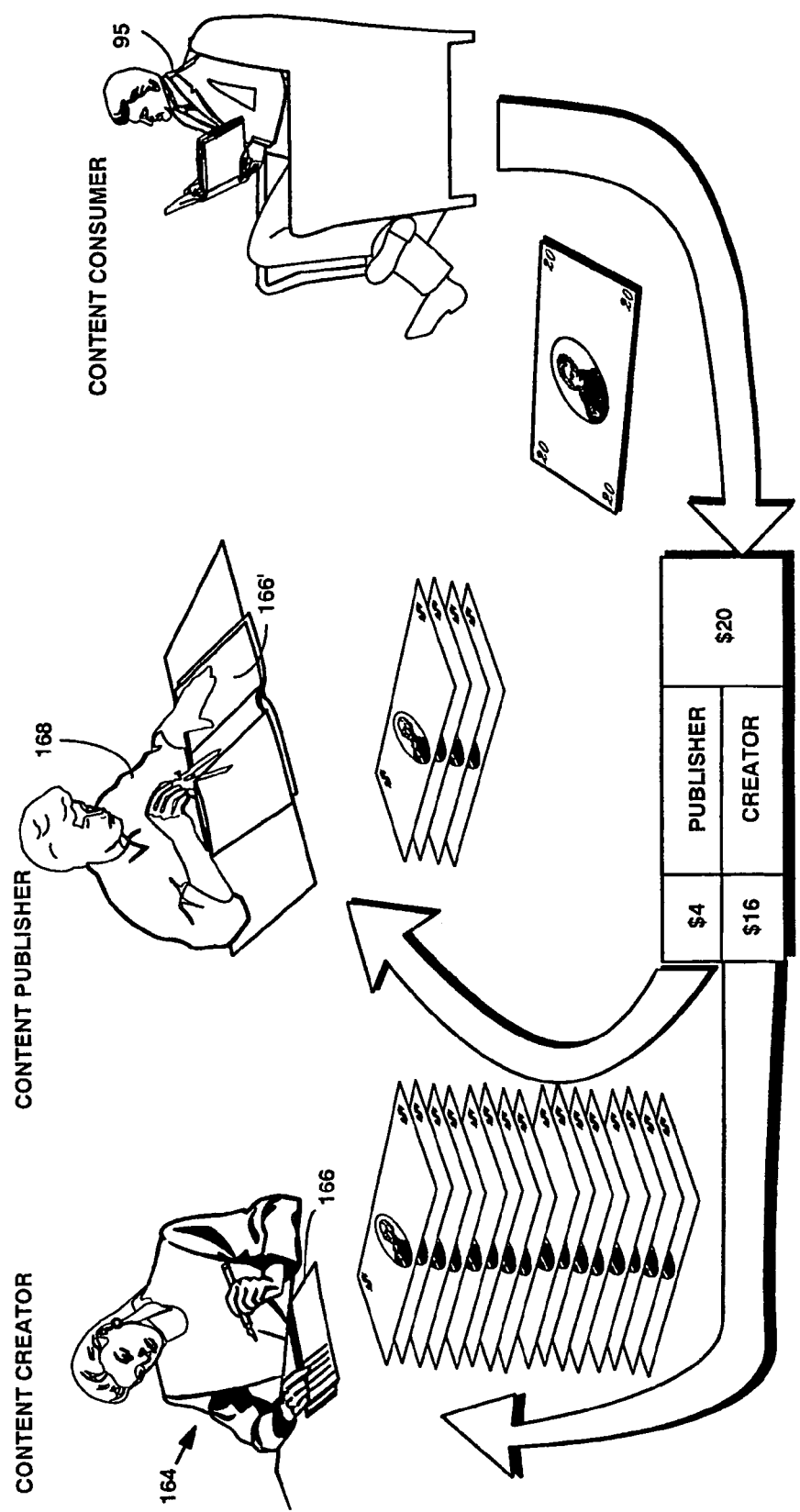
FIG. 21 Example Payment Disaggregation

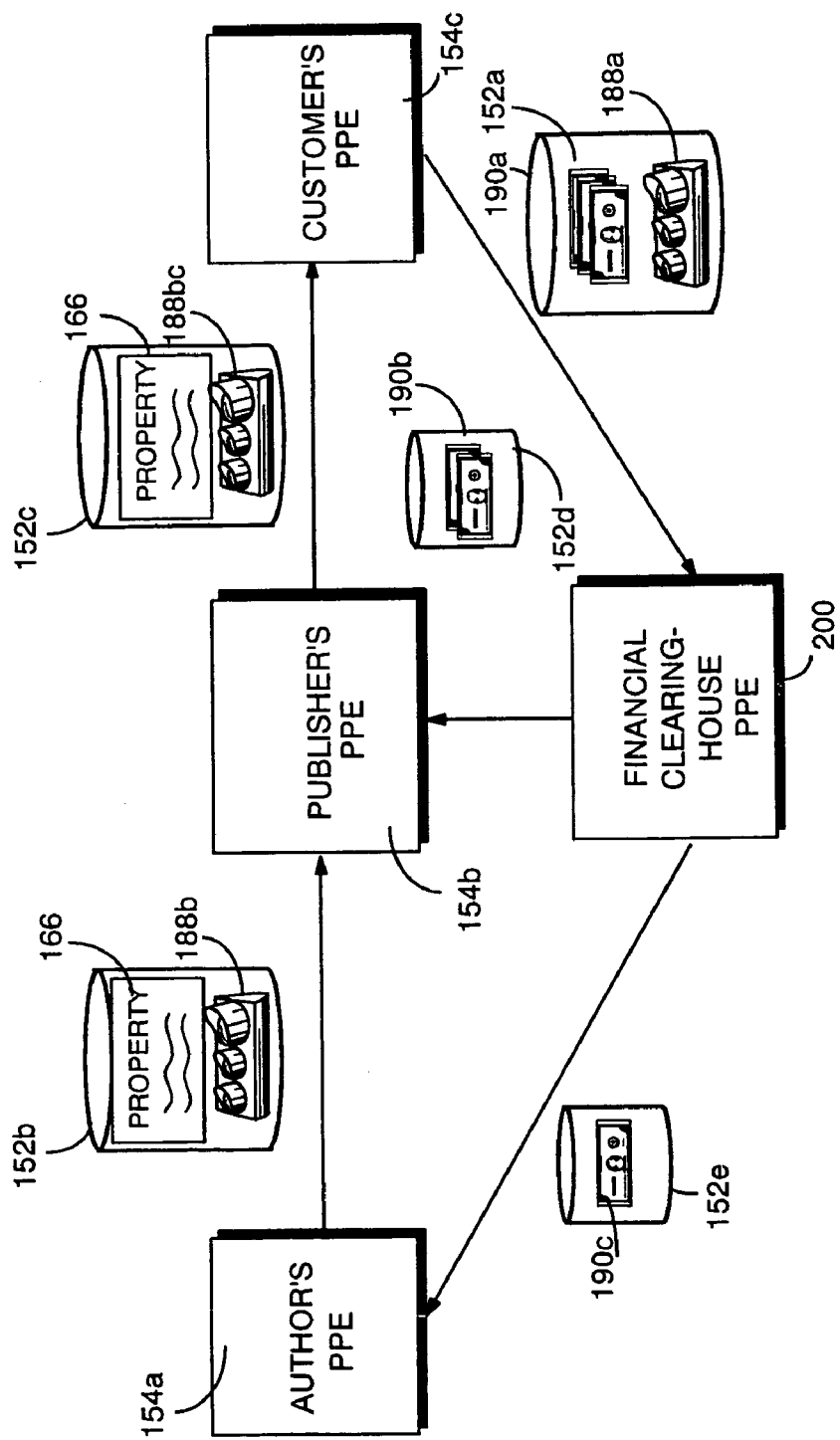
FIG. 22 PAYMENT AND REDISTRIBUTION EXAMPLE

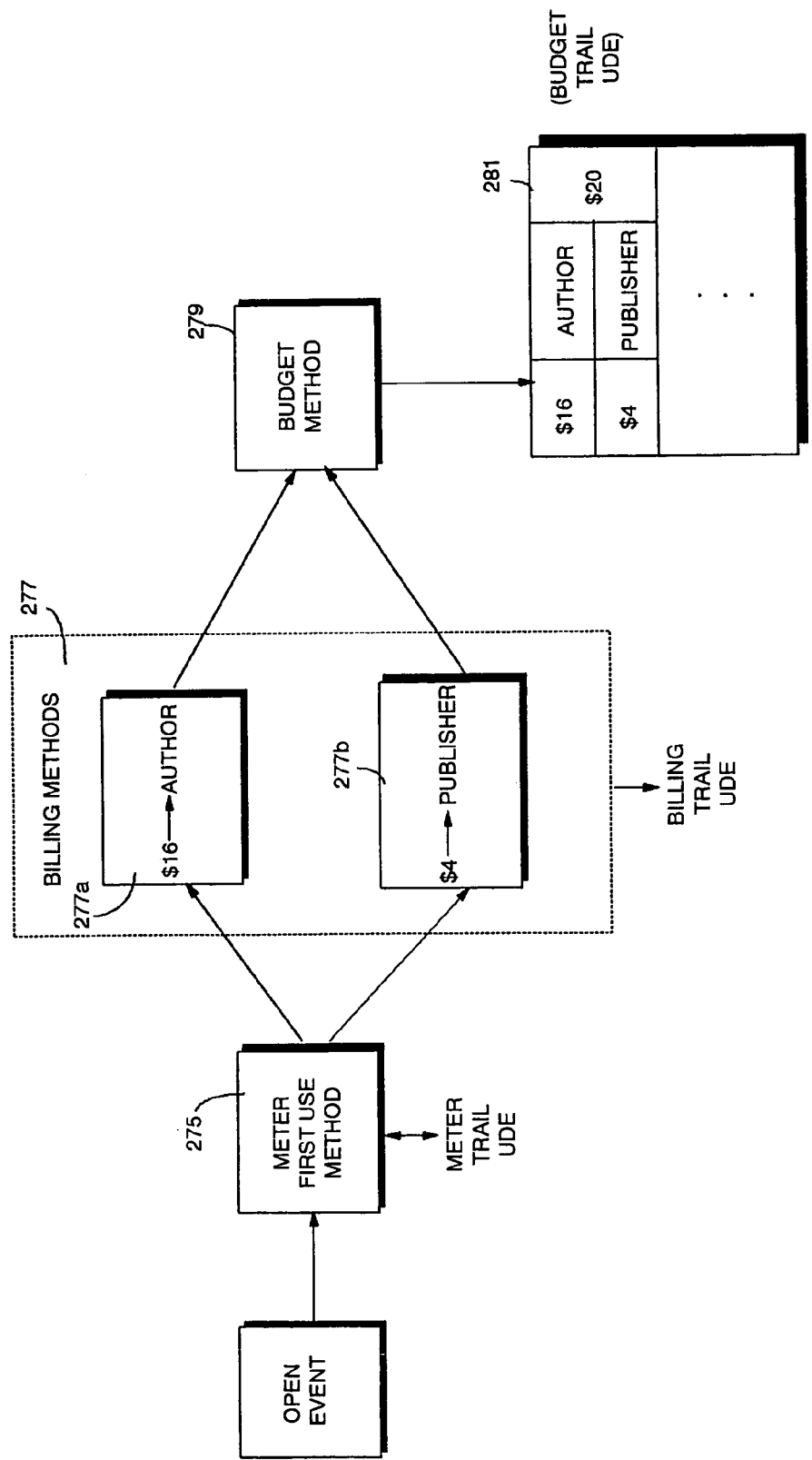
FIG. 22A User Node Disaggregation Example

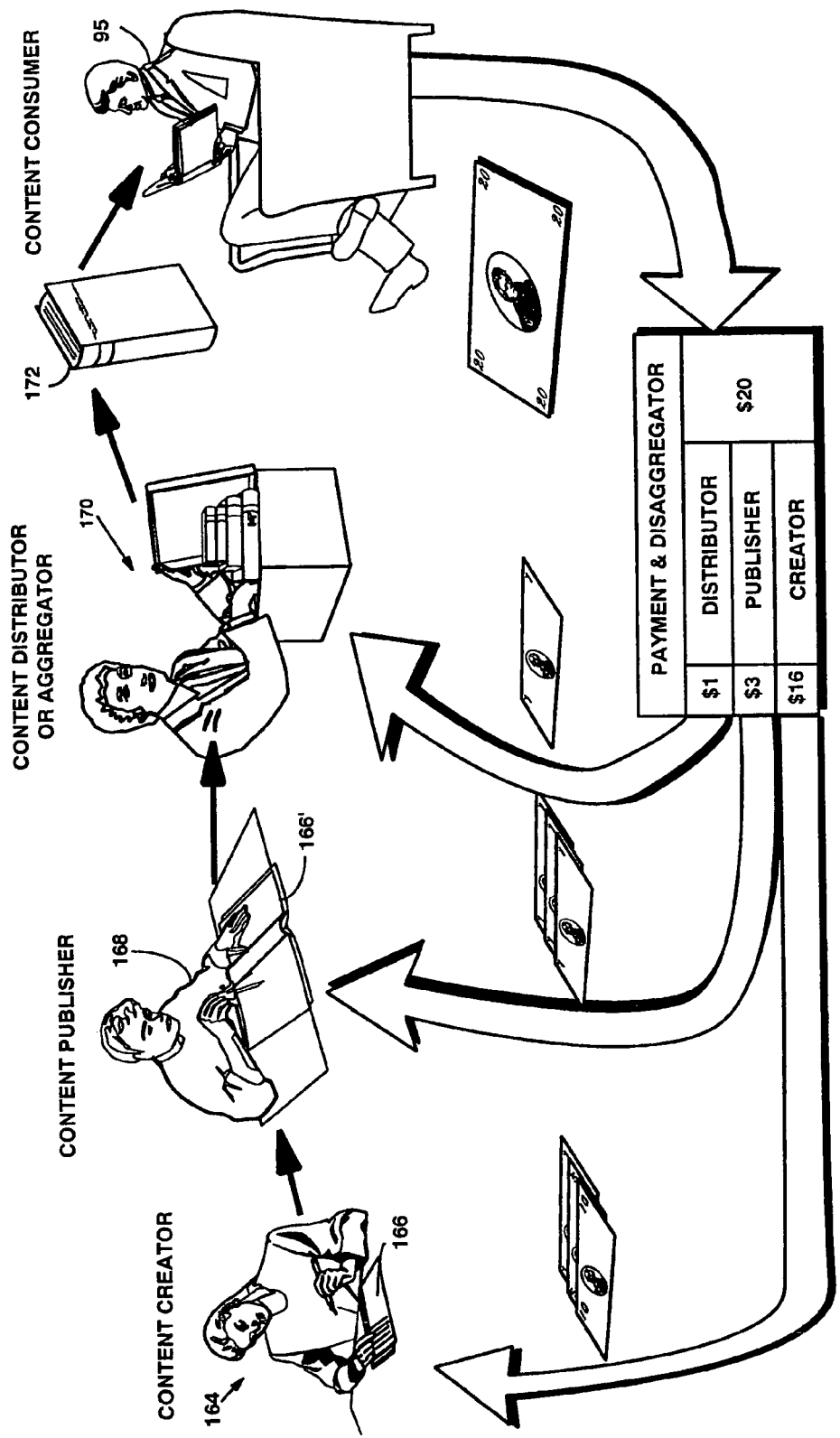
FIG. 23 Payment Disaggregation

EXAMPLE PAYMENT
AND REDISTRIBUTION
SCENARIO

FIG. 25  Example Payment Disaggregation

FIG. 26 PAYMENT DISAGREGGATION

Example Payment and
Redistribution Scenario

FIG. 28 Example Super Distribution

NODE PAYMENT AGGREGATION

FIG. 30 EXAMPLE PAYMENT AGGREGATION

FIG. 31 Financial Clearinghouse Example Payment Aggregation

FIG. 32 EXAMPLE FINANCIAL CLEARINGHOUSE ARRANGEMENT

FIG. 33 Example Usage Clearinghouse

EXAMPLE USAGE CLEARINGHOUSE

FIG. 35 Example Usage Clearing Process

FIG. 36 Example Usage Clearing Process

FIG. 37 Example Financial & Usage Clearinghouse Process

FIG. 38 EXAMPLE USAGE CLEARINGHOUSE MEDIA PLACEMENT

EXAMPLE USAGE CLEARINGHOUSE
DISCOUNTS BASED ON DISCLOSURE

FIG. 40 Example Rights and Permissions Clearinghouse

Rights and Permissions Clearinghouse

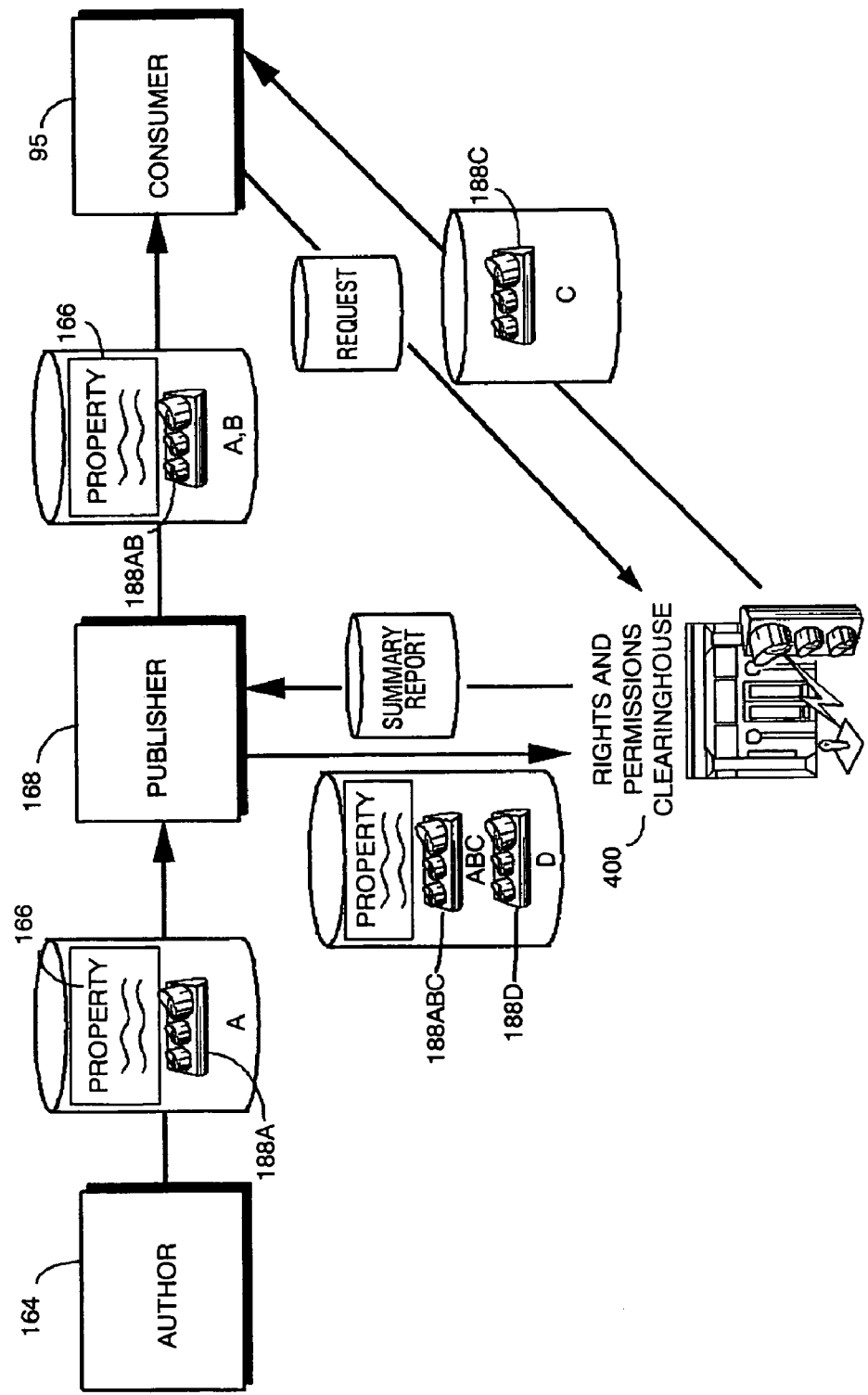
FIG. 42 Example Rights & Permissions Clearinghouse Process

Consumer Registers Control Set
To Request Updates

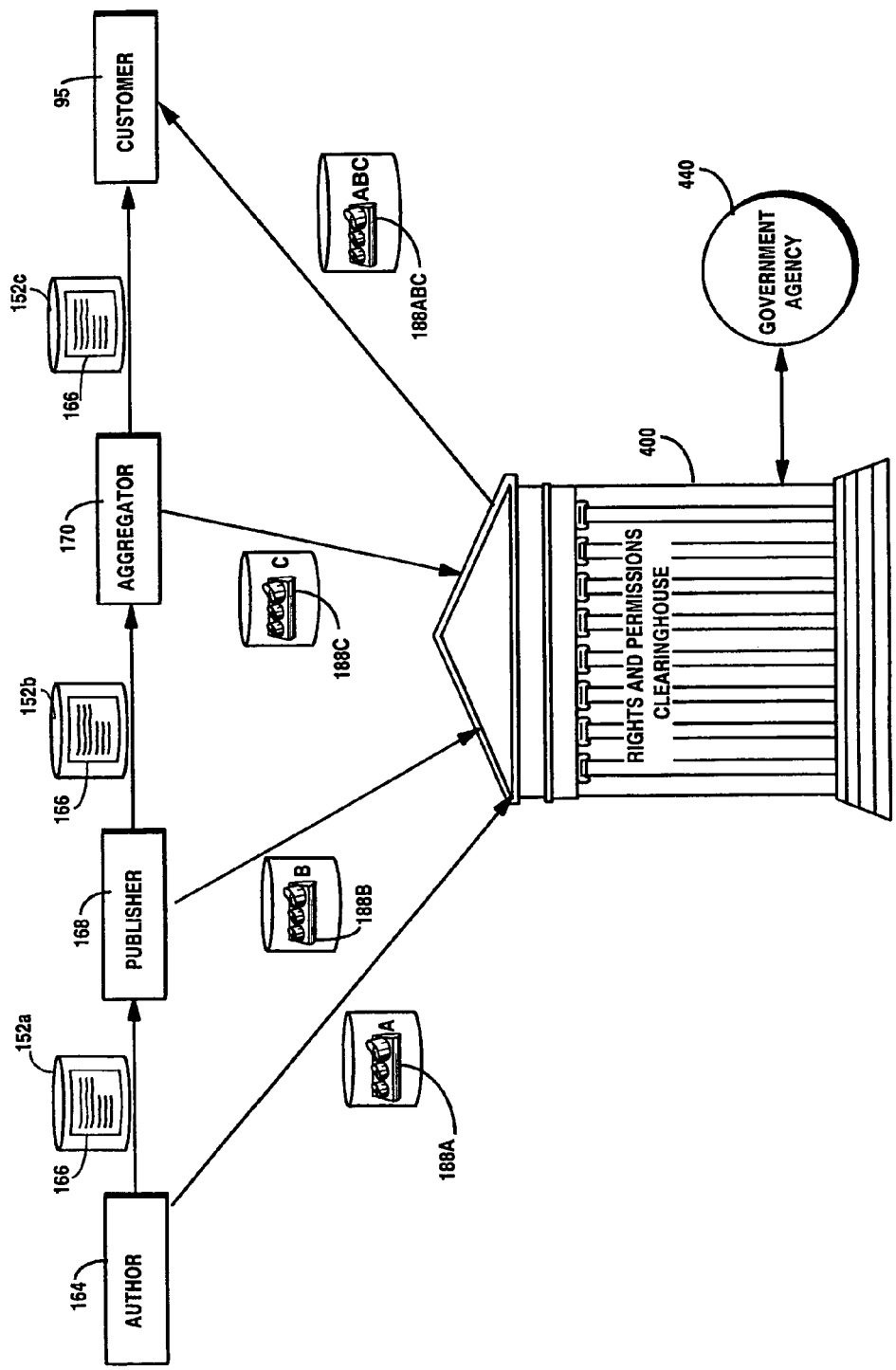
FIG. 43 EXAMPLE RIGHTS AND PERMISSIONS VALUE CHAIN

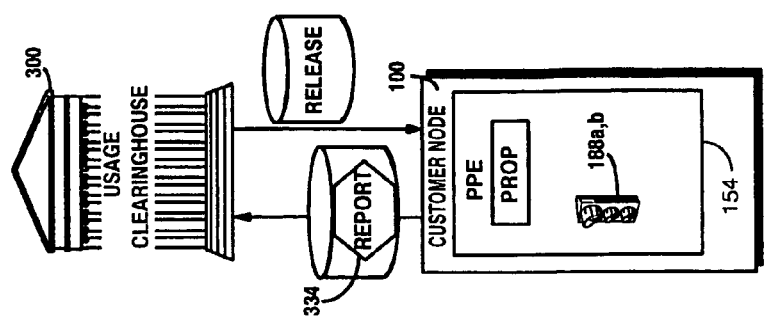
FIG. 44E Customer Node Reports Aspects Of Usage
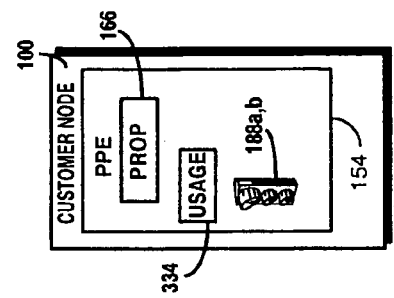
FIG. 44D Customer Uses Property In Accordance With Rights
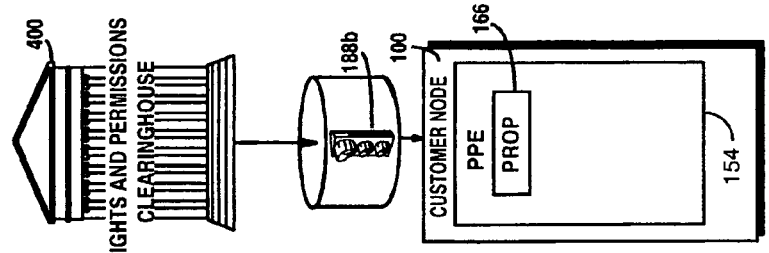
FIG. 44C Rights and Permissions Clearinghouse Provides Rights To Customer
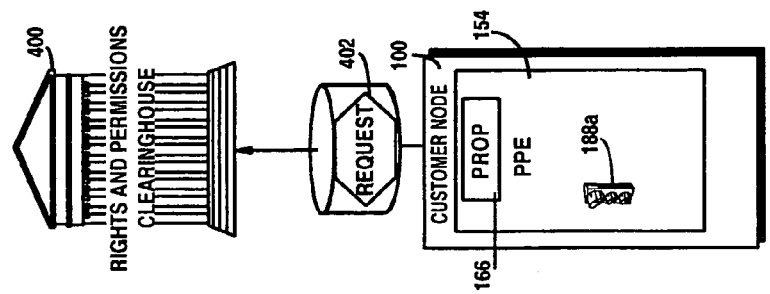
FIG. 44B Customer Requests Rights To Use Property
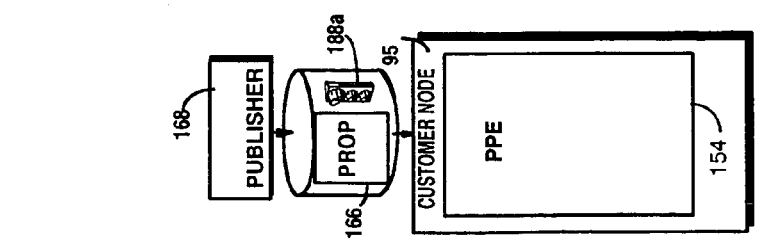
FIG. 44A Customer Receives Property

FIG. 45A  EXAMPLE RIGHTS TEMPLATE

| | PERMISSION TYPE | | | | PRICING MODELS | | | |
|---|---|---|---|---|---|---|---|---|
| ACTION | UNCOND. PERMIT | COND. ON PAYMENT | CONTENT BASED | UNCOND. PROHIBIT | | | | |
| VIEW TITLE | ✓ | | | | | | | |
| VIEW ABSTRACT | ✓ | | | | | | | |
| MODIFY TITLE | | | | ✓ | . . . . | | | |
| REDIS-TRIBUTE | | | ✓ | | | | | |
| BACK UP | | ✓ | | | ONE TIME PURCH. | PAY PER ACTION | DECL. COST | ... |
| ⋮ | | | | | | | | |
| VIEW CONTENT | | ✓ | | | ONE TIME PURCH. | PAY PER VIEW | DECL. COST | ... |
| PRINT CONTENT | | ✓ | | | ONE TIME PURCH. | PAY PER PRINT | DECL. COST | ... |

(450)

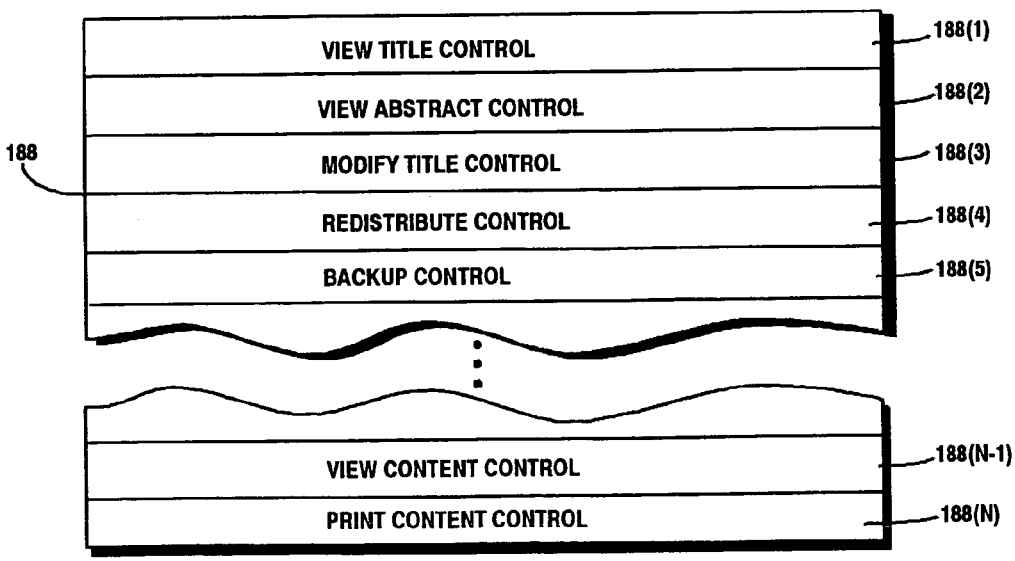

FIG. 45C  EXAMPLE CONTROL SET

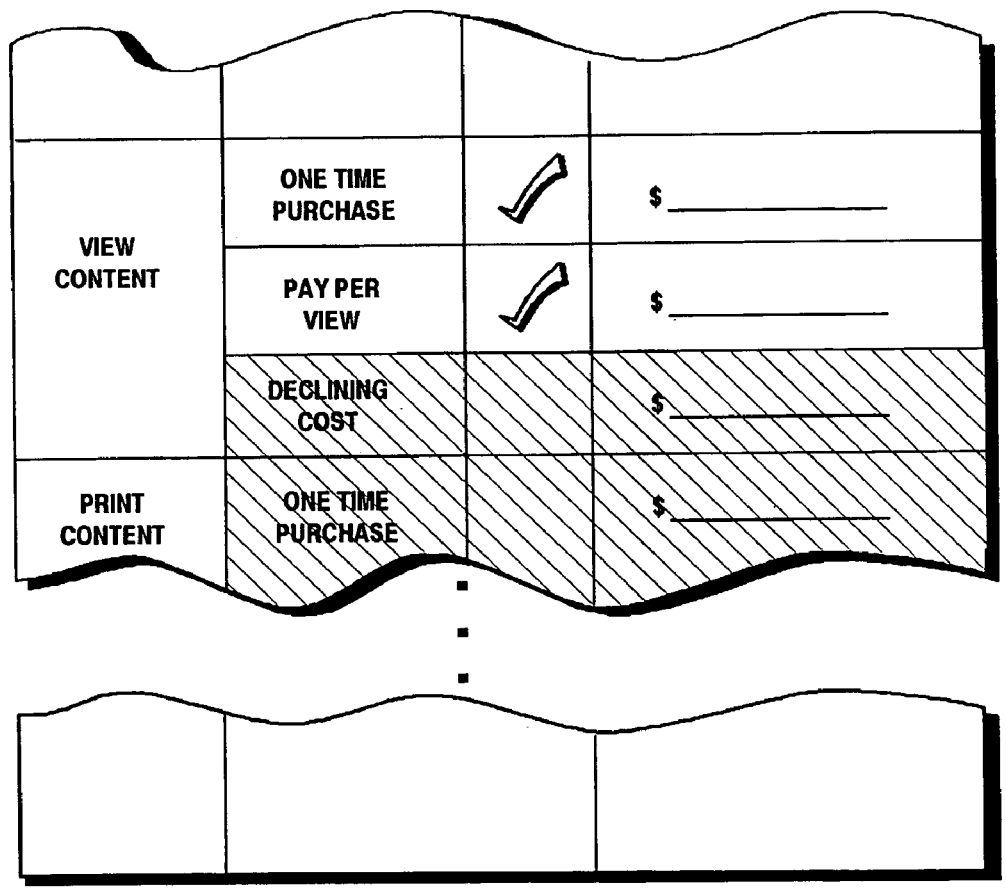
FIG. 45B PRICING MODELS AND LEVELS

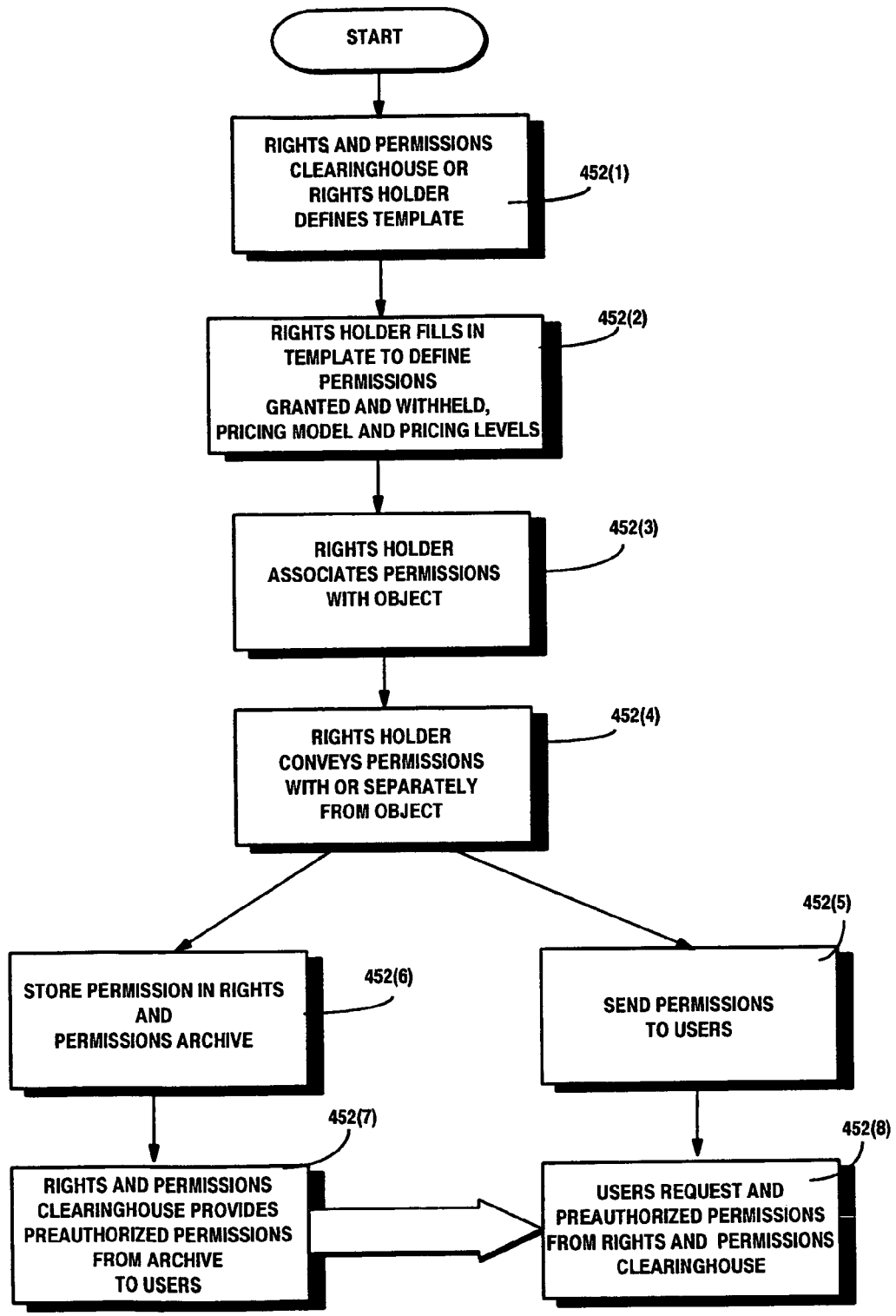
FIG. 46 Example Rights And Permissions Clearing Process

Example Certifying Authority

Example Certifying Authority

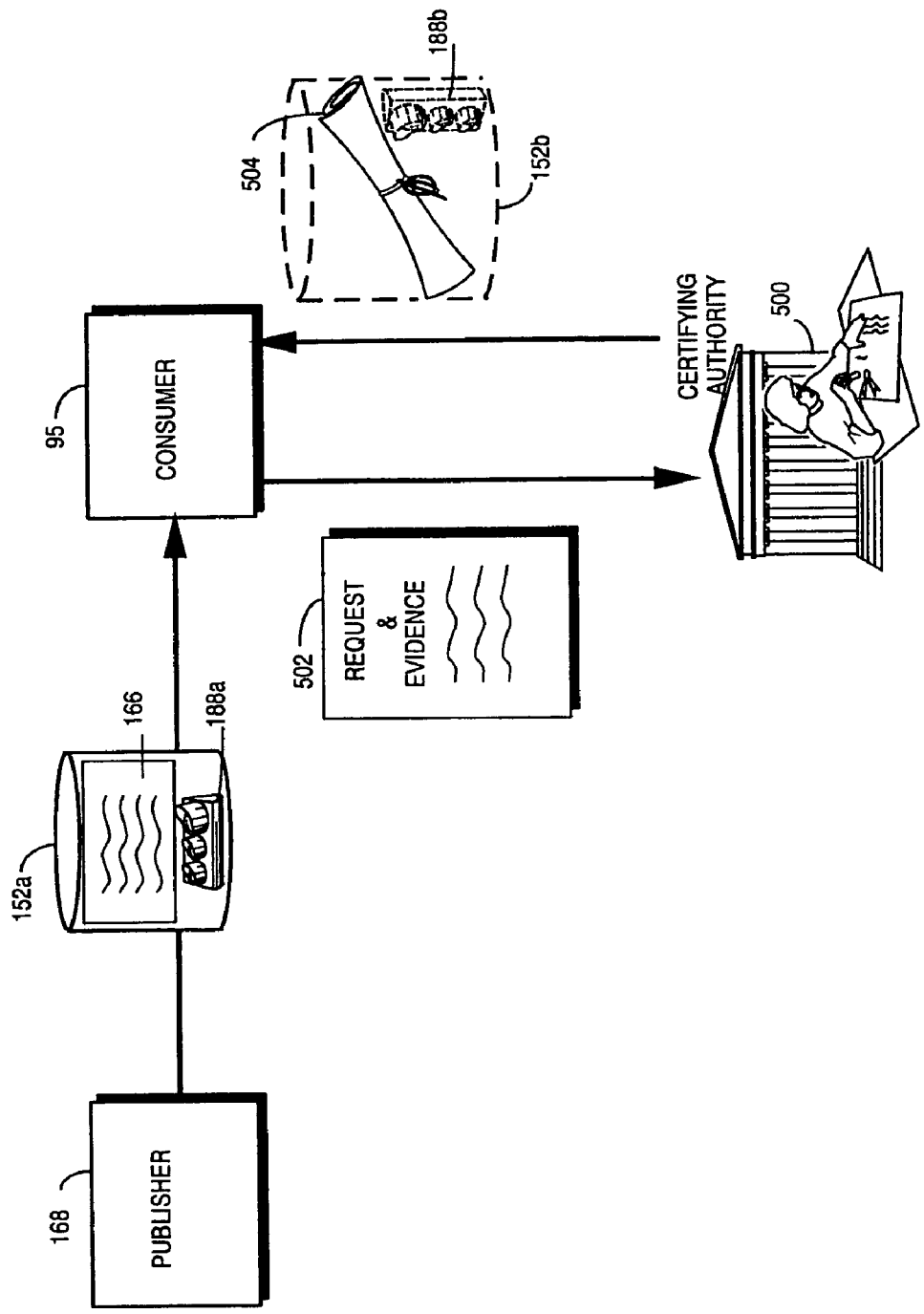
FIG. 49 Example Certifying Process

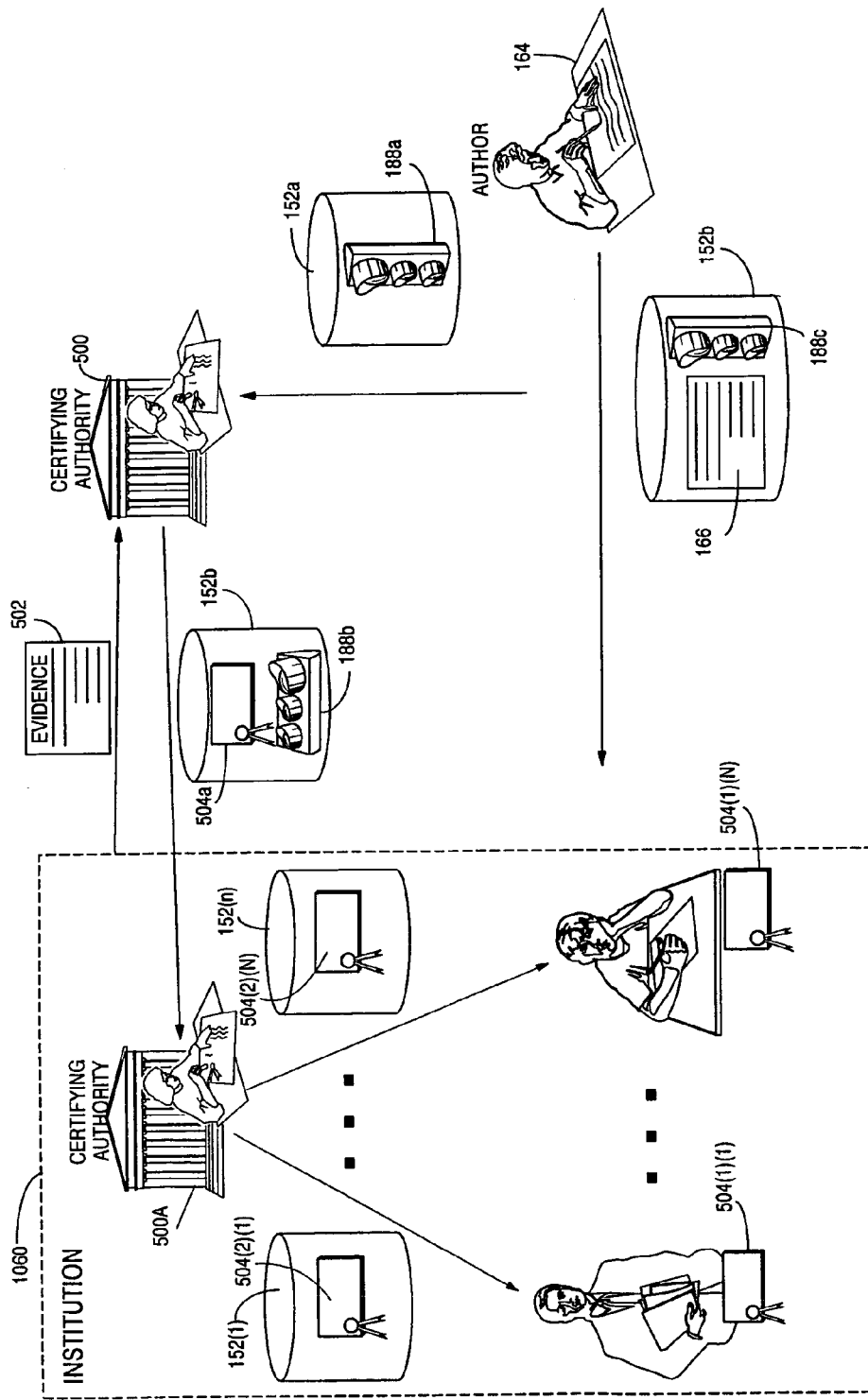
FIG. 50  Distributed Certificate Issuance

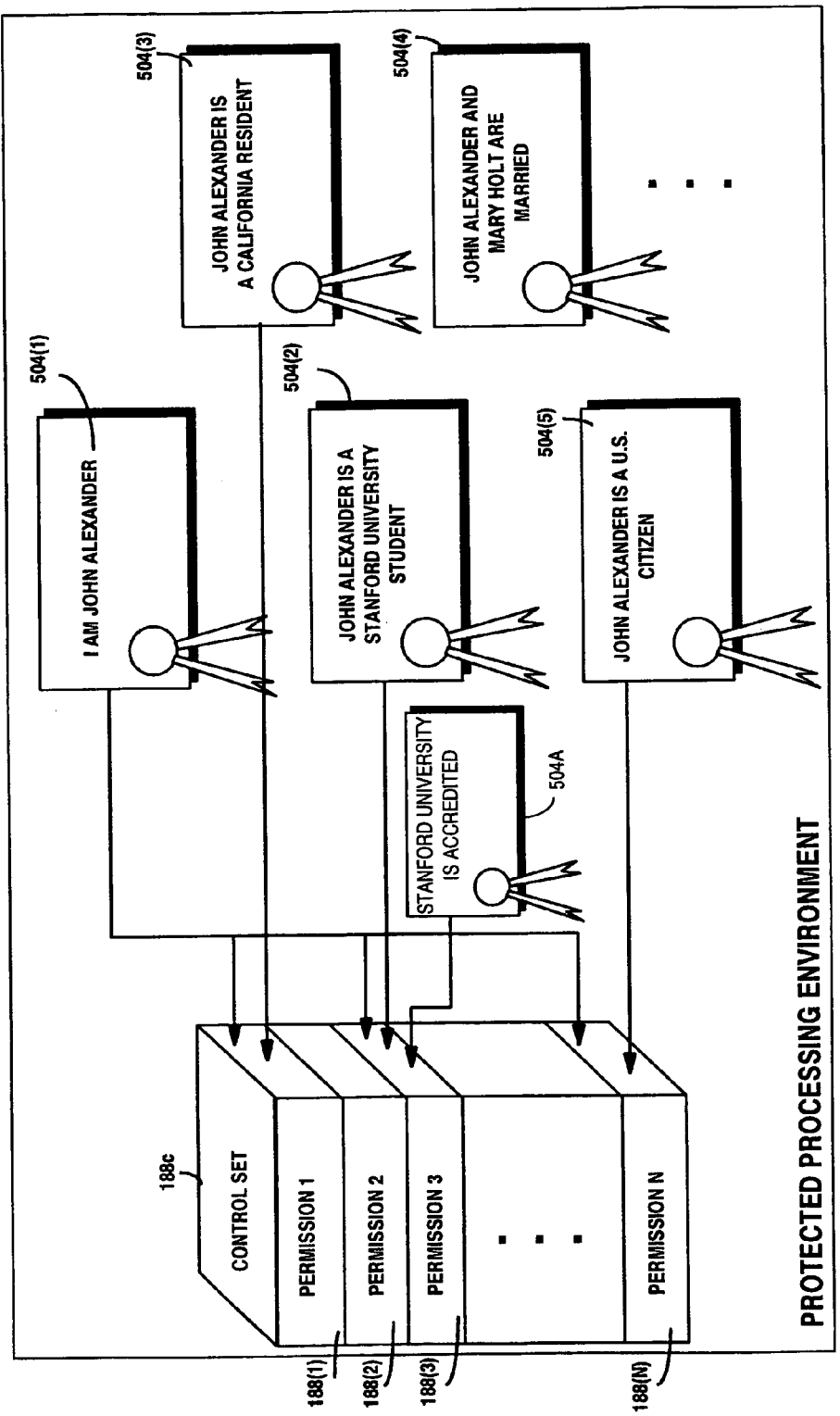
FIG. 50A Example Control Set Using Certificates

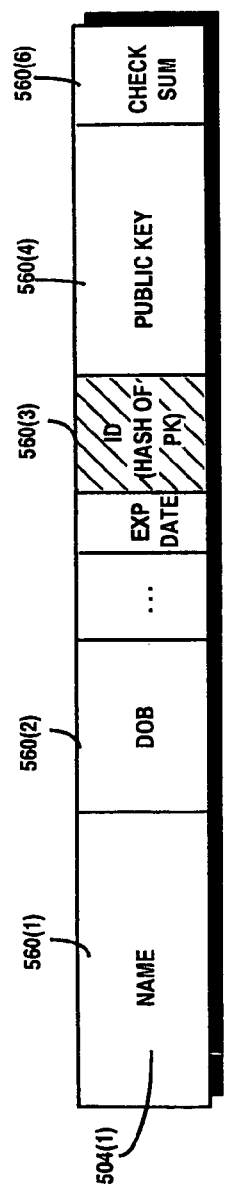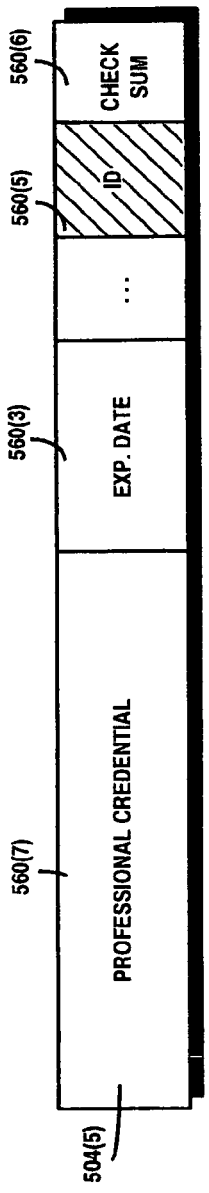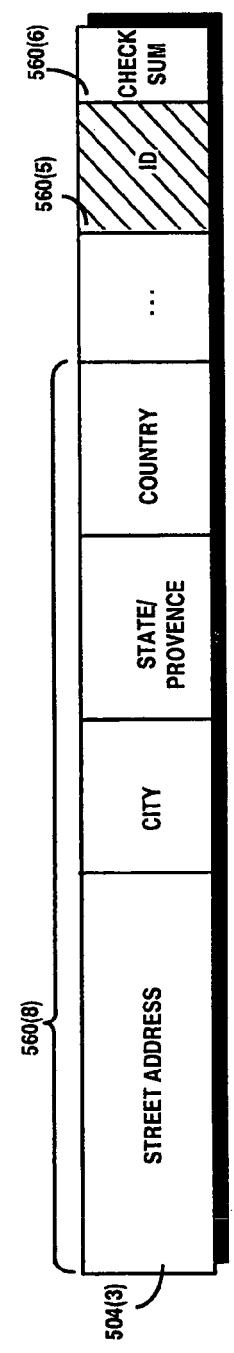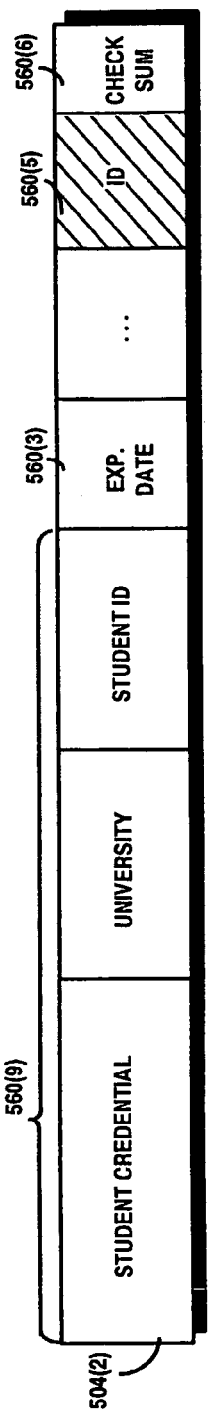
Example Digital Certificates

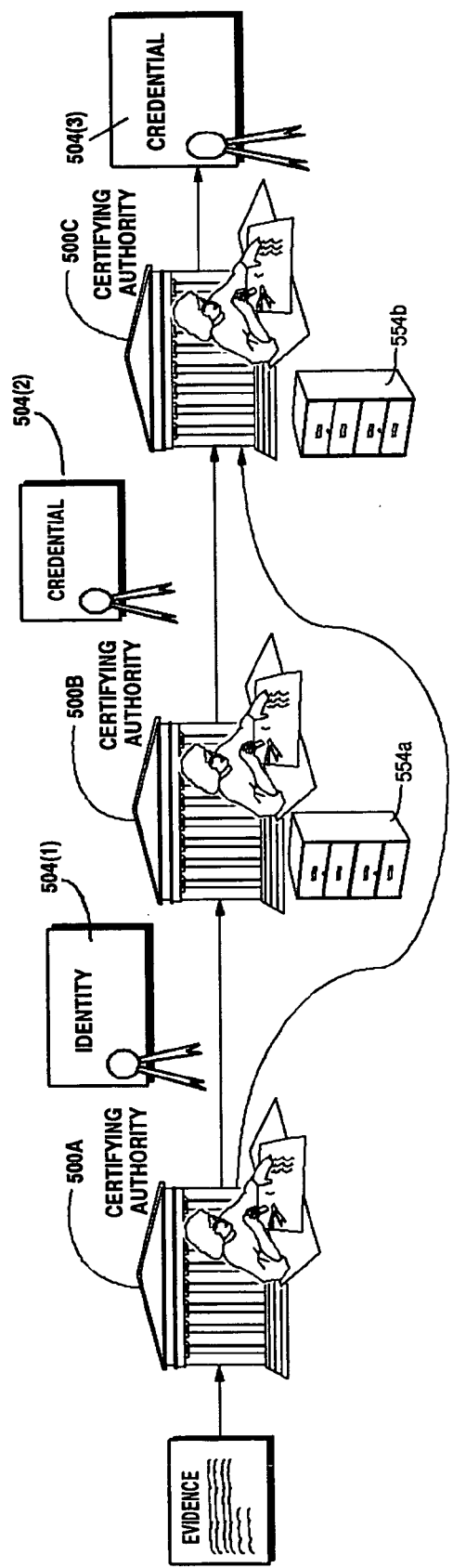
FIG. 51E Generating Certificates Based On Other Certificates

Secure Directory Services

Example Secure Directory Services

FIG. 54 Example Secure Directory Service Process

FIG. 55 Example Transaction Authority

Example Transaction Authority

Example Transaction
Authority Process
Control and Automation

Forming a Control Superset

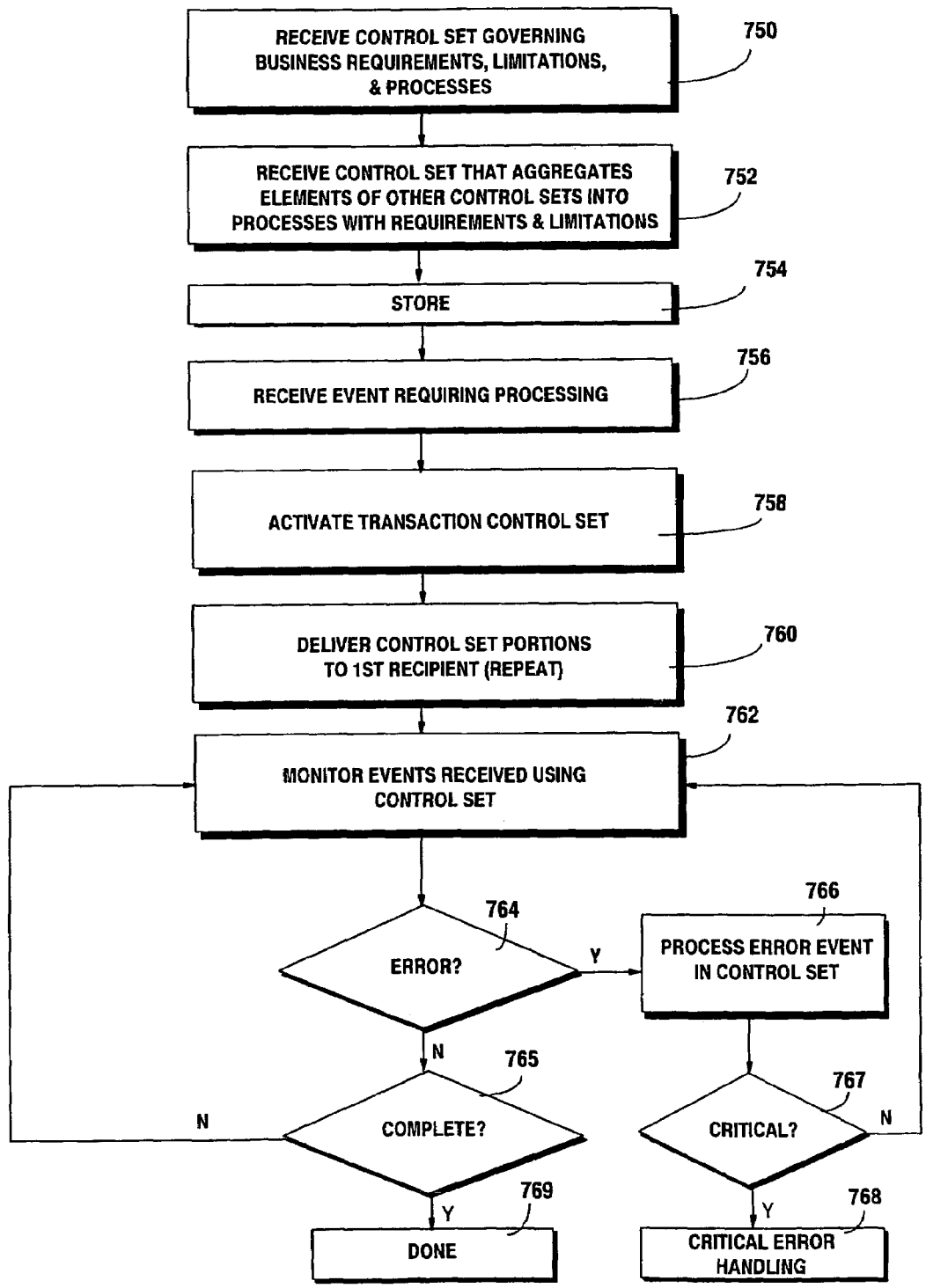
FIG. 58B Transaction Authority Example Steps

SECURITY CHECKPOINT COMMERCE UTILITY SYSTEM SUPPORT CERTIFIED OR AUTHENTICATED COMMUNICATION INFORMATION

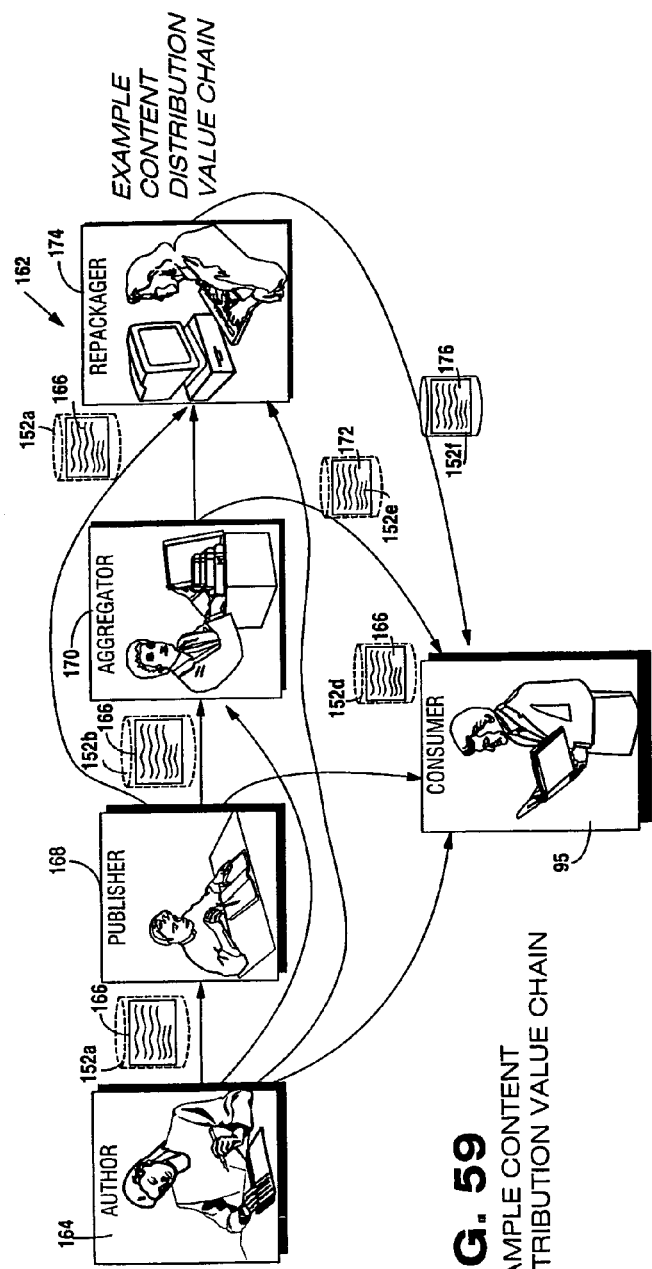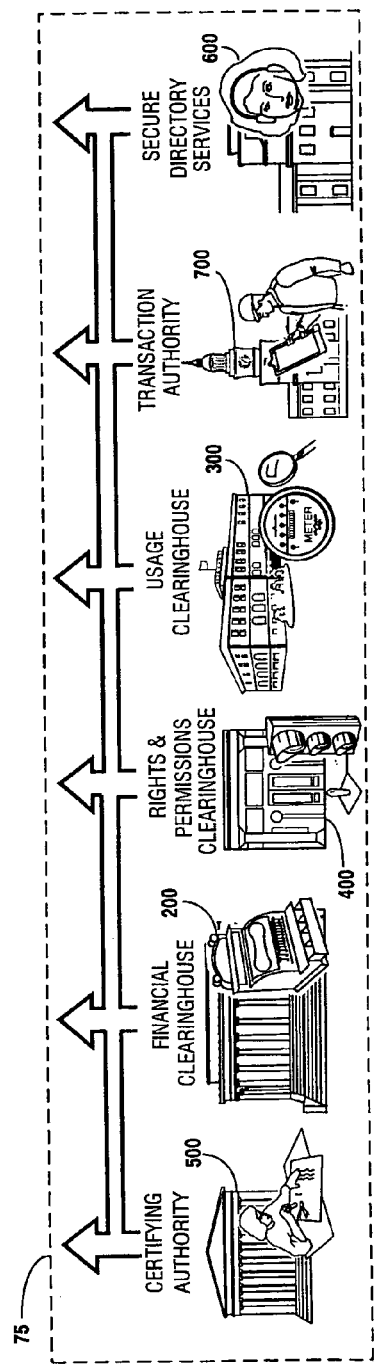
FIG. 59
EXAMPLE CONTENT DISTRIBUTION VALUE CHAIN

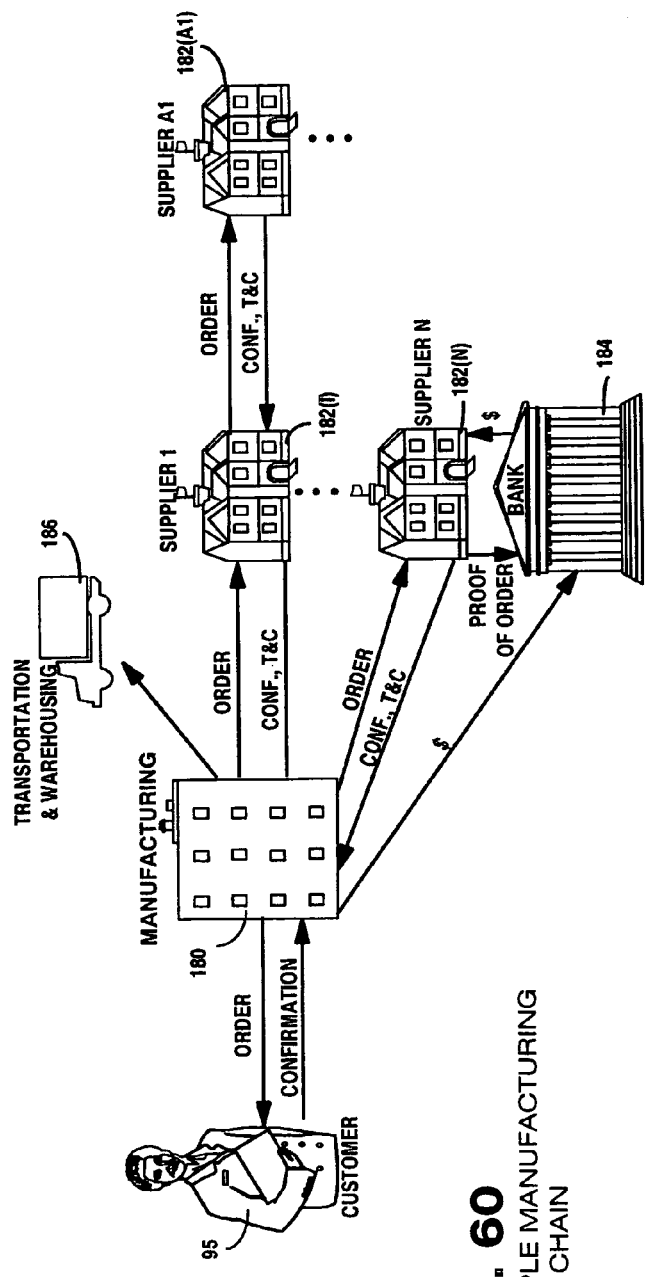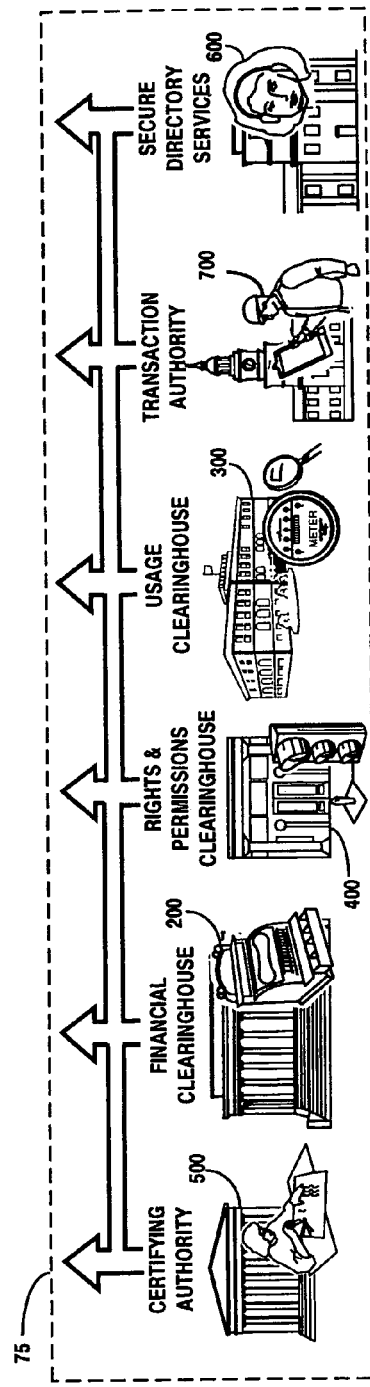
FIG. 60
EXAMPLE MANUFACTURING
VALUE CHAIN

FIG. 61 Purchasing, Licensing and/or Renting Example

FIG. 62 Example Of Purchasing and Paying For A Tangible Item

FIG. 63 Example: Customer Securely Pays For Services

FIG. 64  Example Value Chain Disaggregation For Purchase of Tangibles

FIG. 65  Cooperation Among Commerce Utility Systems Internal and External To An Organization

FIG. 66 EXAMPLE INTER AND INTRA ORGANIZATION

INTERNATIONAL TRADING EXAMPLE

DIGITAL CERTIFICATE SUPPORT SYSTEM, METHODS AND TECHNIQUES FOR SECURE ELECTRONIC COMMERCE TRANSACTION AND RIGHTS MANAGEMENT

CROSS REFERENCE TO RELATED APPLICATION

This is a continuation of application Ser. No. 08/699,712, filed Aug. 12, 1996, now abandoned which is a continuation of application Ser. No. 08/388/107, filed Feb, 13, 1995, now abandoned—all of which are incorporated herein by reference.

FIELD OF THE INVENTIONS

These inventions generally relate to optimally bringing the efficiencies of modern computing and networking to the administration and support of electronic interactions and consequences and further relate to a secure architecture enabling distributed, trusted administration for electronic commerce.

These inventions relate, in more detail, to a "Distributed Commerce Utility"—a foundation for the administration and support of electronic commerce and other electronic interaction and relationship environments.

In still more detail, these inventions generally relate to:
efficient administration and support of electronic commerce and communications;
methods and technologies for electronic rights administration and support services;
techniques and arrangements for distributing administration and support services such as secure electronic transaction management/administration, electronic process control and automation, and clearing functions across and/or within an electronic network and/or virtual distribution environment; and/or
clearing, control, automation, and other administrative, infrastructure and support capabilities that collectively enable and support the operation of an efficient, secure, peer-to-peer collection of commerce participants within the human digital community.

BACKGROUND

Efficient, effective societies require capabilities enabling their inhabitants to control the nature and consequences of their participation in interactions. Every community needs certain basic services, facilities and installations:
the post office delivers our mail,
the schools teach our children,
the highway department keeps our roads passable and in good repair,
the fire department puts out fires,
the power company delivers electrical power to our homes,
the telephone company connects people and electronic devices near and far and provides directory services when you don't know the right number,
banks keep our money safe,
cable TV and radio stations deliver news and entertainment programming to our homes.
police keep order,
the sanitation department collects refuse, and
social services support societal policies for the needy.

These and other important "behind the scenes" administrative and support services provide an underlying base or foundation that makes the conveniences and necessities of modern life as we know it possible and efficient, and allow the wheels of commerce to spin smoothly.

Suppose you want to buy bread at the local bakery. The baker doesn't have to do everything involved in making the bread because he can rely on support and administration services the community provides. For example:
The baker doesn't need to grow or mill grain to make flour for the bread. Instead, he can purchase flour from a supplier that delivers it by truck.
Similarly, the baker doesn't need to grow or produce fuel to keep its ovens hot; that fuel can be delivered in pipes or tanks by people who specialize in producing and supplying fuel.
You can also have confidence in the cleanliness of the local bakery because it displays an inspection notice certifying that it has been inspected by the local health department.

Support and administrative services are also very important to ensure that people are compensated for their efforts For example:
You and the bakery can safely trust the government to stand behind the currency you take out of your wallet or purse to pay for the bread.
If you pay by check, the banking system debits the amount of your check from your bank account overnight and gives the bakery the money.
If you and the bakery use different banks, your check may be handled by an automated "clearinghouse" system that allows different banks to exchange checks and settle accounts—efficiently transferring money between the banks and returning checks drawn on accounts that don't have enough money in them.
If the bakery accepts credit cards as payment, the flexibility of payment methods accepted in exchange for the bakery products is increased and provides increased convenience and purchasing power to its customers.

Such support and administrative services provide great economies in terms of scale and scope—making our economy much more efficient. For example, these important support and administrative services allow the baker to concentrate on what he knows how to do best—make and bake bread. It is much more efficient for a bakery and its experienced bakers to make many loaves of bread in its large commercial ovens than it is for individual families to each bake individual loaves in their own home ovens, or for the growers of grain to also bake the bread and pump the fuel needed for baking and accept barter, for example, chickens in exchange for the bread. As a result, you and the bakery can complete your purchasing transaction with a credit card because both you and the bakery have confidence that such a payment system works well and can be trusted to "automatically" function as a highly efficient and convenient basis for non-cash transactions.

The Electronic Community Needs Administrative and Support Services

There is now a worldwide electronic community. Electronic community participants need the ability to shape, control, and, in an electronic world, automate, their interactions. They badly need reliable, secure, trusted support and administrative services.

More and more of the world's commerce is being carried on electronically. The Internet—a massive electronic network of networks that connects millions of computers worldwide—is being used increasingly as the vehicle for commerce transactions. Fueled largely by easy-to-use interfaces (e.g., those allowing customers to "point and click" on items to initiate purchase and then to complete a simple form to convey credit card information), the Internet is rapidly becoming a focal point for consumer and business to business purchases. It is also becoming a significant "channel" for the sale and distribution of all kinds of electronic properties and services, including information, software, games, and entertainment.

At the same time, large companies use both private and public data networks to connect with their suppliers and customers. Driven by apparently inexorable declines in the cost of both computing power and network capacity, electronic commerce will increase in importance as the world becomes more and more computerized. This new electronic community—with its widespread electronic commerce—is generating great new demands for electronic administrative, support and "clearing" services.

The electronic community badly needs a foundation that will support both commercial and personal electronic interactions and relationships. Electronic commerce on any significant scale will require a dependable, efficient, scaleable, and secure network of third party support and administrative service providers and mechanisms to facilitate important parts of the transaction process. For example:

People who provide value to the electronic community require seamless and efficient mechanisms allowing them to be compensated for the value they provide.

Providers who sell goods or services to the electronic community need reliable, efficient electronic payment mechanisms to service themselves and other value chain participants.

Purchasers in the electronic marketplace, while often unaware of the behind-the-scenes intricacies of payment transaction activity, nonetheless require easy to use, efficient and flexible interfaces to payment mechanisms and financial obligation fulfillment systems.

Rights holders in all types of electronic "content" (for example, analog or digital information representing text, graphics, movies, animation, images, video, digital linear motion pictures, sound and sound recordings, still images, software computer programs, data), and to many types of electronic control processes, require secure, flexible and widely interoperable mechanisms for managing their rights and administering their business models, including collecting, when desired, payments and relevant usage information for various uses of their content.

All parties require infrastructure support services that remain dependable, trusted, and secure even as the volume of commerce transactions increases substantially.

An important cornerstone of successful electronic transaction management and commerce is therefore the development and operation of a set of administrative and support services that support these objectives and facilitate the emergence of more diverse, flexible, scaleable, and efficient business models for electronic commerce generally.

The Ginter Patent Specification Describes a Comprehensive Solution

The above-referenced Ginter, et al. patent specification describes technology providing unique, powerful capabilities instrumental to the development of secure, distributed transaction-based electronic commerce and rights management. This technology can enable many important, new business models and business practices on the part of electronic commerce participants while also supporting existing business models and practices.

The Ginter et al. specification describes comprehensive overall systems and wide arrays of methods, techniques, structures and arrangements that enable secure, efficient distributed electronic commerce and rights management on the Internet (and Intranets), within companies large and small, in the living room, and in the home office. Such techniques, systems and arrangements bring about an unparalleled degree of security, reliability, efficiency and flexibility to electronic commerce and electronic rights management.

The Ginter, et al. patent specification also describes an "Information Utility"—a network of support and administrative services, facilities and installations that grease the wheels of electronic commerce and support electronic transactions in this new electronic community. For example, Ginter, et al. details a wide array of support and administrative service providers for interfacing with and supporting a secure "Virtual Distribution Environment." These support and administrative service providers include:

transaction processors,
usage analysts,
report receivers,
report creators,
system administrators,
permissioning agents,
certification authority
content and message repositories,
financial clearinghouses,
consumer/author registration systems,
template libraries,
control structure libraries,
disbursement systems,
electronic funds transfer, credit card, paper billing systems, and
receipt, response, transaction and analysis audit systems.

The Present Inventions Build on and Extend the Solutions Described in the Ginter Patent Specification The present inventions build on the fundamental concepts described in the Ginter, et al. patent specification while extending those inventions to provide further increases in efficiency, flexibility and capability. They provide an overlay of distributed electronic administrative and support services (the "Distributed Commerce Utility"). They can, in their preferred embodiments, use and take advantage of the "Virtual Distribution Environment" (and other capabilities described in the Ginter et al patent specification and may be layered on top of and expand on those capabilities.

BRIEF SUMMARY OF SOME OF THE FEATURES AND ADVANTAGES OF THE PRESENT INVENTIONS

The present inventions provide an integrated, modular array of administrative and support services for electronic commerce and electronic rights and transaction management. These administrative and support services supply a secure foundation for conducting financial management, rights management, certificate authority, rules clearing, usage clearing, secure directory services, and other transaction related capabilities functioning over a vast electronic network such as the Internet and/or over organization internal Intranets, or even in-home networks of electronic appliances.

These administrative and support services can be adapted to the specific needs of electronic commerce value chains. Electronic commerce participants can use these administrative and support services to support their interests, and can shape and reuse these services in response to competitive business realities.

The present inventions provide a "Distributed Commerce Utility" having a secure, programmable, distributed architecture that provides administrative and support services. The Distributed Commerce Utility can make optimally efficient use of commerce administration resources, and can scale in a practical fashion to accommodate the demands of electronic commerce growth.

The Distributed Commerce Utility may comprise a number of Commerce Utility Systems. These Commerce Utility Systems Lie provide a web of infrastructure support available to, and reusable by, the entire electronic community and/or many or all of its participants.

Different support functions can be collected together in hierarchical and/or in networked relationships to suit various business models and/or other objectives. Modular support functions can be combined in different arrays to form different Commerce Utility Systems for different design implementations and purposes. These Commerce Utility Systems can be distributed across a large number of electronic appliances with varying degrees of distribution.

The comprehensive "Distributed Commerce Utility" provided by the present invention:

Enables practical and efficient electronic commerce and rights management.

Provides services that securely administer and support electronic interactions and consequences.

Provides infrastructure for electronic commerce and other forms of human electronic interaction and relationships.

Optimally applies the efficiencies of modern distributed computing and networking.

Provides electronic automation and distributed processing.

Supports electronic commerce and communications infrastructure that is modular, programmable, distributed and optimally computerized.

Provides a comprehensive array of capabilities that can be combined to support services that perform various administrative and support roles.

Maximizes benefits from electronic automation and distributed processing to produce optimal allocation and use of resources across a system or network.

Is efficient, flexible, cost effective, configurable, reusable, modifiable, and generalizable.

Can economically reflect users' business and privacy requirements.

Can optimally distribute processes—allowing commerce models to be flexible, scaled to demand and to match user requirements.

Can efficiently handle a full range of activities and service volumes.

Can be fashioned and operated for each business model, as a mixture of distributed and centralized processes.

Provides a blend of local, centralized and networked capabilities that can be uniquely shaped and reshaped to meet changing conditions.

Supports general purpose resources and is reusable for many different models; in place infrastructure can be reused by different value chains having different requirements.

Can support any number of commerce and communications models.

Efficiently applies local, centralized and networked resources to match each value chain's requirements.

Sharing of common resources spreads out costs and maximizes efficiency.

Supports mixed, distributed, peer-to-peer and centralized networked capabilities.

Can operate locally, remotely and/or centrally.

Can operate synchronously, asynchronously, or support both modes of operation.

Adapts easily and flexibly to the rapidly changing sea of commercial opportunities, relationships and constraints of "Cyberspace."

In sum, the Distributed Commerce Utility provides comprehensive, integrated administrative and support services for secure electronic commerce and other forms of electronic interaction.

Some of the advantageous features and characteristics of the Distributed Commerce Utility provided by the present inventions include the following:

The Distributed Commerce Utility supports programmable, distributed, and optimally computerized commerce and communications administration. It uniquely provides an array of services that perform various administrative and support roles—providing the administrative overlay necessary for realizing maximum benefits from electronic automation, distributed processing, and system (e.g., network) wide optimal resource utilization.

The Distributed Commerce Utility is particularly adapted to provide the administrative foundation for the Internet, organization Intranets, and similar environments involving distributed digital information creators, users, and service systems.

The Distributed Commerce Utility architecture provides an efficient, cost effective, flexible, configurable, reusable, and generalizable foundation for electronic commerce and communications administrative and support services. Providing these capabilities is critical to establishing a foundation for human electronic interaction that supports optimal electronic relationship models—both commercial and personal.

The Distributed Commerce Utility architecture provides an electronic commerce and communication support services foundation that can be, for any specific model, fashioned and operated as a mixture of distributed and centralized processes.

The Distributed Commerce Utility supported models can be uniquely shaped and reshaped to progressively reflect optimal blends of local, centralized, and networked Distributed Commerce Utility administrative capabilities.

The Distributed Commerce Utility's innovative electronic administrative capabilities support mixed, distributed, peer-to-peer and centralized networked capabilities. Collections of these capabilities, can each operate in any mixture of local, remote, and central asynchronous and/or synchronous networked combinations that together comprise the most commercially implementable, economic, and marketable— that is commercially desirable—model for a given purpose at any given time.

The Distributed Commerce Utility architecture is general purpose. It can support any number of commerce and communication models which share (e.g., reuse), as appropriate, local, centralized, and networked resources. As a result, the Distributed Commerce Utility optimally enables practical and efficient electronic commerce and rights management models that can amortize resource maintenance costs through common usage of the same, or overlapping, resource base.

One or more Distributed Commerce Utility commerce models may share some or all of the resources of one or more other models. One or more models may shift the mix and nature of their distributed administrative operations to adapt to the demands of Cyberspace—a rapidly changing sea of commercial opportunities, relationships, and constraints.

The Distributed Commerce Utility supports the processes of traditional commerce by allowing their translation into electronic commerce processes. The Distributed Commerce Utility further enhances these processes through its use of distributed processing, rights related "clearinghouse" administration, security designs, object oriented design, administrative smart agents, negotiation and electronic decision making techniques, and/or electronic automation control techniques as may be necessary for efficient, commercially practical electronic commerce models.

Certain Distributed Commerce Utility operations (financial payment, usage auditing, etc.) can be performed within participant user electronic appliance secure execution spaces such as, for example, "protected processing environments" disclosed in Ginter et al.

Distributed clearinghouse operations may be performed through "virtually networked and/or hierarchical" arrays of Commerce Utility System sites employing a general purpose, interoperable (e.g., peer-to-peer) virtual distribution environment foundation.

For a given application or model, differing arrays of Distributed Commerce Utility Services may be authorized to provide differing kinds of administrative and/or support functions.

Any or all of the roles supported by the Distributed Commerce Utility may be performed by, and/or used by, the same organization, consortium or other grouping of organizations, or other electronic community participants, such as individual user web sites.

One or more parts of the Distributed Commerce Utility may be comprised of a network of distributed protected processing environments performing one or more roles having hierarchical and/or peer-to-peer relationships.

Multiple Distributed Commerce Utility protected processing environments may contribute to the overall role of a service, foundation component, and/or clearinghouse.

Distributed protected processing environments contributing to a Distributed Commerce Utility role may be as distributed, in a preferred embodiment, as the number of VDE participant protected processing environments and/or may have specific hierarchical, networked and/or centralized administration and support relationship(s) to such participant protected processing environments.

In a given model, certain one or more Distributed Commerce Utility roles may be fully distributed, certain other one or more roles may be more (e.g., hierarchically), and/or fully, centralized, and certain other roles can be partially distributed and partially centralized.

The fundamental peer-to-peer control capabilities provided by the Distributed Commerce Utility allows for any composition of distributed roles that collectively provide important, practical, scaleable, and/or essential commerce administration, security, and automation services.

Combinations of Distributed Commerce Utility features, arrangements, and/or capabilities can be employed in programmable mixtures of distributed and centralized arrangements, with various of such features, arrangements, and capabilities operating in end-user protected processing environments and/or "middle" foundation protected processing environments (local, regional, class specific, etc.) and/or centralized service protected processing environments.

The Distributed Commerce Utility is especially useful to support the Internet and other electronic environments that have distributed information creators, users and service providers. By helping people to move their activities into the electronic world, it plays a fundamentally important role in migration of these non-electronic human activities onto the Internet, Intranets, and other electronic interaction networks. Such network users require the Distributed Commerce Utility foundation and support services in order to economically realize their business and privacy requirements. This secure distributed processing foundation is needed to optimally support the capacity of electronic commerce models to meaningfully scale to demand and efficiently handle the full range of desired activities and service volume.

The Distributed Commerce Utility technologies provided by the present inventions provide a set of secure, distributed support and administrative services for electronic commerce, rights management, and distributed computing and process control.

The Distributed Commerce Utility support services including highly, secure and sophisticated technical and/or contractual services, may be invoked by electronic commerce and value chain participants in a seamless, convenient, and relatively transparent way that shields users against the underlying complexity of their operation.

The Distributed Commerce Utility can ensure appropriately high levels of physical, computer, network, process and policy-based security and automation while providing enhanced, efficient, reliable, easy to use, convenient functionality that is necessary (or at least highly desirable) for orderly and efficiently supporting of the needs of the electronic community.

The Distributed Commerce Utility, in its preferred embodiments, support the creation of competitive commercial models operating in the context of an "open" VDE based digital marketplace.

The Distributed Commerce Utility can provide convenience and operating efficiencies to their value chain participants. For example, they may offer a complete, integrated set of important "clearing" function capabilities that are programmable and can be shaped to optimally support multi-party business relationship through one seamless, "distributed" interface (e.g., a distributed application). Clearing and/or support functions and/or sub-functions can, as desirable, be made available individually and/or separately so as to serve business, confidentiality, efficiency, or other objectives.

The Distributed Commerce Utility can make it easy for providers, merchants, distributors, repurposers, consumers, and other value chain participants to attach to, invoke, and work with Distributed Commerce Utility services. Hookups can be easy, seamless and comprehensive (one hook-up may provide a wide variety of complementary services).

The Distributed Commerce Utility can further enhance convenience and efficiency by providing or otherwise supporting consumer brand images for clearing services offered by participant organizations, but utilizing shared infrastructure and processes.

The Distributed Commerce Utility can realize important efficiencies resulting from scale and specialization by participant organizations by supporting "virtual" models that electronically and seamlessly employ the special services and capabilities of multiple parties.

The Distributed Commerce Utility makes it possible for consumers to conveniently receive a benefit such as a service or product, where such service or product results from the invocation of a "fabric" of various support services—each of which service may be comprised of a distributed fabric of more specialized services and/or participating constituent service providers (the overall fabric is apparent to the value chain participant, the underlying complexity is (or can be) largely or entirely hidden).

Distributed Commerce Utility services and capabilities in their preferred embodiments can employ and be combined in any reasonable manner with any one or more Virtual Distribution Environment capabilities described in Ginter, et. al., including for example:
A. VDE chain of handling and control,
B. secure, trusted internodal communication and interoperability,
C. secure database,
D. authentication,
E. cryptographic,
F. fingerprinting,
G. other VDE security techniques,
H. rights operating system,
I. object design and secure container techniques,
J. container control structures,
K. rights and process control language,
L. electronic negotiation,
M. secure hardware, and
N. smart agent (smart object) techniques (for example, smart agents employed as process control, multi-party, and/or other administrative agent capabilities supporting distributed node administrative integration).

Commerce Utility Systems can be Distributed and Combined

The support and administrative service functions provided by the Distributed Commerce Utility can be combined in various ways and/or distributed through an electronic community, system or network. The preferred embodiment uses the protected processing environment based Virtual Distribution Environment described in Ginter et al. to facilitate such combinations and distributedness. Since all such Virtual Distribution Environment protected processing environments are at least to some degree trusted, every protected processing environment can be a clearinghouse or a part of a clearinghouse. Commerce models acceptable to the interest and desires of VDE commerce node users, can support Distributed Commerce Utility services that are pushed all the way to end-user electronic appliances employing, for example, other VDE protected processing environments; secure communication techniques and other VDE capabilities (as discussed elsewhere VDE capabilities can be directly integrated with the present inventions). Such appliances, along with more centralized value chain nodes can together form combinations that function as virtual clearing protected processing environments. In the end, cyberspace will be populated, in part, by big, "virtual" computers where access to resources is based upon "availability" and rights.

The Distributed Commerce Utility is a modular, programmable and generalizable context that it can support such virtual computers. The Distributed Commerce Utility is a unique architectural foundation for the design of electronic commerce value chain models and virtual computers. The programmable nature of a particular implementation can support differing actual (logical and/or physical), and/or degrees of, distribution for the same and/or similar services For example:

Centralized Commerce Utility Systems and services may be used to provide certain support service functions, or collections of functions, efficiently from a centralized location.

Other Commerce Utility Systems might be provided in a partially or wholly distributed manner.

Some support and administrative service functions might be distributed in and/or throughout existing or new communications infrastructure or other electronic network support components.

Other support services might operate within secure execution spaces (e.g., protected processing environments) on any or all user electronic appliances, using peer-to-peer communications and interactions, for example, to provide a secure web of support service fabric.

Other support services might operate both in the network support infrastructure and at user electronic appliances.

Such distributed support services may complement (and/or eliminate the need for) more centralized support service installations. Different combinations of the same and/or differing, non-distributed and differently distributed services may be provided to support different activities. Moreover, the nature and distribution of services for one overall model may differ from one implementation to another. Such differing model implementations can, if desired, share both the same Commerce Utility Systems and Services and/or any particular and/or any combination of Distributed Commerce Utility administrative and/or support functions.

Further, a particular Commerce Utility Systems and Service infrastructure may be used by differing value chains (e.g., business model or relationship set) in differing manners. For example, certain value chains may elect to keep certain support service functions more centralized for efficiency, security, control or other reasons, others may elect more and/or differently distributed models.

Provided that, for example, payment methods and rightsholders and/or other value chain participants concur, any one or more of the Distributed Commerce Utility secure infrastructure support services may distribute and/or delegate a portion or all of their functions and authority to any arbitrary collection or set of end-user and/or other value chain electronic appliances. Distributing and delegating these services and functions has various advantages including, for example, enabling flexible and efficient creation of temporary, ad hoc webs of secure electronic commerce in which any, a number, or all appliance(s) in the collection or set may participate as at least a partial (if not full) peer of other appliances in the same commerce web fabric.

The present invention provides the following non-exhaustive list of additional features relating to distributing administrative and support functions:

Any mixture of any administrative and/or support functions may be integrated with any other mixture of administrative and/or support functions.

Any set or subset of Commerce Utility System functions can be combined in an integrated design with any other mixture of Commerce Utility system functions. Such mixtures can be distributed to any desired degree and any one or more portions of the mixture may be more or less distributed than any other one or more portion. This allows a value chain to employ optimum desired and/or practical designs. Any mixture, including any degrees of distribution, of rights clearing, financial clearing, usage aggregation, usage reporting and/or other clearing and/or other Distributed Commerce Utility functions, can be provided. Such Distributed Commerce Utility functions and/or administrative and/or support services can be combined with any other desired Distributed Commerce Utility functions and/or administrative and/or support services.

Any one or more such administrative and/or support services and/or functions can operate as a Commerce Utility System and support a web of Commerce Utility System nodes, each of which supports at least a portion of such Commerce Utility administrative service activities. Each Commerce Utility System may be capable of granting authority and/or providing services to and/or otherwise securely interoperating with other Commerce Utility Systems and/or nodes.

Each Commerce Utility System (or combination of Commerce Utility Systems) may be capable of participating as a "virtual clearinghouse" comprised of plural Commerce Utility Systems. In the preferred embodiment, these "virtual clearinghouses" may, when in accordance with VDE rules and controls, interoperate—in a fashion prescribed by such rules and controls—with other Commerce Utility Systems and/or other virtual clearinghouses participating in the same web. Such "virtual clearinghouses" may receive authority from secure chain of handling and control embodied in electronic control sets, and may participate in electronic commerce process automation resulting from such chain of handling and control and other VDE capabilities.

This ability to distribute, and, if desired to subsequently adapt (modify), any support service functions to any desired degree across a system or network provides great power, flexibility and increases in efficiency. For example, distributing aspects of support services such as clearing functions will help avoid the "bottlenecks" that a centralized clearing facility would create if it had insufficient capacity to handle the processing loads. Taking advantage of the distributed processing power of many value chain participant appliances also has great benefits in terms of improved effectiveness and system response time, much lower overhead of operation, greater fault tolerance, versatility in application implementations, and, in general much greater value chain appeal resulting from the present inventions adaptability to each value chain participant's needs and requirements.

Some Examples of Administrative and/or Support Services Provided by the Distributed Commerce Utility The Distributed Commerce Utility may be organized into a number of different, special and/or general purpose "Commerce Utility Systems." The Commerce Utility Systems can be centralized, distributed, or partially distributed and partially centralized to provide administrative, security, and other services that practical commerce management layer requires. Certain Commerce Utility Systems comprise Distributed Commerce Utility implementations of certain well known administrative service functions, such as financial clearinghouse and certifying authorities. Other Commerce Utility Systems involve new forms of services and new combinations and designs for well known service activities. A Commerce Utility System is any instanstiation of the Distributed Commerce Utility supporting a specific electronic commerce model, and a Commerce Utility System may itself be comprised of constituent Commerce Utility Systems. Commerce Utility Systems may include any or all of the following, in any combination of capabilities and distribution designs, for example:

financial clearinghouses,
usage clearinghouses,
rights and permissions clearinghouses,
certifying authorities,
secure directory services,
secure transaction authorities,
multi-purpose, general purpose and/or combination Commerce Utility Systems including any combination of the capabilities of the systems listed immediately above, and
other Commerce Utility Systems.

These Commerce Utility Systems are far-reaching in their utility and applicability. For example they may provide administrative support for any or all of the following:

trusted electronic event management,
networked, automated, distributed, secure process administration and control,
Virtual Distribution Environment chain-of-handling and control, and
rights administration and usage (e.g., event) management (e.g., auditing, control, rights fulfillment, etc.), across and/or within electronic networks, including "unconnected," virtually connected, or periodically connected networks.

The Commerce Utility Systems may govern electronic process chains and electronic event consequences related to, for example:

electronic advertising,
market and usage analysis,
electronic currency,
financial transaction clearing and communications,
manufacturing and other distributed process control models,
financial clearing,
enabling payment fulfillment or provision of other consideration (including service fees, product fees or any other fees and/or charges) based at least in part on content, process control (event) and/or rights management,
performing audit, billing, payment fulfillment (or provision of other consideration) and/or other clearing activities,
compiling, aggregating, using and/or providing information relating to use of one or more secure containers and/or content and/or processes (events), including contents of secure containers and/or any other content, providing information based upon usage auditing, user profiling, and/or market surveying related to use of one or more secure containers and/or content and/or processes (events), employing information derived from user exposure to content (including advertising) and/or use of processes (events), providing object registry services; and/or rights, permissions, prices, and/or other rules and controls information; for registered and/or registering objects;

electronically certifying information used with and/or required by rules and controls, such as authenticating identity, class membership and/or other attributes of identity context including for example, certification of class identity for automating processes, such as rights related financial transaction fulfillment based upon governing jurisdiction (taxation(s)), employment and/or other group membership including, for example, acquired class rights (e.g., purchased discount buyers club membership); third party archiving and/or authenticating of transactions and/or transaction information for secure backup and non-repudiation, providing programmed mixed arrays of Commerce Utility System process control and automation services, where different Commerce Utility Systems support different value chains and/or business models requirements, and where such Commerce Utility Systems further support distributed, scaleable, efficient networked and/or hierarchical fixed and/or virtual clearinghouse models which employ secure communication among a Commerce Utility System's distributed clearinghouse protected processing environments for passing clearinghouse related rules and controls and derived, summarized, and/or detailed transaction information, EDI, electronic trading models, and distributed computing arrangements where participants require trusted foundation that enables efficient, distributed administration, automation, and control of transaction value chains, and other support and/or administrative services and/or functions.

BRIEF DESCRIPTION OF THE DRAWINGS

These and other features and advantages provided by the present inventions will become better and more completely understood by studying the following detailed description of presently preferred example embodiments in conjunction with the drawings, of which:

FIGS. 2A–2E show examples of how administrative and support service functions can be distributed;

FIGS. 3A–3C show example distributed Commerce Utility Systems;

FIG. 7A shows an example web of combined function Commerce Utility Systems;

FIGS. 8A–8B show example Commerce Utility System hierarchies;

FIG. 17E-1 through 17E-4 show Commerce Utility System example interaction models;

FIG. 20 shows an example financial clearing process;

FIGS. 20A–20F show an additional example of financial clearing activities and processes;

FIG. 21 shows a simplified value chain (payment) disaggregation example;

FIG. 22 shows an example of how the FIG. 21 disaggregation can be implemented within a financial clearinghouse context;

FIG. 22A shows an example arrangement for implementing payment disaggregation on a user protected processing environment;

FIG. 23 shows a more complex value chain (payment) disaggregation example;

FIG. 42 shows an example rights and permissions clearing process;

FIG. 43 shows an additional example rights and permissions clearing process;

FIGS. 44A–44E show an additional rights and permissions clearing example;

FIGS. 45A and 45B show example rights template(s);

FIG. 45C shows an example control set corresponding to the example rights template(s);

FIG. 46 shows another example rights and permissions clearing process;

FIG. 49 shows an example certifying process;

FIG. 50 shows an example distributed certifying process;

FIG. 50A shows an example control set that conditions performance and/or other consequences on the presence of digital certificates;

FIGS. 51A–51D show example digital certificate data structures;

FIG. 51E shows an example technique for generating digital certificates based on other digital certificates and a trusted database(s);

FIG. 58B shows example steps performed by the transaction authority;

FIGS. 59 and 60 show examples of how the Distributed Commerce Utility can support different electronic value chains;

DETAILED DESCRIPTION OF EXAMPLE EMBODIMENTS

Distributed Commerce Utility

Figure 1:
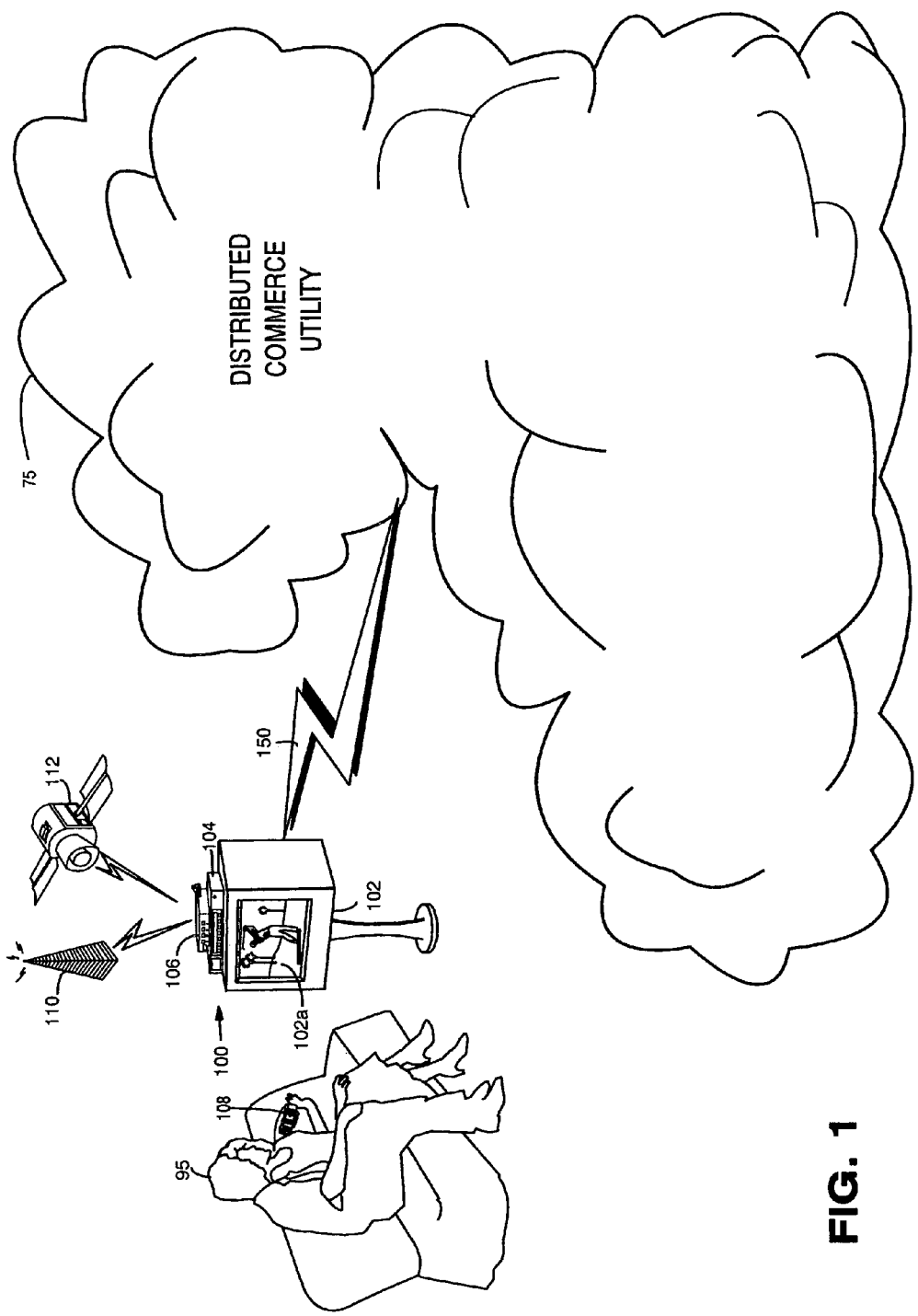
FIG. 1 shows an example Distributed Commerce Utility supporting a consumer's example electronic appliance.

FIG. 1 shows an example consumer appliance 100 electronically connected to Distributed Commerce Utility 75. In this example, an electronic network 150 connects appliance 100 to Distributed Commerce Utility 75. Distributed Commerce Utility 75 supports the activities going on within consumer appliance 100.

Distributed Commerce Utility 75 provides a foundation of administrative and support services for electronic commerce and communications. This foundation is efficient, cost effective, flexible, configurable, reusable, programmable and generalizable. It supports all kinds of electronic relationships, interactions and communications for both personal and business use.

The Distributed Commerce Utility can Support any Electronic Appliance

Appliance 100 may be any sort of electrical or electronic device such as for example, a computer, an entertainment system, a television set, or a video player—just to name a few examples. In the particular example shown in FIG. 1, the consumer appliance 100 is a home color television set 102, a video player/recorder 104, and a set top box 106. Appliance 100 may be controlled by hand held remote controller 108, for example. Set top box 106 could receive television programs from television broadcasters 110 and/or satellites 112 via a cable television network 114, for example. Player/recorder 104 could play various types of program material from tapes, optical disks or other media, and may also have the capability of recording program materials received through set top box 106.

The Appliance 100 can have a "Protected Processing Environment"

Figure 1A:
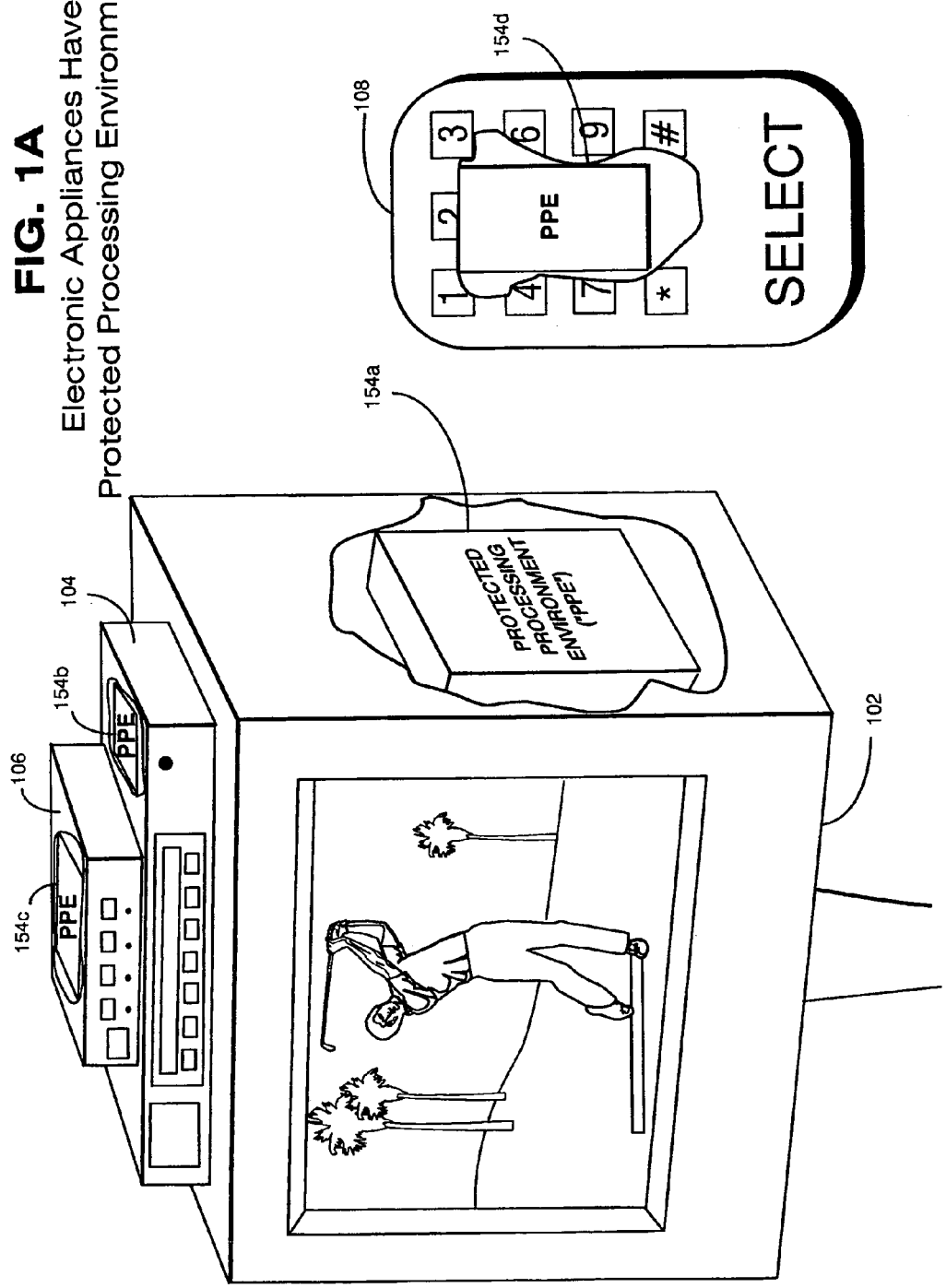
FIG. 1A shows a protected processing environment(s) ("PPE") within the consumer's electronic appliance(s)
Figure 7:
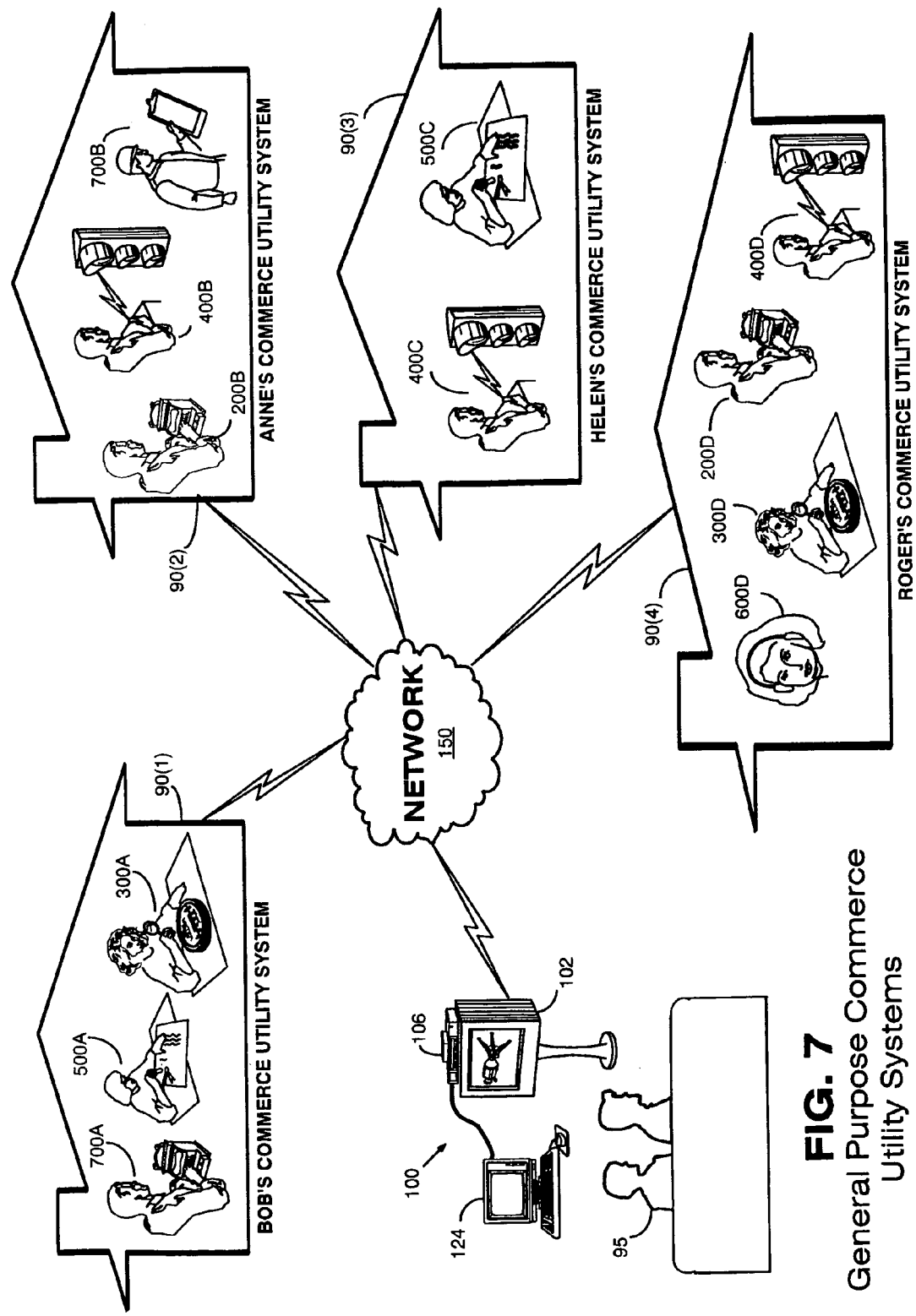
FIG. 7 shows an example of how multiple administrative and support service functions can be combined and integrated within Commerce Utility Systems.

Appliance 100 preferably is a secure electronic appliance of the type shown for example in FIGS. 7 and 8 of the Ginter et al. patent specification. It is preferably part of the "Virtual Distribution Environment" described in the Ginter, et al. patent specification. FIG. 1A shows that television 102, set top box 106, media player/recorder 104 and remote control 108 may each have a "protected processing environment" ("PPE") 154. Distributed Commerce Utility 75 may interact with and support the processes going on within each of these protected processing environments 154.

Figure 9:
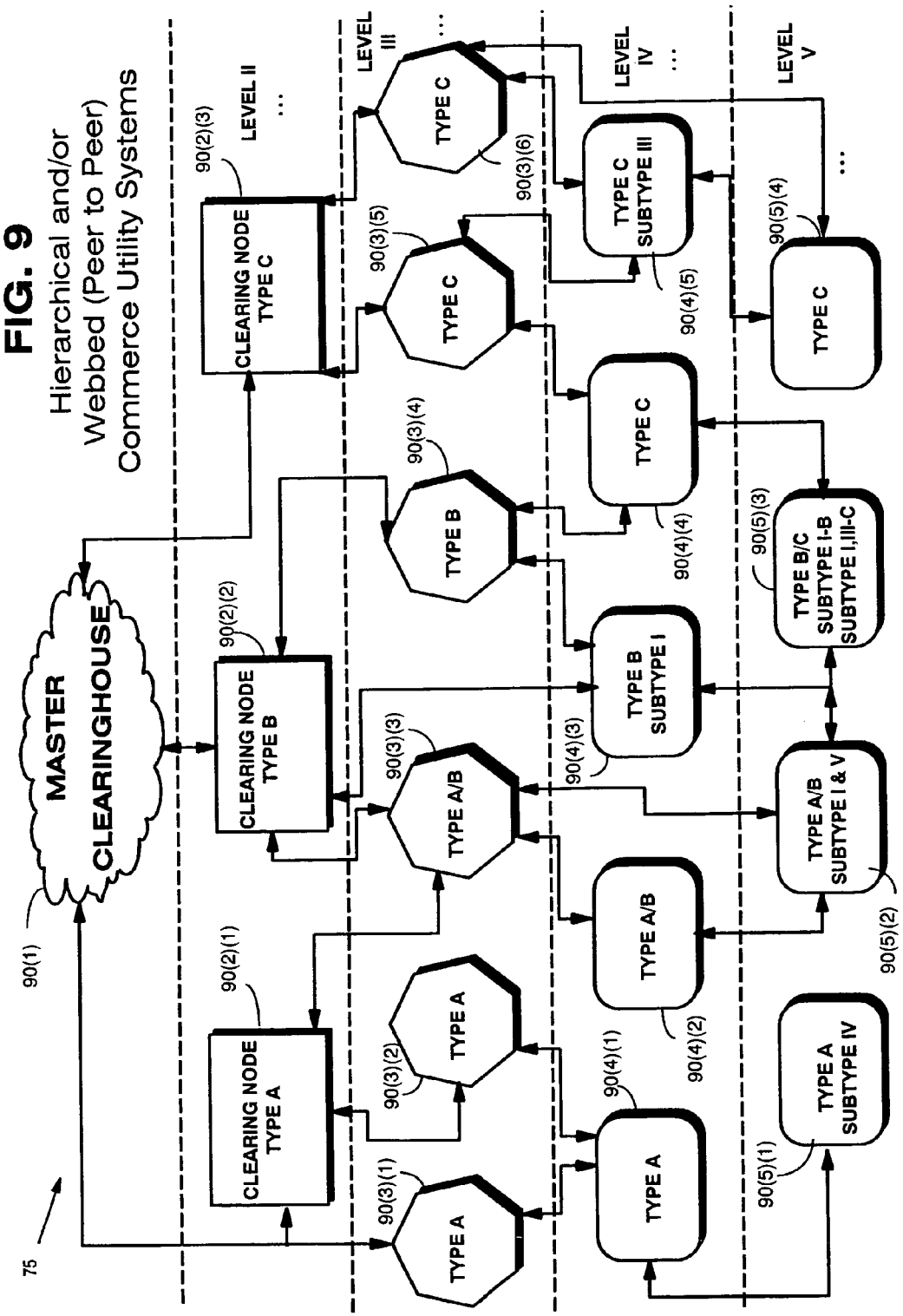
FIG. 9 shows an example hierarchy of multi-function Commerce Utility Systems

Protected processing environments 154 may be based on one or more computer chips, such as a hardware and/or software based "secure processing unit" as shown in FIG. 9 of the Ginter et al. Patent specification. The protected processing environment 154 provides a highly secure, trusted environment in which electronic processes and transactions can be reliably performed without significant danger of tampering or other compromise. The Ginter et al. patent disclosure describes techniques, systems and methods for designing, constructing and maintaining the protected processing environment 154 so that rights holders and other value chain participants (including consumers 95) can trust its security and integrity. In the preferred embodiment, this trustedness is important in the interaction between the Distributed Commerce Utility 75 and electronic appliance 100.

The Distributed Commerce Utility can be Made Up of Many "Commerce Utility Systems"

Figure 1B:
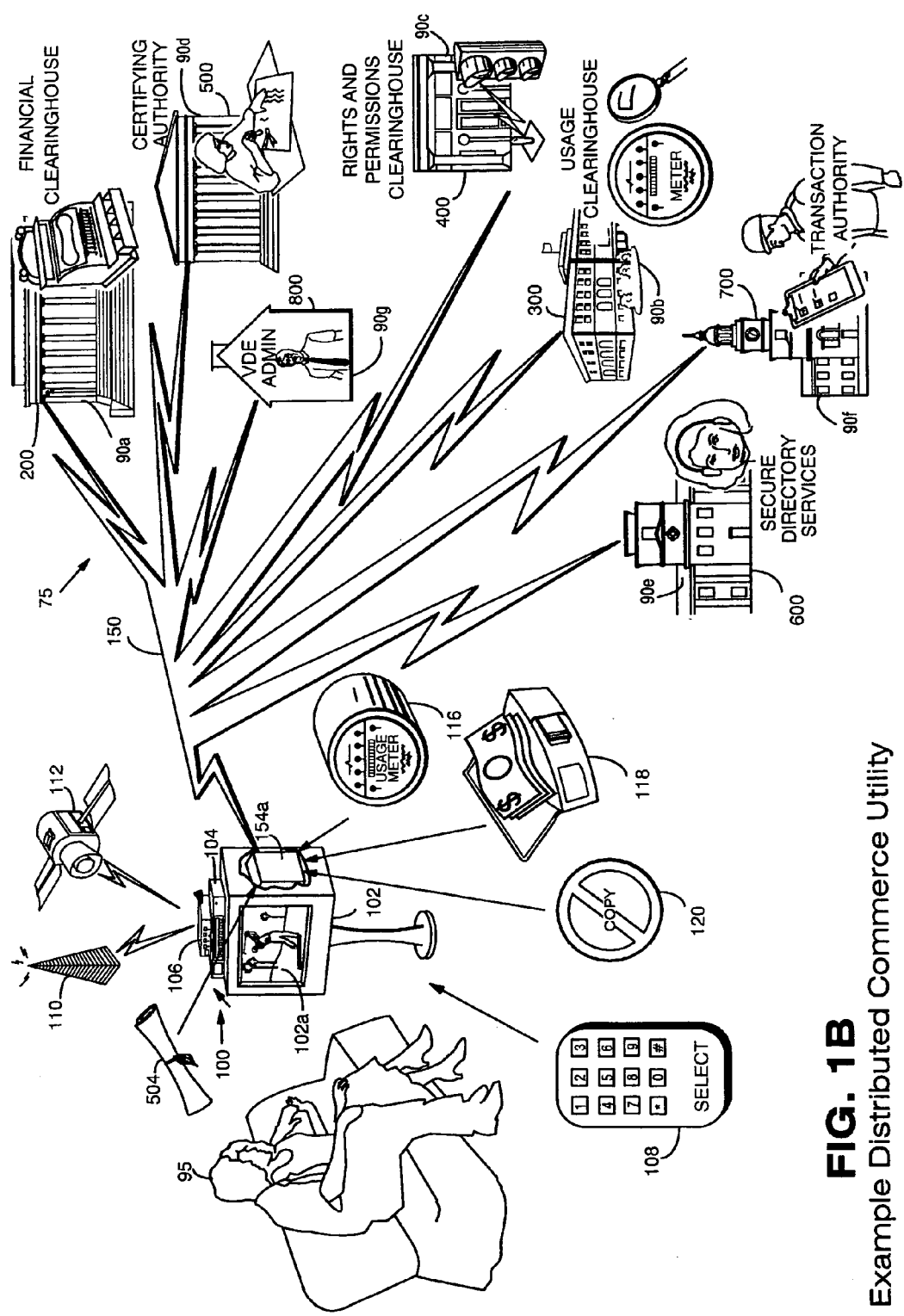
FIG. 1B shows that the Distributed Commerce Utility may comprise a number of example Commerce Utility Systems.

FIG. 1B shows that Distributed Commerce Utility 75 can be made up of a number of Commerce Utility Systems 90. There can be different kinds of Commerce Utility Systems, for example:
- a financial clearinghouse 200;
- a usage clearinghouse 300;
- a rights and permissions clearinghouse 400;
- a certifying authority 500;
- a secure directory services 600;
- a transaction authority 700;
- a VDE administrator 800; and
- other kinds of Commerce Utility Systems 90.

Commerce Utility Systems 90 can support and administer functions or operations within protected processing environment(s) 154. For example:

The appliance 100 protected processing environment 154 may provide an automatic electronic payment mechanism 118 that debits the consumers' bank or other money account based on program consumption.

Distributed Commerce Utility 75 may include a special purpose Commerce Utility System 90a called a "financial clearinghouse" 200 that supports financial aspects of the operation of the protected processing environment 154— ensuring that rights holders and others get paid appropriate amounts and that the consumers 95 are not charged excessive amounts.

The broadcaster of a television program 102a may require appliance 100's protected processing environment 154 to meter, with an electronic usage metering mechanism 116, how much of video program 102a the consumers 95 watch, and which video programs they watch. Distributed Commerce Utility 75 may include a special purpose Commerce Utility System 90b called a "usage clearinghouse" 300 that receives usage information metered by a usage meter 116 within the protected processing environment 154, analyzes it and provides reports.

The rights holders in video program 102a may insist upon the protected processing environment 154 providing a copy protection mechanism 120 that securely protects against copying video program 102a. Distributed Commerce Utility 75 may include a special purpose Commerce Utility System 90c called a "rights and permissions clearinghouse" 400 that supplies the protected processing environment 154 with necessary permissions to allow consumers 95 to watch particular programs (for example, on a pay per view basis) and to assist in enforcing prohibitions, such as, for example, a copy protection mechanism 120.

Rights holders in video program 102a may further require the appliance 100 protected processing environment 154 to possess a "digital certificate" 122 certifying the consumer's identity, age, or the like before consumers 95 can watch video program 102a. Distributed Commerce Utility 75 may include a special purpose Commerce Utility System 90d called a "certifying authority" 500 that creates and provides "digital certificates" 504 to the protected processing environment 154— allowing the consumers to efficiently interact with the permissions provided by the rights holders.

Other Commerce Utility Systems 90 shown in FIG. 1B include:

A "Secure directory services" 600 that may assist the protected processing environment 154 in communicating electronically with other computers and appliances over network 150;

A "transaction authority" 700 that may be available for process control and automation such as, for example, securely auditing and overseeing complicated electronic transactions involving protected processing environment 154; and A virtual distribution environment ("VDE") "administrator" 800 that may, in the preferred embodiment, keep the protected processing environment 154 operating smoothly and securely.

Still other Commerce Utility Systems 90 not shown in FIG. 1B may be used to administer and/or support additional functions and operations. The various Commerce Utility Systems 90 can work together, dividing up the overall tasks to support the consumers 95 efficiently and effectively.

Commerce Utility Systems can be Distributed

FIGS. 2A–2E show how Distributed Commerce Utility 75 can be distributed. Some administrative and support functions of Commerce Utility Systems 90 can be performed within a consumer's electronic appliance 100—or even in a "spread out" fashion over a large number of different appliances cooperating together.

As described above, appliances 100 each provide a protected processing environment 154 that is tamper resistant and provides a secure place in which administrative and support operations can be performed. This allows an electronic appliance 100 within a consumer's home to perform operations that can be trusted by other parties, such as rights holders, electronic commerce participants, and the like. Because of the trusted, protected characteristics of protected processing environment 154, the parts, extensions or even the entirety of a Commerce Utility System 90 may exist within each or any of the protected processing environments 154 and associated electronic appliances within the overall system.

Figure 2A:
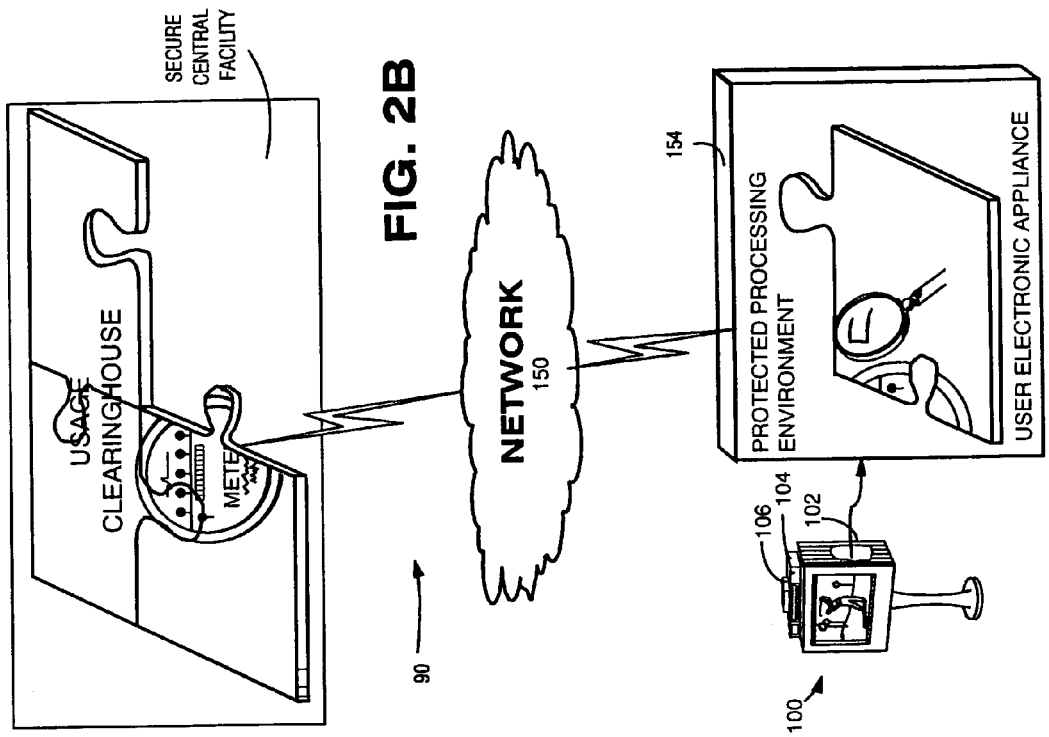

FIGS. 2A–2E represent the overall functions of an example Commerce Utility System 90 such as Usage Clearinghouse 300 as a four-piece jigsaw puzzle. FIGS. 2A–2E show that these Commerce Utility System functions can be distributed to varying degrees. For example:

FIG. 2A shows an example in which all functions of the Commerce Utility System 90 are performed in a secure central facility.

Figure 2B:
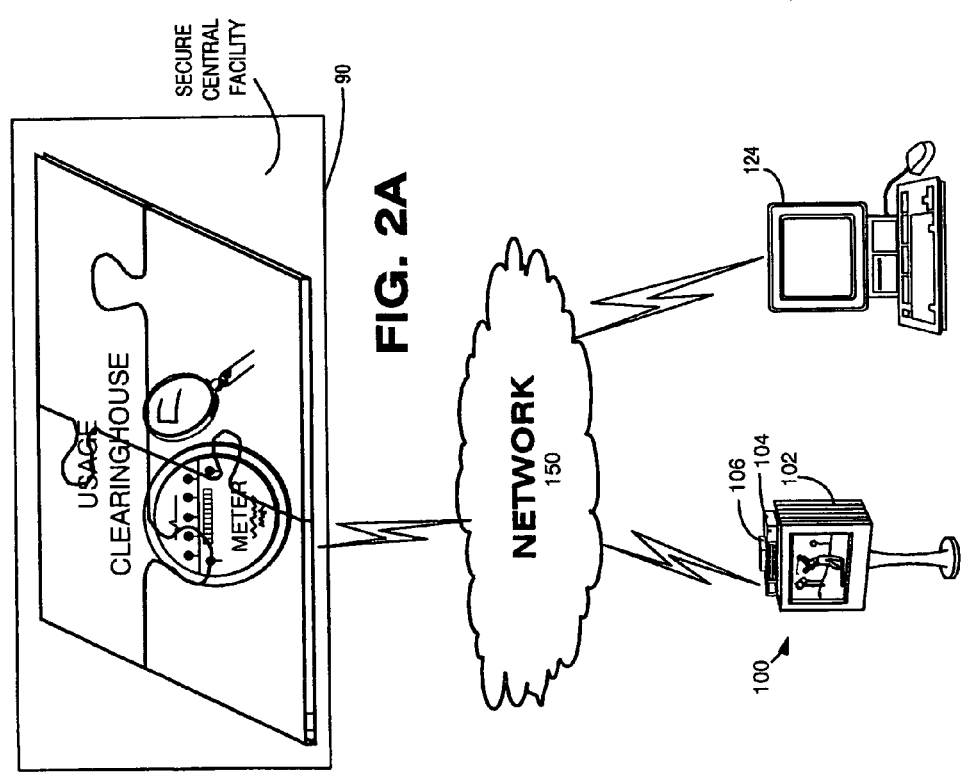

FIG. 2B shows an example in which most functions of the Commerce Utility System 90 are performed in a secure central facility, but some of its functions are performed within the protected processing environment 154 of a user electronic appliance 100.

FIG. 2C shows an example in which some functions of the Commerce Utility System 90 are performed in a secure central facility, but most of its functions are performed within the protected processing environment 154 of a user electronic appliance 100.

FIG. 2D shows an example in which some functions of the Commerce Utility System 90 are performed in a secure central facility, some of its functions are performed within the protected processing environment 154A of a first user electronic appliance 100A, and some of its functions are performed within the protected processing environment 154B of a second user electronic appliance 100B.

Figure 2E:
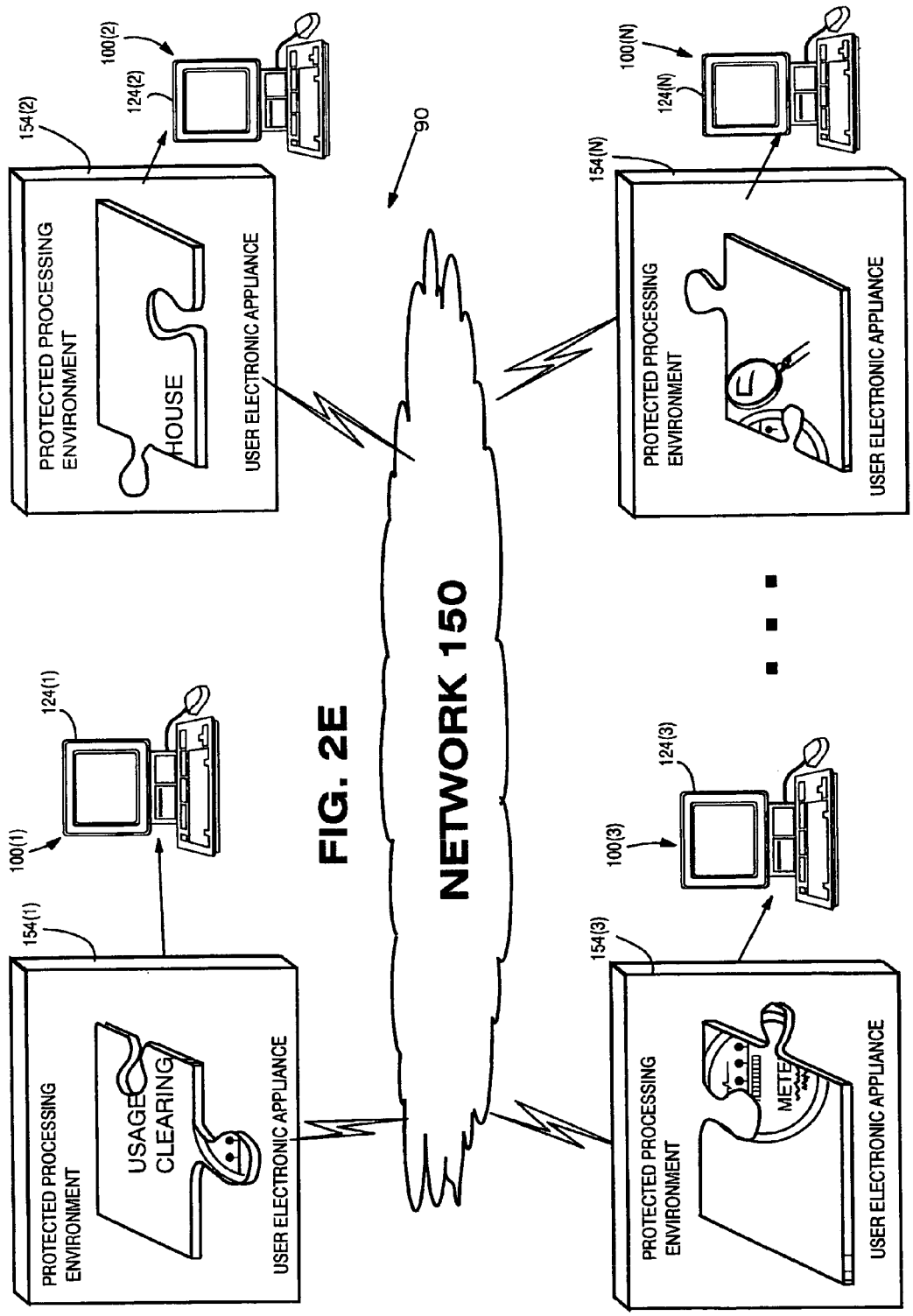

FIG. 2E shows an example in which none of the functions of the Commerce Utility System 90 are performed in a secure central facility; some of its functions are performed within the protected processing environment 154(1) of a first user electronic appliance 100(1), some of its functions are performed within the protected processing environment 154(2) of a second user electronic appliance 100(2), ), some of its functions are performed within the protected processing environment 154(3) of a third user electronic appliance 100(3), and some of its functions are performed within the protected processing environment 154A(N) of a Nth user electronic appliance 100(N).

Alternately or in addition, some of the functions of the Commerce Utility System 90 may be distributed within network 150—for example, in the equipment used to communicate data between appliances 100.

Distributing Multiple Administrative and Support Functions

Figure 3A:
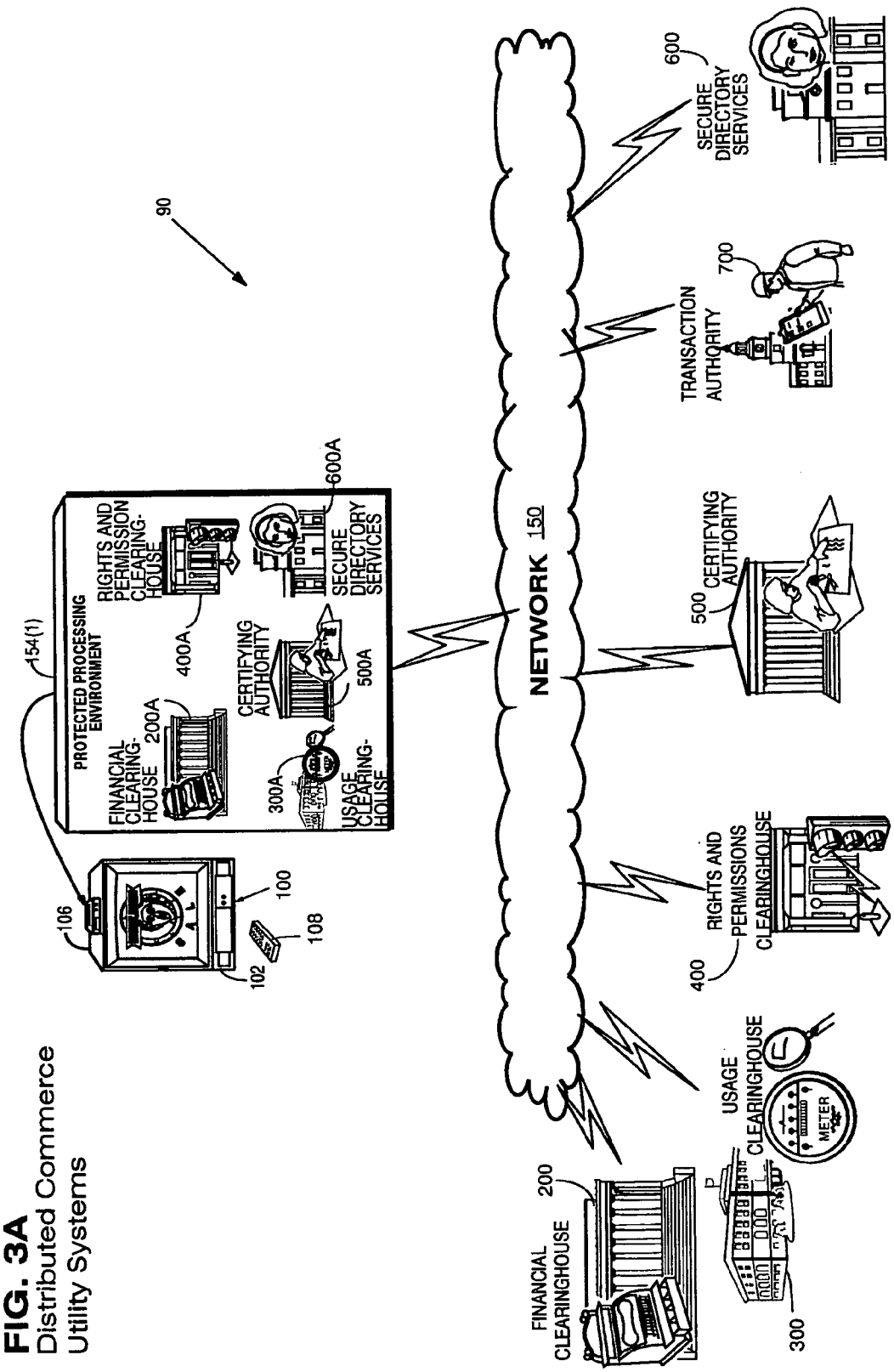

FIG. 3A shows how multiple Commerce Utility System 90 functions or sub-functions can be distributed into the same protected processing environment 154.

For example:

Financial clearinghouse function 200a operating within consumer appliance 100A's protected processing environment 154a may provide certain financial clearing such as auditing that can take the place of and/or support some of the financial clearing operations performed by a centralized financial clearinghouse 200.

Usage clearinghouse function 300a operating within consumer appliance 100A's protected processing environment 154a may perform certain usage information clearing operations, such as, for example, combining or analyzing collected usage information to complement, substitute for, or add to usage clearing operations performed by usage clearinghouse 300.

Appliance 100A's protected processing environment 154a may perform certain rights and permissions clearing operations 400a, certain certifying authority operations 500a, and certain secure directory services support operations 600a all at the consumer's site to complement, add to or substitute for operations performed by rights and permissions clearinghouse 400, certifying authority 500 and secure directory services 600.

Figure 3B:
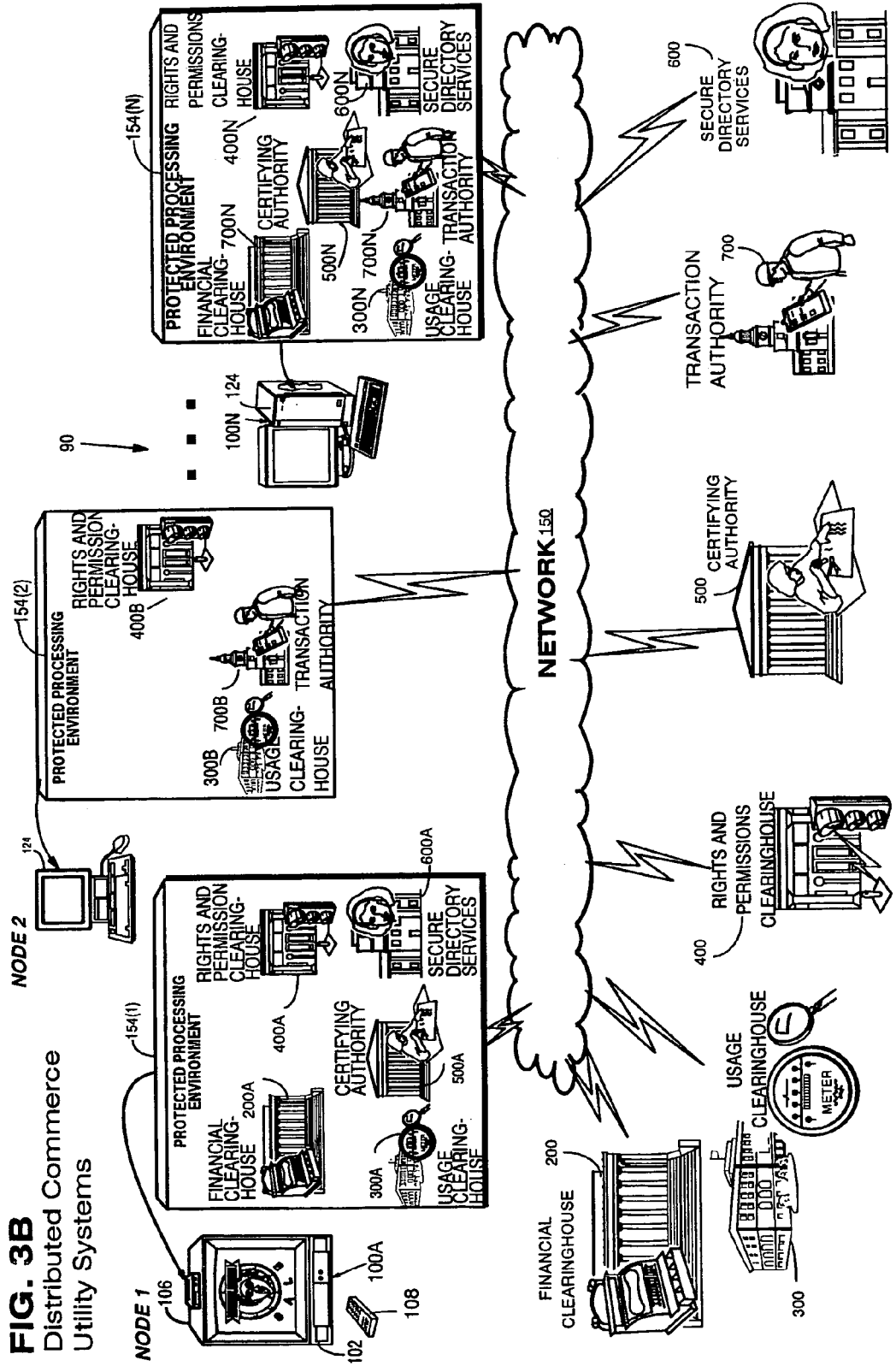

FIG. 3B shows that another example consumer electronic appliances 100(2), . . . , 100N (in this case personal computers 124) might perform different combinations of support or administrative functions locally (for example, some or all of the functions performed by transaction authority 700). For example:

the processes within protected processing environment 154(1) may rely on a partially distributed and partially centralized financial clearinghouse 200A, a partially distributed and partially centralized usage clearinghouse 300A, a partially distributed and partially centralized rights and permissions clearinghouse 400A, a partially distributed and partially centralized certifying authority 500A, a centralized secure directory services 600A, and a centralized transaction authority 700A;

the processes within protected processing environment 154(2) may rely on a centralized financial clearinghouse 200B, a partially distributed and partially centralized usage clearinghouse 300B, a partially distributed and partially centralized rights and permissions clearinghouse 400B, a centralized certifying authority 500B, a centralized secure directory services 600B, and a partially distributed and partially centralized transaction authority 700B; and the processes within protected processing environment 154(N) may rely on a partially distributed and partially centralized financial clearinghouse 200N, a partially distributed and partially centralized usage clearinghouse 300N, a partially distributed and partially centralized rights and permissions clearinghouse 400N, a partially distributed and partially centralized certifying authority 500N, a partially distributed and partially centralized secure directory services 600N, and a partially distributed and partially centralized transaction authority 700N.

Taking this concept of distributed clearing services further, it would be possible to completely distribute the Distributed Commerce Utility 75 as shown in FIG. 3C—relying mostly or completely on administrative and support service operations and activities within the secure, protected processing environments 154 of users' electronic appliances 100. Thus, the users' own electronic appliances 100 could—in a distributed manner—perform any or all of financial, usage, and rights and permissions clearing, as well as certification, secure directory services and transaction authority services. Such "local" and/or parallel and/or distributed processing transaction clearing might more efficiently accommodate the needs of individual consumers. For example, this is one way of allowing consumers to contribute controls that prevent certain private data from ever leaving their own electronic appliance while nevertheless providing rightsholders with the summary information they require.

The distributed arrangements shown in FIGS. 2A–2E and 3A–3C are not mutually exclusive ways of providing centralized Commerce Utility System 90. To the contrary, it may be advantageous to provide hybrid arrangements in which some administrative and support service functions (such as, for example, micro-payment aggregation, usage data privacy functions, and some issuing of certificates, such as parents issuing certificates for their children) are widely distributed while other administrative and support service functions (for example, issuance of important digital certificates, maintaining massive data bases supporting secure directory services, etc.) are much more centralized. The degree of distributedness of any particular administrative and support service, clearinghouse or function may depend on a variety of very important issues including, for example, efficiency, trustedness, scalability, resource requirements, business models, and other factors. In addition, the degree of distribution may involve multiple levels of hierarchy based, for example, on sub-sets determined by specific business models followed by specific business sub-models, or, for example, geographic and/or governing body and/or region areas.

Since a given electronic appliance 100 can participate in multiple activities, it is possible that its different activities may rely on different blends of distributed and centralized Commerce Utility Systems 90. For example, for one activity a protected processing environment 154 may rely on a centralized financial clearinghouse 200, for another activity it may rely on a partially distributed and partially centralized financial clearinghouse 200, and for still another activity it may rely on a wholly distributed financial clearinghouse 200. Different degrees of distributedness may be used for different activities or business models.

Web of Commerce Utility Systems

Figure 4:
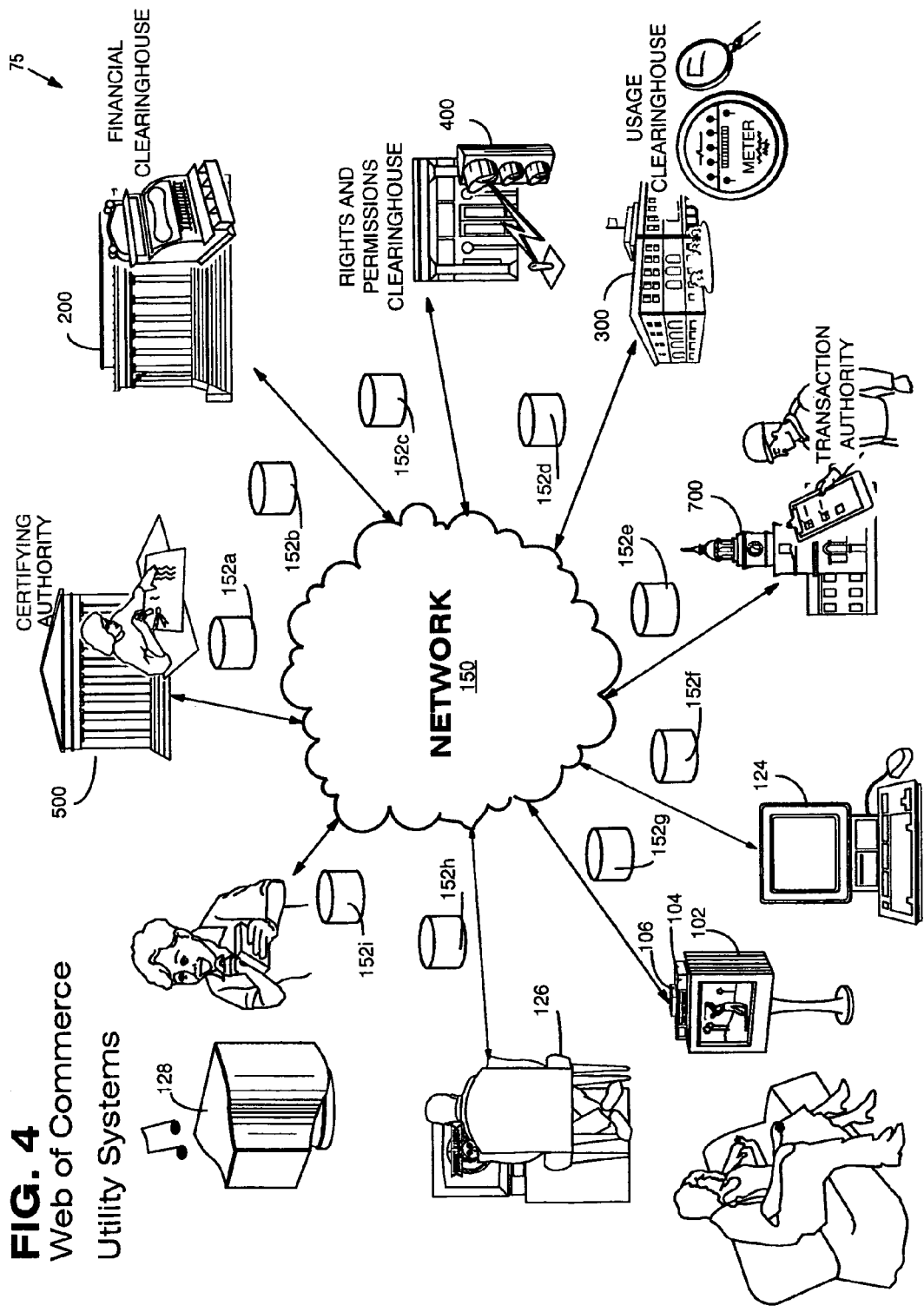
FIG. 4 shows an example web of Commerce Utility Systems.

FIG. 4 shows that Commerce Utility System 75 may comprise a vast "web" of distributed, partly distributed and/or centralized Commerce Utility Systems 90. Network 150 can be used to connect this web of Commerce Utility Systems 90 to a variety of different electronic appliances 100 that can all share the Distributed Commerce Utility 75. For example, electronic network 150 can connect to:

set top boxes 106 and/or media players 104, personal computers 124,
computer graphics workstations 126,
multi-media/video game systems 128, or
any other kinds of electronic appliances 100 including for example, manufacturing control device, household appliances, process control equipment, electronic networking and/or other communication infrastructure devices, mainframe and/or mini computers, etc.

In this example, the same Distributed Commerce Utility 75 can support a variety of different kinds of activities of a number of different consumers, authors, distributors, providers, merchants, and other people—and the Distributed Commerce Utility 75 can support a very large variety of different electronic activities. FIG. 4 also shows that Commerce Utility Systems 90 may communicate with electronic appliances 100 (and with each other) by exchanging electronic "containers" 152 of the type disclosed in Ginter et al. for purposes of security (for example, secrecy, authenticity and integrity) and managed through the use of secure rules and controls processed in protected processing environments.

The Commerce Utility Systems Web can be Virtually Limitless

Figure 4A:
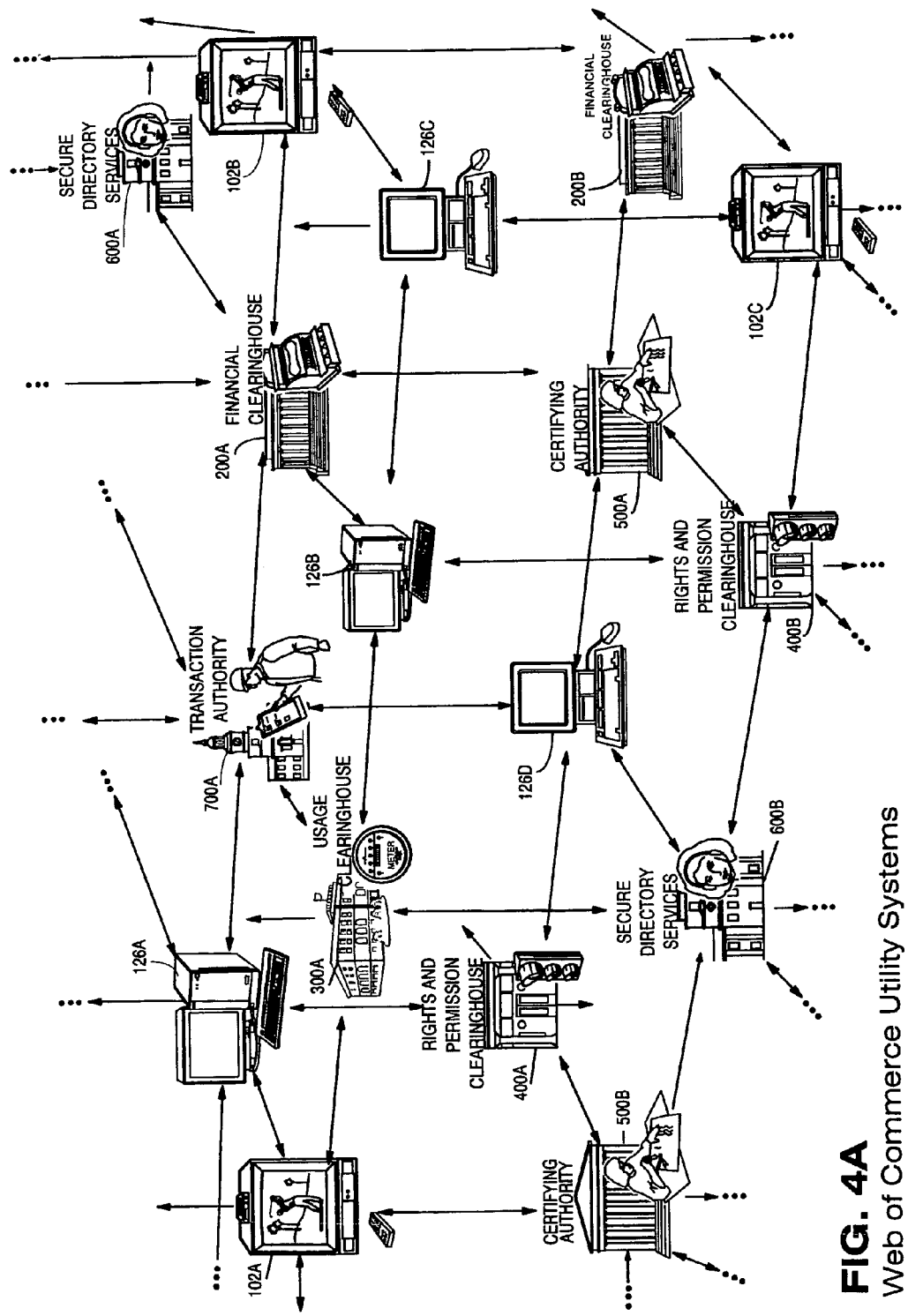
FIG. 4A shows a limitless web of consumer appliances and Commerce Utility Systems.

FIG. 4A shows that the web of Commerce Utility Systems may be vast or limitless. Indeed, network 150 may be a seamless web stretching around the world and connecting millions upon millions of electronic appliances with any number of Commerce Utility Systems 90.

The Commerce Utility Systems 90 web may provide a very complex interconnection with a variety of different types of electronic appliances performing a variety of different electronic functions and transactions. As mentioned above, any of electronic appliances 100 may be able to communicate with any of the Commerce Utility Systems 90 or with any other electronic appliance. This allows maximum efficiency and flexibility in terms of allocating different Commerce Utility Systems to different electronic transactions. For example:

Geographically close Commerce Utility Systems might best be used to minimize the amount of time it takes to get messages back and forth.
In some cases, more distant Commerce Utility Systems might be better equipped to efficiently handle certain kinds of specialized transactions.
Government regulations might also, at least in part, dictate the selection of certain Commerce Utility Systems over others. (for example, a Japanese customer may run into legal problems if she tries to use a financial clearinghouse 200 located in the Cayman Islands—or a New Jersey resident might be required by law to deal with a financial clearinghouse 200 that reports New Jersey sales tax).
Different, competitive Commerce Utility Systems are likely to be offered by different parties and these different systems would populate the web comprising Distributed Commerce Utility 75. Interoperability between such System and/or their nodes is important for efficiency and to allow reusability of electronic commerce resources.

Rights Holders and Providers can Choose Among Commerce Utility Systems

Figure 5:
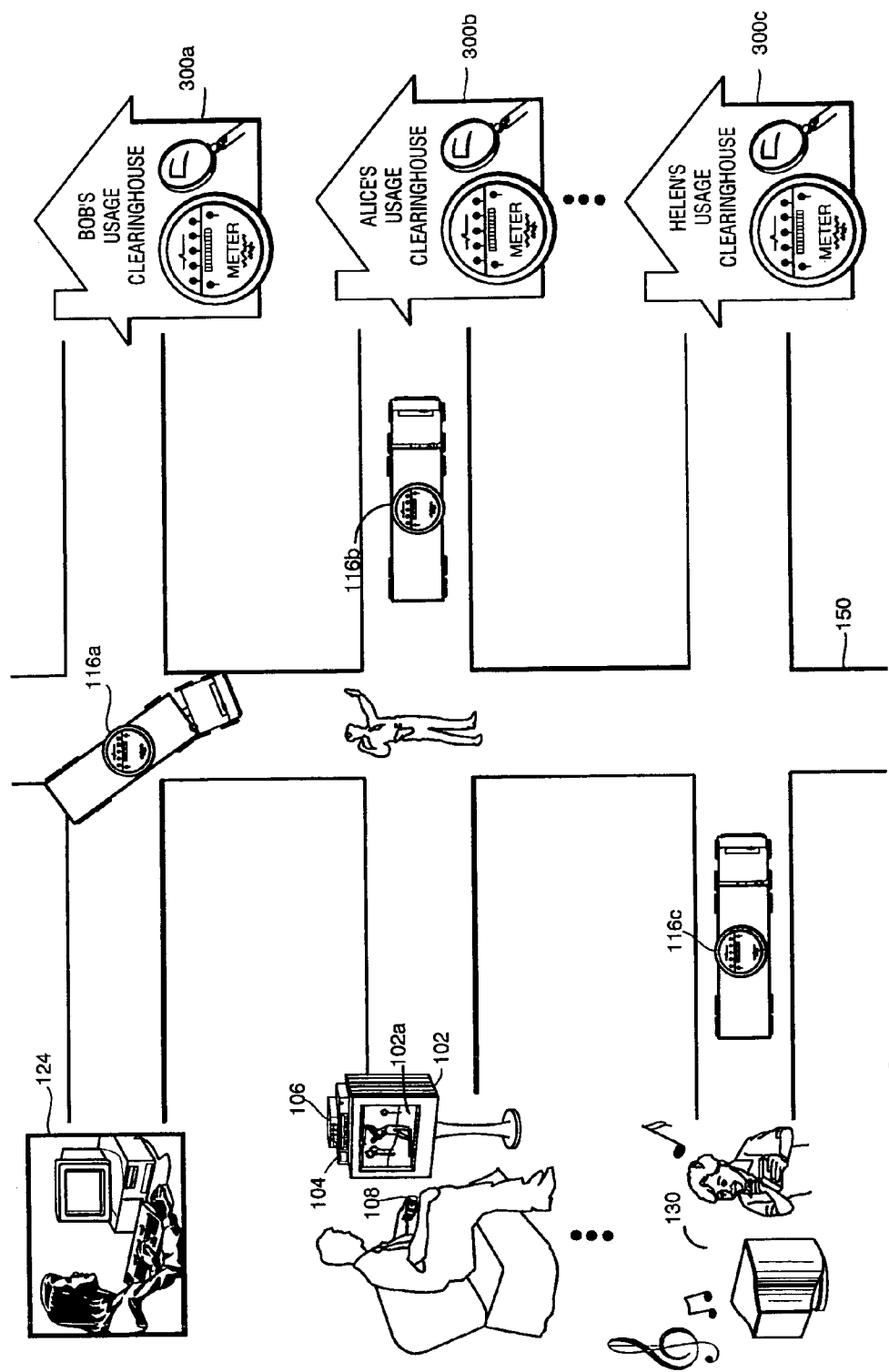
FIG. 5 shows how rights holders can select between multiple Commerce Utility Systems connected to an electronic "information highway"

FIG. 5 shows how rights holders can select between different Commerce Utility Systems 90. In this example, Bob operates a first usage clearinghouse 300a, Alice operates a second usage clearinghouse 300b, and Helen operates a third usage clearinghouse 300c. These various usage clearing service providers may compete with one another based on quality and/or price, or they may be complementary (for example, they may each specialize in different kinds of transactions).

Because electronic network 150 may connect electronic appliances 100 to many different Commerce Utility Systems 90, rightsholders in the digital properties the consumers are using may have a number of different Commerce Utility Systems to choose from. Content providers and rights holders may authorize particular (or groups of) Commerce Utility Systems 90 to handle different aspects of transactions. For example:

Computer software distributor might specify that a personal computer 124 should send metering information 116a to Helen's usage clearinghouse 300c for monitoring usage of the computer software or other activities performed by the personal computer.
A rights holder in video program 102a might specify that set top box 106 should send metering information 116 about the video to Alice's usage clearinghouse.
A multimedia content provider might specify that Bob's usage clearinghouse 300a should be used for processing usage data 116c generated by multimedia player 128.

In some instances, particular consumers 95 may also pay a role in specifying in advance particular clearinghouses or other Commerce Utility Systems 90 they prefer to use. FIG. 5 illustrates the provider's (and/or consumer's) choice by a policeman directing metering traffic to selected usage clearinghouses 300 (electronic controls as described herein and in Ginter et al. would preferably be the mechanism actually controlling how traffic is directed).

A content provider or rights holder could allow a consumer 95 to select from a group of Commerce Utility Systems 90 (and/or Commerce Utility Systems 90 providers) the content provider/rights holder wants to deal with. For example:

A television studio might authorize specific individual or classes of Commerce Utility Systems 90 to handle transactions relating to its television programs and/or it may specify particular individual or classes of Commerce Utility Systems 90 that it doesn't want to have handle its transactions.
Particular Commerce Utility Systems 90 may set requirements or standards for individual (or classes of) providers and/or consumers 95.
Value chain participants could enter into legal agreements and/or business relationships with different Commerce Utility Systems 90.

Commerce Utility Systems can Work Together

Figure 6:
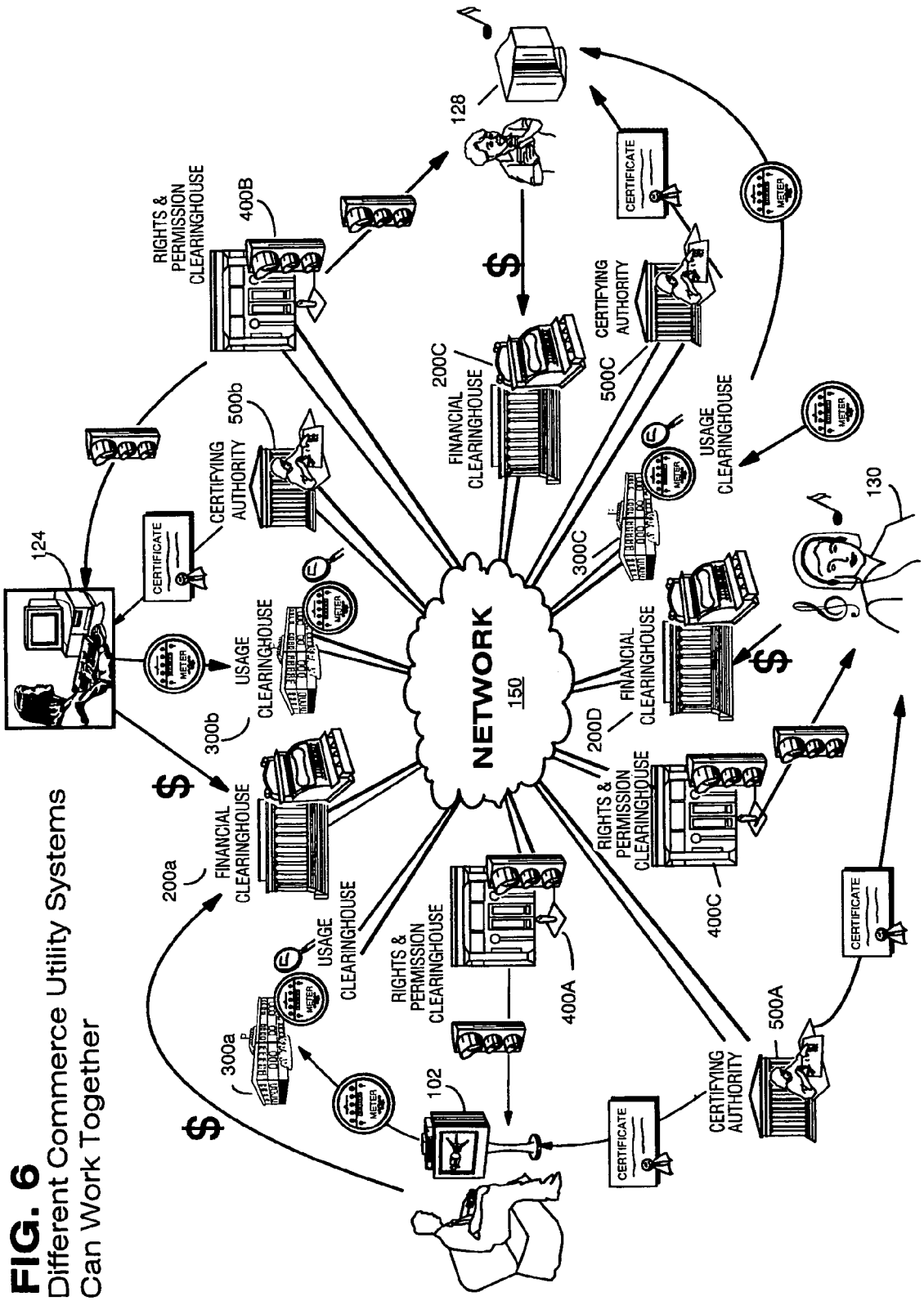
FIG. 6 shows an example of how different Commerce Utility Systems can work together.

FIG. 6 shows that different Commerce Utility Systems 90 can work together to support different kinds of operations. In this example:

Usage clearinghouse 300a, rights and permissions clearinghouse 400a, certifying authority 500a, and financial clearinghouse 200a (left-hand side of drawing) might be used to support a particular operation by set top box 106 and television set 102.

The same financial clearinghouse 200a but a different usage clearinghouse 300b, a different certifying authority 500b and a different rights and permissions clearinghouse 400b (top of drawing) might be used to support certain activities on personal computer 124.

A still different financial clearinghouse 200c, certifying authority 500c and usage clearinghouse 300c but the same rights and permissions clearinghouse 400b (right-hand side of drawing) might be used to support electronic activities of multimedia system 128.

A still different combination of Commerce Utility Systems (in this example, usage clearinghouse 300c, financial clearinghouse 200d, rights and permissions clearinghouse 400c and certifying authority 500a—along the bottom of the drawing) might be used to support sound system 130.

This example shows that various Commerce Utility Systems 90 may operate in combination, and that different combinations of Commerce Utility Systems might be used to support different electronic transactions.

Administrative and Support Service Functions can be Combined within General Purpose Commerce Utility Systems for Efficiency or Convenience FIG. 7 shows that different special purpose Commerce Utility Systems 90 administrative and support service functions or sub-functions may be integrated together into more general or multi-purpose Commerce Utility Systems 90 for maximum convenience, efficiency or other reasons. For example:

Bob may operate an integrated or combined Commerce Utility System 90a providing a financial clearinghouse 200a function, a certifying authority 500a function, and a usage clearinghouse 300a function.

Anne may operate an integrated or combined Commerce Utility System 90b providing a financial clearinghouse function 200b, a rights and permissions clearinghouse function 400b and a transaction authority function 700b.

Helen may operate an integrated or combined Commerce Utility System 90c providing a rights and permissions clearinghouse function 400c and a certifying authority function 500c.

Roger may operate an integrated or combined Commerce Utility System 90d providing secure directory services 600d, usage clearinghouse services 300d, financial clearinghouse services 200d and rights and permissions clearinghouse 400d.

A consumer operating electronic appliances 100 may access any or all of these different Commerce Utility Systems 90 or combinations. For example, set top box 106 might obtain rights and permissions and certificates from Helen's Commerce Utility System 90c, but might make use of Bob's Commerce Utility System 90a for financial clearing and usage analysis.

A Commerce Utility System 90 may provide any combination of administrative and support functions or subfunctions as may be desirable to perform the operations required in certain business models, provide maximum efficiency, and/or maximize convenience. For example, Anne's Commerce Utility System 90(2) might provide only a specialized subset of financial clearinghouse function FIG. 7A shows another illustration of how Commerce Utility Systems 90 can offer a wide variety of different combinations or subcombinations of administrative and support functions. In this FIG. 7A diagram, each of the various administrative and support service functions is represented (for purposes of illustration) as a different kind of child's play block:

financial clearing functions 200 are shown as square blocks,

Usage clearing functions 300 are shown as half-circle blocks,

Rights and permissions clearing functions 400 are shown as rectangular blocks,

Certifying authority functions 500 are shown as triangular blocks,

Secure directory service functions 600 are shown as tunnel blocks, and

Transaction authority functions 700 are shown as cylinders.

Consumer and user appliances 100 are shown as standing-up rectangular columns in the diagram. Electronic network 150 is shown as a road which connects the various Commerce Utility Systems to one another and to consumer electronic appliances 100. Electronic digital containers 152 may be carried along this electronic network or "information highway" 150 between different electronic installations.

FIG. 7A illustrates just some of the many possible administrative and support service combinations that might be used. For example:

In the upper left-hand corner, a Commerce Utility System 90A provides at least some financial clearing functions 200a, at least some rights and permissions clearing functions 400a, and at least some certifying functions 500a. This type of overall electronic Commerce Utility System 90A might, for example, be in the business of managing and granting rights on behalf of rights holders and in handling payments based on those rights.

The Commerce Utility System 90D just to the right of installation 90A comprises financial clearing-services 200d and transaction authority services 700a. It might be especially useful in, for example, auditing and/or managing an overall complex multi-step transaction while also ensuring that appropriate parties to the transaction are paid.

In the lower center of the diagram there is a Commerce Utility System 90B including financial clearing functions 200f and usage clearing functions 300c. This Commerce Utility System 90B could be especially useful, for example, for handling payment and other financial details relating to electronic usage transactions and also providing audit and report services based on the electronic usage.

The Commerce Utility System 90C shown in the bottom center of the drawing combines certifying authority services 500 with usage clearing services 300f. It could be especially useful in issuing digital certificates and then tracking the usage of those certificates (for example, in order to evaluate risks, potential liability, insurance costs, etc.).

The various examples shown in FIG. 7A are for purposes of illustration. Other combinations are possible or likely depending on business objectives, convenience and other factors.

Commerce Utility System Hierarchies

FIG. 8A shows that Commerce Utility Systems 90 or functions can be arranged in a hierarchy. For example, an overall financial (or other) clearinghouse 200(N) may oversee and/or have ultimate responsibility for the operations of numerous other financial (or other) sub-clearinghouses 200 (1), 200(2). . . . In the FIG. 8A example, a consumer electronic appliance 100 might interact with a clearinghouse 200(1), which might in turn interact with another clearinghouse 200(2), etc. This administrative and support service "hierarchy" might be thought of as being similar in some ways to a chain of command in a large corporation or in the military—with some clearinghouses exercising and/or delegating power, control and/or supervision over other clearinghouses.

FIG. 8B shows another example of a administrative and support service hierarchy. In this example, a number of centralized overall clearinghouses and/or other Commerce Utility Systems 90 delegate some or all of their work responsibilities to other Commerce Utility Systems 90. In this particular example shown, organizations, such as companies, non-profit groups or the like may have their own Commerce Utility Systems 156. Certain electronic commerce or other activities (the entertainment industry, for example) might have their own vertically-specialized Commerce Utility Systems 158. Certain geographical, territorial or jurisdictional groups (e.g., all purchasers of particular products within the state of Wisconsin) may have their own territorial/jurisdictional specialized Commerce Utility Systems 160. Commerce Utility Systems 156, 158, 160 lower in the hierarchy may, in turn, further delegate authorities or responsibilities to particular consumers, organizations or other entities.

In one example arrangement, the Commerce Utility Systems 90 to which authority has been delegated may perform substantially all of the actual support work, but may keep the more over arching Commerce Utility Systems 90 informed through reporting or other means. In another arrangement, the over arching Commerce Utility Systems 90 have no involvement whatsoever with day to day activities of the Commerce Utility Systems to whom they have delegated work. In still another example arrangement, the more specialized Commerce Utility Systems do some of the work and the more overarching Commerce Utility Systems do other parts of the work. The particular division of work and authority used in a particular scenario may largely depend on factors such as efficiency, trustedness, resource availability, the kinds of transactions being managed, and a variety of other factors. Delegation of clearing authority may be partial (e.g., delegate usage aggregation but not financial or rights management responsibilities), and may be consistent with peer-to-peer processing (e.g., by placing some functions within consumers' electronic appliances while keeping some more important functions centralized).

Multi-Function Commerce Utility Systems can be Organized Hierarchically or Peer-to-Peer FIG. 9 shows a still different, more complex Commerce Utility System environment including elements of both a hierarchical chain of command and a high degree of cooperation in the horizontal direction between different multifunction Commerce Utility Systems 90. In this example, there are five different levels of responsibility with a master or overarching Commerce Utility Systems 90(1) (for example, a financial clearinghouse 200) on level 1 having the most authority and with additional Commerce Utility Systems on levels 2, 3, 4, and 5 have successively less power, authority, control, scope and/or responsibility. FIG. 9 also shows that different Commerce Utility Systems on the same level may have different functions, scopes and/or areas of responsibility. For example:

a Commerce Utility System 90(2)(1) may be a "type A" Commerce Utility System,

Commerce Utility System 90(2)(2) might be a "type B" Commerce Utility System, and Commerce Utility System 90(2)(3) might be a "type C" Commerce Utility System.

On the next level down, Commerce Utility Systems might be type A Commerce Utility System (such as, 90(3)(1) and 90(3)(2)), they might be type B Commerce Utility Systems (such as, 90(3)(4)), they might be type C Commerce Utility Systems (such as, 90(3)(5), 90(3)(6)), or they might be hybrids—such as, Commerce Utility System 90(3)(3) which is a hybrid having type A and type B functions.

FIG. 9 also shows that additional clearinghouses on levels 4 and 5 might have sub-types as well as types. In the context of a financial clearinghouse 200 for example, Type A might be responsible for consumer credit, Type B for electronic checks, and Type C for commercial credit. Another demarcation might be clearing for Visa (Type A), Mastercard (Type B) and American Express (Type C). A Type A/B clearinghouse would then be a clearing delegation that could handle both consumer credit and electronic check clearing. A Type B Subtype I might be responsible for commercial electronic checks. A Type C Subtype I might be commercial credit card transactions, and Subtype III might be credit drafts. The rationale for multiple instances might be based on jurisdictional boundaries (e.g., France, Germany, New York, and Alabama), and/or contractual arrangements (e.g., delegation of responsibility for bad credit risks, small purchasers, very large transactions, etc.) The peer-to-peer dimension might reflect a need to coordinate an overall transaction (e.g., between a small purchaser's clearinghouse and a large commercial player's clearinghouse).

A rights and permissions clearinghouse 400 might break out along content types (e.g., movies; scientific, technical and medical; and software). Subtype A might include first run movies, oldies, and art films; subtype B might handle journals and textbooks; and type C might be responsible for games, office, educational content. Peer-to-peer communications between clearinghouses could involve multimedia presentation permissions (e.g., a multimedia presentation might have permissions stored at one clearinghouse that uses a back channel to other clearinghouses to ensure that the latest permissions are distributed).

Some Example Commerce Utility Systems

As described above, Commerce Utility Systems 90 are generalized and programmable—and can therefore provide a mix of different support and administration functions to meet requirements of a given transaction. Thus, many or most Commerce Utility Systems 90 as actually implemented may provide a range of different support and administrative functions that may make it difficult to categorize the implementation as being of one particular "kind" of Commerce Utility System as opposed to another.

Nevertheless, certain types of idealized specialized Commerce Utility Systems 90 are particularly useful for a wide range of models, transactions and applications. It is helpful and convenient to describe some of the characteristics of these "pure" Commerce Utility Systems of different types—recognizing that actual implementations may mix functions or function subsets from several of these idealized models. The following are brief vignettes of some of the characteristics of such "pure" idealized Commerce Utility Systems.

Financial Clearinghouse 200

Figure 10:
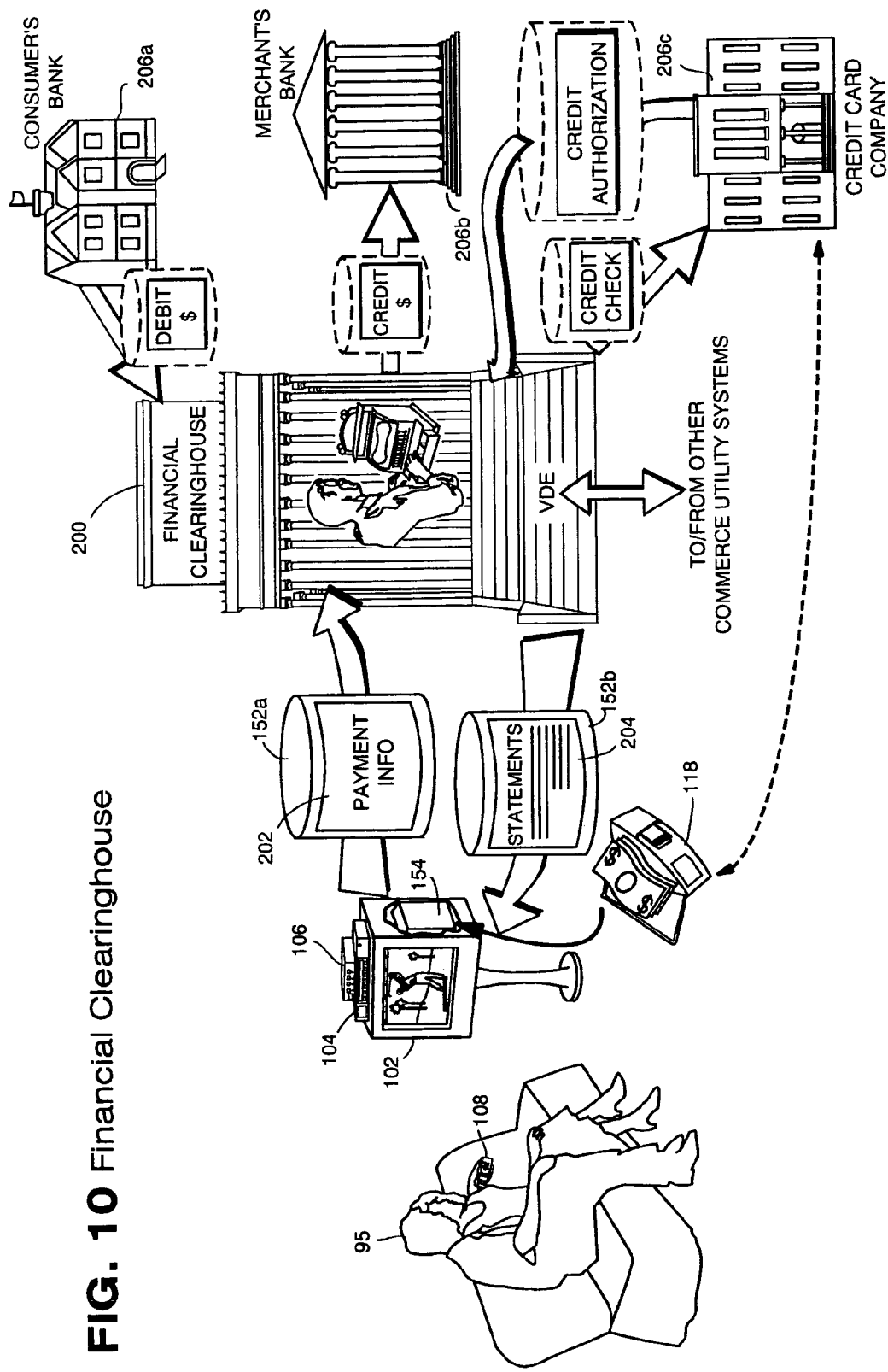
FIG. 10 shows an example financial clearinghouse.

FIG. 10 shows an example financial clearinghouse 200 in more detail. Financial clearinghouse 200 handles payments to ensure that those who provide value are fairly compensated. Financial clearinghouse 200 may securely coordinate with other Commerce Utility Systems 90 in performing this task.

In this example, financial clearinghouse 200 may communicate with appliance protected processing environment 154 over electronic network 150 in a secure manner using electronic containers 152 of the type described, for example, in the Ginter et al. patent specification in connection with FIGS. 5A and 5B. Financial clearinghouse 200 may receive payment information 202 from protected processing environment 154 in these secure containers 152, and interact electronically or otherwise with various banking, credit card or other financial institutions to ensure that appropriate payment is made.

Financial clearinghouse 200 may, for example, interact with a consumer's bank 206a, a provider's bank 206b and a consumer's credit card company 206c. For example, financial clearinghouse 200 can debit funds from the consumer's bank 206a and credit funds to the rights holder's bank 206b to pay for the consumers' watching of a movie, television program or other content. Additionally or alternately, financial clearinghouse 200 may interact with a consumer's credit card company 206c to request credit checks, obtain credit authorizations, payments and the like.

Financial clearinghouse 200 may provide payment statement statements 204 to consumers 95—for example, by transmitting the statements to appliance 100 in a secure electronic container 152b to preserve the confidentiality of the statement information. In this example, consumers 95 can view the statements 204 using their appliance 100 protected processing environment 154, and may also be able to print or save them for record-keeping purposes.

In one example, the payment mechanism 118 provided by protected processing environment 154 might be an electronic wallet supplying electronic money for use in paying for electronic services or content. This electronic wallet may hold money in digital form. Consumers 95 can spend the digital money on whatever they wish. When the electronic wallet is empty, consumers 95 can have the financial clearinghouse 200 replenish the wallet by authorizing the financial clearinghouse to debit the funds from the consumers' account in their bank 206a. Financial clearinghouse 200 may process electronic money payments, arrange for the electronic wallet to be refilled automatically (based on the consumers' pre-authorization, for example) when the consumers have spent all of its former contents, and provide the consumers with detailed reports and statements 204 about how they have spent their electronic money.

Usage Clearinghouse 300

Figure 11:
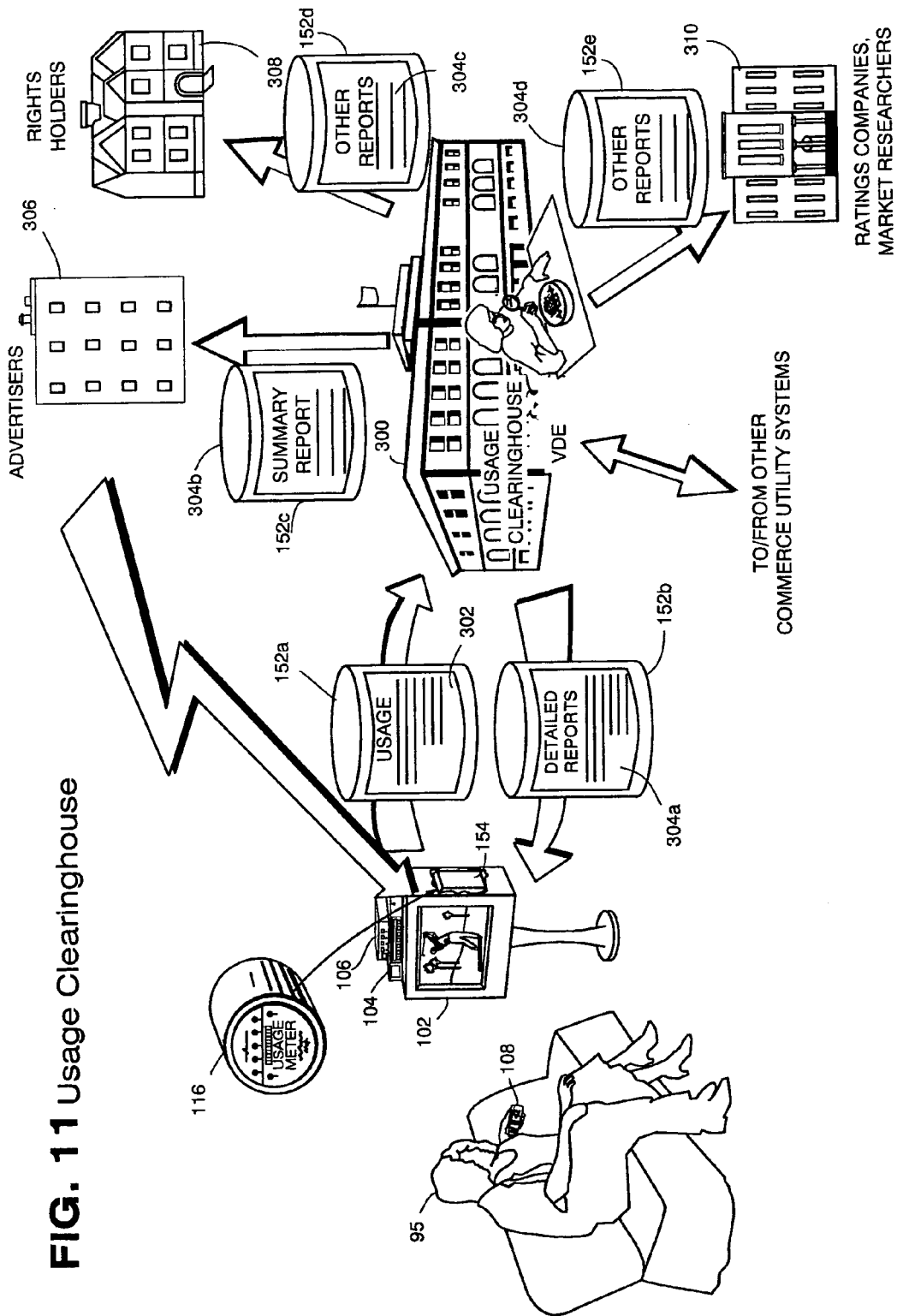
FIG. 11 shows an example usage clearinghouse.

FIG. 11 shows an example usage clearinghouse 300. Usage clearinghouse 300 in this example receives usage information 302 from usage meter 116, analyzes the usage information and provides reports based on the analysis it performs. Usage clearinghouse 300 may securely coordinate with other Commerce Utility Systems 90 in accomplishing these tasks.

For example, usage clearinghouse 300 may send the consumers 95 a detailed report 304a of all the movies, television programs and other material the consumers have watched over the last month. The communication between protected processing environment 154 and usage clearinghouse 300 may be in the form of secure containers 152. As described in the Ginter et al. patent disclosure, usage meter 116 can meter use on the basis of a number of different factors, and can range from being extremely detailed to being turned off altogether. The consumers, if they desire, could view the detailed usage report 304a on their television set 102.

Usage clearinghouse 300 can report to others about the consumers' viewing habits consistent with protecting the consumers' privacy. These reports can also be sent within secure containers 152. For example, usage clearinghouse 300 might provide a summary report 304b to advertisers 306 that does not reveal the consumers' identity but provides the advertisers with valuable information about the consumers' viewing habits. On the other hand, with the consumers' consent, usage clearinghouse 300 could provide a more detailed report revealing the consumers' identity to advertisers 306 or to other specified people. In return, the consumers 95 could be given incentives, such as, for example, discounts, cash, free movies, or other compensation.

Usage clearinghouse 300 can also issue reports 304c to rights holders 308—such as the producer or director of the video program 102a the consumers 95 are watching. These reports allow the rights holders to verify who has watched their program material and other creations. This can be very useful in ensuring payment, or in sending the consumers other, similar program material they may be interested in.

Usage clearinghouse 300 might also send reports 304d to a ratings company 310 for the purpose of automatically rating the popularity of certain program material. Usage clearinghouse 300 might also send reports to other market researchers 312 for scientific, marketing or other research.

Rights and Permissions Clearinghouse 400

Figure 12:
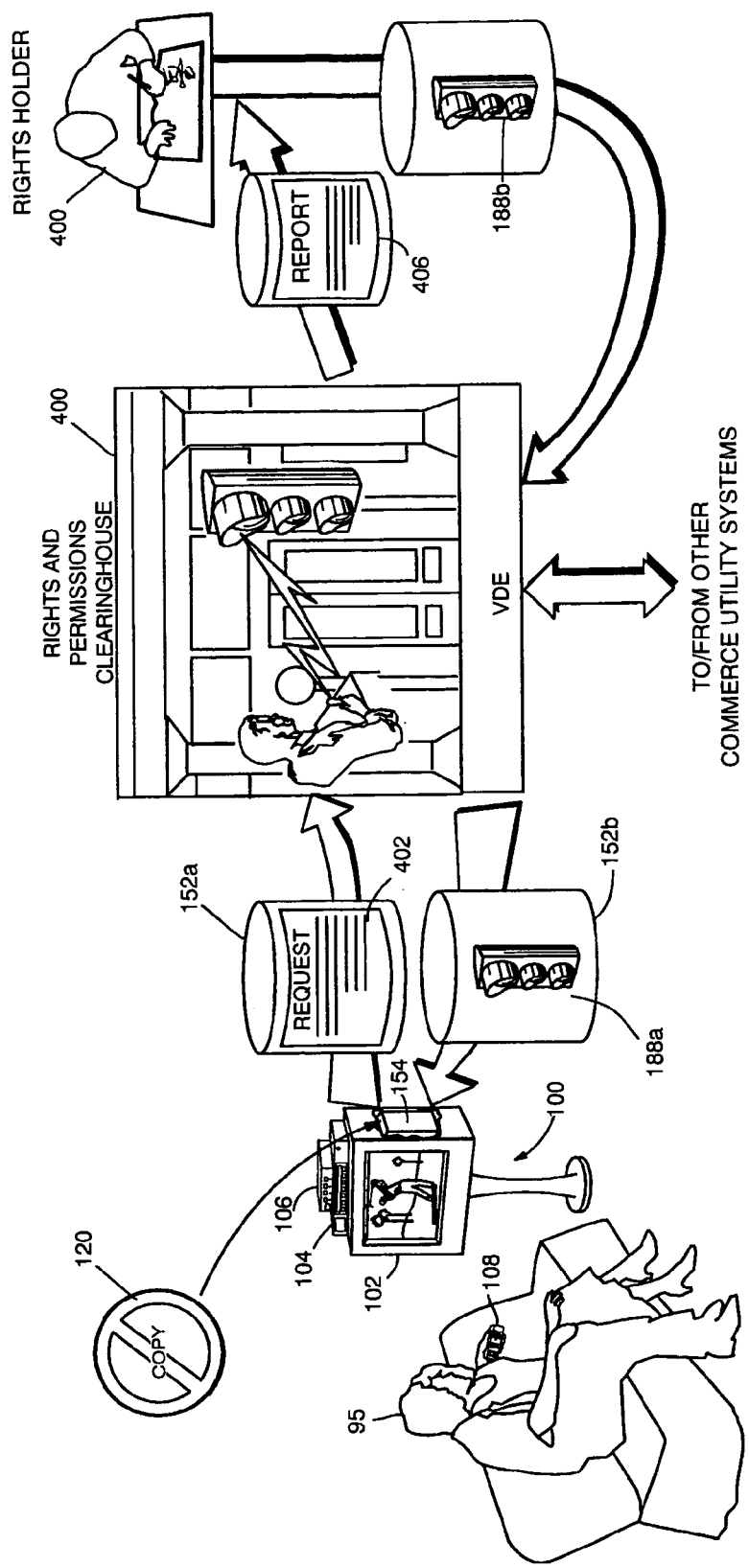
FIG. 12 shows an example rights and permissions clearinghouse.

FIG. 12 shows an example rights and permissions clearinghouse 400. Rights and permissions clearinghouse 400 stores and distributes electronic permissions 404 (shown as a traffic light in these drawings). Permissions 404 grant and withhold permissions, and also define consequences. Rights and permissions clearinghouse 400 may work with other Commerce Utility Systems 90 to accomplish its tasks.

In this example, rights and permissions clearinghouse 400 may act as a centralized "repository" or clearinghouse for rights associated with digital content. For example, broadcasters, authors, and other content creators and rights owners can register permissions with the rights and permissions clearinghouse 400 in the form of electronic "control sets." These permissions can specify what consumers can and can't do with digital properties, under what conditions the permissions can be exercised and the consequences of exercising the permissions. Rights and permissions clearinghouse 400 can respond to requests 402 from electronic appliance protected processing environment 154 by delivering-permissions (control sets)-188 in response.

For example, suppose that consumers 95 want to watch a concert or a fight on television set 102. They can operate their remote control unit 108 to request the right to watch a certain program. Protected processing environment 154 may automatically contact rights and permissions clearinghouse 400 over electronic network 150 and send an electronic request 402. The rights and permissions clearinghouse 400 can "look up" the request in its library or repository to see if it has received (and is authorized to provide) the necessary permission 404b from the program's rights holder 400. It may then send the requested permission 188 to protected processing environment 154.

For example, permission 188 might allow the consumers to view the concert or fight only once and prohibit its copying with copy protection mechanism 120. Permission 188 may also (or in addition) specify the price for watching the program (for example, $5.95 to be deducted from the consumers' electronic wallet). Appliance 100 can ask the consumers 95 if they want to pay $5.95 to watch the program. If they answer "yes" (indicated, for example, by operating remote control 108), the appliance 100 can automatically debit the consumers' electronic wallet and "release" the program so the consumers can watch it.

Rights and permissions clearinghouse 400 can deliver permissions 188 within a secure container 152b that may optionally also contain the information controlled by the permissions—or permission 188 may arrive at a different time and over a different path than the program or other content travels to the appliance 100. For example, the permissions could be sent over network 150, whereas the program it is associated with may arrive directly from satellite 112 or over some other path such as cable television network 114 (see FIG. 1).

Rights and permissions clearinghouse 400 may also issue reports 406 to rights holders or other people indicating which permissions have been granted or denied. For example, the author of a book of video might, consistent with consumer privacy concerns, be able to learn the exact number of people who have requested the right to publish excerpts from his or her work. These kinds of reports can supplement reports provided by usage clearinghouse 300.

Certifying Authority 500

Figure 13:
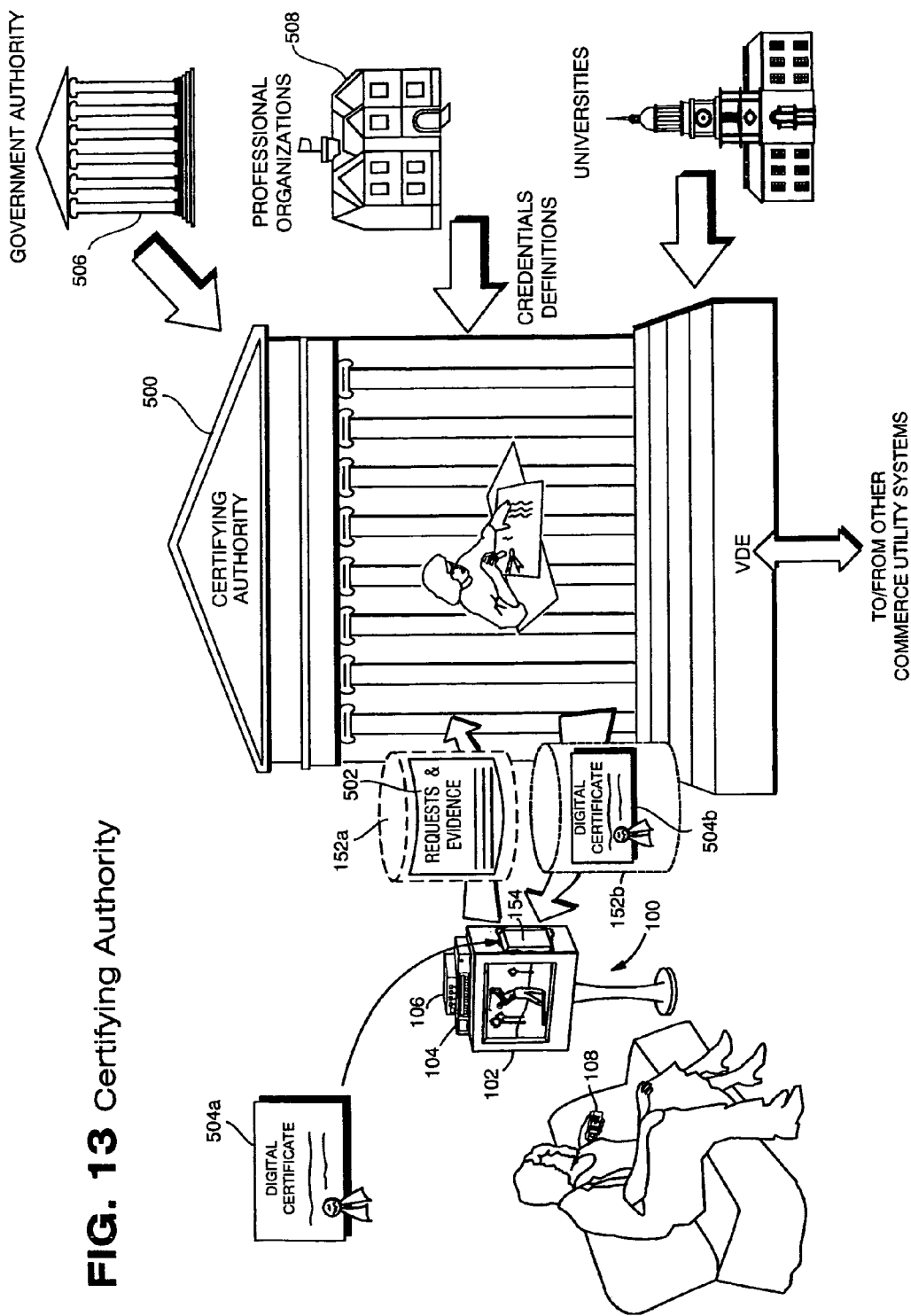
FIG. 13 shows an example certifying authority.

FIG. 13 shows an example of a certifying authority 500. Certifying authority 500 issues digital certificates 504 that provide a context for electronic rights management. Certifying authority 500 may coordinate with other Commerce Utility Systems 90 to accomplish its tasks.

Certifying authority 500 issues digital certificates 504 that certify particular facts. Digital certificate 122 is like a driver's license or a high school diploma in some respects, since they each provide proof of a certain fact. For example, we may show our drivers' license to prove that we are old enough to vote, buy liquor, or watch an "R" rated movie. This same driver's license attests to the fact that we have a certain name and live at a certain address, and that we have certain knowledge (of state motor vehicle laws) and skills (the ability to maneuver a motor vehicle). Digital certificate 504 is similar to that aspect of a driver's license that confirms the identity of, and related facts pertaining to the licensee, except that it is made out of digital information instead of a laminated card.

In this example, certifying authority 500 may receive consumer requests and associated evidence 502, and may issue corresponding digital certificates 504 that certify particular facts. Certifying authority 500 may also receive evidence, credentials and possibly also certificate definitions from other people such as government authorities 506, professional organizations 508 and universities 510. As one example, the certifying authority 500 might receive birth certificate or other identity information from a government authority 506. Based on this identity information, the certifying authority 500 may prepare and issue a digital certificate 504 that attests to person's identity and age. The certifying authority 500 might also issue digital certificates 504 attesting to professional status, employment, country of residence, or a variety of other classes and categories based on various evidence and inputs from various people.

Certifying authority 500 may certify organizations and machines as well as people. For example, certifying authority 500 could issue a certificate attesting to the fact that Stanford University is an accredited institution of higher learning, or that the ACME Transportation Company is a corporation in good standing and is authorized to transport hazardous materials. Certifying authority 500 could also, for example, issue a certificate 504 to a computer attesting to the fact that the computer has a certain level of security or is authorized to handle messages on behalf of a certain person or organization.

Certifying authority 500 may communicate with protected processing environment 154 and with other parties by exchanging electronic containers 152. Electronic appliance 10('s protected processing environment 154 may use the digital certificates 504 the certifying authority 500 issues to manage or exercise permissions 188 such as those issued by rights and permissions clearinghouse 400. For example, set top box 106 might automatically prevent any consumer under 17 years of age from watching certain kinds of program material, or it might provide a payment discount to students watching educational material—all based on certificates 504 issued by certifying authority 500.

Secure Directory Services

Figure 14:
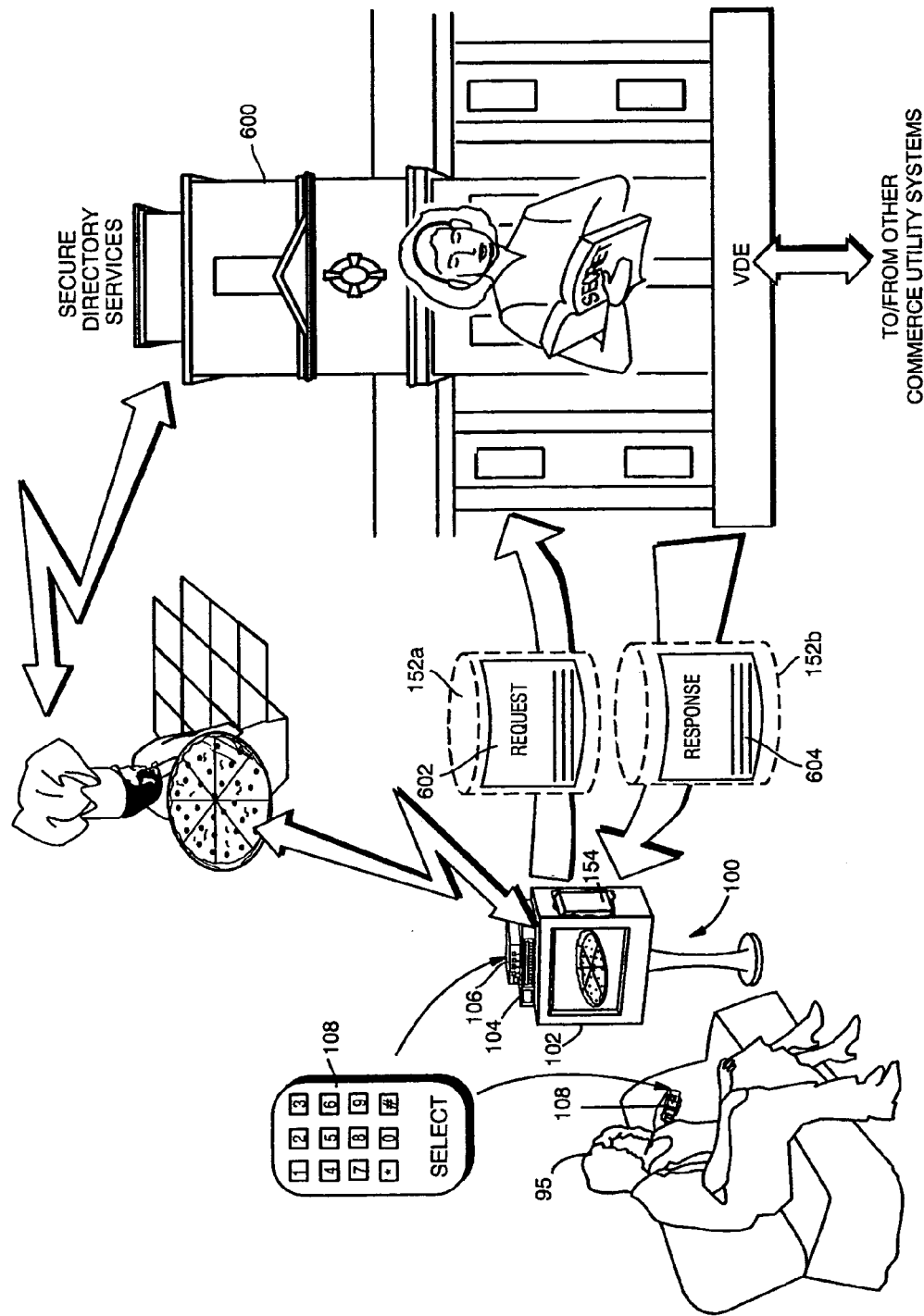
FIG. 14 shows an example secure directory service.

FIG. 14 shows an example of secure directory services 600. Secure directory services 600 acts something like a computerized telephone or name services directory. Consumers 95 can send a request 602 specifying the information they need. Secure directory services 600 can "look up" the information and provide the answer 604 to consumers 95. Secure directory services 600 can work with other Commerce Utility Systems 90 to perform its tasks.

For example, suppose consumers 95 want to electronically order a pizza from Joe's Pizza. They decide what kind of pizza they want (large cheese pizza with sausage and onions for example). However, they don't know Joe's Pizza's electronic address (which may be like an electronic phone number). Consumers 95 can use remote control 108 to input information about what they want to have looked up ("Joe's Pizza, Lakeville, Conn."). Protected processing environment 154 may generate a request 602 containing the identification information and send this request to secure directory services 600. It can send the request in a secure container 152a.

When secure directory services 600 receives the request 602, it may access a database to locate the requested information. Secure directory services 600 may have earlier obtained Joe's electronic address directly from Joe or otherwise. Secure directory services 600 may send the requested information back to appliance 100 in a response 604. Response 604 may also be in a secure container 152b. The consumers 95 can use this information to electronically send their order to Joe's Pizza—which can display on Joe's order terminal within a few seconds after the consumers send it. Joe may deliver to consumer 95 a piping hot cheese, sausage and onion pizza a few minutes later (by car—not electronically—since a physical pizza is much more satisfying than an electronic one).

Secure directory services 600 can help anyone connected to network 150 contact anyone else. As one example, secure directory services 600 can tell usage clearinghouse 300 how to find a financial clearinghouse 200 on network 150. Any electronic appliance 100 connected to network 150 could use secure directory services 150 to help contact any other electronic appliance.

As mentioned above, the request 602 to secure directory services 600 and the response 604 it sends back may be encased within secure containers 152 of the type described in the Ginter et al patent specification. The use of secure containers 152 helps prevent eavesdroppers from listening into the exchange between consumers 95 and secure directory services 600. This protects the consumers' privacy. The consumers 95 may not care if someone listens in to their pizza order, but may be much more concerned about protecting the fact that they are corresponding electronically with certain other people (e.g., doctors, banks, lawyers, or others they have a relationship of confidence and trust with). Secure containers 152 also help ensure that messages sent across network 150 are authentic and have not been altered. Electronic containers 152 allow Joe's Pizza to trust that the just-received pizza order actually came from consumers 95 (as opposed to someone else) and has not been altered, and the consumers can be relatively sure that no one will send Joe a fake pizza order in their name. The use of secure containers 152 and protected processing environment 154 in the preferred embodiment also ensures that the consumers 95 cannot subsequently deny that they actually placed the order with Joe's Pizza if they in fact did so.

Transaction Authority 700

Figure 15:
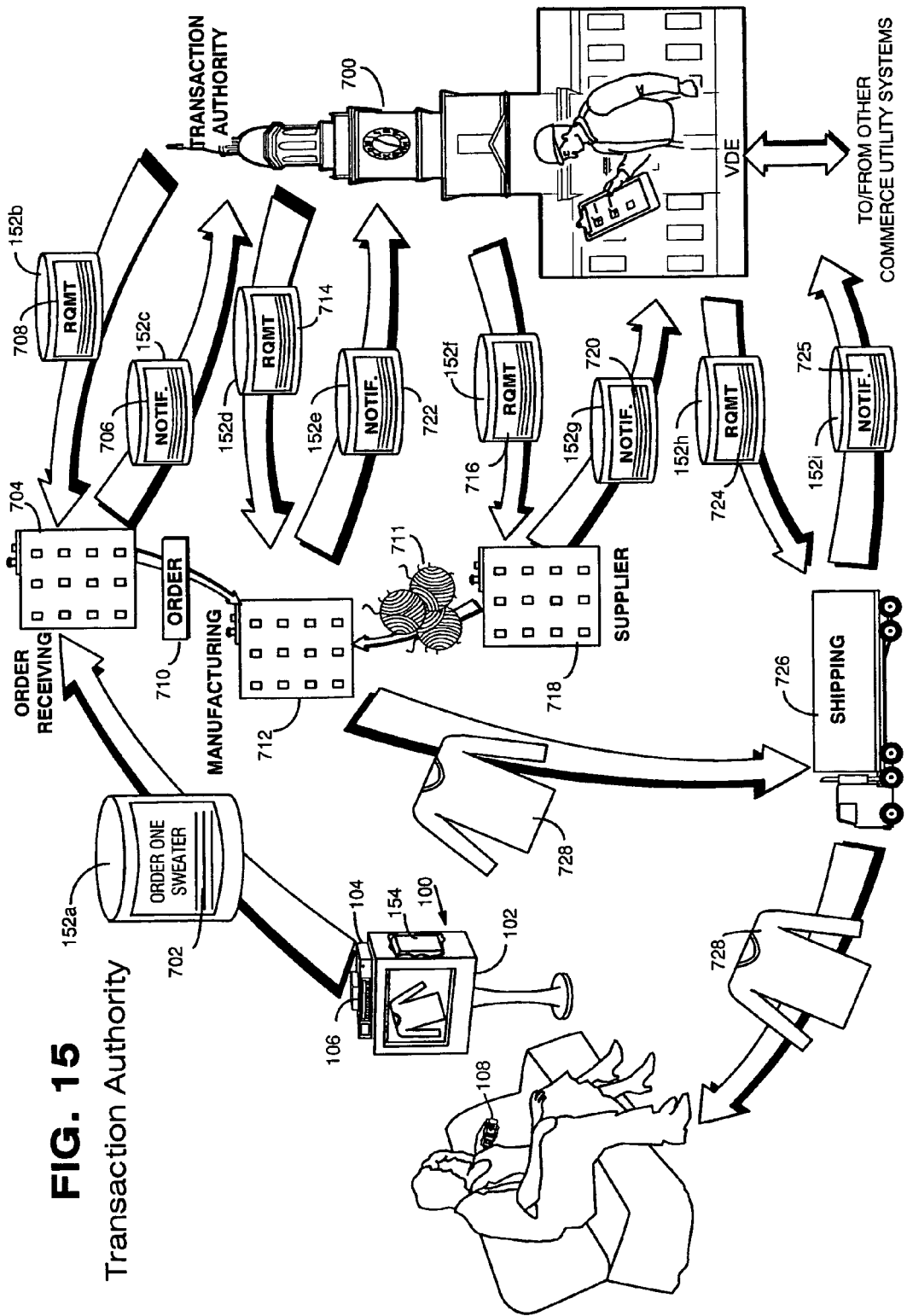
FIG. 15 shows an example transaction authority.

FIG. 15 shows an example transaction authority 700. Transaction authority 700 in this example provides process control and automation. It helps ensure that processes and transactions are completed successfully. Transaction authority 700 may work with other Commerce Utility Systems 90 to perform and complete its tasks.

In more detail, transaction authority 700 in this example monitors the status of an electronic transaction and/or process and maintains a secure, reliable record of what has happened so far and what still needs to happen for the overall transaction and/or process to complete. Transaction authority 700 may also, if desired, perform a more active role by, for example, generating requests for particular actions to occur. Transaction authority 700 may in some cases be the only participant in a complex transaction or process that "knows" all of the steps in the process. Transaction authority 700 can also electronically define an overall process based on electronic controls contributed by various participants in the process.

FIG. 15 illustrates an example of how transaction authority 700 can be used to allow consumers 95 to order merchandise such as a sweater. In this particular electronic home shopping example (which is for purposes of illustration but is not intended to be limiting in any way), the consumers 95 can use their remote control 108 to select the particular seller, style and color of a sweater they want to order at a particular price. In this home shopping example, appliance 100's protected processing environment 154 may generate an electronic order 702 which it sends to the order receiving department 704 of an electronic "mail order" company. The order 702 may be sent within a secure container 152a.

In this example, transaction authority 700 may assist the electronic mail order company to coordinate activities and make sure that all steps required to deliver the sweater are performed in an accurate and timely fashion. For example:

Upon receiving the electronic order 702, the order receiving department 704 might provide an electronic notification 706 to transaction authority 700. The transaction authority 700 stores the electronic notification 706, and may issue a "requirement" 708.

Transaction authority 700 may have issued the requirement 708 before the order was placed so that the order receiving department 704 knows what to do when the order comes in.

In accordance with the "requirement" 708, order receiving department 704 may issue an electronic and/or paper (or other) version of the order 710 to a manufacturing department 712.

The transaction authority 700 may issue a manufacturing requirement 714 to the manufacturing department to make the sweater according to the consumers' preferences.

Transaction authority 700 might also issue a supply requirement 716 to a supplier 718. For example, transaction authority 700 may request supplier 718 to deliver supplies, such as balls of yarn 711, so manufacturer 712 has the raw materials to manufacture the sweater.

Supplier 718 may notify transaction authority 700 when it has delivered the supplies by issuing a notification 720.

When manufacturing department 712 has finished the sweater, it may alert transaction authority 700 by sending it a notification 722.

In response to the notification 722 sent by manufacturing department 712, transaction authority 700 may issue a shipping requirement 724 to a shipping department 726, for example, requesting the shipping department to pick up completed sweater 728 from the manufacturing department and to deliver it to the consumers.

Transaction authority 700 may coordinate with other Commerce Utility Systems 90, such as a financial clearinghouse 200, to arrange payment.

Of course, this example is for purposes of illustration only. Transaction authority 700 may be used for all kinds of different process control and automation such as, for example, handling electronic orders and sales, electronic data interchange (EDI), electronic contract negotiation and/or execution, electronic document delivery, inter and intra company transactions, and the secure electronic integration of business processes within or among business organizations—just to name a few of many useful applications.

VDE Administration Services 800

VDE administrator 800 (see FIG. 1 of this application and FIG. 1A and associated discussion in the Ginter et al. specification) may, in the preferred embodiment, provide a variety of electronic maintenance and other functions to keep network 150, appliance 100 protected processing environments 154 and Distributed Commerce Utility 75 operating securely, smoothly and efficiently. For example, VDE administrator 800 may manage cryptographic keys used for electronic security throughout network 150, and may also provide services relating to the maintenance of secure data by appliances 100, the various Commerce Utility Systems 90, and other electronic appliances. As described in detail in the Ginter et al. patent disclosure, other important functions performed by VDE administrator 800 include installing and configuring protected processing environments 154, and helping protected processing environments to securely maintain stored permissions and/or usage data. The VDE administrator 800 may work with other Commerce Utility Systems 90.

Commerce Utility Systems 90 can Support One Another

In addition to supporting consumers 95, Commerce Utility Systems 90 can support other Commerce Utility Systems. This is shown in FIGS. 16A–16F. For example:

financial clearinghouse 200 can help ensure other Commerce Utility Systems 90 are paid for their contributions (see FIG. 16A); and usage clearinghouse 300 (see FIG. 16B) may inform other Commerce Utility Systems 90 concerning how the support they provide is being used. For example, usage clearinghouse 300 may tell certifying authority 500 how the certifying authority's certificates have been used (very useful for the certifying authority to keep tabs on the amount of potential liability it is undertaking or in helping to detect fraudulent certificates).

Figure 16:
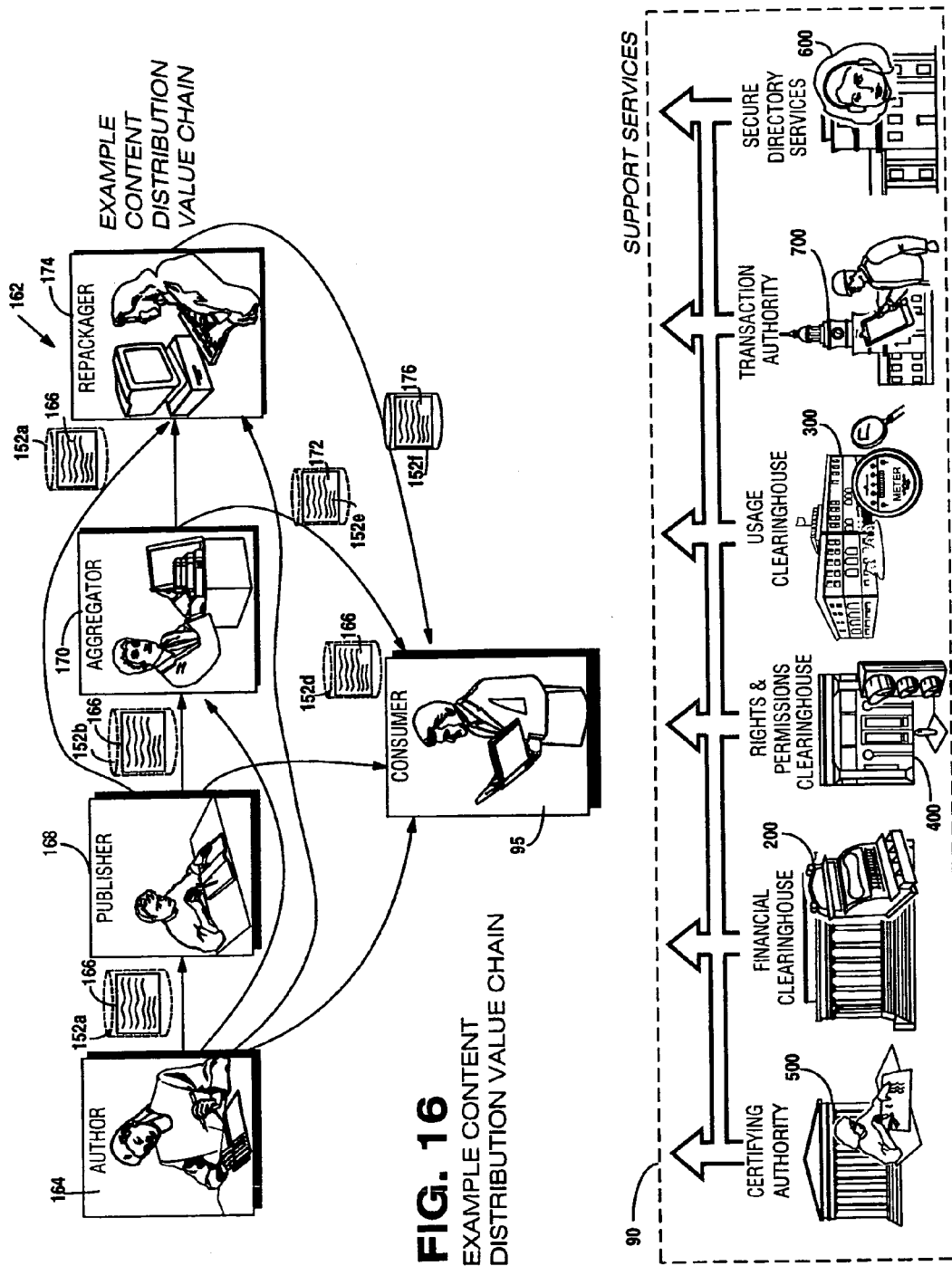
FIGS. 16A–16F show that Commerce Utility Systems can support other commerce utility systems.
Figure 16A:
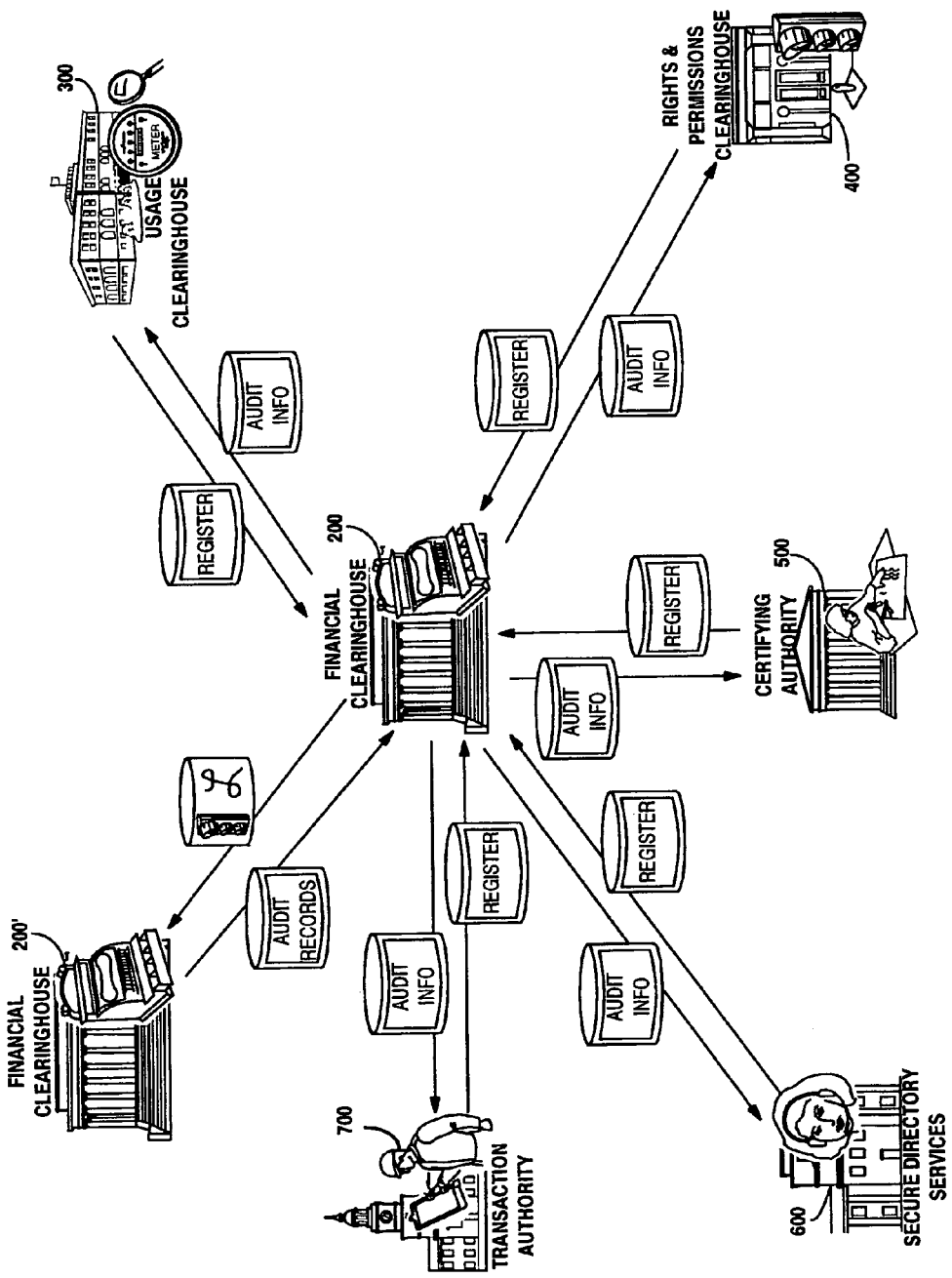
Figure 16B:
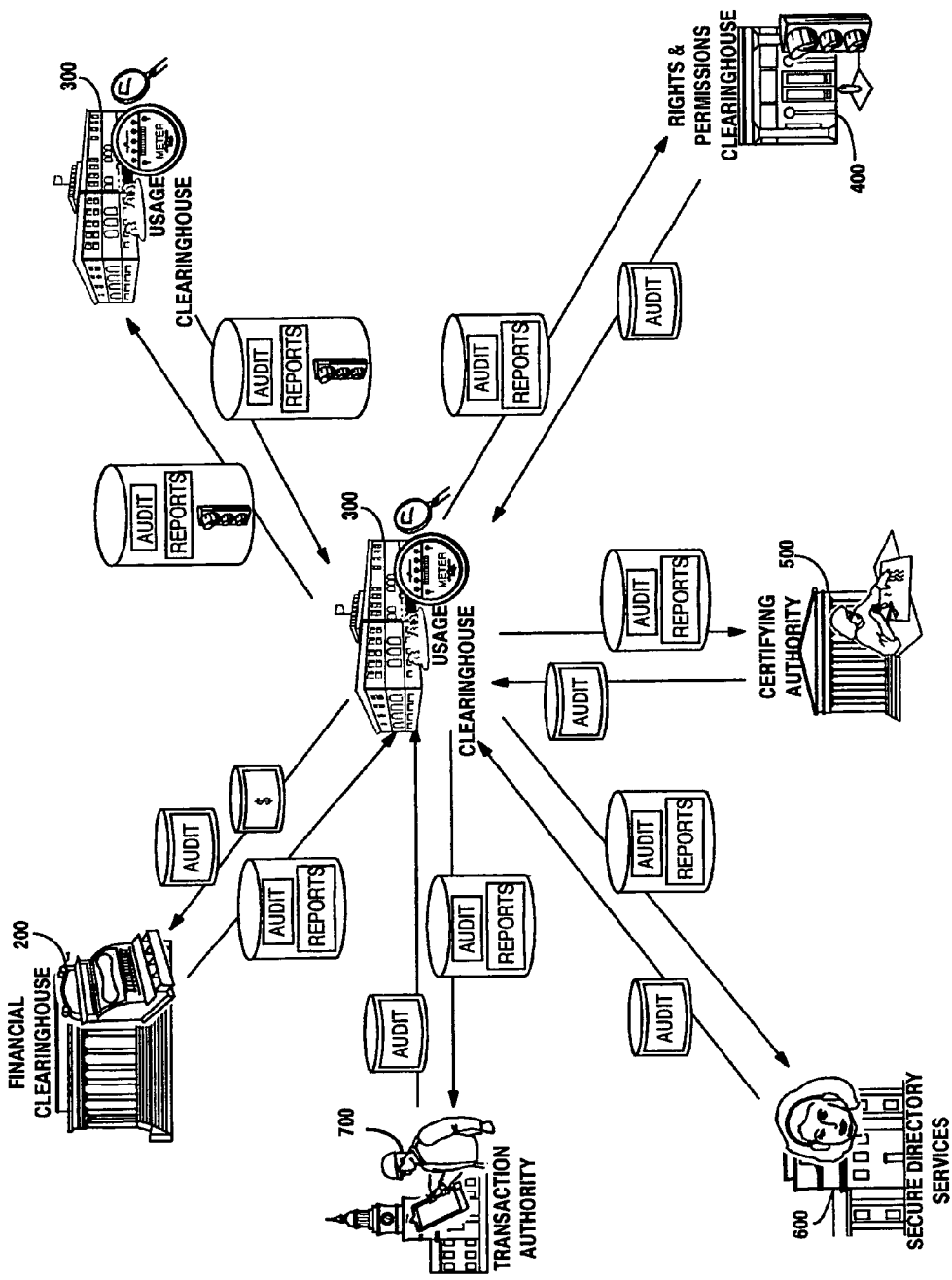
Figure 16C:
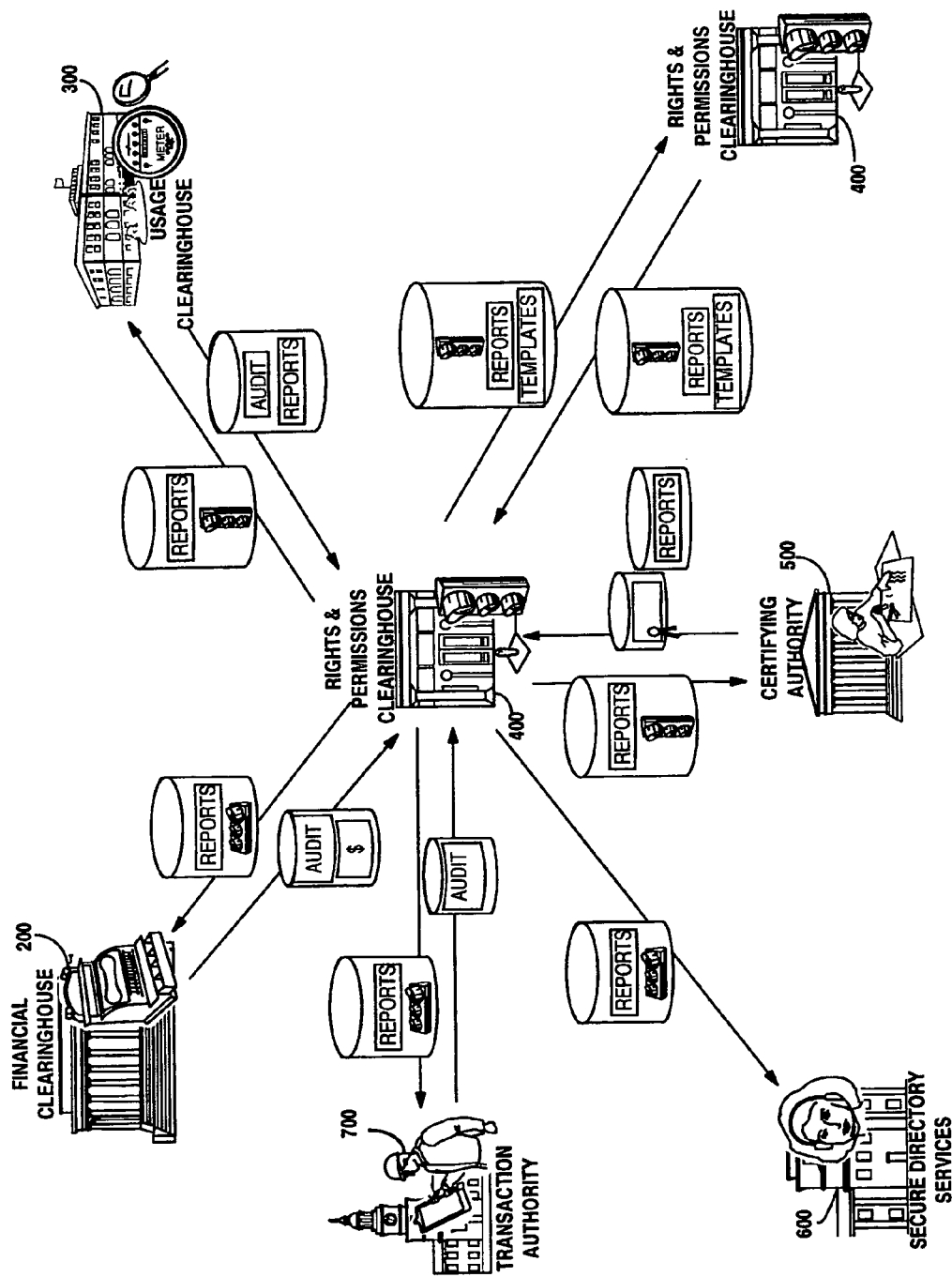
Figure 16D:
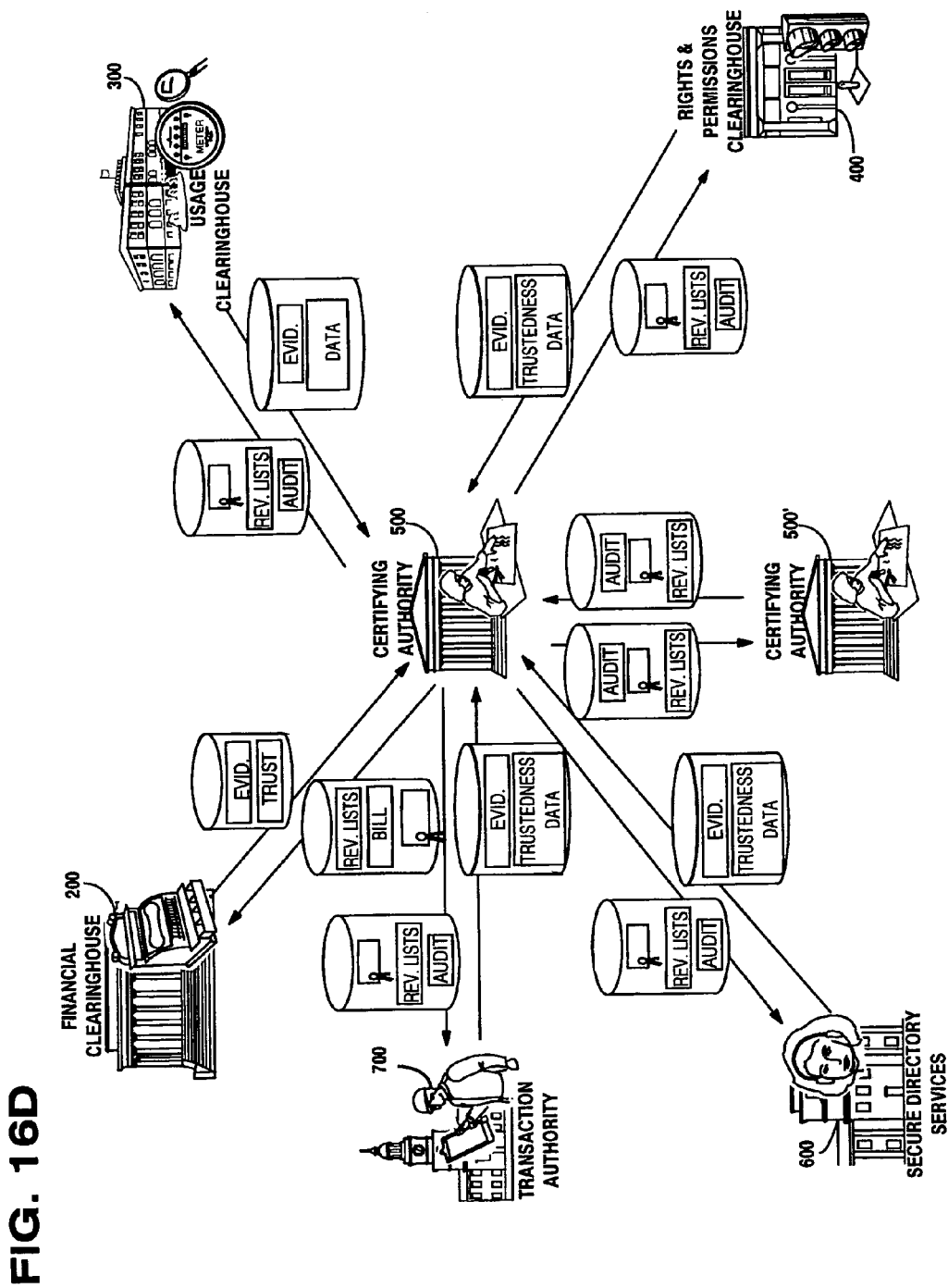

FIG. 16C shows that a rights and permissions clearinghouse 400 can support other Commerce Utility Systems 90 such as, for example, a financial clearinghouse 200, a usage clearinghouse 300, another rights and permissions clearinghouse 400', a certifying authority 500, a secure directory services 600, and a transaction authority 700.

Certifying authority 500 can issue digital certificates 504 certifying the operation of one or more other Commerce Utility Systems 90 (see FIG. 16D)—supporting other Commerce Utility Systems 90 such as, for example, a financial clearinghouse 200, a usage clearinghouse 300, a rights and permissions clearinghouse 400, another certifying authority 500', secure directory services 600, and transaction authority 700.

Figure 16E:
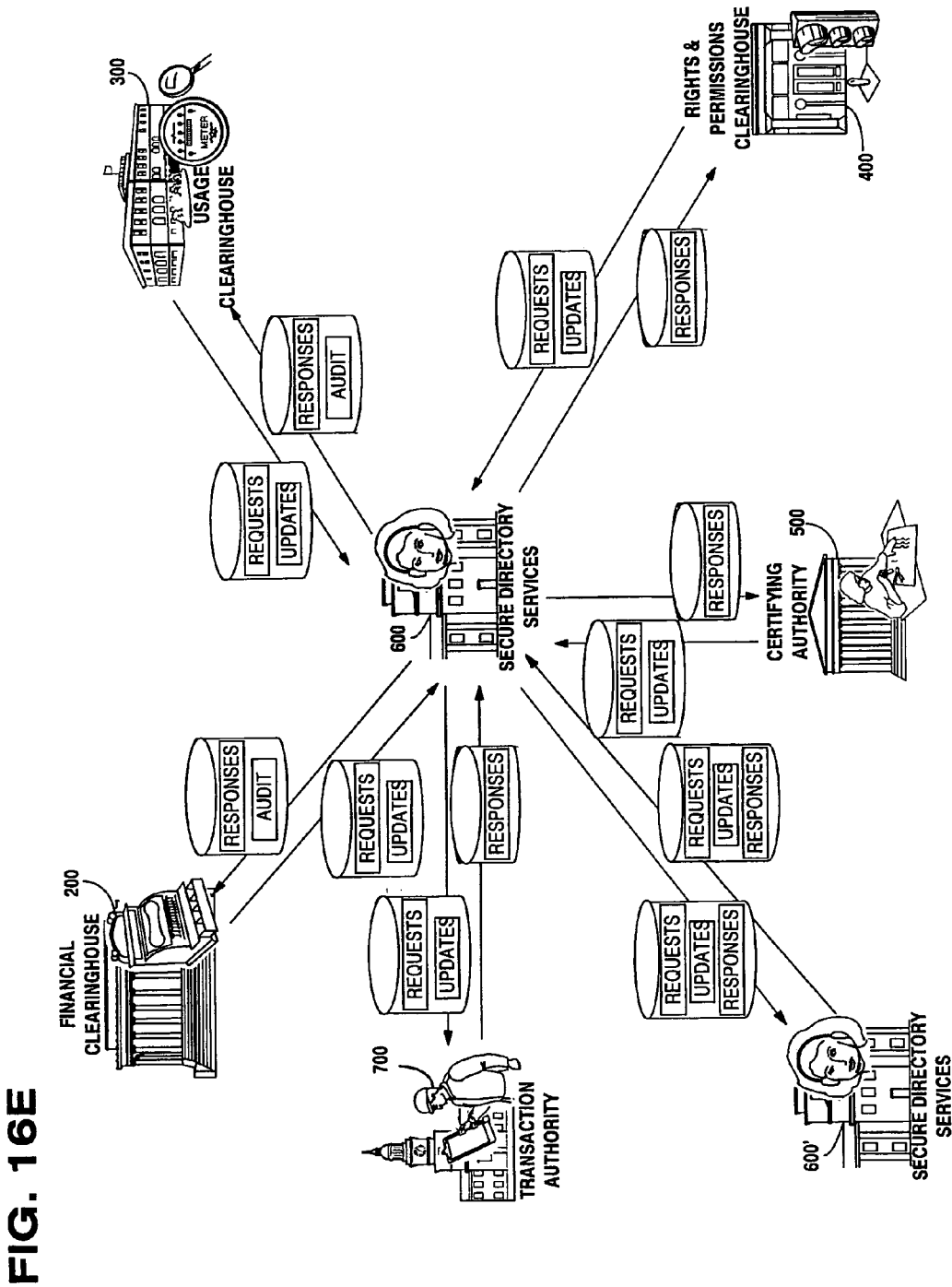

FIG. 16E shows that a secure directory services 600 may support other Commerce Utility Systems 90, such as, for example, financial clearinghouse 200, usage clearinghouse 300, rights and permissions clearinghouse 400, certifying authority 500, other secure directory services 600', and transaction authority 700.

Figure 16F:
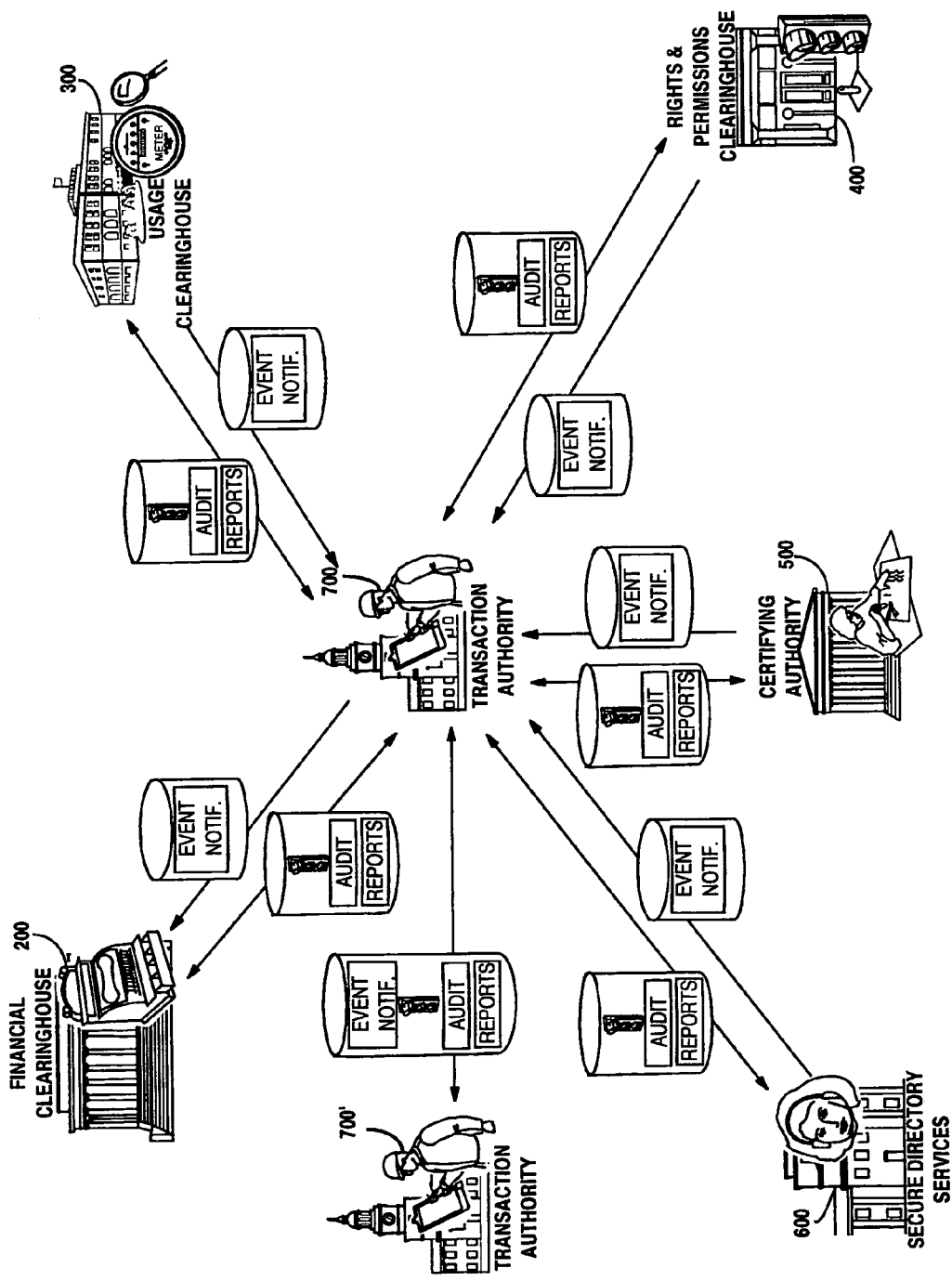

FIG. 16F shows that a transaction authority 700 can support other Commerce Utility Systems 90, such as, for example, a financial clearinghouse 200, a usage clearinghouse 300, a rights and permissions clearinghouse 400, a certifying authority 500, a secure directory services 600, and another transaction authority 700'.

"A Piece of the Tick"

The Commerce Utility Systems 90 described herein provide valuable, important services and functions. The operators of such services can and should be compensated for the services they provide. Financial Clearinghouse Commerce Utility Systems 200 can ensure that they and other support service providers receive this compensation without inconvenience to other electronic community and value chain participants.

In assisting or compensating value chain participants, a Commerce Utility System 90 may (based on pre-approved contractual arrangements) take its own portion or percentage to compensate it for the clearing services it provides. Support services can be compensated based on a small portion of payment (i.e., a "micro-payment") attributable to each electronic transaction (a "piece of the tick"). Providers may pass some or all of these fees along to their own value chain participants in various ways.

Several different classes of value chain participants may be called upon to compensate the Commerce Utility Systems 90, including:

Information Consumers (including for example, people who make use of the information "exhaust" generated by electronic commerce, electronic transaction management and rights management activities);

Content Rightsholders and other Electronic Providers;

Participants in the broadest range of secure, distributed electronic commerce transactions;

In addition, various support service providers may also need to support one another in various ways—and may therefore need to compensate one another. For example:

One Commerce Utility System 90 may act as an intermediary for another Commerce Utility System 90's customer;

One Commerce Utility System 90 may be required to support the operation of another Commerce Utility System 90; and/or Commerce Utility System 90s may need to work together to support a common transaction.

Different Commerce Utility System 90s may cooperate to establish a common fee that they then divide among themselves. In another scenario, each Commerce Utility System 90 may independently charge for the value of its own services. There may be competition among different Commerce Utility System 90s based on quality of service and price—just as credit card companies now compete for providers' and consumers' business.

Example Distributed Commerce Utility System Architecture

The Ginter et al. patent disclosure describes, at pages 180 and following, and shows in FIGS. 10–12, for example, a "Rights Operating System" providing a compact, secure, event-driven, compartmentalized, services-based, "component" oriented, distributed multi-processing operating system environment that integrates VDE security control information, components, and protocols with traditional operating system concepts. The preferred example Commerce Utility System 90 architecture provided in accordance with these inventions builds upon and extends the Rights Operating System described in Ginter et al.

For example, the preferred example Commerce Utility System 90 architecture provides a collection of service functions that the Rights Operating System may execute as applications. These service functions define a variety of useful tasks that any and/or all Commerce Utility Systems 90 may need to perform. These service functions are distributable, scaleable and reusable. They can be combined in various combinations and sub-combinations—depending upon business models, for example—to provide the overall functionality desired for any particular Commerce Utility System 90 implementation.

Figure 17A:
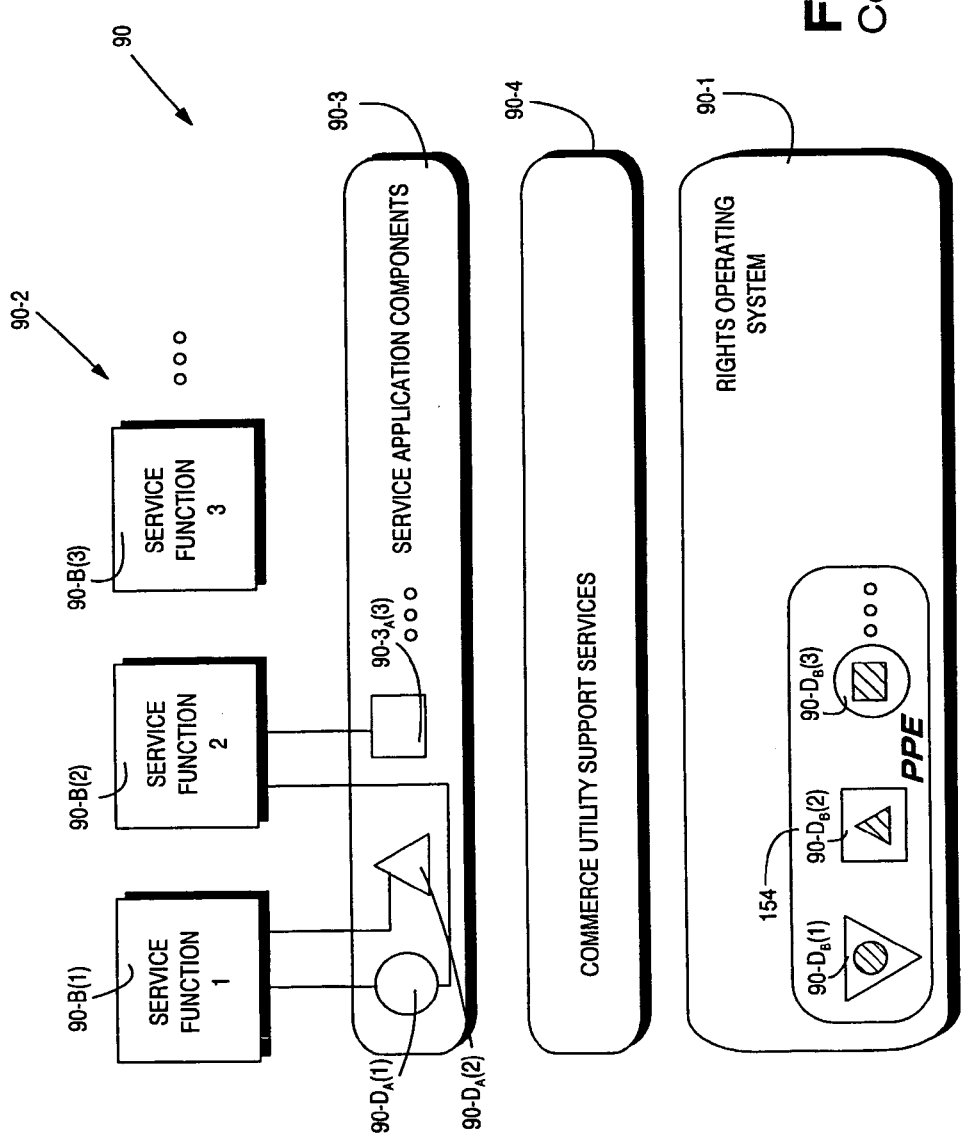
FIGS. 17A through 17D-3 show an example Commerce Utility System architecture.
Figure 17C:
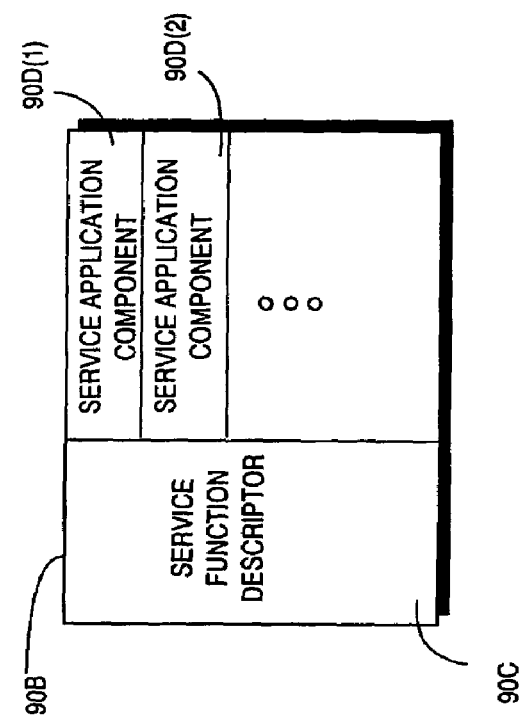
Figure 17B:
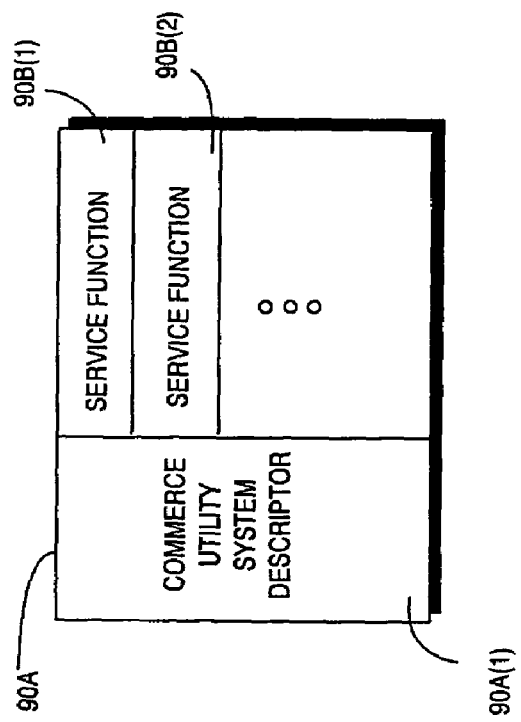

FIG. 17A shows an example overall architecture of a Commerce Utility System 90, FIG. 17B shows an example of the application architecture of a Commerce Utility System, and FIG. 17C shows more detail of a service function.

Referring first to FIG. 17B, in this example the application software architecture for a Commerce Utility System 90 contains a commerce utility system descriptor 90A. Commerce utility system descriptor 90A contains information about the Commerce Utility System 90 that may be used to identify such system and its capabilities, as well as to describe, aggregate and/or interface with any number of service functions 90B(1), 90B(2), . . . . Commerce utility system descriptor 90A and service functions 90B may, for example, be implemented using object oriented programming techniques to help ensure that such descriptor and service functions are modular and reusable—as well as abstracting the specifics of how actions requested of Commerce Utility System 90 are actually carried out and/or implemented.

Commerce utility system descriptor 90A(1) may also be responsible for coordinating the action of service functions 90B. In this example, descriptor 90A is used to direct requests and other system actions to the appropriate service functions 90B, and to ensure that actions requiring more than one service function are coordinated by reconciling differences in interfaces, data types and the like that may exist between the service functions 90B—as well as helping to direct overall process flow amongst the various service functions 90B. A non-exhaustive list of examples of such service functions 90B include the following:

audit, maintaining records, overseeing processes, monitoring status,
complete process definition,
process control,
interface(s) to settlement services,
funds transfer,
currency conversion,
tax calculation and application,
account creation and identifier assignment,
payment aggregation,
payment disaggregation,
budget pre-authorization,
status notification,
confirmation,
uncompleted events record,
requirements generation,
report generation,
event consequences,
account reconciliation,
identity authentication,
electronic currency creation,
event database management,
routing database,
generating requests,
replication,
propagation,
usage database management,
bill creation and processing,
market research,
negotiation,
control set database management,
control set generation,
process control logic,
event flow generation,
routing,
archiving,
rights and permissions database management,
template database management,
commerce management language processing
rights management language processing,
advertising database management,
automatic class generation,
automatic class assignment,
notary,
seal generator,
digital time stamp,
fingerprint/watermark,
offers and counteroffers,
object registry,
object identifier assignment,
copyright registration,
control set registry,
template registry,
certificate creation,
revocation list maintenance,
director database management,
database query and response processing,
other service functions.

FIG. 17C shows more detail of a service function 90B. In this example, service function 90B is comprised of a service function descriptor 90C, and any number of service application components 90D(1), 90D(2), . . . . Service function descriptor 90C performs a role similar to that of commerce utility system descriptor 90A, except that it acts with respect to service function 90B and service application components 90D. Service function descriptor 90C and service application components 90D may, for example, also be implemented using object oriented programming techniques to help ensure that such descriptor and service application components are modular and reusable, as well as abstracting the specifics of how actions requested of service function 90B are actually carried out and/or implemented. In this example, the service application components 90D implement most of the capabilities of the service function 90B by carrying out steps of, or subfunctions of, the service function 90B.

FIG. 17A shows an example overall Commerce Utility System 90 architecture. The overall architecture shown in this example is an object oriented system in which the overall Commerce Utility System 90 is a single object, that is in turn comprised of reusable service function 90B objects. These service function 90B objects are comprised of reusable service application components (objects) 90D. Any or all of these objects may make use of the services provided by a commerce utility support service layer 90-4, as described in more detail below. The preferred embodiment Commerce Utility System architecture 90 shown is built upon the Rights Operating System 90-1 described in detail in the Ginter et al. patent specification (see FIG. 12 of Ginter, et al., for example). A set of service functions 90B comprise "applications" executed by the Rights Operating System 90-1. There can be any number of service functions 90B.

The object oriented design of the Commerce Utility System 90 architecture shown in FIG. 17A has several desirable attributes. For example, a Commerce Utility System 90 may easily add, remove and/or replace service functions 90B to alter, extend and/or enhance its capabilities. Similarly, the architecture allows the addition, removal, and/or replacement of service application components 90D to permit similar flexibility in the case of service functions. Furthermore, object oriented design significantly improves the ease and efficiency of reuse of service functions and/or service application components in different Commerce Utility Systems 90, or different service functions 90B (as shown in FIG. 17A); respectively.

The application layer, which is comprised of service function layer 90-2 and service application component layer 90-3 (comprising components $90D_A$), may be, if desired, supported by a commerce utility support services layer 90-4. Commerce utility support services layer 90-4 may provide increased efficiency for large numbers of transactions. Such commerce utility support services 90-4 may include, for example:
 session management,
 fault tolerance,
 memory management,
 load balancing,
 database bridging, and
 other commerce utility support services.

In this example, service functions 90B are component based, and may make use of the reusable and component based service application components 90D. The service application components 90D typically perform steps of, or subfunctions of, service functions 90B. Each service application component 90D can have either or both of two parts:
 a component $90\text{-}B_a$ that need not execute within protected processing environment 154; and
 a secure component $90\text{-}B_b$ that needs to execute within protected processing environment 154.

In this example architecture, there may be a correspondence between components $90D_a$ and components $90D_b$. For example, at least one component $90D_a$ may correspond with at least one secure component $90D_b$. There may be a one-to-one correspondence between components 90D$_a$ and components 90D$_b$ (as indicated in FIG. 17A by common geometric shapes). In the preferred embodiment, this separation of function permits, when required and/or desired, the interaction between secure processes operating in PPE 154 and service application components 90D. By using this architecture, it is easier and more efficient to create service functions that implement capabilities requiring both application level support as well as secure processing.

For example, some administrative and/or support functions for performance by commerce utility systems 90 may involve use of both application level database functions as well as information protected by a protected processing environment ("PPE") 154 in the preferred embodiment. A specific example of this might be the records of payment by a user of a financial clearinghouse 200. If the operator of such a financial clearinghouse 200 chose to keep payment history information in an application level database, but needed information protected by PPE 154 in order to accurately determine the current account status of a customer, implementing a service application component 90D$_A$ that coordinated the information in the application level database with information protected by PPE 154 and processed by service application component 90D$_B$ into a single object may significantly simplify the task of using this information in the context of a given service function 90B (e.g. a decision to extend additional credit). Furthermore, this example service application component may be reusable in other service functions 90B.

In another example, service application component 90D$_A$ might serve principally as an application level interface object to a corresponding PPE 154 object 90D$_B$. For example, if a notary service function 90B requires the application of a digital signature, a service application component 90D$_A$ might principally provide an interface that transports information to, and receives information from, a corresponding service application component 90D$_B$ that performs essentially all of the actual work of creating and applying a digital signature. In addition, the application level service component 90D$_A$ might provide additional exception handling, protocol conversion, or other functions designed to help integrate capabilities more easily or in a different manner than originally designed for a service function 90B.

Figures 1, 17D:
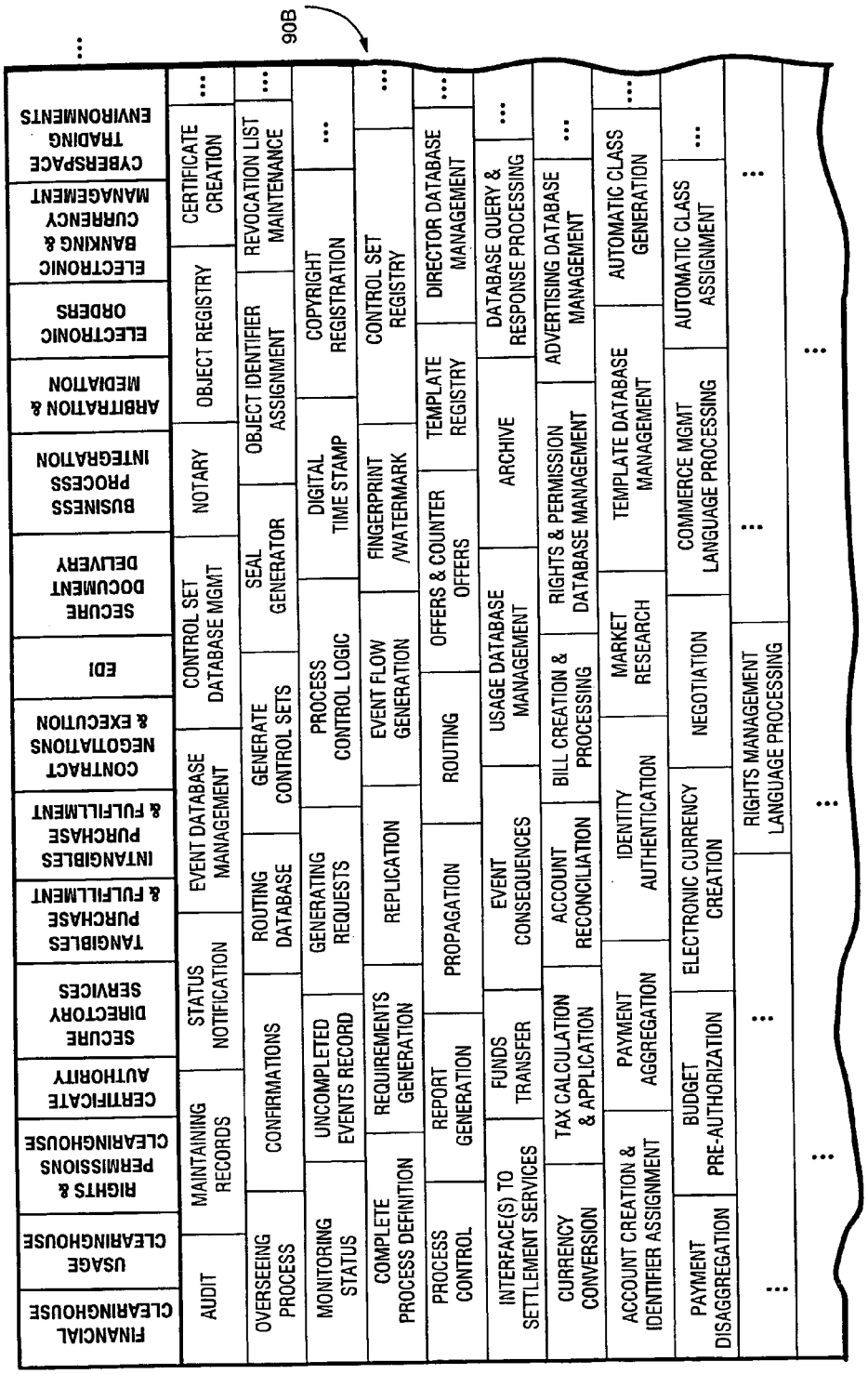

FIG. 17D-1 shows an example correspondence between service functions 90B and general types of useful example commerce utility systems 90. Example service functions 90B ("Audit", "Maintaining Records", . . . ) are shown horizontally. These example service functions 90B may be useful for implementing commerce utility system 90 example types ("Financial Clearinghouse", "Usage Clearinghouse", . . . ) written vertically in the row of boxes along the top of the diagram. The FIG. 17D-1 diagram is not exhaustive—additional useful commerce utility system types are possible and additional service functions 90B are also possible. Indeed, the architecture of Commerce Utility System 90 ensures that both types and service functions 90B are extensible as business models or other factors change.

Although certain business needs and models may tend to inspire the use of certain combinations and collections of important service functions in almost any implementation, the Commerce Utility System 90 architecture is inherently flexible—allowing the implementer to freely mix and combine a variety of different service functions depending upon their needs. For example, it is useful to provide a Commerce Utility System 90 that functions as a "financial clearinghouse 200"-providing payment processing, communications, database management, and other related service functions. The Commerce Utility System architecture can provide such a "financial clearinghouse"—and is also inherently much more generalized and generalizable. For example, a particular Commerce Utility System 90 implementation of a "financial clearinghouse" could also combine "non-financial" service functions with financial service functions. The particular functions or sets of functions that are realized in any given Commerce Utility System 90 implementation depend upon the individual needs of the implementer as dictated for example by business model(s) or functions.

Figures 2, 17D:
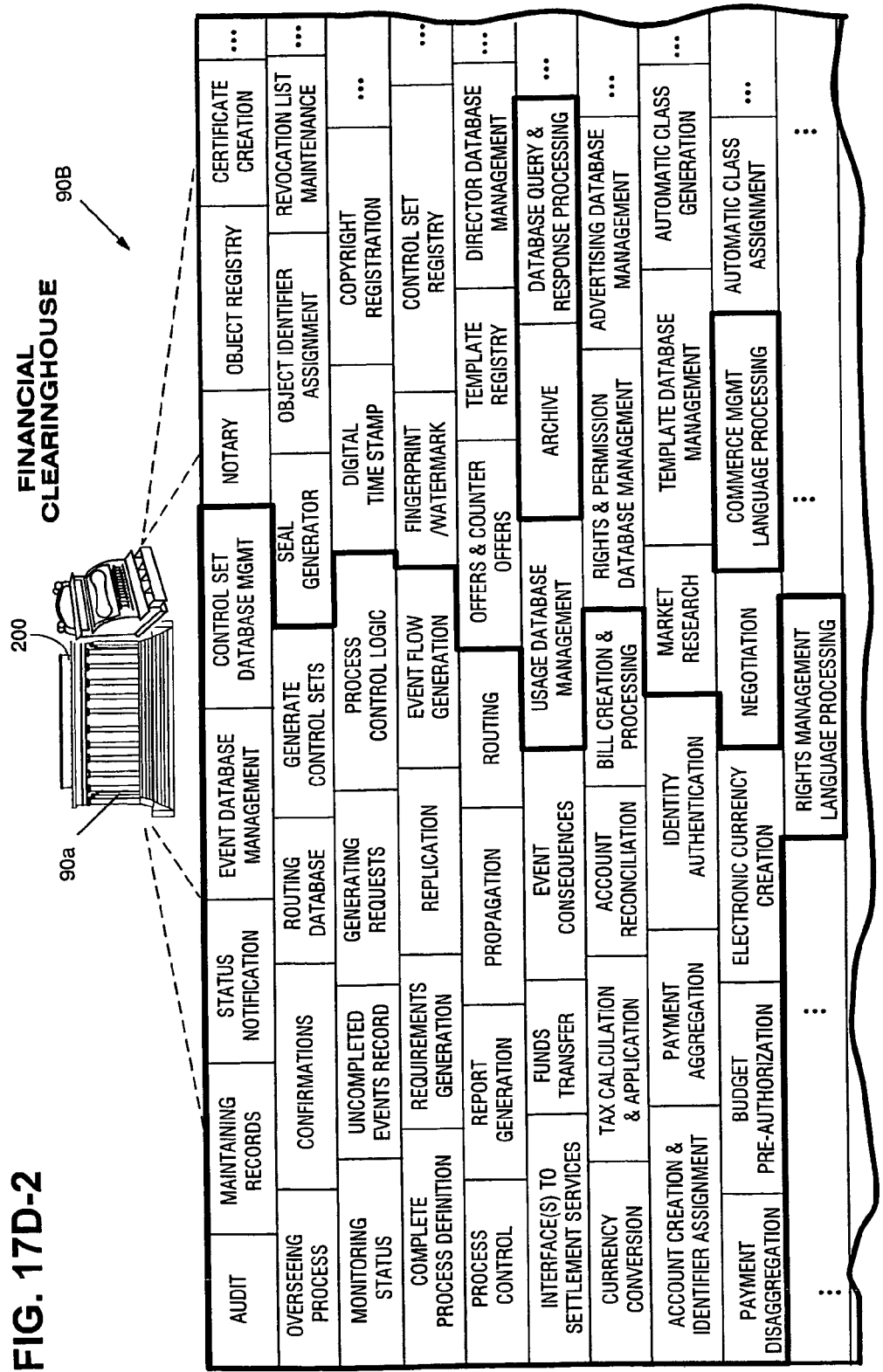

FIG. 17D-2 shows, for example, how the overall functionality of an example "financial clearinghouse" commerce utility system 200 can be constructed from example service functions 90B. In this example, the service functions 90B surrounded by darker lines are included within the commerce utility system descriptor 90a shown in FIG. 17B. FIG. 17D-2 shows an example usage clearinghouse commerce utility system 300 constructed based on a different subset of service functions 90B surrounded by dark lines (shown in FIGS. 17D-1). Comparing FIGS. 17D-2 and 17D-3, one can see that some service functions 90B (for example, "audit," "status notification," "event database management," etc.) may be reused for both financial and usage clearing operations. A combination financial and usage clearinghouse commerce utility system 90 might use the union of the service functions 90B surrounded by dark lines in FIGS. 17D-2 and the service functions 90B surrounded by dark lines in FIG. 17D-3. More, less and/or different functionality can be provided for a particular commerce utility system 90 simply by providing and invoking more, less and/or different service functions 90B.

Distributing Commerce Utility System 90

The secure application components 90-3 described above may, in the preferred embodiment, include or comprise reciprocal control structures and associated rules and methods shown in FIGS. 41A–41D and 48 of the Ginter et al. patent application. These reciprocal control structures can be used to interlink different or the same control sets operating on the same or different Commerce Utility Systems 90 or other electronic appliances 100. Hence, each actor can have one or more reciprocal relationships with every other actor—with Commerce Utility System 90 involved in some role in some of the various actions.

Figures 3, 17D:
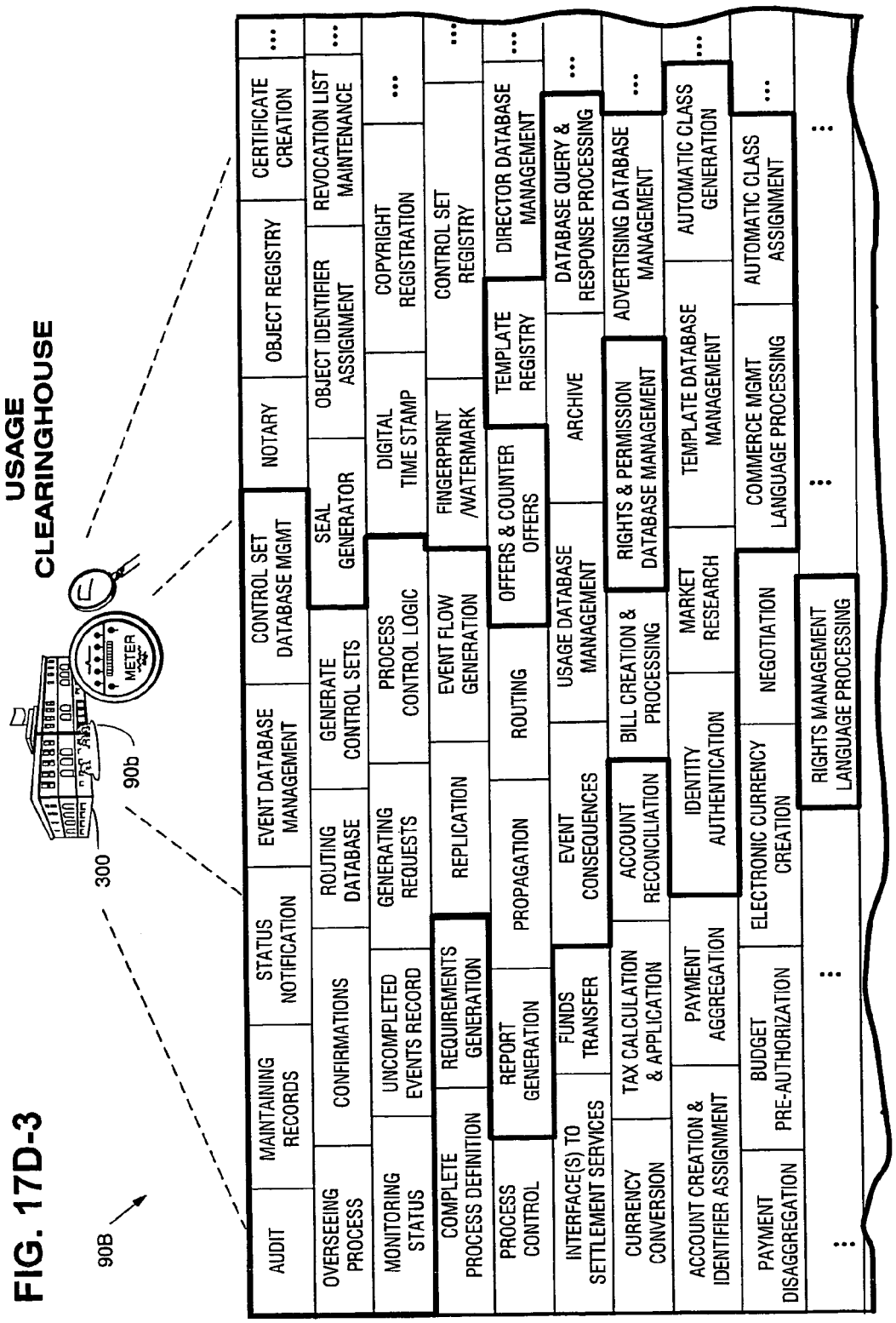
Figures 2, 17E:
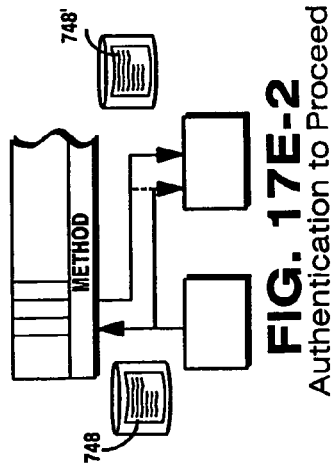
Figures 3, 17E:
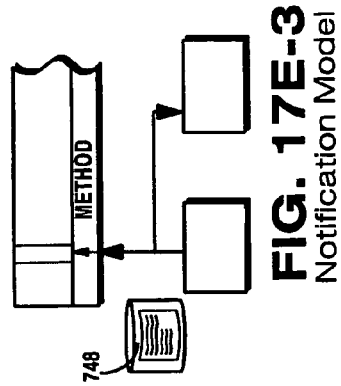
Figures 4, 17E:
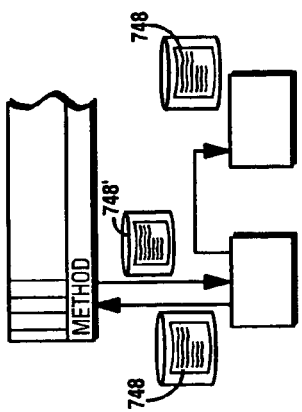
Figures 1, 17E:
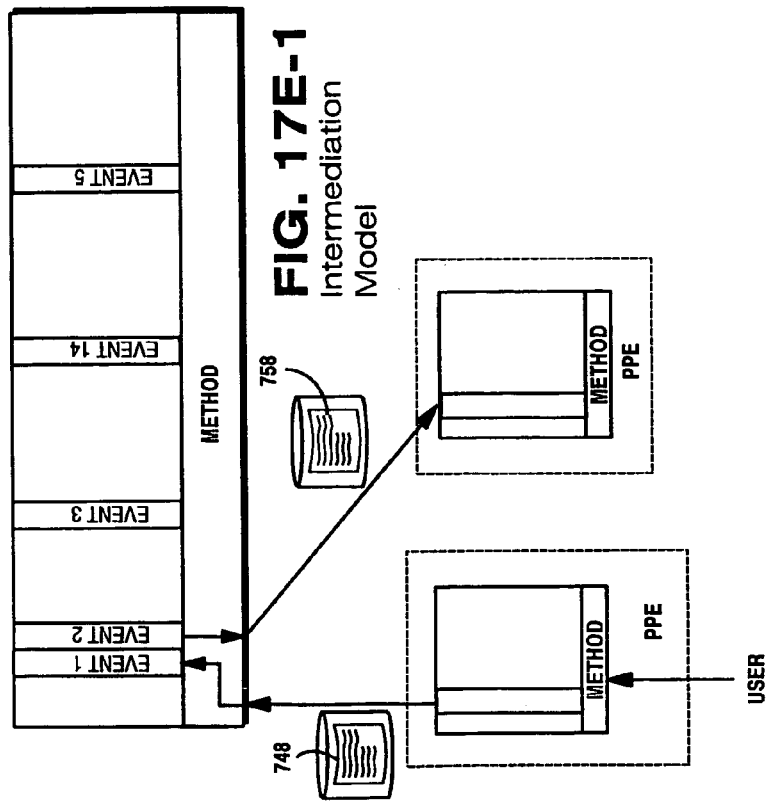

FIGS. 17E-1 through 17E-4 show different examples of interaction models Commerce Utility System 90 may use to interact with an ongoing transaction or process based in part on these reciprocal control structures:

FIGS. 17E-1 shows an event intermediation model in which a Commerce Utility System 90 receives an event notification 748 from a secure entity (e.g., a first protected processing environment) and generates an event 758 which triggers activities of another (and/or the same) secure entity (e.g., a second and/or the first protected processing environment).

FIG. 17E-2 shows a different Commerce Utility System interaction model in which the first secure entity provides event notification 748 to both a Commerce Utility System 90 and another secure entity to perform a step, but the second entity awaits receipt of an authorization from Commerce Utility System 90 to proceed before it actually performs the next step in the process.

FIG. 17E-3 shows a notification model in which Commerce Utility System 90 is more of a passive bystander, receiving event notifications 748 for purposes of secure auditing but otherwise not interacting directly with the ongoing process or transaction unless needed to resolve exceptions (e.g., an error condition).

FIG. 17E-4 shows a prior authorization model in which the Commerce Utility System 90 must issue a notification 748' to one secure entity in response to receipt of an event notification 748 from that entity before that entity may pass the event notification 748 along to the next secure entity to perform the next step in a overall process or transaction.

The various Commerce Utility System 90 interaction models shown in FIGS. 17E-1 through 17E-4 are not exhaustive or mutually exclusive—any given transaction or process may include some or all of these in different combinations based upon business models or other requirements.

Figure 17F:
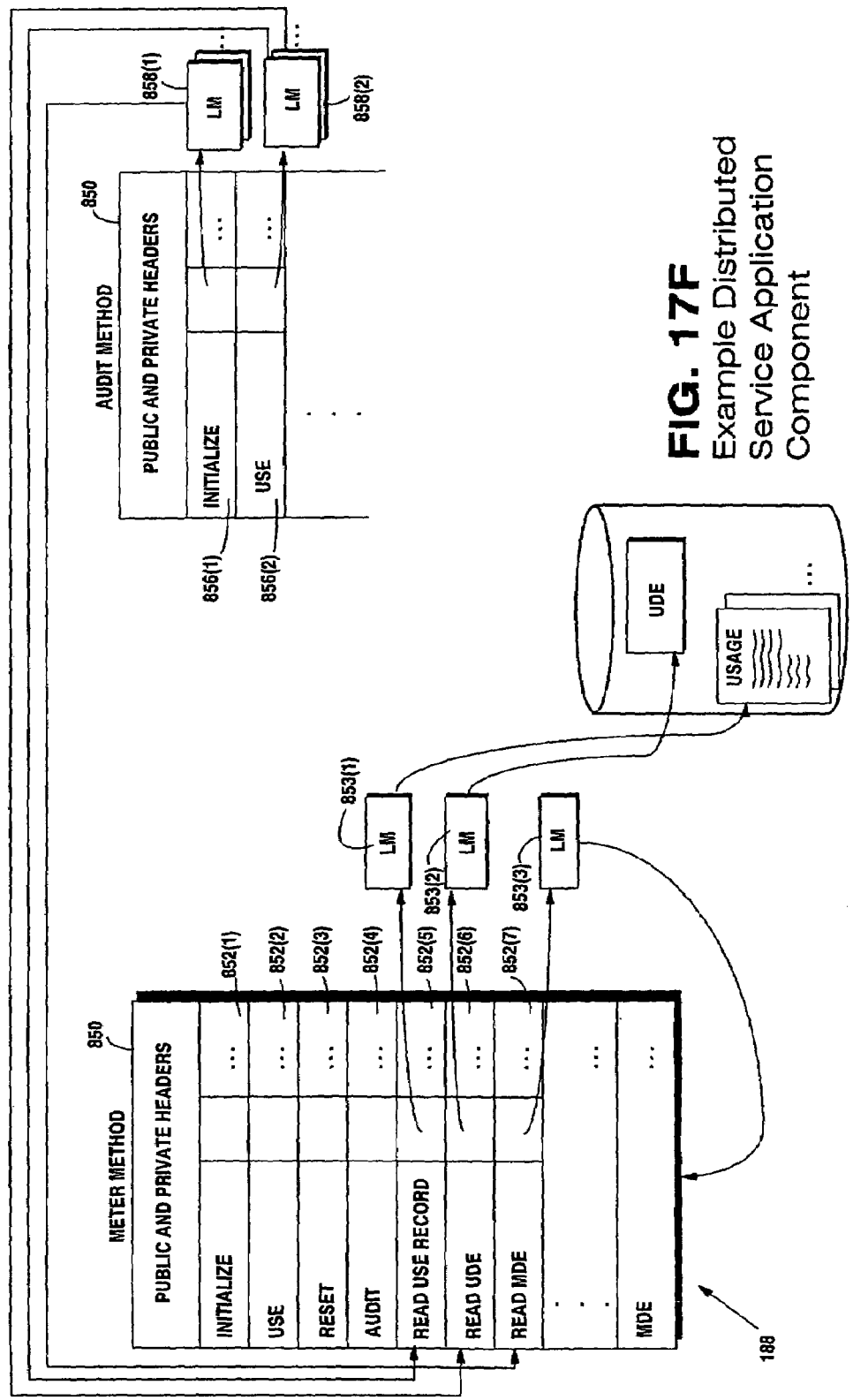
FIG. 17F shows an example arrangement for distributing portions of administrative and support service operations.

As mentioned above, the present inventions provide techniques for distributing the operation of a particular service function 90-2 or service application component 90-3 throughout a system 50 or network—including for example to electronic appliances of individual consumers 95. FIG. 17F shows an example of a control set 188 that can be used to control a remotely located protected processing environment (for example, a consumer's electronic appliance) to perform a "local" portion of a clearing operation. A Commerce Utility System 90 could deliver this control set 188 to a consumer's electronic appliance, to another Commerce Utility System 90, or to some other electronic appliance (e.g., one that is part of a communicating infrastructure). The Commerce Utility System 90 can, for example, delegate part of its clearing authority (implemented, for example, as one or more service functions 90-2, each including one or more service application components 90-3) to a process that can be performed within the protected processing environment 154 of a user's electronic appliance.

The FIG. 17F example is a method 850 (e.g., meter, billing, or budget) whose AUDIT event 852(1) is processed by an audit method 854. The example meter method 850, for example, might have:

a USE event 852(2) (e.g., "click" the meter),
an INITIALIZE event 852(1) (e.g., prepare the meter for use),
a RESET event 852(3) (e.g., restore the meter to a known good state after an error condition),
an AUDIT event 852(4) (e.g., gather up records generated during USE events, as well as a copy of the current UDE value, and arrange for shipment to the auditor(s)),
a READ USE RECORD event 852(5) (e.g., return a copy of the requested use record),
a READ USE event 852(6) (e.g., return a copy of the current UDE),
a READ MDE event 852(7) (e.g. that returns a copy of the requested MDE), and
other miscellaneous events.

The AUDIT event 852(4), in this example, may be linked to an audit method 854. In order to access the data in this example, the Commerce Utility System 90 might need permission in the form of access tags and/or an appropriate PERC control set defining more detailed usage permissions, and semantic knowledge of the record format written out by the meter method 850's USE event 852(2). The semantic knowledge could come from an out-of-band agreement (e.g., a standard), or through access to the MDE (or relevant MDE portion) of the meter method 850 that describes the use record format.

The events of audit method 854 would include a USE event 856(2) that performs the functions expected by the calling method's event—in this case, gathering use records and a copy of the current UDE, and sending them off. In this example, let's assume there is an INITIALIZE event 856(1) in this method as well. When called, the INITIALIZE event 856(1) would be sent internally, and its associated load module(s) would call back to the READ MDE event 852(7) of the meter method 850 to learn the semantics of the use records. Then, the USE event 856(2) would be called and the load module(s) 858(2) associated with processing this event would call the appropriate events of the meter method 850 (e.g., READ USE RECORD repeatedly, and READ UDE once). At this point, the expectations of the calling method have been fulfilled, except for administrative object packaging and transmission.

In order to implement more distributed clearing functions, the USE event 856(2) may do more processing. For example, while reading in the USE records from the meter, the audit method 854 may implement analysis functions (e.g., categorizing the types of objects used, and reducing the information reported up the clearing chain to a simple count of how many times various types of content were accessed). Records from content types that are not interesting may be discarded. The detailed records themselves may be discarded after analysis. In another example, the UDE values (e.g., how many clicks are recorded) may be compared to the number of use records retrieved, and if there is a discrepancy, they can be reported and/or acted upon locally (e.g., disabling use of the objects from a given provider until further interaction). In still another example, records may have user identity information removed to ensure privacy. In a further example, some use records may be processed and analyzed locally (and then discarded), while other detail records are saved for later processing.

Once the distributed clearing functions have been performed, the information can be packaged up in one or more administrative objects for transmission up the clearing chain to a centralized location. This may involve a direct report to the provider(s), and/or a report to another clearing function, for example. The processed records may be released (for deletion, summary, filing, etc. by the meter method) by the audit method 854 when received, processed, transmitted, or on receipt of a confirmation by the recipients.

In another example using the meter method 850 shown in FIG. 17F, the AUDIT event 854 could be performed "internally" by the meter method 850. In this example, the use records and UDE would be bundled up in one or more administrative objects for transmission to the auditor(s) by the load module(s) 853 associated with the AUDIT event 854(4) of the meter method 850. However, rather than transmitting these objects, they could be processed locally. To do this, the name services record used by ROS (see Ginter et al. FIGS. 12 and 13) to find the named auditor(s) could be redirected back to the local PPE 154. In the PPE 154, a process controlled by the Commerce Utility System 90 can be created (based on methods and/or load modules delivered on their behalf) to perform the local clearing functions described above, except using the content of the administrative object(s), rather than calls to the meter method events. This is more analogous to the function that would be performed at a remote clearing facility in the sense that the operations are performed on administrative objects and their contents—but the processing can instead be done on the local consumer electronic appliance, on a networked appliance.

Distributing support services in this manner provides additional capabilities that may not be present or available in a centralized architecture. For example, a rights and permissions clearinghouse could delegate a local server within an organization to keep track of requests and to cache copies of permissions previously requested by the organization. Such a local rights and permissions clearinghouse could reduce network traffic and provide a convenient local repository for organization-specific permissions (e.g., site licenses for computer software). The local rights and permissions server could be authorized by rights holders or a rights and permissioning agency or other rights distribution organization to grant licenses on a request basis.

As another example, many secure, largely automated administrative and support services may be distributed in whole and/or in part to an at least occasionally connected appliance—regardless of whether that appliance is a computer, set top box, personal digital assistant (PDA) digital telephone, intelligent digital television, or any other digital appliance. Such appliances can use a protected processing environment to ensure that the support service is performed securely and reliably, free from tampering and other interference (e.g., as described in the Ginter, et al. patent specification).

In another example, one possible VDE content distribution scenario involves content providers performing the initial packaging role, distributors performing the distribution function, users keeping track of usage records, and clearinghouses processing usage and financial information. This is in contrast to a centralized processing model, in which all of these functions are performed by a single centralized party.

As still another example, efficiency increases can be realized by distributing clearinghouse functions across individual user machines, local area network (LAN) servers, and/or corporate "gateway" machines that bridge the corporate LAN/WAN environment with the outside world, and commercial "backbone" servers.

As another example, a company's computer might be authorized by a central certificate authority to grant certain kinds of digital certificates. For example, the company might be a member of a certain-trade organization. The trade organization's certifying authority might give the company a digital certificate attesting to that fact, and delegate to the company's own computer the certifying authority to issue certificates attesting to the fact that each of the company's employees is a member of the trade organization. Similarly, parents may be authorized to issue digital certificates on behalf of their offspring.

The techniques described above illustrate how the Distributed Commerce Utility, through use of the Commerce Utility System 90 architecture, can be distributed across multiple Commerce Utility Systems. Furthermore, the service functions 90-2 provided by one or more Commerce Utility Systems 90 may be decomposed into complete, or even partial, process steps (e.g., service application components 90-2) that are performed in whole or in part on other Commerce Utility Systems 90, or any other system (including end user systems) selected by the participants in a given scenario.

Example Commerce Utility System Types

Financial Clearinghouse 200

Figure 18:
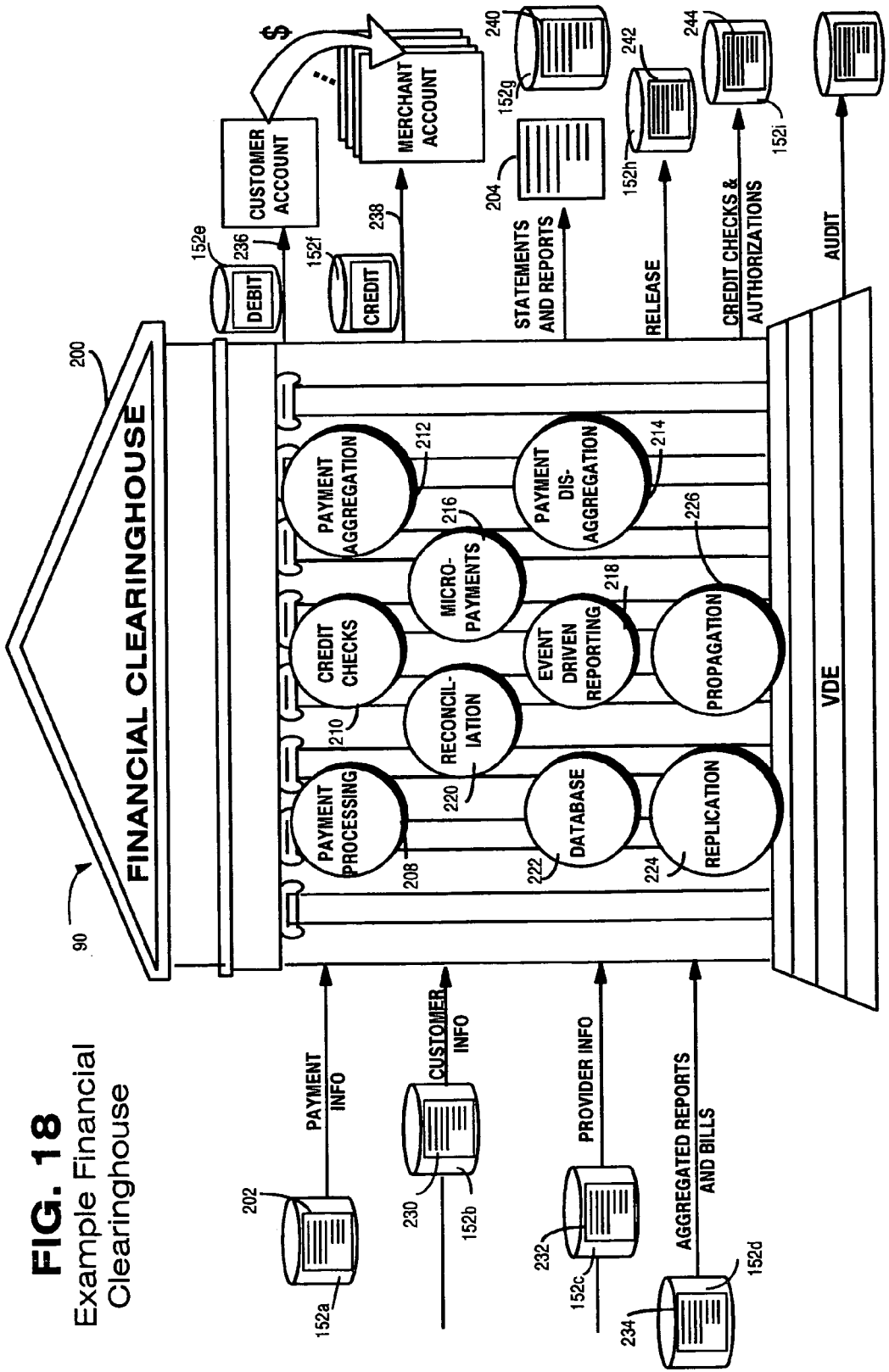
FIG. 18 shows an example financial clearinghouse Commerce Utility System.

FIG. 18 shows an example of a Financial Clearinghouse Commerce Utility System 200. "Financial Clearinghouses" support automated, efficient financial fulfillment for electronic transactions. For example, financial clearinghouse 200 may collect payment related information and details, and efficiently arrange for the transfer of money and other compensation to ensure that value providers get paid, including the automated, selective disaggregation of a payment into payment portions directed to appropriate value chain participants. Financial clearinghouses 200 may also provide credit, budgets limits, and/or electronic currency to participant (e.g., end-user) protected processing environments, wherein the financial clearinghouse may have distributed some of its operations to such protected processing environments for secure, local performance of such operations. The following are some example financial clearing support functions that can be provided through the use of the present inventions:

Clearing of financial transactions in a secure, efficient, timely and accurate manner.

Providing secure financial clearing on payment mechanisms that are trusted by, and convenient for value providers and users/consumers.

Assuring payment to rights holders and other value chain participants (for example, providers who supply value to the electronic community in some part of the process from creation, to distribution, to sale, and to delivery) without requiring them to take on the task of managing a large number of financial interfaces with widely dispersed customers and/or a variety of often complex financial services standards and protocols.

Allowing content consumers to pay for information goods and associated services using a variety of different payment vehicles via a common, trustable interface.

Allowing each party involved in a transaction to verify that a given exchange has occurred as it was mutually intended, and to preclude repudiation of the transaction by any party.

Reconciling accounts at time of purchase or usage reporting (e.g., transferring funds from a value chain participant account to one or more provider accounts).

Supporting frequent and granular transaction clearing activities.

Providing financial clearing services to all value chain participants (e.g., buyers, distributors and sellers of digital content of all kinds as well as buyers, distributors, and sellers of physical goods and user of other services).

Interfacing distributed electronic commerce domains with existing electronic, paper and/or other payment and/or clearing services, including but not limited to credit card systems, bank debit card systems, smart card systems, electronic data interchange, automatic clearinghouses, digital money, etc.

The effecting, by one or more banks and/or other organizations, of settlement and reconciliation and/or interfacing directly with entities who may legally perform settlement services.

The effecting of the creation of, and assigning of, identifying labels, numbers, names or other unique identifiers, by one or more banks and/or other organizations to digital process and/or digital information creators, information distributions and/or modifiers, and/or customer and/or other user accounts for funds, credits and debits.

Using secure containers in any step, part, or process of providing secure financial clearing services.

Controlling secure financial clearing processes based, at least in part, on rules and controls stipulating the distribution of processes to be performed at each protected processing environment of a distributed financial clearinghouse systems, e.g., clearing performed by the user protected processing environments, web servers, centralized clearing facilities.

Efficiently and securely handling conversions from one currency to another.

Enabling payment fulfillment on provision of other consideration including service fees, product fees and/or any other fees or charges based at least in part on content, process control, and/or rights management use.

Supporting wide use of micro-fees and micro-payments at least in part based on content, process control, and/or other usage transactions, wherein said support may include the distributed, secure accumulation and/or processing of micro-transaction activity and the periodic passing of information related to such activity through a clearinghouse network for further processing and/or accumulation.

Efficiently measuring and managing micro-payment activity while minimizing transaction overhead.

Minimizing latency in micro-payment transaction handling.

Aggregating or "bundling" transactions against local value store or other payment vehicles (methods).

Employing value chain rules and controls and chain of handling and control for efficiently administrating the disaggregation (splitting apart) of payments, including the assignment or transfer to different value chain providers of payments based on the same or differing electronic control sets controlling usage and/or other permissions (e.g., securely controlling payment consequences through the parsing of payment amounts among various value chain parties as required by rules and controls before specific payment methods are activated.

Reducing (e.g., minimizing) the number of electronic messages required to support a given set of electronic transactions through, for example, distributed transaction processing and/or transaction activity accumulation.

Supporting local aggregation (bundling or combining together) of multiple payments or micro-payments at a value chain participant's site.

Allowing value providers (e.g., value chain participants) to efficiently check another value chain participant's ability to pay before providing services or goods (physical and/or electronic) on credit.

Allowing value providers to authorize an appropriate level of funding for estimated purchase levels on a value chain participant's preferred payment vehicle, including, for example, allowing the provision of budgets for credit and/or currency that can be expended towards all and/or only certain classes of transactions (e.g., content and/or process control types) including, for example, budgets for disbursement for expressly specified categories of expenditures such as only G and PG movies.

Providing verification of the identity of a potential value chain participant and binding of that identity to the value chain participant's selected payment vehicle(s).

Providing periodic reporting of transaction activity for clearinghouse reconciliation and recordation purposes. Performing auditing, billing, payment fulfillment and/or other consideration and/or other clearing activities.

Providing event driven reporting based, for example, on time, place, depletion of local funds, and/or class of disbursement activity such as purpose (for business, entertainment, travel, household expense), family member or other individual or group identity, category of content or other goods and/or services acquired, and/or category any of type of disbursement activity Receiving authority from secure chain of handling and control embodied in electronic control sets.

Granting authority and/or providing services to, and/or in conjunction with, one or more distributed financial clearinghouses that are some combination of subordinate to, and/or have peer-to-peer relationships with, one or more of said clearinghouses.

Distributing financial clearing functions across a network or other system (for example, every consumer or other value chain participant node can perform distributed financial clearing services and wherein said participant node may communicate financial clearing information directly to one or more other participants) and in accordance with rules and controls and other VDE techniques as described in the Ginter, et al patent specification.

Granting authority and/or providing services to, or in conjunction with, one or more financial sub-clearinghouses whose operations may be located logically and/or physically elsewhere, such as within a company or government agency and/or within one or more jurisdictions and/or serving subsets of the overall business focus area of a senior financial clearinghouse.

Distributing and/or otherwise authorizing financial clearing functions across a system or network, for example, where every consumer and/or certain or all other value chain participant nodes can potentially support a distributed usage clearing service initiating its own, secure financial clearing transactions and function in the context of the overall clearinghouse network including clearinghouse interoperation with one or more other participant, interoperable nodes, and as elsewhere in this list, all activities employing VDE techniques as appropriate.

Efficiently calculating, collecting, and dispersing sales and "value added taxes" imposed by at least one jurisdiction.

Supporting a web of financial clearinghouses in which one or more classes (groups) of clearinghouse have interoperable, peer-to-peer relationships and in which, differing groups may have differing rights to interoperate with members of other groups, for example financial clearinghouses on end-user protected processing environments may have limited rights to inter-operate with "primary" financial clearinghouses.

Supporting a web of clearinghouse protected processing environments in which such protected processing environments comprise discreet "banks" or banking protected processing environments, and where such protected processing environments can employ VDE capabilities to securely govern and perform banking functions such as the secure storage (locally and/or remotely) of notational currency, the right to "lend" stored currency to end-user and/or other clearinghouse protected processing environments, the right to launch electronic currency objects, the right to fulfill payment from local or remote currency store(s), the ability to receive communications representing obligations to pay (e.g., electronic bills), the ability to fulfill such payments, and the ability to operate as a component banking "branch" of one or more virtual bank(s) (or banking network(s)) wherein such bank performs many of the roles currently performed by conventional banks.

Supporting the ability for financial clearinghouses to create electronic currency that is conditionally anonymous and where such currency may be employed in the fulfillment of payment obligations and where such currency is treated as authentic without the requirement that a receiving party connect after such receipt with a remote banking authority for assessing that the currency is valid or authorized for use.

Supporting the ability for distributed clearinghouse protected processing environments to operate—in conjunction with one or more capabilities described above—on portable devices such as smart cards (e.g., electronic wallets, etc.) where cellular or land-line communication means (or other transport mechanisms) support on-line or asynchronous communication of information related to a current or an plural transactions such as billing or other audit information regarding commerce activity including identification, for example, of purchasers, sellers, and/or distributors, and authorization information, budget information, credit provision, currency provision, and/or disbursement information, etc. related to such activity.

Supporting the provision of discounts, subsidies and/or coupons to value chain participants, for example to consumer users, in exchange for usage data or more finely grained usage data (for example, ameliorating privacy concerns in some contexts).

May be organized hierarchically, peer-to-peer, or in a combined mode where responsibility for financial clearing may be distributed in differing fashions for differing commerce models and/or activities and/or value chains and where certain one or more parties may be, for example, hierarchically more senior to other parties in one or more instances and hierarchically a peer or less senior in one or more other instances.

The relationship among participants is programmable and may be set (and later modified) to represent one or more desired financial clearing arrangements for Liven commerce activities, value chains, or models.

Distributing payments to plural parties, including, for example, taxes to one or more governments (e.g., city, state, and federal).

FIG. 18 shows an example function oriented diagram for financial clearinghouse 200. In this example, financial clearinghouse 200 is highly automated, and operates in a trusted, secure domain to provide a protected processing environment. It efficiently provides financial clearing services to all kinds of electronic commerce chains. It can also serve as a gateway between the highly secure virtual distribution environment (VDE) domain and other domains—providing protocol support for the existing infrastructure. The gateway functions can allow the highly flexible and distributed VDE protected processing environments to exploit the inflexible and centralized, but ubiquitous and trusted, existing financial infrastructure services.

The core functions of financial clearinghouse 200 relate to payment processing 208, payment aggregation 212, payment disaggregation 214, and micro-payment management 216—since these functions collect money from customers and other value chain participants, and pay money to value chain service or product providers such as merchants.

In more detail, financial clearinghouse 200 may perform the following functions in this example:
payment processing 208,
credit checks 210,
payment aggregation 212,
payment disaggregation 214,
micro-payment handling 216,
event driven reporting 218,
reconciliation 220,
database maintenance/management 222,
replication 224, and
propagation 226.

Financial clearinghouse 200 may receive payment information 202, customer information 230, provider information 232, and aggregated reports and bills 234 from the outside world. It may generate debit orders 236, credit orders 238, statements and reports 204, 240, release signals 242, and credit checks and authorizations 244.

Database management 222 and event driven reporting 218 may be used to securely provide accurate financial reports to value chain participants. Reconciliation function 220—which is related to both reporting and financial management—allows financial clearinghouse 200 to provide more reliable financial management. Replication function 224 and propagation function 226 are used by financial clearinghouse 200 to facilitate distributed processing with other financial clearinghouses 200 and/or other secure or insecure protected processing environments, permitting the financial clearinghouse to securely share state and update information with other Commerce Utility Systems or other participants.

In the example shown, the payment information 202 (which may arrive in one or more secure containers 152) is the primary input to payment processing block 208. If desired, payment information 202 can also include some or all of the usage information sent to a usage clearinghouse 300—or it may include different types of usage information more relevant to financial auditing and transaction tracking. This payment information 202 can arrive in real time or on a delayed (e.g., periodic or other event-driven) basis.

Financial clearinghouse 200 uses provider information 232 and customer information 230 to effect funds transfers between customers and providers. Financial clearinghouse 200 uses aggregated reports and bills 234 to guide the overall payment processing 208 as well as payment aggregation 212 and payment disaggregation 214. For example, financial clearinghouse 200 may issue debit and credit orders 236, 238 to third party financial parties such as banks, credit card companies, etc., to effect debiting of consumer accounts and corresponding crediting of provider accounts. Financial clearinghouse 200 may issue statements 204 and reports 240 for secure auditing and/or informational purposes. Financial clearinghouse 200 may issue credit authorizations 244 after performing credit checks 210, thereby extending credit to appropriate value chain participants. Such authentication 244 may include an input/output function, unless they are performed entirely locally (i.e., an authorization request comes in, and clearinghouse 200 is the source of credit and/or credit limit information).

Financial clearinghouse 200 may issue release signals 242 in appropriate circumstances to allow electronic appliances 100 to stop maintaining and/or keep "pending" financial information after it has been transferred, analyzed and/or processed by financial clearinghouse 200. In one example, the user appliance 100 may, within business model limitations, store the financial information even after it is "released," reduce it to a summary, etc. Of course, it may have already done this with a copy of the data (e.g., if previously allowed to access it). For example, suppose the local copy of financial usage information contains confidential business model information. A property might cost $1.00 to view, and that dollar may be split among several parties. Normally, the user is only aware of the overall bottom line, not the details of the split—even though a record may exist locally for each of the participants in the transaction.

Figure 19:
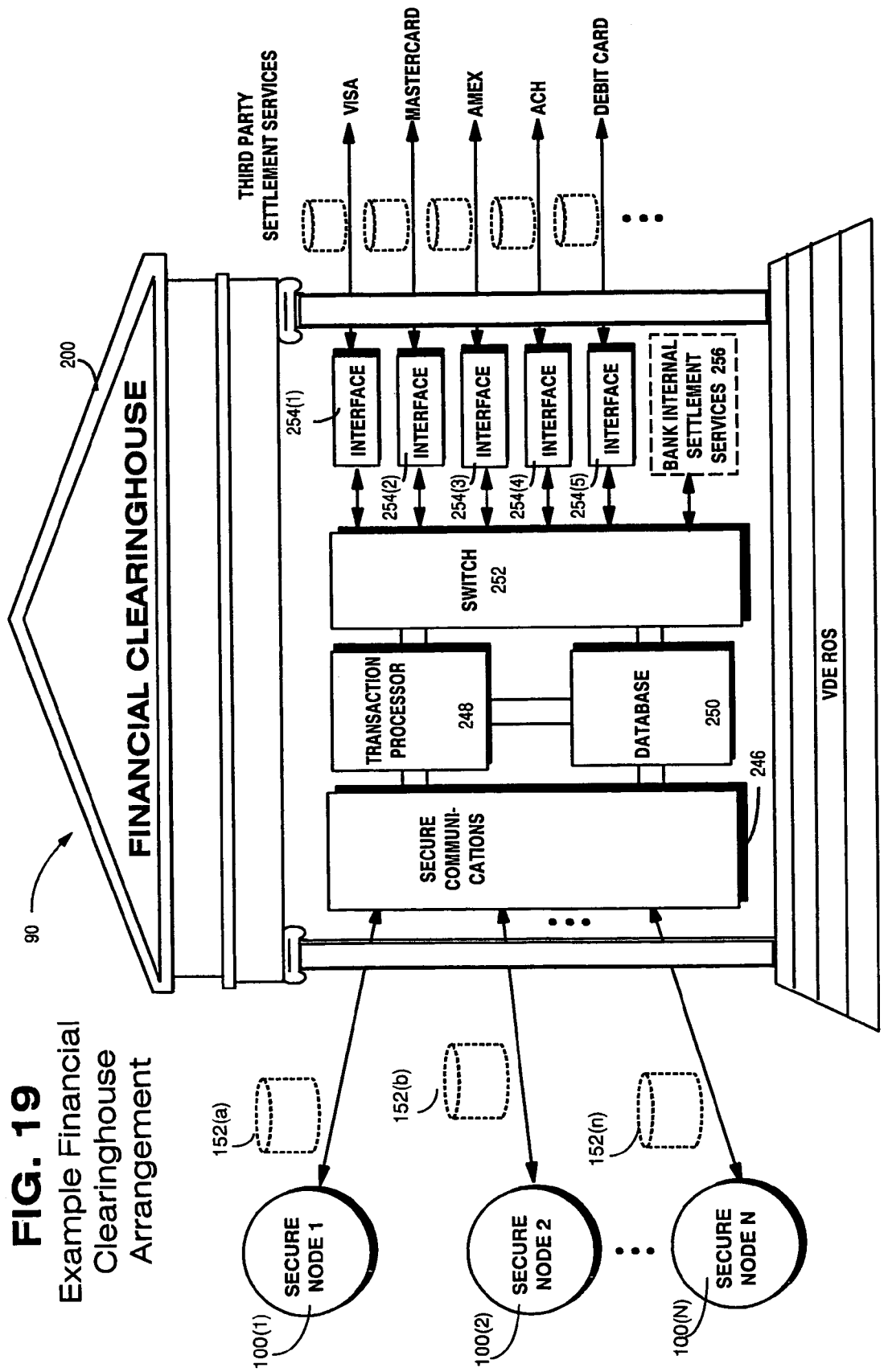
FIG. 19 shows an example financial clearinghouse arrangement.

FIG. 19 shows an example architectural diagram for financial clearinghouse 200. Financial clearinghouse 200 in this example includes a secure communications handler 246, a transaction processor 248, a database manager 250, a switch 252, and one or more interface blocks 244. This example financial clearinghouse architecture may be based, for example, on the operating system architecture shown in FIGS. 12 and 13 of the Ginter et al. patent specification (general purpose external services manager 172 in that example could support settlement service interfaces 254 for example). Secure communications handler 246 allows financial clearinghouse 200 to communicate securely with other electronic appliances 100(1) . . . 100(N). Such communications may be by way of secure digital containers 152. It is desirable for most Commerce Utility Systems 90 (including financial clearinghouse 200) to support both real time and asynchronous receipt of containers 152. In addition, financial clearinghouse 90 may also support a real time connection protocol that does not require containers 152 for simple transactions such as making a credit card payment that doesn't have disaggregation requirements. The advantage to using a real time connection is real time results. This may be beneficial in circumstances where users need more money or credit because they have run out (rather than simply making a report or receiving a periodic replenishment of a budget that has not been exhausted), and also when a provider (e.g., of content or budget) insists on clearing a transaction before allowing whatever activity initiated the transaction to go forward.

A connection for a real time transaction doesn't always require secure containers 152, but using containers 152 even in this scenario has advantages. For example, containers 152 permit attachment of rules and controls to the contents, allowing users to specify how the contents may be used. In addition, use of containers 152 leverages existing capabilities in the protected processing environment. Using a technique such as electronic mail to deliver containers 152 (e.g., as attachments to SMTP mail messages, or as attachments to any other e-mail protocol that supports attachments) permits asynchronous processing of contents, thereby allowing Commerce Utility Systems 90 to smooth out their peak processing loads. A cost of operating a commercial clearinghouse is the depreciation expense of the equipment. The amount of equipment is principally driven by the peak load requirement. One can expect a significant variance in load (for example, compare Friday night at 8 pm versus Tuesday morning at 3 am). Smoothing out this function can lead to quite considerable savings in equipment and related costs (electricity, personnel, maintenance, etc.)

Transaction processor 248 may process and analyze received information, and database manager 250 may store received information in a database for later analysis and/or for historical analysis (to increase credit limits, analyze payment histories, etc.) In addition, database manager 250 may also store information associated with existing credit limits, addresses for communications (physical and/or electronic), and other account information. For example, the Ginter et al. patent specification discusses budget encumbrances. The database manager 250 may be used to store information used to track encumbrances as well. There may also be sets of security information used to communicate with protected processing environments and/or users employing the protected processing environments, and the settlement services. Records associated with communications with the settlement services may also be stored there as well. The database 250 may also be outfitted with various reporting facilities related to its contents.

Transaction processor 248 and database manager 250 together perform most of the functions shown in FIG. 18. Switch 252 is used to route information to and from interface blocks 244. Interface blocks 244 are used to communicate with third party settlement services, such as credit card companies, Automatic Clearing House (ACH) systems for bank settlements, debit card accounts, etc. Optionally, the internal settlement services provided by a Federal Reserve Bank 256 may be used in lieu of or in addition to the third party settlement services shown to provide settlement of accounts in accordance with prevailing banking arrangements and legal requirements. The payment mechanisms used by financial clearinghouse 200 may be symmetrical (e.g., tell VISA to charge consumer A's charge account and credit vendor Y's account) or asymmetrical (e.g., tell VISA to debit consumer A's charge account and provide the money to the financial clearinghouse which will credit vendor Y's account using some other payment mechanism) as allowed by applicable financial and banking regulations.

Example Financial Clearing Processes

FIG. 20 shows an example financial clearinghouse process. In this example, a provider 164 provides goods, services or content to a consumer 95. For example, provider 164 may provide one or more digital properties 1029 and associated controls 404 within an electronic secure container 152. A secure protected processing environment 154 at the consumer 95 site keeps track of payment, usage and other information, and may provide an audit trail 228 specifying this information. Audit trail 228 may be transmitted from the site of consumer 95 to financial clearinghouse 200 within one or more secure containers 152*b*. Audit trail 220 might include, for example, the identification of the reporting electronic appliance 100; the amount of payment; provider identification; the consumer's desired payment method; the name or other identification of the electronic appliance user; and the type(s) of transaction(s) involved. The time and/or frequency of reporting might be based on a number of different events such as for example, the time of day, week, month, year or other time interval; the occurrence of some related or unrelated event (e.g., pre-approval for a purchase is required, a certain number of purchases have taken place, a local electronic purse has been exhausted of funds, reporting is necessary for some other reason, etc.); or a combination of these.

Financial clearinghouse 200 analyzes the audit trail 228, and generates one or more summary reports 240. Financial clearinghouse 200 may provide the summary report 240 to provider 164 by transmitting it electronically within a secure container 152*c*. Financial clearinghouse 200 may also coordinate with a financial intermediary 258 and one or more financial processors 260 to effect a debiting of a bank or other account owned by consumer 95 and corresponding crediting of a bank or other account owned by provider 164.

For example, the financial clearinghouse 200 may receive the audit information, disaggregate the transactions (into value chain amounts for creators, distributors, and others; as well as for tax authorities and other governmental entities), and then calculate an amount due it from each of the transaction beneficiaries. Then, if desired or necessary (due to the size of the transactions, per transaction fees, or other efficiency and/or cost considerations), the transactions may be rolled up into lump sums for each of the parties, and submitted to a financial intermediary 258 (along with appropriate account information) that is responsible for performing credit card transactions. The financial intermediary 258 (who may also charge a fee or take a percentage) may then cause transactions to occur at the financial processor 260 such that the beneficiaries each receive the appropriate amounts. Alternatively, if the financial clearinghouse 200 has the ability and authorizations necessary to submit credit card transactions directly to credit card companies, it may cause the transactions to occur directly with the financial processor 260 (e.g., Visa).

Financial processor 260 may send a statement 204 to provider 164 (and/or to consumer 95) detailing the financial debits and payments that have occurred. It may provide statement 204 within a secure container (not shown) if desired. Financial clearinghouse 200 may receive a portion or percentage of the debited funds to compensate it for the financial clearing services it has provided.

FIGS. 20A–20F show an example financial clearing activity using a local electronic money purse 262 maintained at the consumer's electronic appliance 100. In this example, financial clearinghouse 200 may initially provide consumer 100 with electronic money in the form of electronic cash by transmitting the electronic cash within one or more secure containers 152. Financial clearinghouse 200 may automatically debit the consumer's bank 206a or other account to obtain these funds, and may do so at the consumer's request (see FIG. 20A).

The consumer's electronic appliance 100 upon receiving the electronic funds may deposit them within an electronic cash purse 262 it maintains within its protected processing environment 154 (e.g., as an "MDE" described in Ginter et al.) (see FIG. 20B). The customer's electronic appliance 100 may use this locally stored electronic money to pay for goods and services consumed by the consumer. For example, a publisher 68 may provide a work 166, such as a book, film, television program, or the like, to the consumer's electronic appliance by transmitting it within one or more secure containers 152b. The consumer may operate his or her electronic appliance 100 to open the container and access the work 166, allowing the consumer to use the work in the manner specified by its associated electronic controls (see FIG. 20C).

Assuming that the rights owner requires payment in return for usage of the work 166, the consumer's electronic appliance 100 may automatically debit electronic purse 262 by the amount of payment required (in this case $5) (FIG. 20C). Additionally, electronic appliance 100 may automatically generate a usage record 264 recording this usage event. Based on time and/or other event occurrence, the consumer's electronic appliance 100 may automatically send an audit trail 264—which may comprise a package of audit records transmitted at audit time or set of related records stored in the secure database—(or a summary of it to protect the consumer's privacy)—to financial clearinghouse 200 in the form of one or electronic containers 152c (see FIG. 20D).

Upon receiving the usage record 262 and successfully storing it within its own database 250, financial clearinghouse 200 may send a release signal 242 within an electronic container 152d (see FIG. 20D). This release signal 242 may allow the consumer's electronic appliance 100 to delete the usage record 264 it had previously maintained (see FIG. 20D).

The consumer may use the same or different work 166 again to prompt generation of an additional usage record 264' and to decrement the electronic purse 262 by another usage charge (in this case exhausting the purse's contents) (see FIG. 20E). Exhaustion of electronic purse 262 may prompt the consumer's electronic appliance 100 to again contact financial clearinghouse 200 to request additional funds (see request 228') and to also provide usage record 264' (both pieces of information are transmitted within the same electronic container 152e in this example) (see FIG. 20F).

Financial clearinghouse 200 may respond by transmitting additional electronic funds (after debiting the consumer's bank or other account), and may also provide another release signal allowing the consumer's electronic appliance 100 to delete usage record 264' (see FIG. 20F). The money collected may be paid to the rights holders (after any appropriate reductions to compensate Commerce Utility Systems 90).

Payment Disaggregation

FIG. 21 shows an example financial clearing activity involving value chain "disaggregation." Financial clearinghouse 200 in this example efficiently, reliably and securely supports payment disaggregation within a value chain. FIG. 21 shows a content creator, such as an author, delivering a work 166 to a publisher 168. The publisher publishes the work (for example, within an electronic book 166') and delivers it to a consumer 95. In this example, the consumer 95 pays $20 for his copy of the book 166'. The consumer's payment is "disaggregated" or split up between the author 164 and the publisher 168 based, for example, upon a contractual agreement. In this example, the publisher receives four of the consumer's $20 and the author receives the rest.

Disaggregation allows financial clearinghouse 200 to automatically split up a consumers' payment among any number of different value chain participants. This is extremely useful in ensuring that all contributors to a product or service can reliably and efficiently receive compensation for their respective contributions.

FIG. 22 shows how financial clearinghouse 200 can support the value chain disaggregation shown in FIG. 21. In the FIG. 22 electronic example, the customer 95 may deliver his payment electronically to financial clearinghouse 200. This payment may be in the form of electronic currency packaged within a secure electronic container 152a, or it might be in some other form (e.g., reported usage information coupled with a preexisting authorization for financial clearinghouse 200 to debit the bank account of customer 95).

Financial clearinghouse 200 may distribute appropriate shares of the customer's payment to author 164 and publisher 168 in accordance with the agreement between the author and the publisher. What tells financial clearinghouse 200 who should receive the disaggregated parts of the payment? In this FIG. 22 example, the work 166 may pass from the author 164 to the publisher 168 and from the publisher 168 to customer 95 in electronic form within one or more secure electronic containers 152. One or more electronic control sets 188 may be included within the same or different containers, these control sets being associated with the work 166 or other property. Control sets 188 may specify, among other things, the amount of payment customer 95 must supply in order to be able to use the work 166.

Controls 188 may also specify and control how the customer's payment will be disaggregated among the other value chain participants. For example, author 164 may specify within controls 188b the author provides, that she is to receive $16 for each copy of work 166 purchased by an ultimate consumer 95. Because of the secure chain of handling and control provided in accordance with the virtual distribution environment (see the Ginter et al. patent disclosure), author 164 can be confident (to the degree required by the commercial priorities of the author and allowed by the strength of the overall system) that publisher 168, customer 95 and any other consumers or potential users of property 166 will be subject to this control 188b. The publisher 168 may add its own controls to the one specified by author 164, the publisher controls 188*c* providing a $4 mark up (for example) that it will receive for the use of its brand name, distributing and marketing services.

FIG. 22A shows a detailed example of how payment disaggregation can be performed within the customer's protected processing environment 154 using control sets 188 as described in the Ginter et al patent disclosure. Ginter et al. teaches, in FIG. 48 and associated text, how a control set can implement and control an overall metering, billing and budgeting process within a user's protected processing environment 154. FIG. 22A illustrates payment disaggregation based on one or more control sets 188 provided to a consumer's protected processing environment 154. Each of the processing blocks shown in FIG. 22A may be in response to a user request (event) to open and access content.

In this particular example, a metering method 275 is designed to pass an event to billing method 277 whenever the consumer first uses a particular piece of content (meter event 275 could also or alternatively pass the event along each time the consumer uses the content to provide a "pay per view" functionality if desired).

The billing methods 277 include two different billing methods 277*a* and 277*b* in this example. Methods 277*a*, 277*b* can be independently deliverable—for example, the author 164 could deliver billing sub-method 277*a*, and the publisher 168 could deliver billing sub-method 277*b*. Billing method 277*a* writes information to a billing trail data structure specifying how much the author 164 is to be paid ($16 in this example). Billing method 277*b* writes information to the same or different billing trail data structure specifying how much the publisher is to be paid ($4). Billing methods 277*a*, 277*b* may each receive the open event passed along by meter method 275, and may each write billing records to the same (or different) billing trail data structure.

In this example, a budget method 279 may be delivered independently of the billing methods 277*a*, 277*b*. Budget method 279 may write records to a budget trail data structure 281 specifying (among other things) the payment disaggregation arrangement (i.e., the $16/$4 split between author and publisher) specified by the billing methods 277*a*, 277*b*. The budget trail data structure 281 (which is maintained independently from the data structures maintained by billing methods 277*a*, 277*b* and therefore cannot be compromised by the author 164 and/or the publisher 168) might be sent to a financial clearinghouse 200. The financial clearinghouse 200 would perform payment and debit financial clearing as described above to result in the consumer's account being debited by $20, the author's account being credited by $16 and the publisher's account being credited by $4 (thus disaggregating the user's $20 payment between the author 164 and the publisher 168). Meanwhile, the billing trail data structure could be sent to a usage clearinghouse 300 specified by the author 164 and/or the publisher 168. Usage clearinghouse 300 could analyze the billing trail data structure and let author 164 and/or publisher 168 know what payments they might expect to receive from the financial clearinghouse 200.

Thus, in this example, electronic control sets 188 may specify or define, among other things: (i) rights available in a particular digital object, (ii) the cost of exercising such rights, and (iii) how payments for exercising rights will be divided (disaggregated) among rightsholders. This ability to define payment disaggregation in advance (before customers' payment methods and arrangements are activated) provides a high degree of efficiency and flexibility—since it can use the consumers' payment method, for example, to automatically direct parts of the consumers' payment to appropriate people who need to be compensated. Since the same electronic appliance 100 that is being used to exercise the rights is also being used to help direct payments to various different value chain participants, a portion of the overall financial clearing process is effectively distributed throughout a large number of parallel computing resources. Because of the high degree of trustedness that can be provided by the system disclosed in the Ginter et al. patent specification, for example, rightsholders can release such control sets 188 into the stream of commerce with an appropriate that their payment arrangements will be carried out. Financial clearinghouse 200 can help to ensure that such disaggregated payments efficiently and rapidly reach their required destinations.

A protected processing environment 154 at the site of customer 95 securely enforces the augmented controls 188*c*, requiring total payment and/or payment authorization from the customer 95 before allowing the customer to access work 166. Controls 188*c* may also specify which financial clearinghouse 200 is to be used to handle payment processing, and what payment methods are acceptable while still giving customer 95 flexibility in terms of choosing a desired payment method. The customer's protected processing environment 154*c* may then automatically send appropriate payment or payment authorization 190*a* to financial clearinghouse 200 for disaggregation in accordance with controls 188*a*—which may be the same controls (or a subset of those controls relating to payment disaggregation) specified by the author and/or the publisher.

Because the customer's protected processing environment 154*c* generates controls 188*a* subject to the controls 188*c*, 188*b* specified by the publisher and author (see FIG. 22), these payment controls 188*a* can be trusted to carry out the payment wishes of the author and the publisher and to reflect the payment dividing agreement between the two of them. The customer's protected processing environment 154*c* may send the customer's payment or payment authorization 152*a* and these payment controls 188*a* to financial clearinghouse 200 within one or more secure electronic containers 152*a*.

Financial clearinghouse 200 processes the payment or payment authorization 152*a* in accordance with controls 188*a*, distributing payment 152*b* to the publisher and payment 152*c* to the author in accordance with the payment dividing agreement reached between the author and the publisher. Thus, for example, financial clearinghouse 200 might send $4 of electronic money to the publisher and $16 of electronic money to the author; or it might credit the bank or other accounts of the author and publisher in these amounts. Because this entire process takes place in a secure, trusted virtual distribution environment, each of the value chain participants can trust that they will in fact receive the payment they require and the process can be carried on automatically and electronically in a very efficient way that flexibly accommodates a wide variety of different business models and ad hoc relationships.

Figure 24:
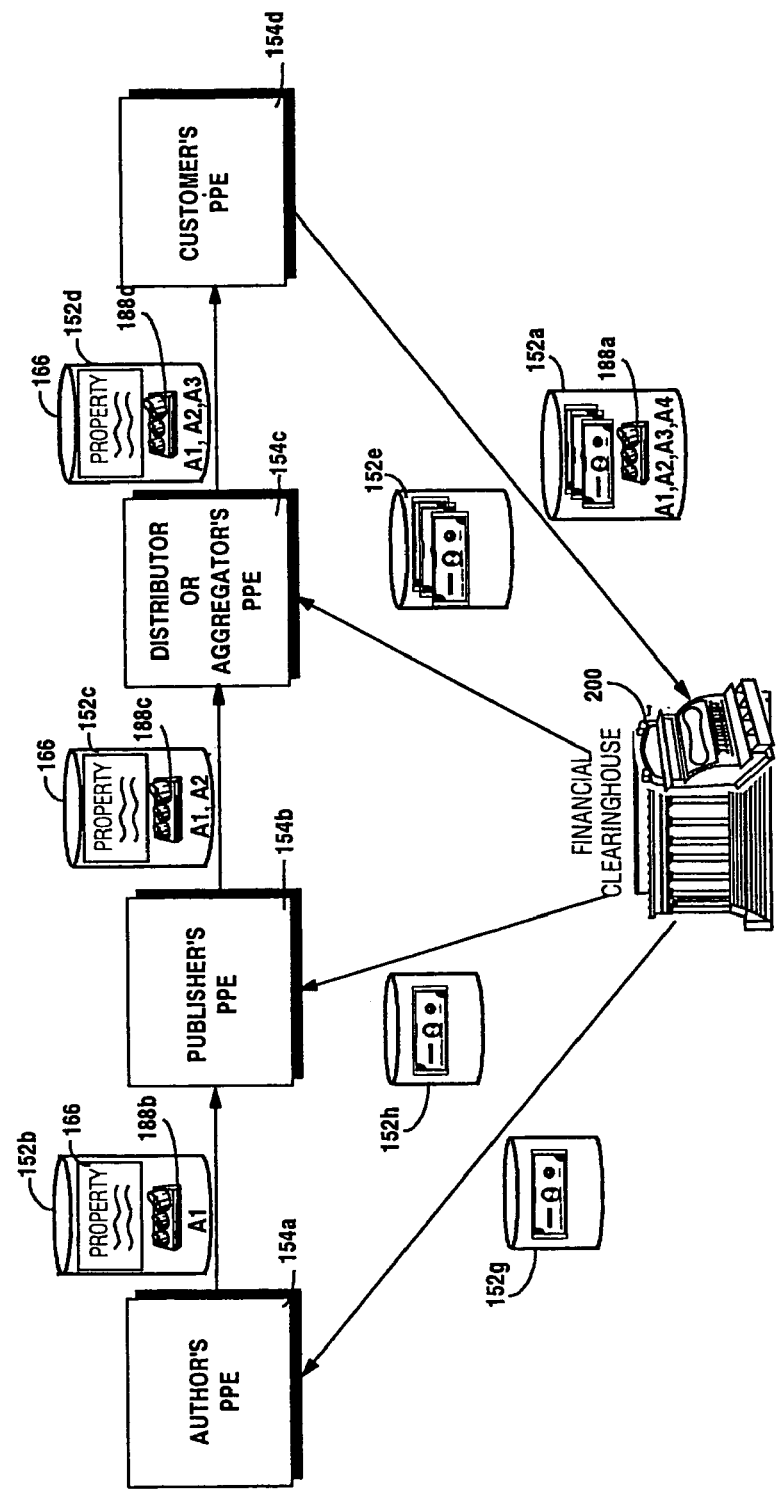
FIG. 24 shows an example of how disaggregation can be implemented within a financial clearinghouse context.

FIG. 23 shows a further, somewhat more complex payment disaggregation example that adds a content distributor or aggregator 170 to the value chain. In this example, the consumer 95's $20 may now need to be split three ways instead of two, with the author 164 still receiving $16, the publisher receiving only $3 and the content distributor/aggregator 170 receiving $1 for his or her efforts. FIG. 24 shows that the same basic arrangement shown in FIG. 22 can be used to accommodate the payment and other interests of this new value chain participant.

Figure 25:
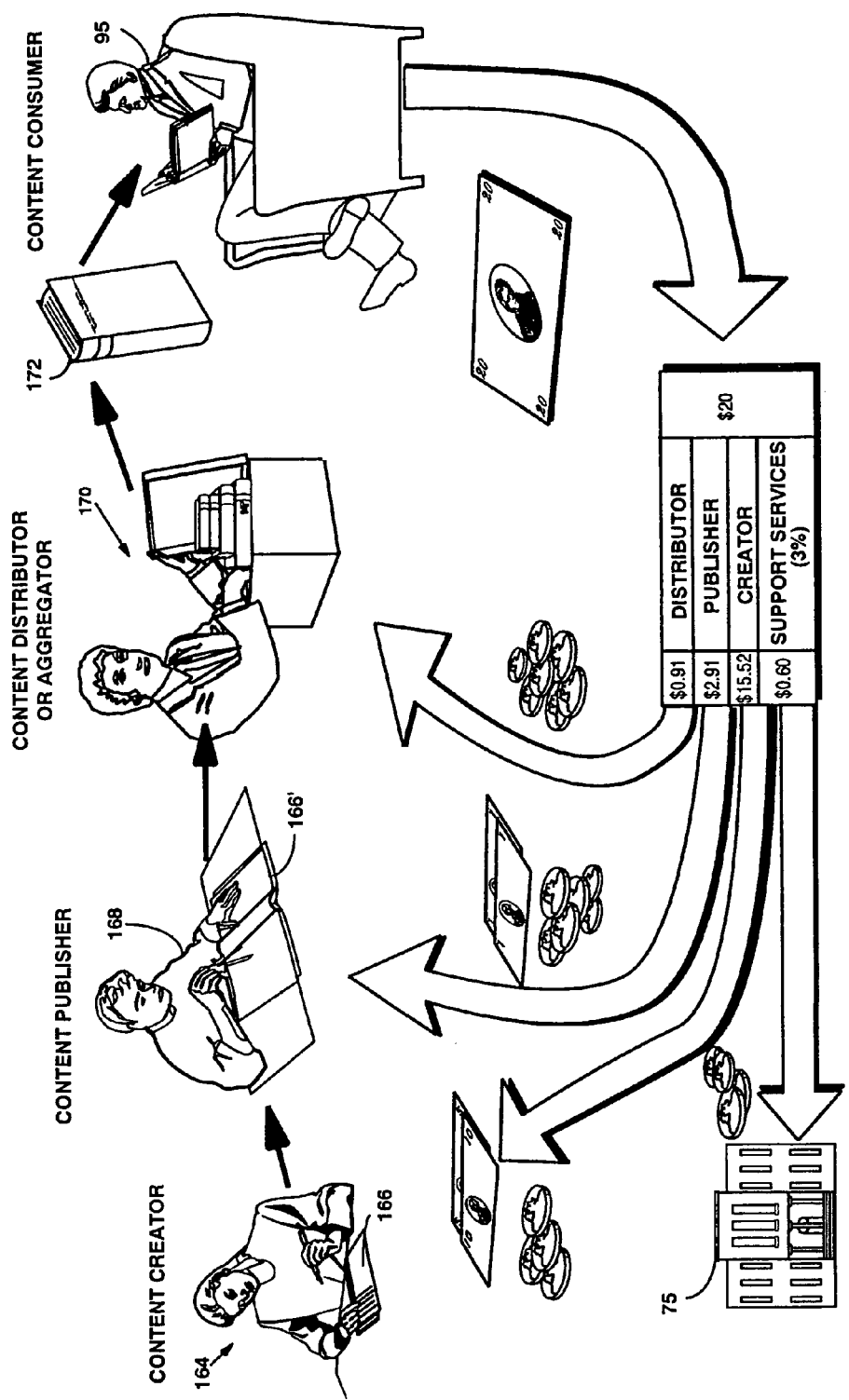
FIG. 25 shows a value chain disaggregation example that also details compensation to the Distributed Commerce Utility.

FIG. 25 shows a further payment disaggregation example. FIG. 25 shows how disaggregation can be used to compensate Commerce Utility Systems 90 for their role in maintaining and managing the value chain. As described above, the Distributed Commerce Utility 75 provides very important services, such as financial clearing, usage auditing, permissioning, certification, etc. Entire businesses or industries may be based on efficiently and reliably providing these kinds of administrative and support services. Commerce Utility Systems need to be compensated for their own investments and efforts. One way for them to be compensated is to receive a small part of every transaction—"a piece of the tick." The same payment disaggregation mechanisms described above can also be used to support such micropayments to Commerce Utility Systems 90.

FIG. 23 shows one example in which the Commerce Utility Systems 90 receive 3% (e.g., $0.60 in the example shown) of the value of each transaction. Because electronic control sets 188 discussed above can be used to implement such micro-payment capabilities, any desired business arrangement or objective can be flexibly and efficiently accommodated.

Figure 26:
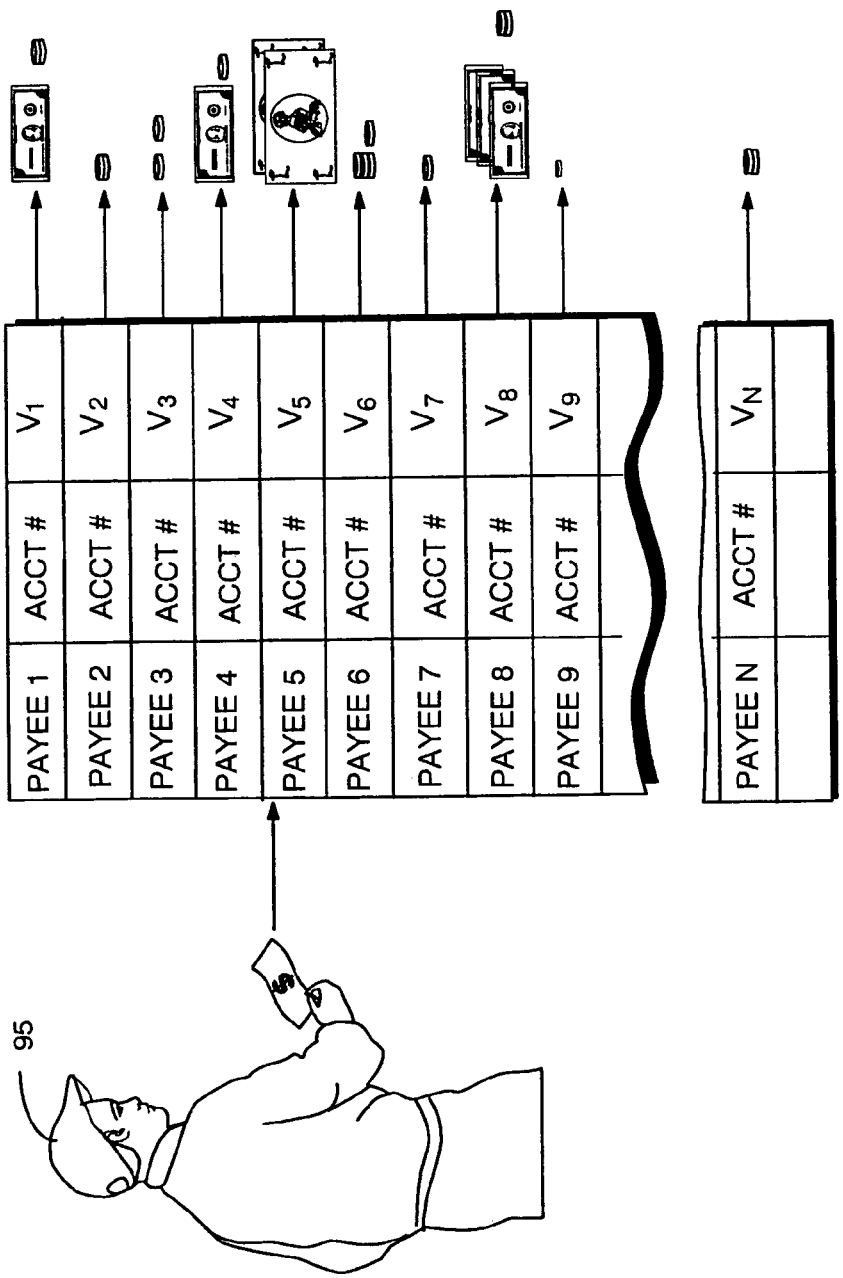
FIG. 26 shows an example value chain (payment) disaggregation to any number of payees.

FIG. 26 shows that payment disaggregation can be used to disaggregate or split up a single consumer payment into an arbitrary number of different amounts (even recording amounts in different types of currencies for international trading purposes) at a variety of different destinations and using a variety of different payment mechanisms (e.g., credit cards, bank accounts, electronic money, etc.).

Figure 27:
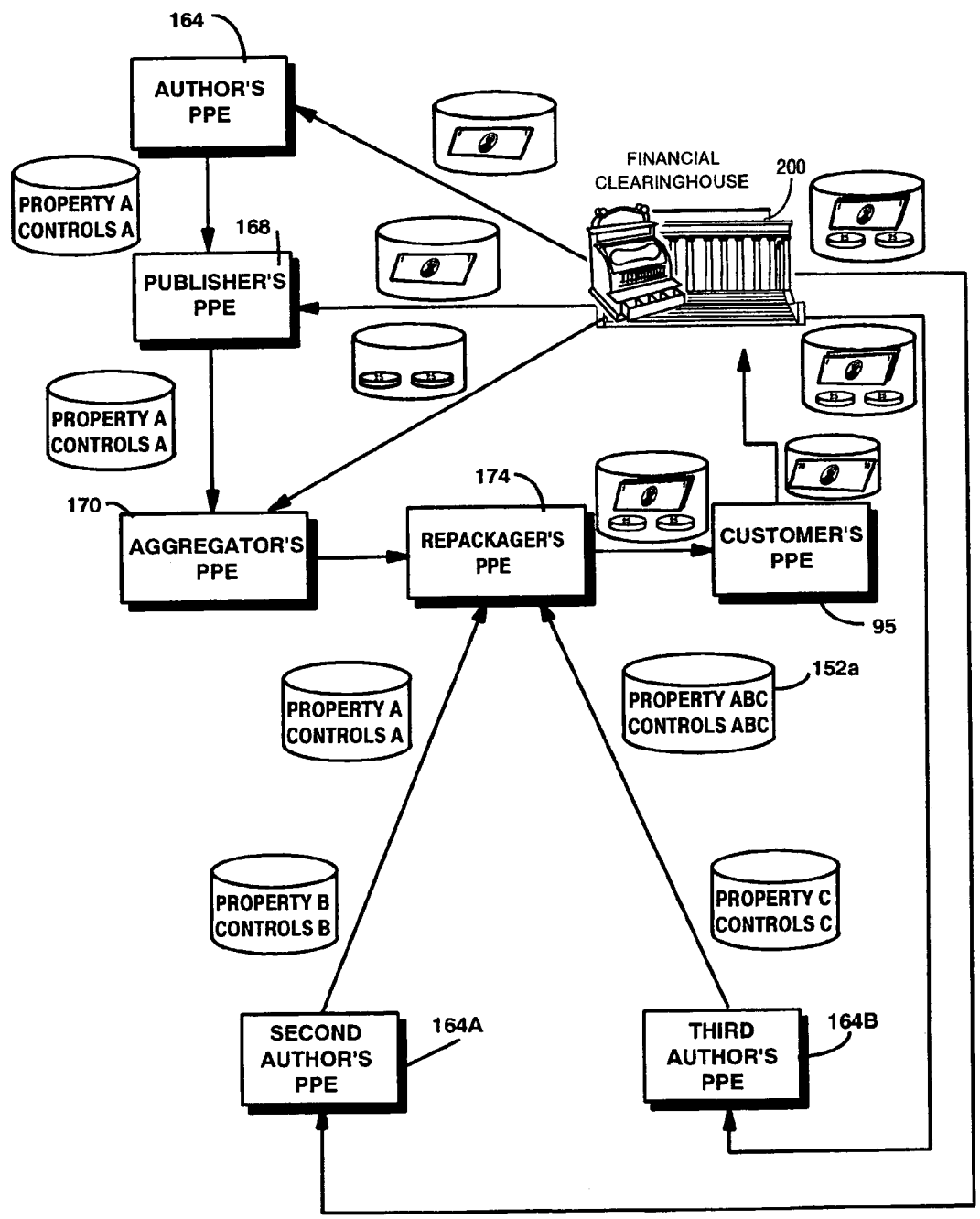
FIG. 27 shows an additional example of how value chain (payment) disaggregation and redistribution may be accomplished through a financial clearinghouse.
Figure 28:
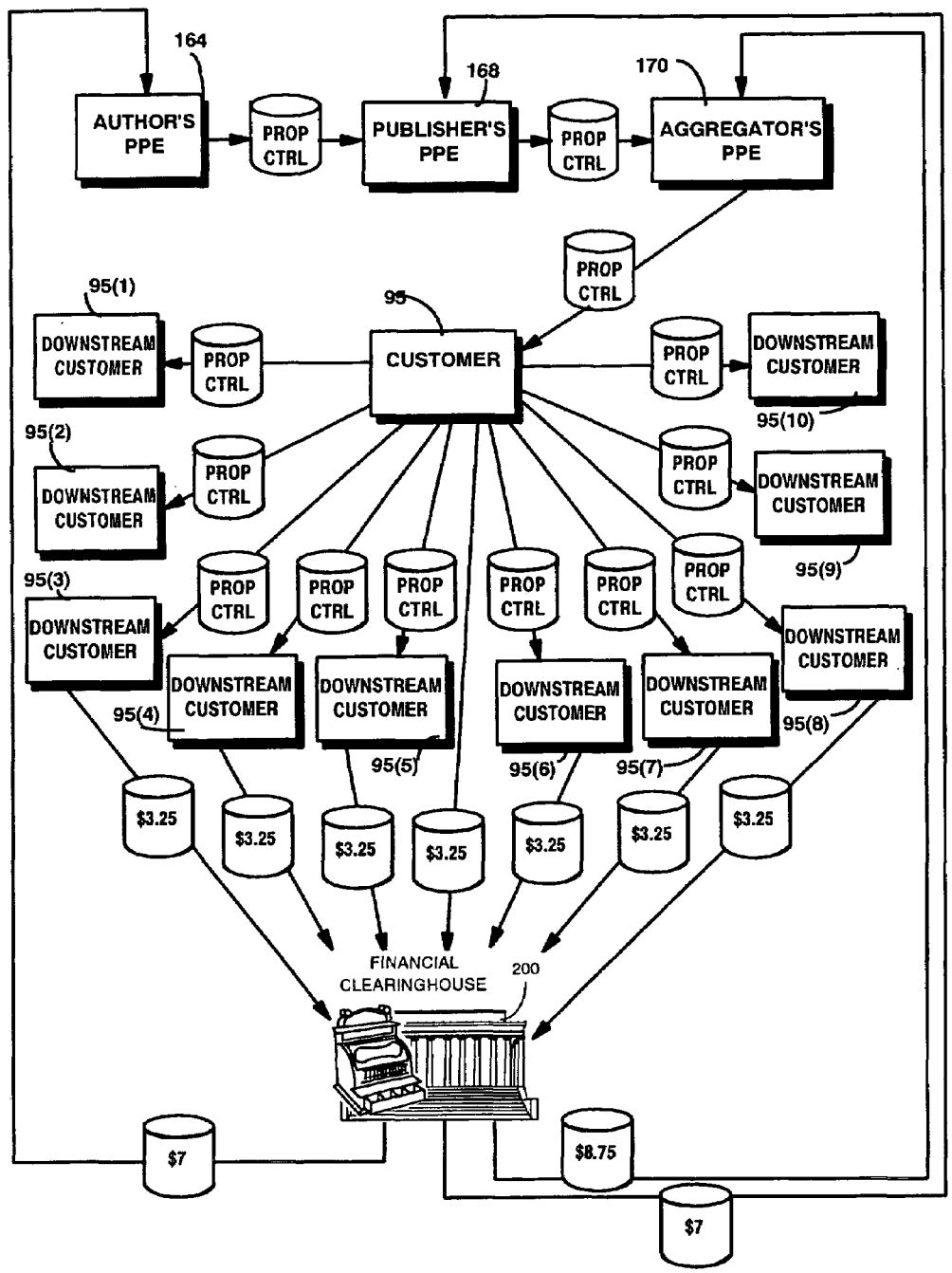
FIG. 28 shows an example superdistribution payment and redistribution scenario using a financial clearinghouse for financial clearing.

FIGS. 27 and 28 show still additional payment disaggregation examples to further illustrate the flexibility in which Distributed Commerce Utility 75 can handle these and other arrangements. The FIG. 27 example shows the customer's payment being split up among the author 164, the publisher 168, the aggregator 170, a repackager 174 and two additional authors ~164a, 164b supplying additional works incorporated within the electronic property being provided to the customer. The FIG. 27 example is particularly applicable, for example, where the repackager 174 takes content from several sources on related matters and combines them into mixed source products such as multimedia combinations, "current awareness" packages, or newsletter-like publications for sale to interested parties.

For example, repackager 174 might publish a newsletter on contemporary politics, and select an essay written by author 164 for publication along with two other works written by authors 164a, 164b for publication in the next newsletter issue. Authors 164, 164a and 164b may grant repackager 174 the right to reformat and redistribute the work. Taking advantage of this reformatting right, repackager 174 may create the latest issue of the newsletter and distribute it in a secure electronic container for reading by customer 95. In this example, the secure electronic container 152a may contain at least four separately "delivered" sets of business requirements—one for each of the three works (as specified by each of author 164, author 164a and author 164b) and one for the overall newsletter (as specified by repackager 174). Alternatively, the various works and/or the controls applying to them can be sent and delivered in independent secure containers 152, and/or some or all of the works and/or controls may be located remotely.

To read the newsletter, customer 95 opens electronic container 152a. Suppose that the newsletter cost (as set by repackager 174) is $10 per issue. The customer's $10 payment or payment authorization is sent to financial clearinghouse 200, which resolves it to give each value chain participant compensation (for example, author 164 may get $1, publisher 168 may get $1, aggregator 170 may get $0.50, each additional author 164a, 164b may each get $1 and the repackager 174 may get the rest—all as directed by the applicable electronic controls. Thus, the repackager can be compensated for selecting appropriate articles on the topic and combining them in a single, easy to read publication, and may also bring its own brand name recognition as an indicator of overall quality, and may itself add unique content of its own creation.

FIG. 28 shows a "superdistribution" example. One key rights holder concern is copyright infringement from "pass-along"—that is, illegal duplication and redistribution. This pass-along problem is serious in digital environments such as the Internet. The virtual distribution environment disclosed in the Ginter et al. patent specification and the administrative and support services arrangements disclosed in this specification fundamentally transform pass-along from a clear threat to an important opportunity. Because of the unique, automated, secure electronic management of value chain rights provided by the virtual distribution environment in the preferred embodiment, the consumer can be treated as a trusted member of the value chain. This makes possible a superdistribution model in which all customers become potential distributors. Since revenue from superdistribution incurs only minimal rights holder costs, superdistribution provides large profit potentials to holders of rights in successful works.

Looking at FIG. 28, assume that customer 95 received a work from aggregator 170 that she likes so much that she wants to pass it along to several friends and colleagues. Assuming that aggregator 170 has granted customer 95 the right to redistribute the work, the customer may simply and easily be able to send a copy of the work to each of any number of additional potential customers 95(1) . . . 95(N). These additional people may know customer 95 and believe that she would not be sending them something that was not potentially interesting and of high quality. In addition, the downstream customers may be able to read an abstract or see extracts of the work (e.g., view a trailer of a film, read the first chapter of a novel, or the like) without triggering payment.

After reading the abstract or watching the first five minutes of the film without cost, suppose six of the downstream customers 95(3)–95(8) agree to pay for the content at an example cost of $3.25 each. Financial clearinghouse 200 may ensure that the author 164, publisher 168 and aggregator 170 each receive an appropriate share of the income (e.g., $7 to the author, $7 to the publisher and $8.75 to the aggregator).

Superdistribution makes possible any number of levels of redistribution. For example, suppose that of the six downstream customers 95(3)–95(8), three of them decide to pass the work along to each of six additional potential customers—so that eighteen additional people receive a copy. Since the redistributed works have associated control structures mandating the same payment arrangement, author 164, publisher 168 and aggregator 170 each receive additional payments from each of these new customers. The snowballing effect of redistribution can continue in this manner across any number of consumers for a long time, and can dramatically increase revenue with minimal additional cost to the value chain members.

Payment Aggregation or Bundling

Micro-fees and micropayments may become an important basis for content usage transactions. For example, a consumer might pay each time she views a particular work or uses a certain piece of computer software, or listens to a certain piece of music. Different payment arrangements can be flexibly provided so that the consumer might have the option of paying a larger initial fee for unlimited usage or smaller micropayments on a per use basis. In addition, micropayments may be the least burdensome and most practical way for Commerce Utility Systems 90 to be compensated for their services. The ability to efficiently handle micropayments is thus very important in terms of supporting and enabling small charges.

Traditional financial payment mechanisms, such as credit cards, checks and the like, are unsuited to manage micropayments. These systems typically have levels of transaction overhead that impose severe burdens on business models based on many purchases below $5 each. For example, if it costs $0.50 to handle a payment transaction, it becomes uneconomical to handle payments for less than some value, perhaps $2 each because the cost of handling the payment is such a large portion of the transaction value, or even exceeds the payment itself. Hence, traditional financial payment mechanisms favor larger purchases and disfavor micropurchases.

Figure 29:
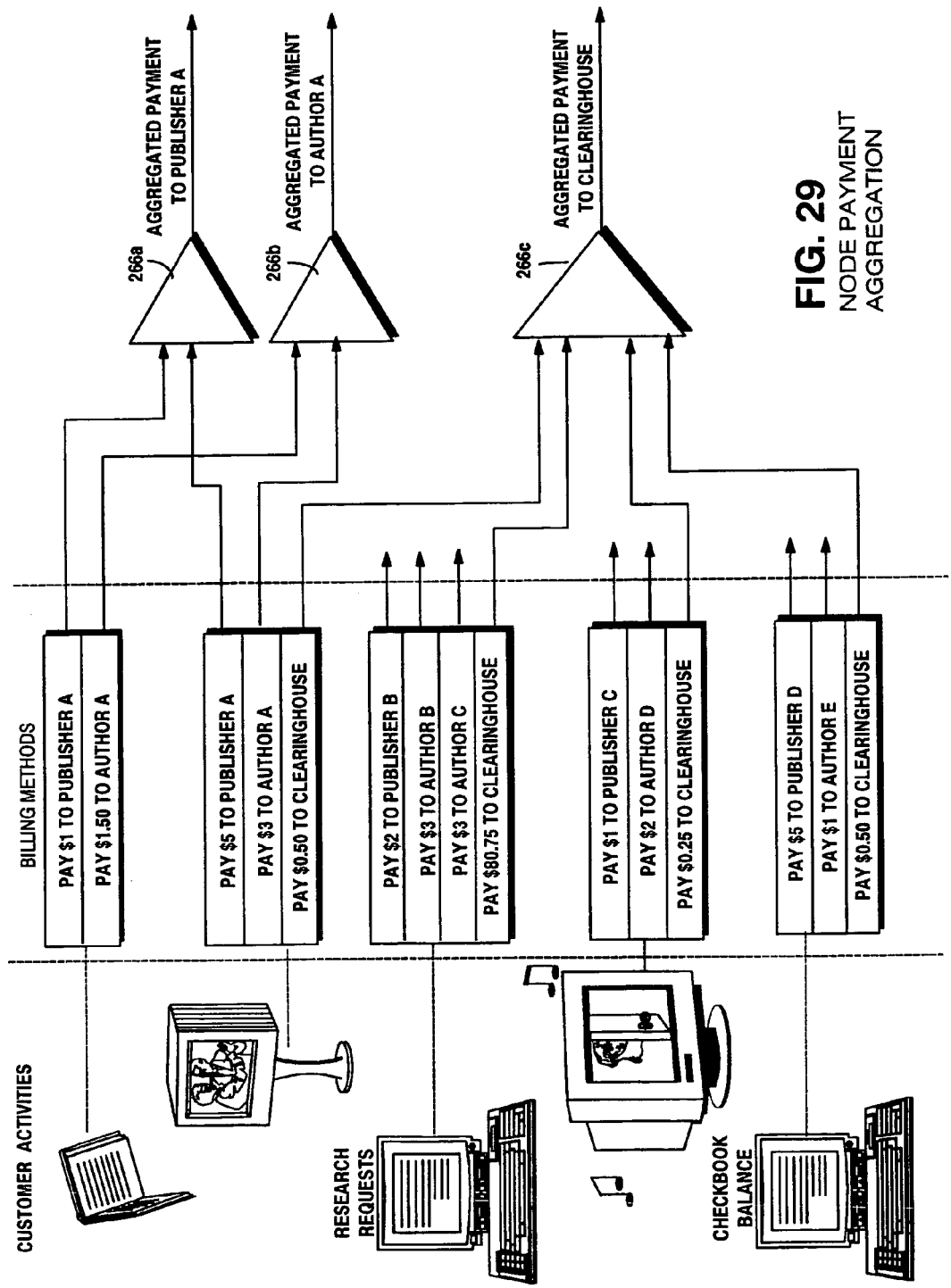
FIG. 29 shows an example value chain (payment) aggregation at a consumer protected processing environment or other site.

FIG. 29 shows how payment aggregation or bundling can be used to circumvent these concerns by reducing the number of individual financial transactions that need to be cleared, and/or by reducing the amount of messaging required to clear those transactions. The example payment aggregation shown in FIG. 29 may be performed on the consumer's own electronic appliance 100 within a protected processing environment 154; or at a centralized financial clearinghouse 200; or part of it can be performed at the appliance and part of it performed at the centralized clearinghouse. This payment aggregation process can aggregate or combine many small payments together into larger payments—or into a bundle of small payments that can be handled all at once. Such larger payments and/or bundles can be reported periodically along with other transaction data if desired to be reconciled and recorded by Distributed Commerce Utility 75. This ability to aggregate smaller payments has important beneficial effects in terms of increasing efficiency, reducing the number of individual transactions that need to be cleared, and decreasing messaging traffic over electronic network 150. Of course, payment aggregation is not necessarily suitable for every transaction (some large, critical or risky transactions may require real time clearing, for example), but can be used in a large number of routine transactions to reduce the burdens on Commerce Utility Systems 90 and overall system 50.

In one variation on this concept, payment aggregation may preserve the amounts of each individual transaction to allow high degree of reporting granularity but may be used to trigger when reporting occurs (e.g., after X dollars have been charged, or Y number of transactions have occurred) so that many individual transactions can be bundled and transmitted/processed together. This type of aggregation is useful for reducing the number and frequency of individual messages traveling over electronic network 150. In such instances, the reporting electronic appliance 100 may report: (i) the sum of the aggregated individual transactions, or (ii) each of the individual transactions, or (iii) both, or (iv) a combination of the two.

FIG. 29 shows that a consumer may use his or her electronic appliance 100 for a number of different activities, such as, for example, reading a novel, watching a video program, obtaining and reviewing research results, interacting with and enjoying multimedia presentations, and home financial management such as checkbook balancing. A per use micro-payment may be associated with each of these activities. For example, the consumer might pay $1 to a publisher A and $1.50 to an author A each time the consumer accesses an electronic version of a work written by the author and distributed by the publisher. Suppose that the author A's works have become so popular that they have been made into films. The consumer might pay on a per-use basis to watch one of these films—paying the publisher A $5, the author A $3 and Distributed Commerce Utility 75 $0.50.

Payment aggregators 266 (which may, if desired, operate at the consumer's site within the protected processing environment 154 provided by the consumer's electronic appliance 100) may aggregate payments to common entities, keeping a running total of the amount of money owed to publisher A, the amount of money owed to author A, and the amount of money owed to the Distributed Commerce Utility 75. This running total can be incremented each time the consumer triggers an additional payment event. The aggregated payment amounts can be periodically or otherwise reported to financial clearinghouse 200 or other Commerce Utility Systems 90 based on certain time intervals (for example, weekly, monthly, or daily), the occurrence of certain events (for example, the consumer has exceeded her credit authorization and needs a new one, certain electronic controls have expired, etc.), and/or a hybrid of any or all of these techniques.

Figure 30:
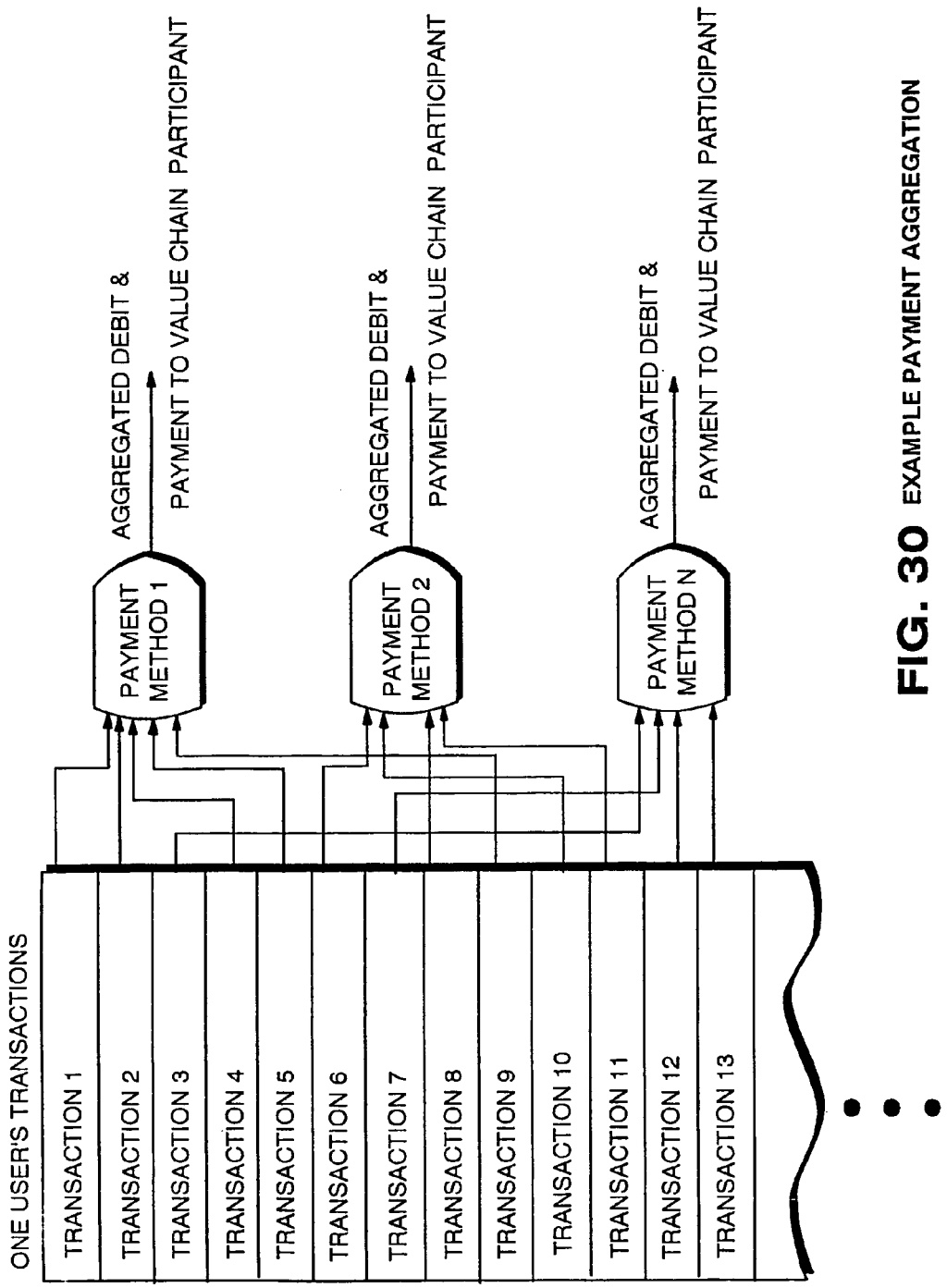
FIG. 30 shows example value chain (payment) aggregation across multiple transactions.

FIG. 30 shows another example of payment aggregation across a number of consumer transactions. In this example, payments to the same value chain participants and using the same payment method are aggregated together to provide totals. This payment aggregation—which may take place at the consumer's site and/or within a financial clearinghouse—reduces the number of overall financial transactions that need to be cleared. This increases efficiency and throughput, and decreases the cost for handling each individual consumer transaction.

Figure 31:
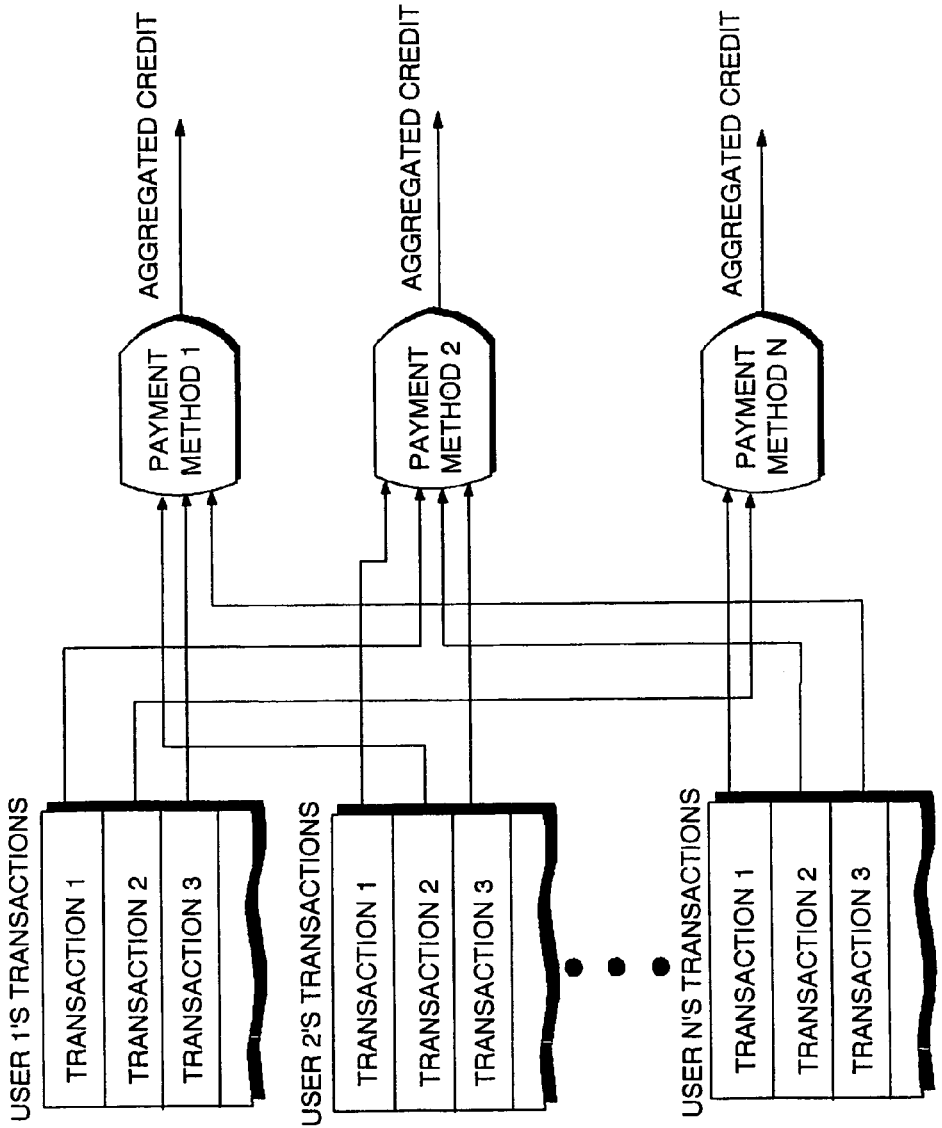
FIG. 31 shows example value chain (payment) aggregation across multiple transactions and multiple consumers.

FIG. 31 shows a still additional payment aggregation example in which aggregation is performed over transactions of a number of different consumers. For example, all transactions using a particular payment method pertaining to a particular provider could be aggregated by a financial clearinghouse 200. Note that the payment aggregation techniques shown in FIGS. 29–31 do not necessarily result in loss of individual transaction detail. In other words, it is still possible for consumer electronic appliances 100 to log and report detailed per-transaction information, and for financial clearinghouse 200 and/or the usage clearinghouse 300 to report detailed usage information on a transaction-by-transaction basis—even though individual transaction payments are being combined for more efficient payment processing and handling. This ability to separately handle and process more detailed and granular usage information while at the same time aggregating payments can provide a high level of auditing accountability without unduly burdening the payment handling mechanism. In some cases, loss of the detail records leads to savings on the clearinghouse side. They may be discarded, but there are advantages to keeping them around on the user's system and/or in a repository on a Commerce Utility System 90. If there is a billing dispute, for example, the local copy of the detail records might serve as useful evidence of what actually occurred—even if they were never transmitted to the clearinghouse.

Figure 32:
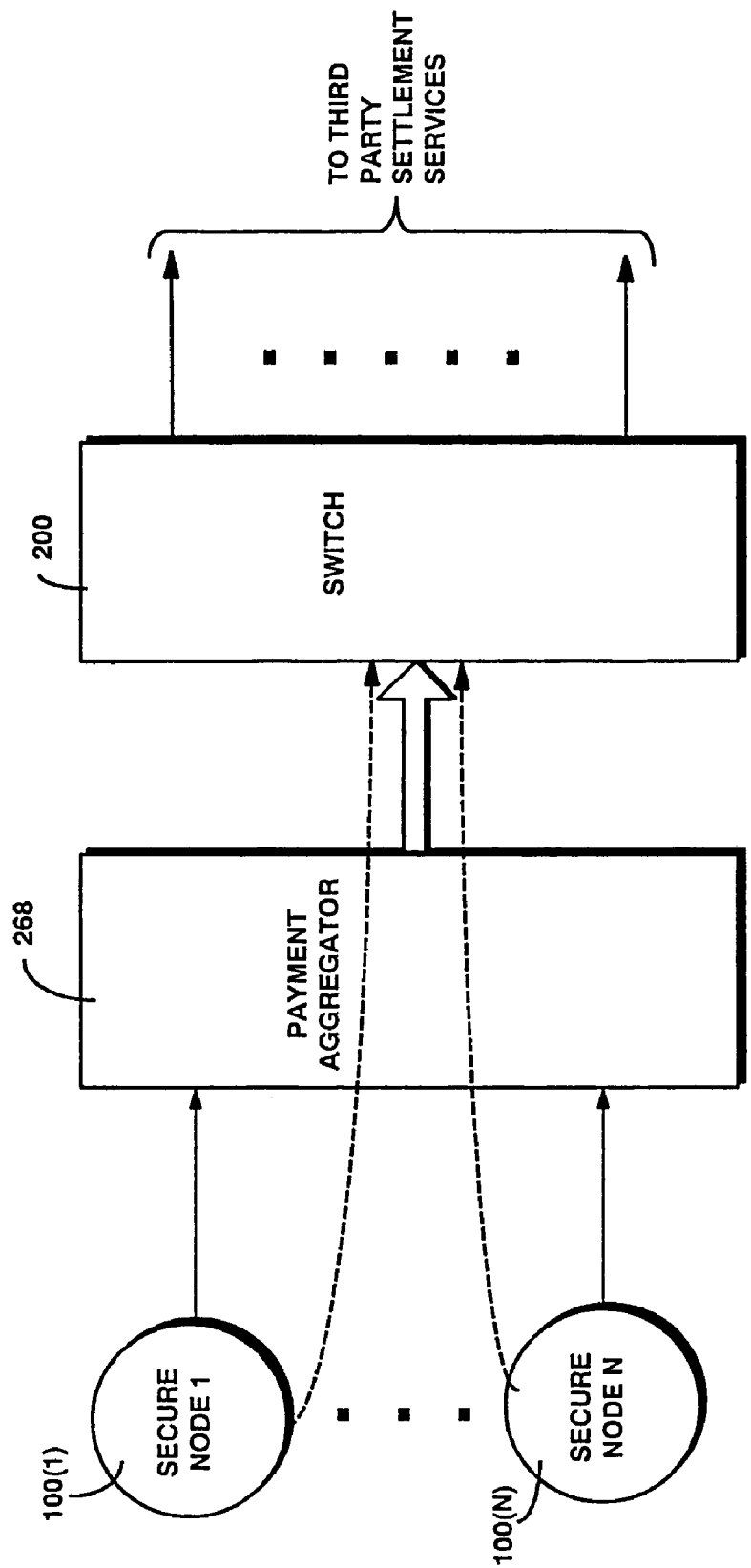
FIG. 32 shows an example Commerce Utility System architecture providing payment aggregation.

FIG. 32 shows how an example financial clearinghouse 200 might be modified to include a payment aggregator component 268. Payment aggregator 268 could be used to aggregate payments incoming from a number of different consumer electronic appliances 100 or other sources, and provide those aggregated payments to switch 200 for handling via third party settlement services, for example. Payment aggregator 268 could selectively aggregate only certain payments while permitting other payments to pass through directly to switch 200 for direct handling without aggregation. Payment aggregation can be based on a number of different factors. For example, payments can be aggregated based on consumer, provider, payment method, or a combination of any or all of these factors. This aggregation function can be performed entirely or in part within consumer 95 electronic appliances, or it could be performed centrally by a centralized clearinghouse 200.

Usage Clearinghouse 300

Figure 33:
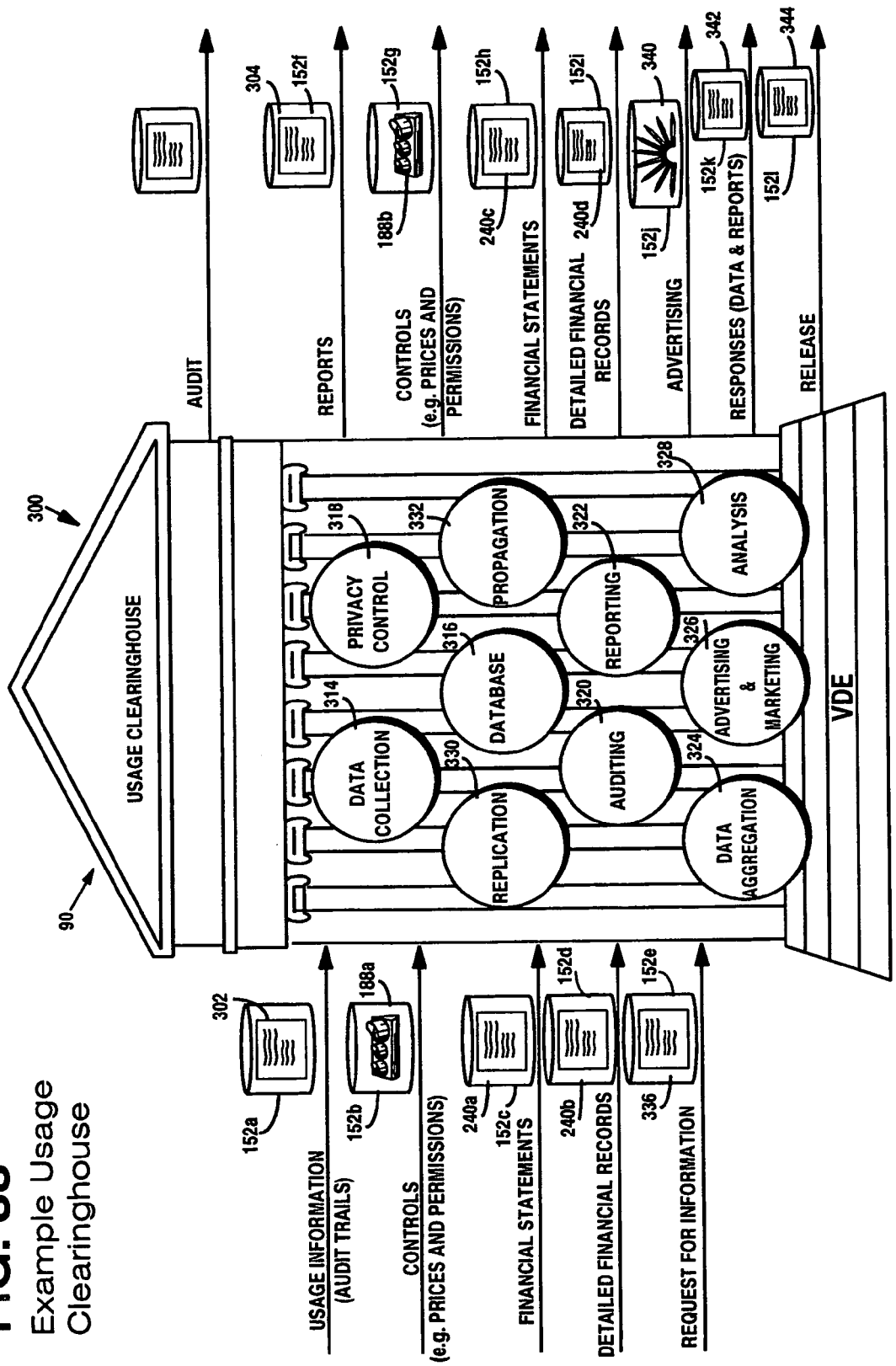
FIG. 33 shows an example usage clearinghouse Commerce Utility System.

FIG. 33 shows an example usage clearinghouse Commerce Utility System 300. Usage clearinghouses services and functions, in general, may collect, analyze and "repurpose" detailed, summary, and/or derived usage information about the use and/or execution of digital properties and/or digital processes. This information may include any information descriptive of electronic transaction activity. Usage clearinghouses and/or support services may, for example, provide and/or facilitate the following:

- Independent auditing and reporting (which may be presented independently of financial settlement clearing services);
- General market researching;
- Negotiating, implementing, determining, and communicating levels of privacy and confidentiality with customers and value chain participants-regarding such usage information; and
- Mass customized marketing and consolidated list selling, renting, or licensing.

In more detail, usage clearing services in accordance with the present inventions may provide, for example, any combination of the following detailed features and/or functions:

- Compiling, aggregating, using, deriving and/or providing information descriptive of and/or otherwise relating to, use of a secure container(s), secure container contents, and/or any other content and/or any digital control process(es), wherein such information describes and/or otherwise relates to (a) one or more users of content and/or processes, (b) one or more classes of content, control processes, uses of content, and/or users, and/or (c) one or more recipients of such usage information.
- Enabling tracking and reporting of content and/or process control usage and/or processing information at a highly granular (e.g., detailed) level.
- Can collect, aggregate, analyze, summarize, extract, report, distribute, rent, license, and/or sell usage information.
- Employing information derived from user exposure to content, such as advertising, information materials, entertainment, training materials, business productivity software applications, etc., and securely supplying at least a portion of such derived information and/or related to such information, through the use of VDE mechanisms in the preferred embodiment, to usage information aggregating and/or analyzing clearinghouses, and where such clearinghouse securely provides at least a portion of said usage information, or information derived from said information to at lest one further clearinghouse and/or value chain rightsholder; and wherein said clearinghouse may securely provide differing derived usage information to different other parties who have a clearinghouse role or other rightsholder role.
- Using the "information exhaust" audit trails created by, and/or derived from, user protected processing environment metering based on a variety of different techniques (for example those disclosed in Ginter, et al.).
- Ability to collect and analyze detailed usage information such as the number of times a digital property or any portion of a property has been opened, extracted from, embedded into, or executed; or the length of time a value chain participant has used a property such as an interactive game or multimedia presentation, computer software, or modules or subparts of such products.
- Providing a variety of repurposing capabilities for usage information arriving from consumers or other secure protected processing environments.
- Providing independent third party auditing capabilities useful, for example, for archiving and non-repudiation.
- Providing information based upon usage auditing, user profiling and/or market surveying related to use of one or more secure containers and/or content and/or VDE managed process control in the preferred embodiment.
- Providing neutral, trusted third-party audit usage aggregating and reporting services for rights holders, consumers, and/or other value chain participants and/or interested parties such as governmental bodies (information for taxation, law enforcement, commercial surveying and statistics, etc.).
- Providing audit opportunities in conjunction with rules and controls rights and permissions clearing (for example, to provide a report about which rules and controls permissions and rights, were exercised, for example by whom, for what, and when—thereby tying actual user activity back to specific permissioning and rights and/or rules and controls templates).
- In the preferred embodiment, providing standardized and custom reporting and analyzing based upon VDE rules and controls and produced and delivered in VDE containers to each and/or any one or more grouping of content creators, content distributors, industry analysts, trade associations, and any other stakeholders and value chain participants, and/or any other interested parties such as government statisticians, regulators, and/or taxation authorities.
- Providing any combination of raw, refined, summarized, derived, and aggregated trusted data reporting for the support of plural business models within any value chain, and/or across and/or plural value chains.
- Distributing, to value chain participants and other parties within or outside of the electronic community, usage information separately from and/or with financial settlement clearing services.
- Supporting privacy and confidentiality controls fully protecting rights of all value chain participants interests related to usage information, including, for example, rights inherent in VDE chain of handling and control managed business models.
- Can accommodate privacy concerns, e.g., to not reveal more information than a consumer or value chain content distributor, aggregator, repurposer, or other user of an electronic device that employs, in the preferred embodiment, VDE for secure, managed content or other process control, authorizes, and, for example, to inform such authorizing user of what kind of information is being gathered and/or cleared).
- Can be trusted to automatically, based at least in part upon rules and controls, conceal (e.g., encrypt), remove, and/or transform one or more portions of confidential or proprietary usage information before further processing of such information or delivering of such information to any one or more additional parties, including any further usage clearinghouse(s), thereby efficiently protecting privacy and confidentiality, including protecting business trade secret information.

Protecting key business model information from prying eyes of other interested parties, and/or from inadvertent disclosure to other interested parties and/or to the public, thereby laying the foundation for truly trusted, commercial networks.

Allowing value chain participants, including, for example, commercial publishers and distributors, and/or consumers and service and/or product provider organizations, to negotiate the level of detail of usage information to be conveyed to any given value chain rightsholders, and wherein such level of detail may differ according to who the specific receiving parties are and the specific type and/or subtype of usage information, and where plural, differing levels of detail for differing portions of such usage information may be provided to a given usage information receiver and/or as a given deliverable, and where such determination of detail is, at least in part, determined by the rights of a given party at least in part described by VDE rules and controls information in the preferred embodiment.

Allowing consumers and organizations to negotiate the level of detail of information conveyed to value chain rightsholders.

Allowing consumers or other value chain participants—creators, publishers, distributors, repurposers—to specify and/or negotiate the level(s) of detail, aggregation and/or anonymity they desire with respect to usage information regarding their usage of any given piece of content, content class, specific process, process class, and/or payment requirement (e.g., anonymity, and/or the maintenance of privacy related to some or all usage details, may require a payment premium to offset the loss of the value of such information).

Allowing information consumers and/or other value chain participants to customize their "information exhaust" and to set rules and controls for how they wish to have their usage information aggregated, or otherwise used—subject to the competing requirements of rightsholders to receive information they are entitled to and/or receive information that user and rightsholders mutually, electronically agree may be provided to rightsholders. Users and/or one or more rightsholders may have the right to specify limits upon (e.g., use VDE chain of handling and control), and/or describe specific usage information that may or must be to be delivered to, one or more other rightsholders.

Supporting substantial value chain participant control over what kind of value chain participant usage information is accumulated, who can access which information and how such information may be used, how such information is gathered and processed, and the extent that usage records are tied to a specific value chain participant or organization.

Securely using containers (e.g., using VDE secure containers in combination with VDE protected processing environment and communications security capabilities as described in Ginter, et al.) in any step, part, and/or process of providing secure usage clearing services.

Supporting providing discounts, subsidies and/or coupons to value chain participants, for example to consumers, distributors, repurposers, etc., in exchange for usage data or more finely grained usage data (for example, ameliorating privacy concerns in some contexts).

Generating and supplying to interested parties marketing research and reporting and consolidated marketing lists (for targeted mailing, direct sales, and other forms of targeted marketing. Such materials are generally analogous to independent magazine and newspaper circulation audits, television audience ratings reports, and/or commercial targeted marketing lists, but generating in a highly efficient, distributed, and secure electronic environment. Such materials, when desired, can be provided with important new forms of detail (e.g., viewing, printing, extracting, reusing, electronically saving, redistributing, etc.), with far greater granularity of information, and with customized, selective reporting of materials based upon recipients requests, payments, rights, and/or conflicts of interest with one or more parties who have a rightsholder's interest in one or more portions of the underlying information.

Using detailed usage information to automatically generate classification hierarchies, schemes, groups, and/or classes, and automatically assigning individuals, groups of individuals, organizations, groups of organizations, digital and/or analog content or groups of digital and/or analog content to one or more classes derived from usage data created, collected, transmitted, in conjunction with at least one secure container and/or VDE in the preferred embodiment.

Supporting advertising and marketing, including supporting efficient value chain automation of the delivery of such services, such as automatic targeting or delivery of advertising and/or other marketing materials to defined sets (e.g., one or more classes) of consumers, professionals, employees and companies, in which the sets may be defined by self-selection, usage data, usage data profiles, or by any other means, and wherein said sets may be comprised of any one or more value chain participants (e.g., creators, consumers, distributors, service providers, web sites, distributed clearinghouses) and wherein said one or more participants may receive differing, customized materials, and wherein said receiving participants may redistribute such materials, if authorized by rules and controls, and where such participants may receive credit, coupons, monetary payment, and/or other forms of consideration for such redistribution, and where such redistribution may take the form of directing some or all of such received materials to one or more other parties at least in part based upon self-selection, usage data, usage data profiles, or by any other means, and wherein all such processes may be securely managed (e.g., supported) by internodal VDE chain of handling and control in the preferred embodiment.

Determining payments and/or other consideration due to rights holders from advertisers based on value chain user exposure to advertising and at least in part, securely automating the distribution of portions of such consideration among plural parties having rightsholder interests related to the content and/or processes that served as a basis for determining such consideration.

Supporting superior, targeted market segmentation and the design of more suitable information products and business models based on direct, more specific and detailed usage data and on customer and value chain preferences implied, explicit, and/or automatically derived from usage information, user profiles, class(s) identification information, etc.

Enabling "private" usage clearinghouses (a usage clearinghouse controlled and/or operated by an organization) to acquire certain detailed usage information and where such usage clearinghouses may perform usage analysis and/or other processing of such information and provide to more centralized and/or other party clearinghouses and/or other value chain participants, selectively limited usage information (e.g., employing higher level abstractions, summary information, restrictions on and/or manner of use of usage information—viewing, printing, saving, redistributing, etc.) for some or all of such usage information, and where differing limitations on such usage information may be applied to usage information derived from usage of differing classes of content, processes, users, and/or user groups, and where such limitation capabilities provide important additional protection of the confidential trade secret information of a company or other organization by concealing the detailed nature of certain internal activities, and where there may be a requirement by one or more other parties in a value chain for payment and/or other consideration in return for the retention of such detailed usage information.

Enabling organizations to employ private usage data clearinghouses on corporate Intranets, where such clearinghouses are integrated with organization document workflow and/or data warehousing systems.

Receiving, with private usage organization (e.g., corporation, government agency, partnership, or any other organized operating entity) clearinghouses, usage data from electronic appliances within the organization, and aggregating records into detailed reports for internal use, and/or reporting raw, detailed data for internal use, but only aggregating usage data into summary reports for external distribution, for example, to rights holders and/or other value chain participants, and/or one or more commercial clearinghouses, and where detailed data for internal use is, in the preferred embodiment, protected as VDE protected content and access or other use of such content is limited to specified parties and/or in specified ways based, at least in part, on the specified parties securely maintained electronic identity, including, for example, any relevant party class identification information (e.g., member of a certain research group, senior executive officer) that has associated specific information usage privileges.

Identifying and supplying, through private usage clearinghouses, usage related information providing important value usage data for allocating internal organization resources, directing research, and other important business purposes.

Distributing usage clearing (e.g., for efficiency and/or other reasons).

Distributing usage clearing functions across a network or other system (for example, every consumer and/or other value chain participant node is potentially a distributed usage clearing service at least in part initiating its own, secure usage clearing, and where such participant node may communicate usage information directly to one or more other participants) and, in the preferred embodiment, in accordance with rules and controls and other VDE techniques as described in the Ginter, et al patent specification.

Hierarchically organizing usage clearinghouses, at least in part to protect confidentiality at each level in the hierarchy.

Granting authority and/or providing services to, or in conjunction with, one or more distributed usage sub-clearinghouses whose operations may be located logically and/or physically elsewhere, such as within a company or government agency and/or within one or more jurisdictions and/or serving subsets of the overall business focus area of a senior usage clearinghouse.

Distributing and/or otherwise authorizing usage clearing functions across a system or network, for example, where every consumer and/or certain or all other value chain participant protected processing environment (node) can potentially support a distributed usage clearing service, and function in the context of the overall Distributed Commerce Utility.

Initiating its own, secure usage clearing transactions directly with one or more other participants.

Providing interoperable operation with one or more other participant interoperable nodes, using any or all activities employing Virtual Distribution Environment techniques.

Use of clearinghouse to generate usage information used, at least in part, in the design and/or marketing of products and/or services related to the products and/or services whose usage is described by such usage information.

May be organized hierarchically, peer-to-peer, or in a combined mode where responsibility for usage clearing may be distributed in differing fashions for differing commerce models and/or activities and/or value chains, and where certain one or more parties may be, for example, hierarchically more senior to other parties in one or more instances, and hierarchically a peer or less senior in one or more other instances, that is, the relationship among participants is programmable and may be set (and later modified) to represent one or more desired usage clearing arrangements for given commerce activities, value chains, or models.

FIG. 33 shows an example usage clearinghouse 300 from a process point of view. Usage clearinghouse 300 in this example collects, analyzes and reports on the usage of digital information including, but not limited to, the usage of digital content. Usage clearinghouse 300 in this example performs the following functions:

Data collection 314,
Database management 316,
Privacy control 318,
Secure auditing 320,
Secure reporting 322,
Data aggregation 324,
Advertising and marketing 326,
Usage analysis 328,
Replication 330, and
Propagation 332.

Communication between usage clearinghouse 300 and other electronic appliances 100 may be by way of secure electronic containers 152, if desired. As explained in more detail in connection with financial clearinghouse 200, usage clearinghouse 300 may receive the containers in real time and/or on an asynchronous receipt basis. In the usage clearinghouse 300, the real time requirement may involve advertising or ratings information that loses some or all of its value as a function of time (e.g., if certain ratings information isn't delivered by a particular time, it may no longer be relevant in a given market analysis; or if advertisers don't receive usage information promptly, they may not be able to respond to customer tastes as effectively). Another case may involve a required delivery of usage information (e.g., a user on vacation returns to find their required audit date and grace period has expired, and their use of certain properties is prohibited until the audit is performed). The asynchronous delivery case would still be preferable in some instances for the same reasons as above in connection with financial clearinghouse 200.

Data collection function 314 is used to gather usage records 302 in addition to other types of information, such as, rules and controls 188 (which may provide information concerning prices and permissions, for example), financial statements 240a, detailed financial reports 240b, and requests for usage information and/or analysis 336. Data collection function 314 may closely interact with database management function 316—resulting in various types of information being stored and maintained in a usage or other database. Replication and propagation functions 330, 332 may be used to synchronize the contents of database 316 with other databases (for example, maintained by other usage clearinghouses 300) and/or to provide a distributed database across a number of secure network protected processing environments or electronic appliances.

Data aggregation 324 and analysis 328 may be used to analyze the contents of data collected by data collection function 314 and/or stored within database 316, enabling usage clearinghouse 300 to perform auditing 320 and/or reporting 322. Privacy control 318 may be used in conjunction with reporting function 322 to expose only certain information and not others to third parties—thereby protecting the privacy and confidentiality concerns of consumers for whom usage information has been collected. Such pending control 316 can be expressed in rules associated with the containers in which the information arrived.

Reporting function 322 may generate a variety of usage auditing reports 304. In addition, usage clearinghouse 300 may be used to provide advertising and/or marketing support 326 (e.g., to help target advertising to demographically appropriate consumers and/or to provide market and advertising research). Thus, in one example, usage clearinghouse 300 may itself produce and/or distribute advertising 340 for viewing by certain targeted consumers or deliver such advertising on behalf of others. Usage clearinghouse 300 may also generate customized responses 342 in response to information requests 336, and can also generate release signals 344 authorizing electronic appliances 100 to delete and/or make "no longer pending" the usage information from local databases once associated audit records have been transferred to usage clearinghouse 300 and that transfer has been confirmed. Consumer 95 may have an interest in keeping rather than deleting this usage information after it has been "released" (e.g., as a matter of curiosity, to monitor others' behavior (employees, children, etc.))

Usage clearinghouse 300 may generate its own controls 188b to, for example, govern how usage information, market analysis information or other information can be used by others. For example, usage clearinghouse 300 might be prepare a proprietary report or analysis that it provides to third parties in return for compensation. Usage clearinghouse 300 may insist that the people that they provide the report to do not redistribute the report to anyone else. Usage clearinghouse 300 may enforce this requirement electronically by delivering the report within one or more electronic containers 152, and associating electronic controls 188b with the report. These electronic controls 188b could enforce the "no redistribute" prohibition along with other conditions grants and/or limitations (e.g., the report can't be modified, the report can be printed and viewed, the report may be excerpted, etc.).

As mentioned above, usage clearinghouse 300 may also receive financial statements 240a and/or detailed financial records 240b or other financial information—and may generate its own financial statements 240c and/or detailed financial records 240d. For example, the usage clearinghouse 300 might provide a service to content providers in which the usage clearinghouse 300 receives controls 188a from content providers similar to the controls delivered to consumers 95. Based on a comparison of these data, usage clearinghouse 300 might make estimates as to the amounts of money that the content providers should expect to receive from financial clearinghouses 200. Usage clearinghouse 300 might thus provide an independent audit function—serving as a double check on financial clearinghouses 200 and providing a fraud detection function (e.g., people submitting usage records that don't have associated payments or otherwise incorrect payment amounts may be detected by the usage clearinghouse 300). In addition, the control 188 might represent closed models that content providers are considering implementing, and usage clearinghouse 300 might then offer a service in which it runs a comparison against the usage data it actually collects to build a model of what the financial results might look like if the content provider actually instituted the proposed model.

Figure 34:
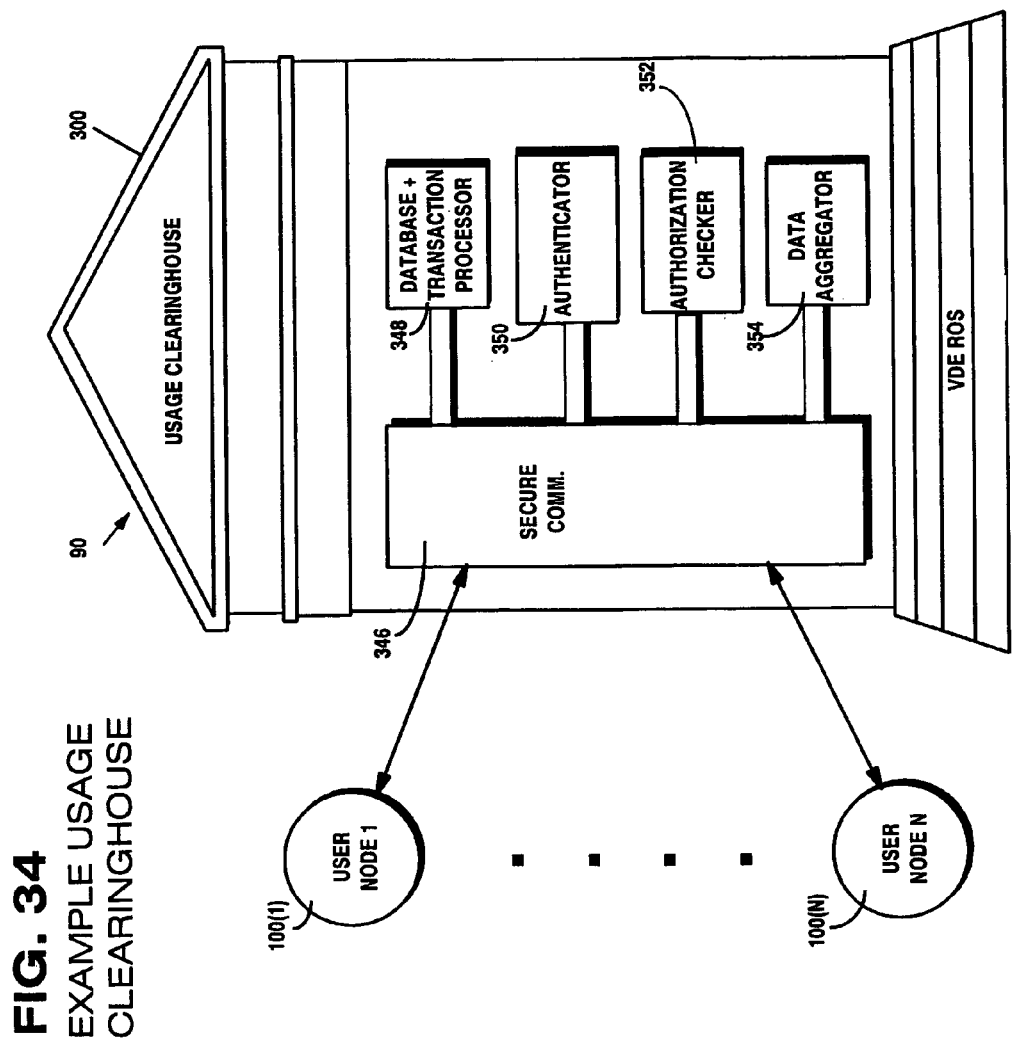
FIG. 34 shows an example usage clearinghouse architecture.

FIG. 34 shows an example architecture of usage clearinghouse 300. In this example, usage clearinghouse 300 includes a secure communications facility 346, a database and transaction processor 348, an authenticator 350, an authorization checker 352 and a data aggregator 354. Usage clearinghouse 300 architecture may be based on the rights operating system architecture shown in FIGS. 12 and 13 of the Ginter et al. patent disclosure.

Secure communications 346 provides communications with a variety of electronic appliances 100 over electronic network 150 via secure containers 152 in this example. Database and transaction processor 348 in this example performs most of the FIG. 33 functions. An authenticator 350 may be used to authenticate consumers and/or data, an authorization checker 352 may be used to check authorizations, and a data aggregator 354 may be used to perform the data aggregation function 324. Authenticator 350 and authorization checker 352 perform authentication functions as described in the Ginter et al. disclosure in connection with secure electronic appliances and protected processing environments.

Figure 35:
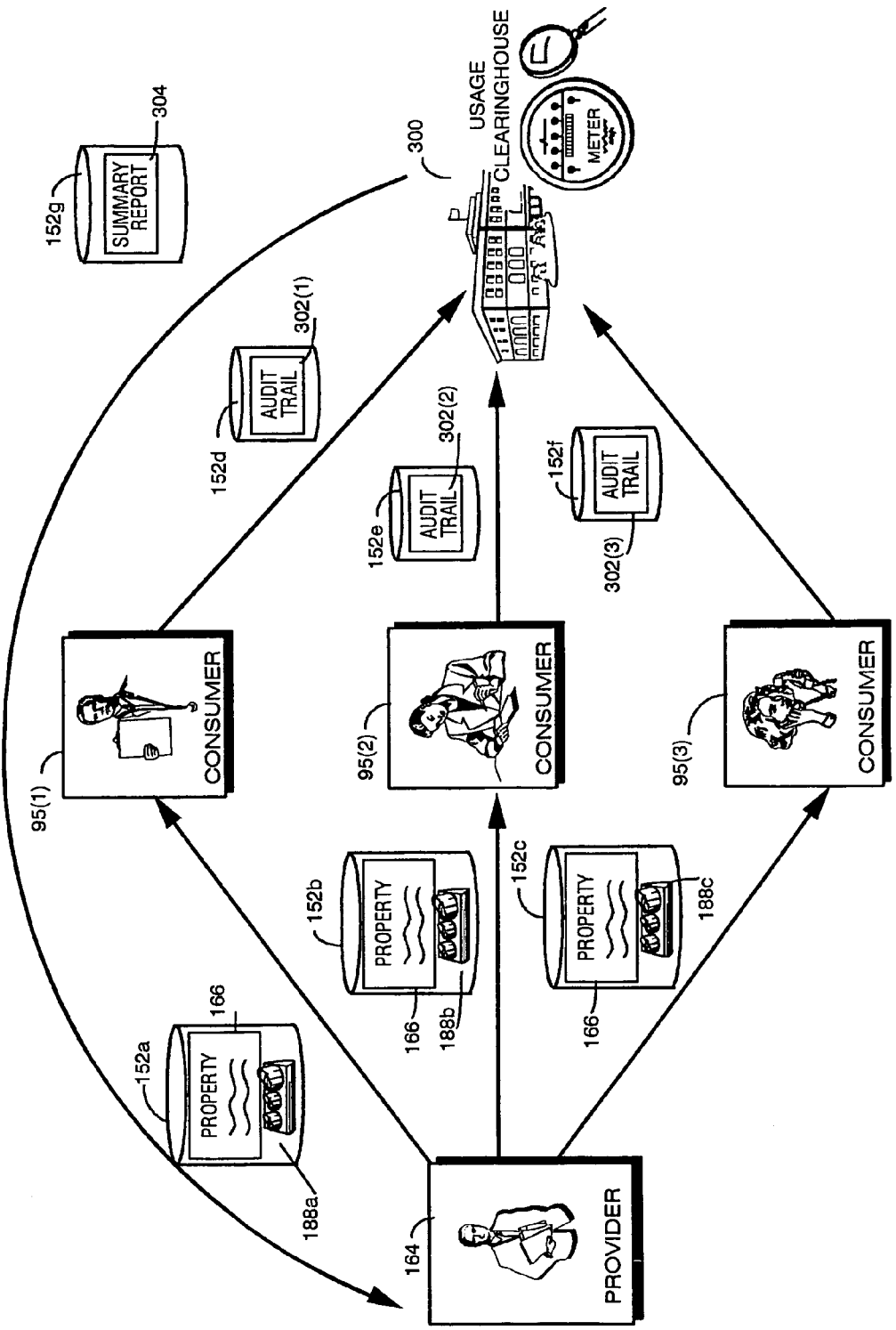
FIG. 35 shows an example usage clearing process.

FIG. 35 shows an example overall usage clearing process. In this example, a provider 164 provides a digital property to consumers 95(1), 95(2), 95(3). For example, provider 164 might provide a novel or other work 166 to each of the consumers 95 within electronic containers 152. One or more control sets 188 may be associated with the work 166 (and may, in one example, be delivered within the same electronic container 152 used to deliver the work 166). The controls 188 may specify that certain types of usage information must be gathered in the form of an audit trail, and that the audit trail must be reported based on certain time and/or other events.

Because container 152 can only be opened within a secure protected processing environment 154 that is part of the virtual distribution environment described in the above-referenced Ginter et al. patent disclosure, provider 164 can be confident that the required audit trails will be generated and reported as he or she instructs. As consumers 95 use the property 166, their electronic appliances 100 automatically gather and store the usage information in the form of audit trails 302. Then, upon the occurrence of a specified event (e.g., once a month, once a week, after a certain number of uses, etc.), the consumer electronic appliances 100 send audit trail information 302 within digital containers to usage clearinghouse 300.

Usage clearinghouse 300 collects the audit trail information 302, may store it in its database 316, and analyzes the audit trail information to generate a report 304 which it may send to provider 164 within a further electronic container 152.

Provider 164 automatically receives secure information auditing the amount his or her work has been used and how it has been used, with usage clearinghouse 300 relieving the provider from having to collect or analyze this detailed usage information. In addition, usage clearinghouse 300 may serve to protect the privacy of consumers 95 by revealing only summary details authorized by them (for example, how many consumers have used the work 166 but not their names or addresses). This confidentiality function would be more difficult or problematic if provider 164 attempted to analyzed detailed usage records himself or herself.

Figure 36:
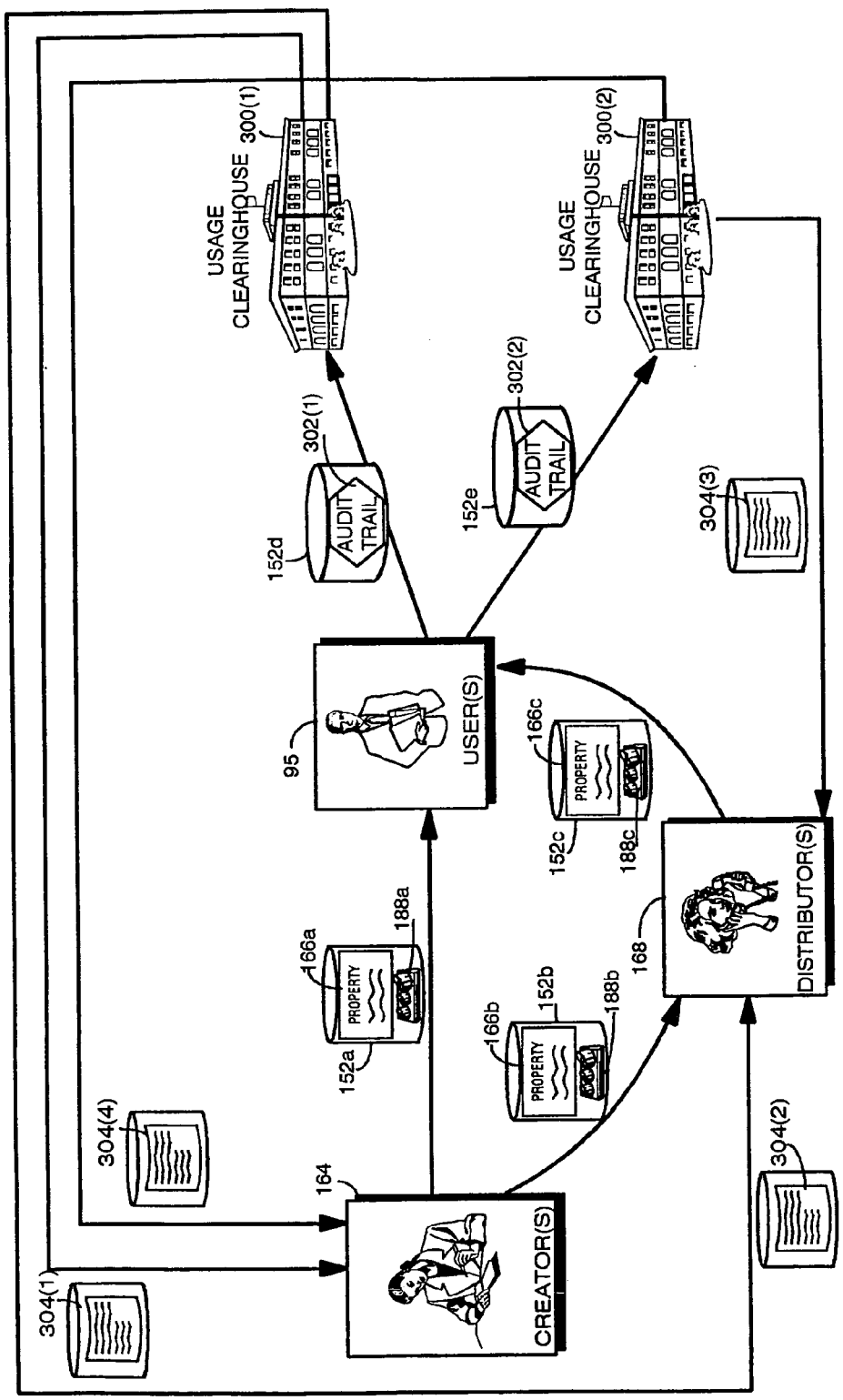
FIG. 36 shows an additional example usage clearing process using multiple usage clearinghouses.

FIG. 36 shows a more detailed example usage clearing process involving two different usage clearinghouses 300 (1), 300(2). In this example, a provider 164 delivers a work 166 directly to consumers 95, and also to distributors 168 that may redistribute the work to the consumers. The controls 188 associated with the distributed content 166 may specify that usage clearinghouse 300(1) is to collect and analyze information relating to the usage of the content 166 as directly distributed by creator 164, and that another usage clearinghouse 300(2) is to collect and analyze usage information pertaining to the usage of the work 166 as distributed by distributor 168. Alternatively, usage clearinghouses 300 (1), 300(2) may gather different types of usage information pertaining to the same electronic property 166 (for example, one usage clearinghouse might gather information pertaining to "pay per view" usage, whereas the other usage clearinghouse might gather usage information for all one-time purchases). Usage clearinghouses 300(1), 300(2) may each issue reports 304 to creator 164 and/or distributor 168 and/or consumer 95.

Figure 37:
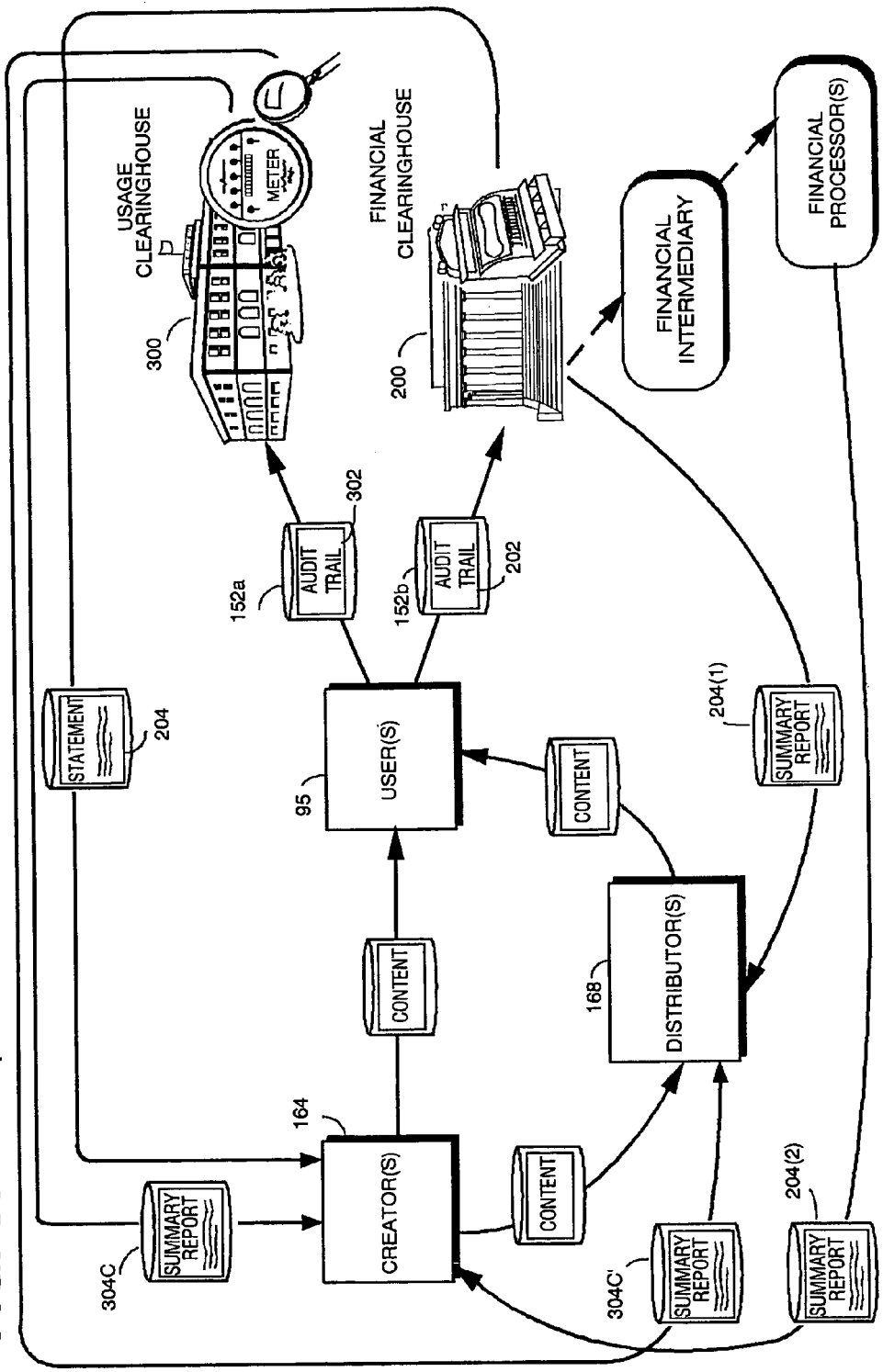
FIG. 37 shows an example usage clearing process using usage and financial clearinghouses.

FIG. 37 shows how a usage clearinghouse 300 can be used in combination with a financial clearinghouse 200. In this example, a consumer's electronic appliance 100 may send:
- to usage clearinghouse 300, audit trail information 302 pertaining to usage of electronic content, and
- to financial clearinghouse 200, usage and payment audit trial information 228 pertaining to financial clearing activities.

If desired, usage clearinghouse 300 and financial clearinghouse 200 may be operated by the same business (in this case, both usage and financial audit trail information could be sent within the same electronic container 152). The usage clearing functions performed by usage clearinghouse 300 may operate in parallel with the financial clearing functions performed by financial clearinghouse 200 to support both detailed usage reporting and efficient financial clearing.

Figure 38:
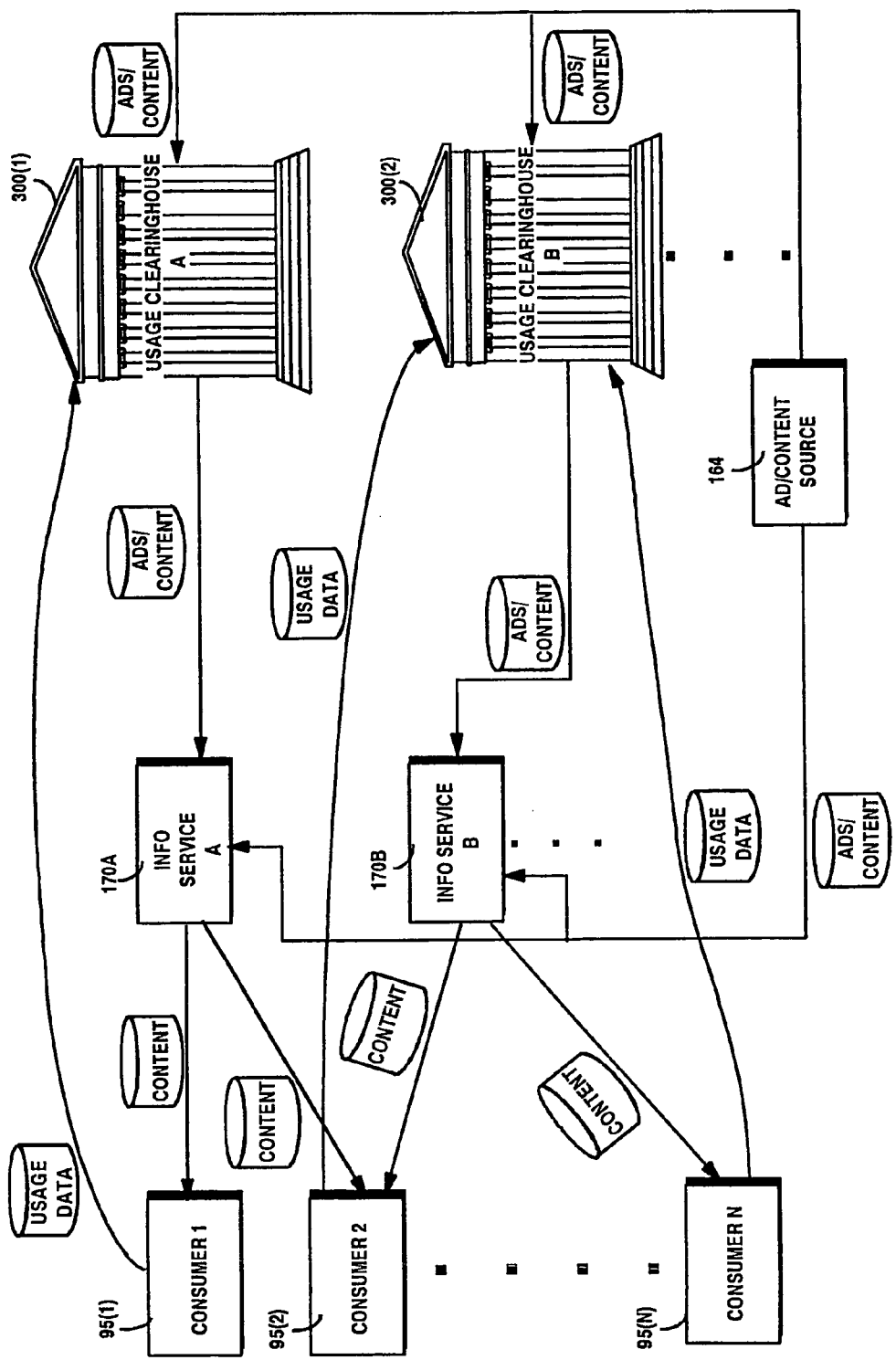
FIG. 38 shows an example usage clearinghouse media placement process.

FIG. 38 shows another example usage clearing operation based on media and/or advertising content placement. Consumers 95(1), 95(2), 95(N) may subscribe to various information distribution services 170A, 170B, . . . . These information distribution services 170 may distribute program material and advertisements (commercial content) produced by content providers 164. Consumers 95 consume the distributed content, and their electronic appliances 100 gather and report associated usage data to usage clearinghouses 300(1), 300(2).

The usage clearinghouses 300 may perform demographic analysis on the received usage data and, based on this demographic analysis, target particular ads for other commercial content 164 to particular information services 170. For example, information service 170A might distribute program material and commercial content 164 of interest to runners and others with physical fitness interests. Usage clearinghouse 300(1) might analyze the usage data provided by the consumers 95 who subscribe to and view this type of information. Usage clearinghouse 300(1) is thus in a unique position to place ads in other commercial and non-commercial content that might be of interest to the same interest group. Similarly, information service 170B might specialize in broadcasting information of interest to car enthusiasts. Usage clearinghouse 300(2) may gather usage data about the usage of this type of information—and is thus in a unique and well placed position to distribute and target advertisements, commercial and non-commercial content to this group of consumers.

Figure 39:
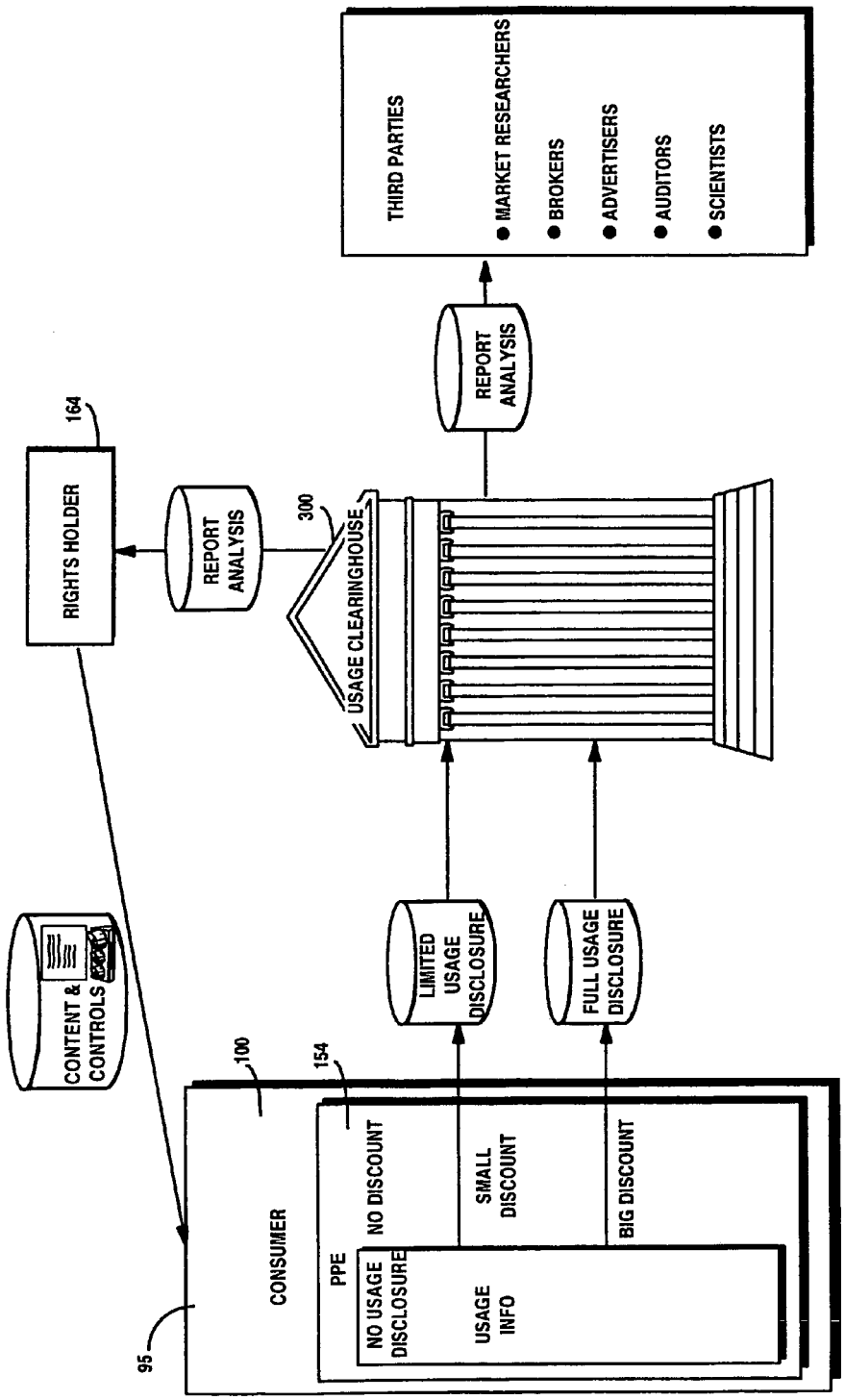
FIG. 39 shows an example usage clearing process providing discounts based on different levels of consumer usage information disclosure.

FIG. 39 shows an additional example usage clearing operation that may be performed by usage clearinghouse 300. In this example, usage clearing house 300 may be authorized by rights holders 164 to offer discounts based on the amount of usage information a consumer 95 is willing to disclose. This can, for example, be done with controls 188 for the property by selecting from among control sets and/or entering into an electronic negotiation (see Ginter et al. FIGS. 76A and B). A rights holder might premeditate this as a general rule for their property—or given rights and permissions clearinghouses 400 could be authorized to deliver these control sets (e.g. based on their special position as collectors of particular categories of usage information).

As one example, the consumer's electronic appliance might be a personal computer, and rights holders 164 who distribute computer software may be interested in knowing what software programs consumer 95 is using in addition to the ones they themselves are distributing. Consumer 95, on the other hand, may not want to reveal this detailed information about all of the software programs that are present on his or her personal computer.

As another example, digital broadcast rights holders 164 may want to know about every broadcasted program that consumer 95 watches, whereas the consumer may not want anyone else to know the kinds of programs he or she is interested in.

Usage clearinghouse 300 can effectively accommodate these countervailing interests by offering consumer 95 a financial incentive for more full disclosure but giving the consumer a choice.

In this example, rights holder 164 distributes electronic content and associated controls to consumer 95. The controls may specify options for revealing usage information. The consumer may choose:
- to pay full price and keep all usage information other than that essential for insuring payment absolutely secret;
- to allow limited usage disclosure in return for a small discount on price; or
- to take advantage of a big discount in return for allowing full disclosure of usage information.

Some secretive consumers may want the outside world to know as little as possible about their usage habits and will be willing to pay full price to protect their privacy. Other consumers may not care what the outside world knows about their usage habits, and will want to take advantage of large discounts based upon more full disclosure. Any number of such option levels may be provided, allowing the consumer to, for example, select precisely what kinds of information are revealed and which ones are kept secret. Because usage data is being collected within a secure protected processing environment 154 that is part of the consumer's electronic appliance 100, the consumer can be confident that the usage data will be securely handled and that unauthorized disclosure will not occur without his or her consent.

Based, for example, on one or more control sets 188 provided to the consumers' protected processing environment 154 and/or the consumers selection made possible through such control sets, the consumer's protected processing environment 154 could reveal no (or minimal) usage information, limited usage information or full usage information, to usage clearinghouse 300. Usage clearinghouse 300 can then freely analyze the limited and full usage information it collects, providing reports and analysis to rights holders 164 and to other third parties such as market researchers, brokers, advertisers, auditors, scientists and others.

Rights and Permissions Clearinghouse

Figure 40:
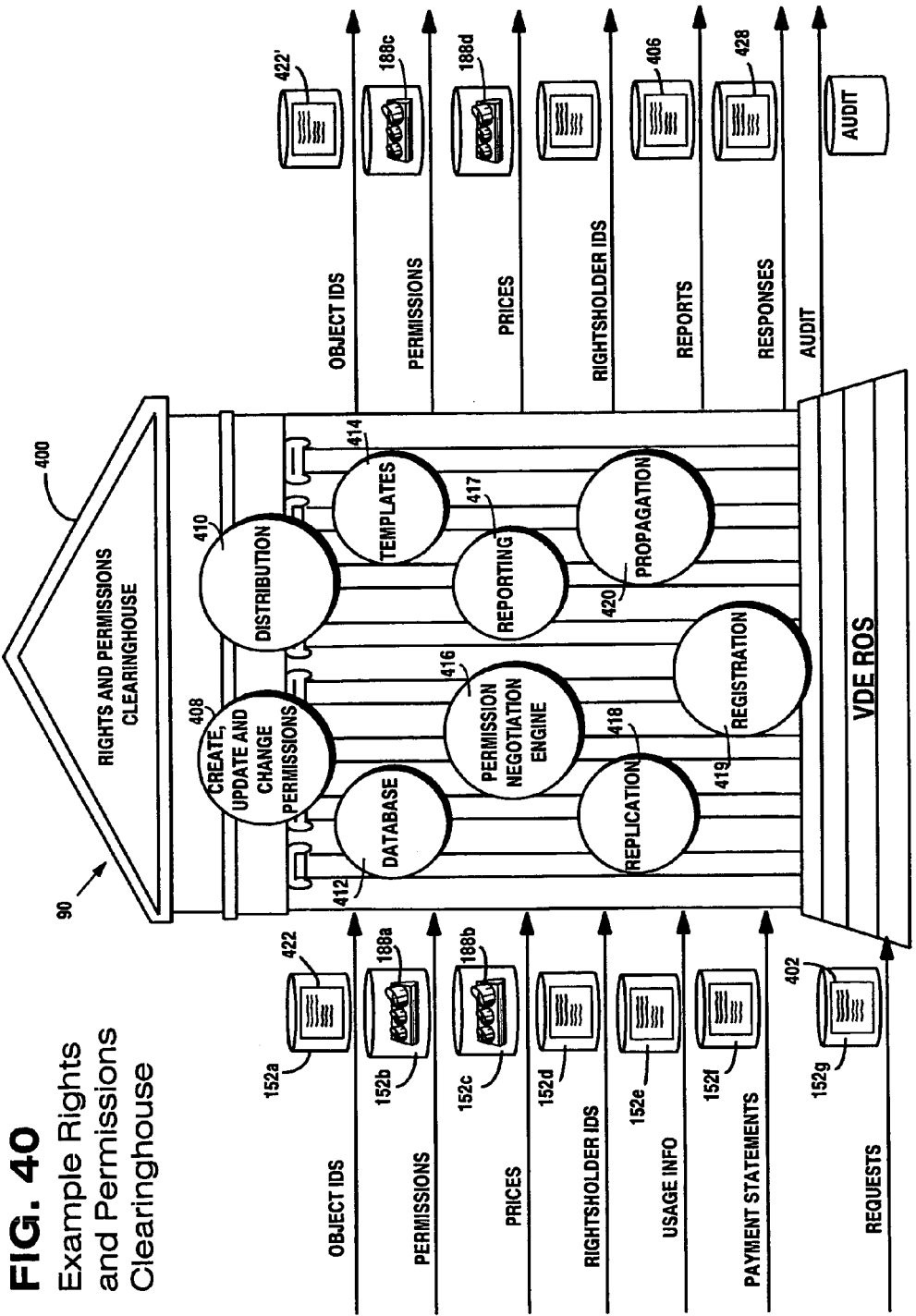
FIG. 40 shows an example rights and permissions clearinghouse Commerce Utility System.

FIG. 40 shows an example of a rights and permissions clearinghouse Commerce Utility System 400. Rights and Permissions clearinghouse services may perform any combination of the following overall functions:

Registering digital objects and associated permissions, prices and/or other permitted and/or required operations supporting the execution of consequences for performing and/or failing to perform such operations;

Providing pre-approved permissions on demand in accordance with specified circumstances and/or other requirements such as class(es) of permission requester, fulfillment, or ability to fulfill, payment requirements, etc.;

Securely and efficiently performing electronic copyright registration with the appropriate agency for one or more countries and/or other jurisdictional units; and Reporting functions.

In more detail, rights and permissions support services in accordance with these inventions that may include, for example, some or all of the following functions and features:

Identifying, distributing and verifying specific property rights and/or other business rules and controls along a digital electronic value chain.

Providing object registry services and rights, prices and/or other control information for registered objects.

Assigning to each digital object at least one identifying number and/or name in accordance with its own numbering and/or naming scheme and/or in accordance with one or more numbering and/or naming schemes defined by one or more other organizations, associations (e.g., standards consortiums), companies, and/or agencies (e.g., governmental regulatory bodies).

Receiving authority from secure chain of handling and control embodied in electronic control sets.

Securely providing permissions (e.g., rules and controls based descriptions of permitted operations and associated consequences such as prices) for digital properties that have been registered and supporting automated association of such registered properties with rules and controls sets (e.g., updating of rules and controls, employing preset templates based upon classes of properties, etc.), that may be provided, for example, at least in part remotely and securely downloaded to the registering site during, or as a result of, such registration.

Allowing rights holders in digital content to determine and flexibly define and securely provide to one or more rights and permissions clearinghouse ways in which they want their intellectual property products (for example, VDE protected digital properties) to be used and not used, and any consequences of such use and/or misuse.

Providing VDE supported capabilities to distribute and manage rights and business rules (including pre-approved and other permissions) along an ad hoc electronic value chain, where such rights and business rules are persistently supported.

Providing digital object permissions on demand to people authorized to use a digital object.

Can provide different terms based on different permissions securely associated with one or more combinations of classes of users (e.g., different age groups, jurisdictions, business capabilities, consumers, creators, providers, partners, government, non-profit organizations, educational organizations, organization membership, etc.).

Providing rights holders with assurances that the terms they set are being adhered to by a potentially diverse and distributed value chain participant base.

Can provide controls that do not include all possible permissions and/or distribute further, required and/or desired permissions upon request on an ad hoc and/or pre-planned basis according to the requester's rights (class and/or individual), for example, allowing rights holders to elect to distribute only the most frequently used permissions associated with a particular digital property, and allowing appropriate parties to obtain new permissions in accordance with the rights holder's model.

Refreshing expired permissions upon request and/or upon an automated recognition of the expiration of such rights through the use of clearinghouse database mechanisms and the automated provisioning and/or messaging to provide such permissions and/, or notify, in the preferred embodiment, a VDE value chain participant of the need to acquire such permissions (notify such user, for example, before the user is actively attempting to use associated information and/or electronic control processes and thereby avoiding user frustration and inefficiency).

Using secure containers such as those described in Ginter, et al., in any step, part, or process of providing secure rights clearing services.

Creating, storing, distributions, and receiving rights and permissions "templates" allowing rights holders to efficiently and adequately specify rights, conditions and consequences, (e.g., compensation) to be associated with operations related to the use of their digital properties (and/or the use of VDE process controlled electronic events).

Templates can directly correspond to digital control sets associated with properties, content-users, user classes, and/or other digital information and/or physical or virtual sites and/or process control for event and event consequence governance.

Templates can be self-executing.

Templates can apply to multiple objects/instances.

Templates can be delivered independently of any digital objects they may be associated with.

Templates are extensible to anticipate new operations and scenarios, including, but not limited to new payment methods, pricing models and pricing levels, and new permissions.

Templates can flexibly recognize all kinds of digital rights including, for example, distribution and transmission and/or retransmission rights.

Templates can flexibly recognize individual identity and/or class identity rights.

Different templates can apply to different content and/or process control arrangement property types.

Plural templates can apply to the same property and/or process control arrangement.

Rights and permissions clearinghouse(s) may maintain superset templates, permitting value chain participants and/or hierarchically sub-clearinghouses to modify one or more of such superset templates to create templates employing a subset and/or extended set of said one or more superset templates.

Templates can be completed in a number of different ways using, for example, a graphical user interface and/or a rights management language.

Template "applications" can be created and/or modified through the use of topographical, schematic, directly editable graphical representation of value chain rules and controls, where such rules and controls and value chain relationships are represented through the display of, for example, mixed iconic, positional, flow diagram, and textual information, and wherein rules and controls are implemented, for example, through the use of a rights management language, and wherein, for example, elements or higher level representation of such elements of the rights language may directly correspond to graphical representation components.

Multiple value chain participants can contribute to and/or modify templates and/or contribute and/or modify different templates applying to the same digital information.

Users can select between differing templates applying to the same digital information, including, for example, digital information describing and/or governing control processes (e.g., event management information) managed through, for example, secure VDE chain of handling and control.

Distributing rights clearing functions across a network or other system (for example, every consumer and/or other value chain participant node is potentially a distributed rights clearing service at least in part initiating its own, secure rights clearing, and wherein said participant node may communicate rights information directly to one or more other participant, interoperable clearing nodes, in the preferred embodiment, all activities employ VDE techniques as appropriate and as described in the Ginter, et al. patent specification).

Granting authority and/or providing services to, or in conjunction with, one or more distributed rights sub-clearinghouses whose operations may be located logically and/or physically elsewhere, such as within a company or government agency and/or within one or more jurisdictions and/or serving subsets of the overall business focus area of a senior rights clearinghouse distributing and/or otherwise authorizing rights clearing functions across a system or network, for example, where every consumer and/or certain or all other value chain participant nodes can potentially support a distributed usage clearing service initiating its own, secure rights clearing transactions and function in the context of the overall clearinghouse network, including, clearinghouse interoperation with one or more other participants interoperable nodes, and as elsewhere in this list, all activities employing, for example, VDE techniques as appropriate.

One or more rights may be automatically provided to a participant based at least in part upon some aspect of content and/or process control usage, and such provided one or more rights may be supplied, for example, as a promotional component providing coupons in compensation for certain usage (e.g., purchasing) profile which may be directly ascertained from usage information or may be derived from a weighted formula involving a variety of variables.

May be organized hierarchically, peer-to-peer, or in a combined mode where responsibility for rights clearing may be distributed in differing fashions for differing commerce models and/or activities and/or value chains and where certain one or more parties may be, for example, hierarchically more senior to other parties in one or more instances and hierarchically a peer or less senior in one or more other instances, that is the relationship among participants is programmable and may be set (and later modified) to represent one or more desired rights clearing arrangements for given commerce activities, value chains, or models.

FIG. 40 shows an example rights and permissions clearinghouse 400 from a functional viewpoint. In this example, rights and permissions clearinghouse 400 may perform some or all of the following four main functions:

Object registration. Rights and permissions clearinghouse 400 registers digital properties and their associated permissions and prices.

Permissions on demand. In response to queries, rights and permissions clearinghouse 400 provides permissions 188 together with associated prices in secure electronic containers 152. The permissions controls 188 may be provided independently of the content.

Negotiated permissions. In response to queries and requests, the rights and permissions clearinghouse 400 negotiates permissions and/or prices on behalf of rightsholders who have delegated this responsibility to the rights and permissions clearinghouse. The rights and permissions clearinghouse 400 may also be an intermediary in the negotiations between rightsholders and rights users. Rightsholders and rights users may negotiate among themselves and report the results of those negotiations to the rights and permissions clearinghouse.

Reporting. Rights and permissions clearinghouse 400 can provide reports to augment reporting performed by financial clearinghouses 200 and/or usage clearinghouses 300.

In this example, rights and permissions clearinghouse 400 may provide some or all of the following functions:

Permission creating, updating or changing 408,
Permission distribution 410,
Database management 412,
Template definitions and/or management 414,
Negotiating permissions 416,
Reporting 417,
Replication 418,
Registration 419, and
Propagation 420.

The rights and permissions clearinghouse 400's primary task of object registration is performed by database management 412. In this connection, rights and permissions clearinghouse 400 may receive control sets 188 and corresponding object identifications 422 within the same or different electronic containers 152, and then "register" this information in a database 412 for later reference. Rights and permissions clearinghouse 400 may assist rights holders in defining control sets 188 specifying rights and permissions relating to the rights holder's electronic properties by providing a template function 414. Registration process 419 and database 412 may register control sets 188 in addition to objects or properties 166.

Rights and permissions clearinghouse 400 database function 412 and distribution function 410 may be used to distribute permissions on demand in response to requests 402, and may also be responsible for the task of distributing (via distribution function 410) all permissions relating to a particular property. Since permissions and/or prices may expire or change, rights and permissions clearinghouse 400 can also be responsible for updating control sets 188 specifying previously issued permissions and/or prices and distributing those updated control sets.

Rights and permissions clearinghouse 400 may also provide a reporting function 417, issuing reports 406 pertaining to the permissions and/or prices it has issued or distributed, for example. In this example, the operation of rights and permissions clearinghouse 400 provides audit opportunities, i.e., a channel through which to attach usage information. Such audit operations (which may, for example, be provided by integrating rights and permissions clearinghouse 400 functions with usage clearinghouse 300 functions) could be used to create integrated reports about which permissions were provided and which permissions were exercised—very valuable information for market research and business consequences as well as providing additional accountability to rightsholders.

This rights and permissions clearinghouse 400 audit function can be especially beneficial to preserve confidentiality. For example, a private rights and permissions clearinghouse 400 may be extended to provide payment aggregation in order to hide confidential individual transaction level information from the financial clearinghouse 200. In another example, a rights and permissions clearinghouse 400 can issue reports 426 indicating, for example, the number of registered objects in database 412 at the beginning of a reporting period, the number of new objects registered, and some aggregate statistics concerning perhaps the numbers of kinds of permissions associated with these objects and/or average or median prices for certain kinds of objects.

Rights and permissions clearinghouse 400 can also respond to queries 402 with responses 428. A request, for example, may consist of a request for permissions—which may be automatically granted; or the request may need to be qualified by the rights and permission clearinghouse 400 to determine whether the requester is qualified to receive the permissions. Qualifications might be established by presentation of one or more valid certificates, which might be simply checked, or stored in the database 412 for transmission to providers along with other information about permissions granted by the clearinghouse. In the preferred embodiment, other qualifications might be based on a shared secret (e.g., one or more tags from a control set 188 held by the requester) known by the requester's PPE 54 and the rights and permissions clearinghouse 400. This shared secret might be used in combination with a certificate, or in cases when qualification requirements are lower or have already been established (e.g., to have received the shared secret in the first place), the shared secret alone might be adequate to receive, for example, a permission that replaces or updates an expired permission.

Rights and permissions clearinghouse 400 also includes a permission negotiation engine 416 that may be used to negotiate permissions 188 that haven't been pre-approved by the rights holder. For example, suppose that a consumer 95 wants to exercise a right that is not within database 412. The consumer 95 could request the right. In response, rights and permissions clearinghouse 400 could determine whether the rights holder has authorized it to negotiate for the right on behalf of the rights holder. If the rights holder has not given the rights and permissions clearinghouse 400 the power to negotiate, the clearinghouse could contact the rights holder and request authorization and/or the permission itself. If the rights holder has granted the rights and permission clearinghouse 400 negotiating authority, the clearinghouse could enter into an electronic negotiation (see Ginter et al. FIGS. 75A–76B) between the consumer's control set and the rights holder's control set. The resulting negotiated control set could be sent to the consumer, allowing the consumer to exercise the right.

Figure 41:
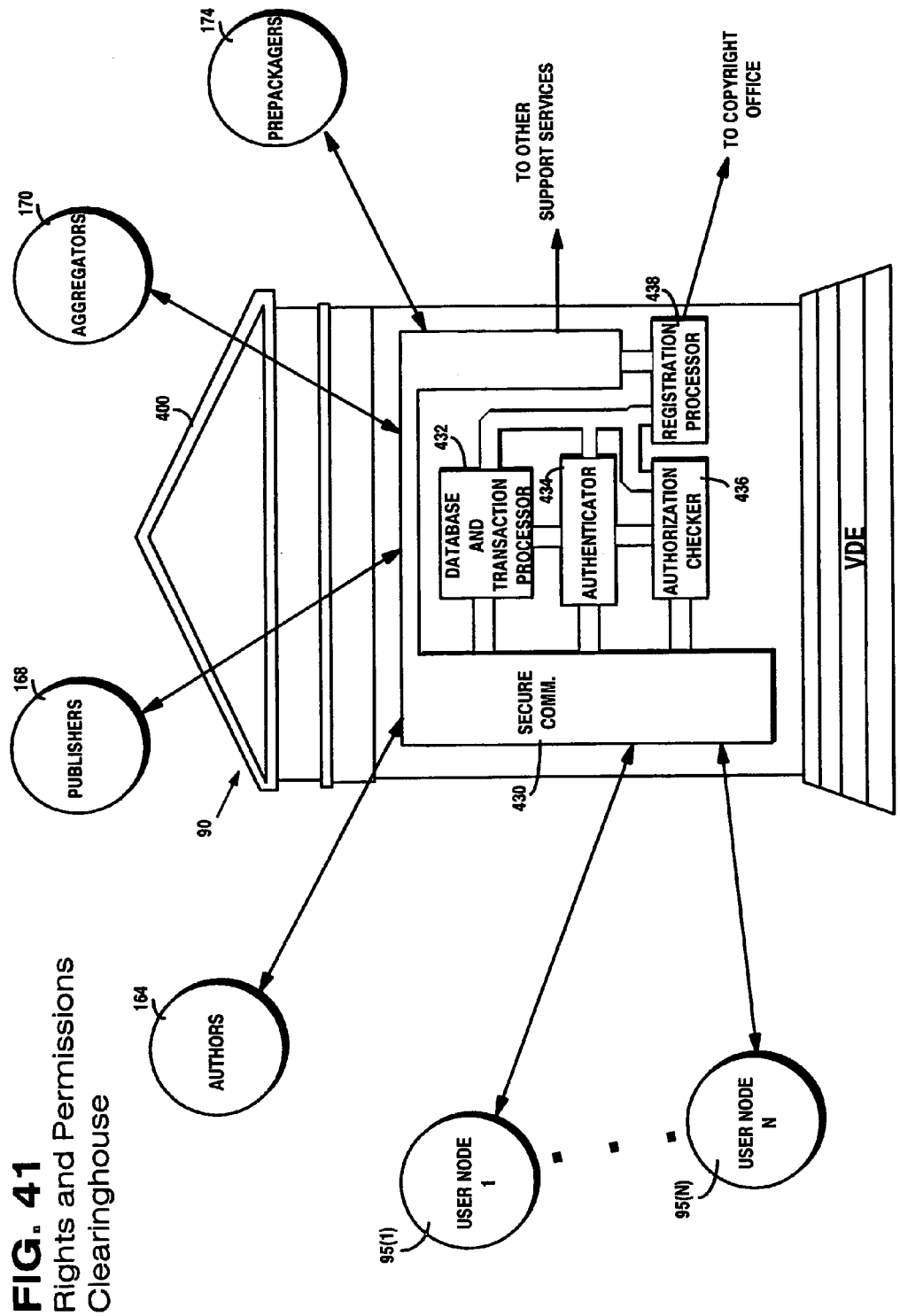
FIG. 41 shows an example rights and permissions clearinghouse architecture.

FIG. 41 shows an example architecture for rights and permissions clearinghouse 400. In this example, rights and permissions clearinghouse 400 includes a secure communications facility 430, a database and transaction processor 432, an authenticator 434, an authorization checker 436, and a registration processor 438. As discussed above, the rights and permissions clearinghouse 400 architecture may be based on the rights operating system architecture shown in FIGS. 12 and 13 of the Ginter et al. patent disclosure and described in associated text.

Database and transaction processor 432 performs most of the functions shown in FIG. 40. Registration processor 43-8 may perform the registration function 419. Secure communications facility 430 communicates securely over electronic network 150 with consumers 95, authors 164, publishers 168, aggregators 170, repackagers 174, and other value chain participants via secure containers 152. Authenticator 434 and authorization checker 436 perform authentication functions as the Ginter et al. patent disclosure describes in connection with secure electronic appliances and protected processing environments.

FIG. 42 shows an example rights and permissions clearing process. In this example, author 164 sends a work 166 with a control set 188A including controls A to a publisher 168. Publisher 168—in accordance with a secure chain of handling and control—adds controls B to the control set to form a new control set 188AB. Publisher 168 publishes the work 166 with control set 188AB to consumers 95. Publisher 168 may also specify a less often used, but sometimes necessary additional set of permissions C within a more comprehensive control set 188ABC (for example, controls C may allow journalists to excerpt certain parts of work 166 for specific purposes).

Publisher 168 may register control set 188ABC (and, if desired, also control set 188AB and control set 188A) with rights and permissions clearinghouse 400. The publisher 168 may also include additional "controls over controls," or "permissions for permissions" "D" (e.g., distribution controls described in connection with FIGS. 79–85 of the Ginter et al. patent disclosure) along with controls 188ABC. These additional "D" controls may specify the circumstances under which rights A, B and/or C may be granted (qualification of credentials, frequency of reissue, number of controls for a given user, etc.).

Consumer 95 (or any other provider, such as an aggregator, repackager, author, or another publisher) may request a copy of any of these various control sets registered with rights and permissions clearinghouse 400. For example, if the consumer 95 is a journalist who uses the work 166 in accordance with control set 188AB and decides she wants to excerpt the work for certain purposes, she may request the control super set 188ABC that publisher 168 previously registered with rights and permissions clearinghouse 400. As another example, a consumer 95 in Germany may have received the control set 188 intended for U.S. distribution, and may need to request a different control set accommodating the European legal and monetary environment. Additionally, a rightsholder may modify previously distributed controls at a later date to add new rights, provide a "sale," take away rights, etc.—with rights and permissions clearinghouse 400 being responsible for distributing these new control sets either on demand.

Figure 42A:
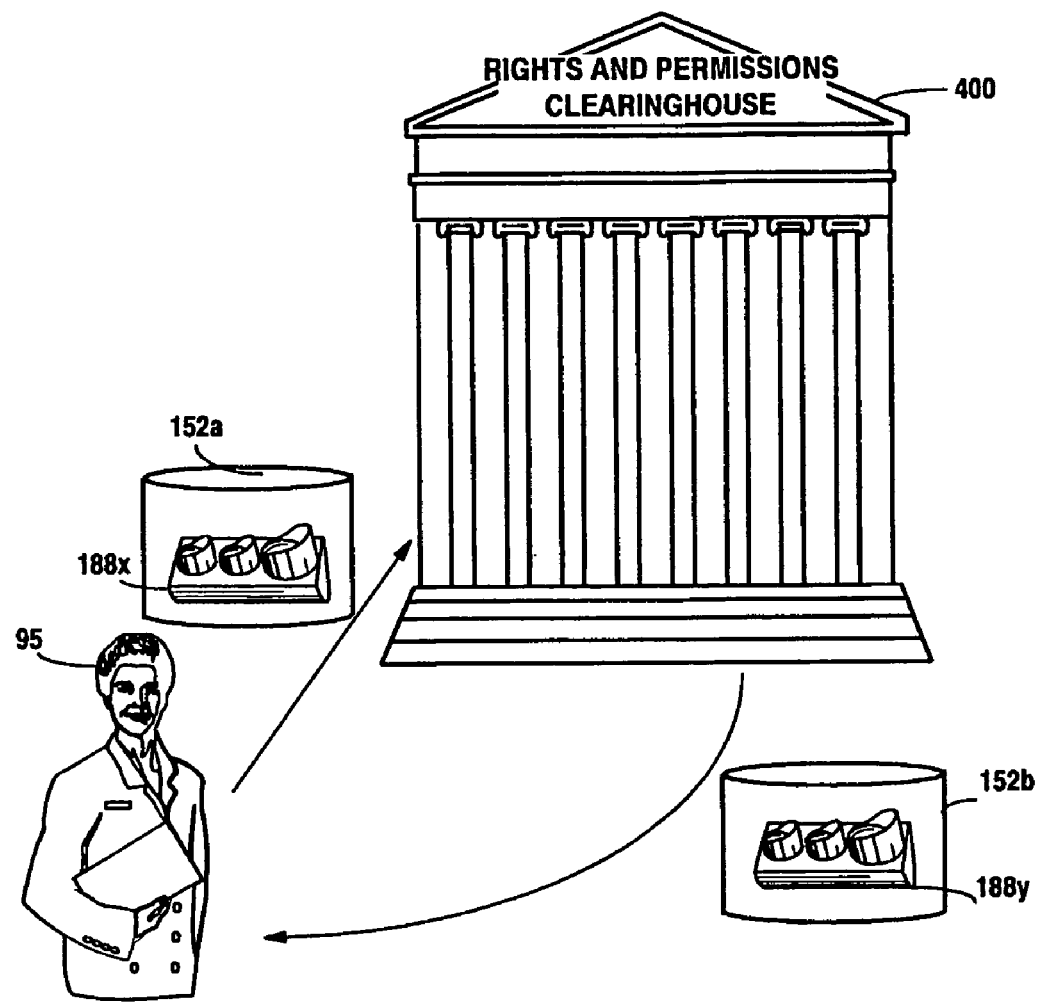
FIG. 42A shows an example control set registration process for updates.

FIG. 42A shows another example in which consumer 95 may register with the rights and permissions clearinghouse 400 a control set 188X that pertains to an object such as a file or software program already received by consumer 95. This new control set 188X requests the rights and permissions clearinghouse 400 to send to consumer 95 a new control set 188Y for the named object whenever the controls registered for that object at the rights and permissions clearinghouse 400 are modified. The rights and permissions clearinghouse 400 may automatically send updated control set 188Y to all registered users of a particular digital property.

In a different example, publisher 168 might distribute work 166 with a very limited control set 188X allowing the consumer 95 to view only the abstract and specifying rights and permissions clearinghouse 400 as a contact point for obtaining permission to view or otherwise use the content as a whole. Consumer 95 could then contact rights and permissions clearinghouse 400 to obtain a more expansive control set 188Y allowing additional levels of usage. This provides a high degree of accountability and expanding auditing capabilities, since it requires consumers 95 to contact rights and permissions clearinghouse 400 in order to actually use a previously distributed property. Similarly, rights and permissions clearinghouse 400 may provide updated control sets 188Y to replace expired ones. This mechanism could be used, for example, to provide a variable discount on a particular item over time (for example, to allow a movie distributor to discount its first run film six months after its initial release date without having to decide at time of initial release how much the discount will be).

FIG. 43 shows a further example rights and permissions clearing operation performed by rights and permissions clearinghouse 400. In this FIG. 43 example, each of authors 164, publishers 168, aggregators 170, and optionally other additional value chain participants, register their own control sets 188A, 188B, 188C, respectively, with a rights and permissions clearinghouse 400—potentially also registering additional controls controlling distribution of their provider controls. Rights and permissions clearinghouse 400 may then distribute a new, combined control set 188ABC consistent with each of the individual control sets 188A, 188B, 188C—relieving any of the value chain participants from having to formulate any control sets other than the one they are particularly concerned about. In this example, rights and permissions clearinghouse 400 may also have an interface to other organizations (e.g., with a government agency 440, such as a Copyright Office—or with another type of organization such as professional associations). Rights and permissions clearinghouse 400 may automatically register copyright in works and other objects registered with the rights and permissions clearinghouse 400—reducing or eliminating such burdens from having to be performed by the rights holders themselves. The copyright registration interaction between the rights and permissions clearinghouse 400 and the government agency 440 may, for example, make use of VDE and secure containers 152.

FIGS. 44A–44E show an additional rights and permissions clearing process that may be performed using rights and permissions clearinghouse 400. In this example, a publisher 168 may provide a property 166 and associated control set 188a to a consumer 95 (see FIG. 44A). The consumer may use her electronic appliance 100 and associated protected processing environment 154 to attempt to access the property 166 using control set 188a, but may determine that she requires an additional control set 188b in order to access the property the way she wishes. The consumer's electronic appliance 100 may generate a request 402 to a rights and permissions clearinghouse 400 (see FIG. 44B). In response, the rights and permissions clearinghouse 400 may distribute the requested control 188b containing the permissions and pricing information requested by the consumer 95 (see FIG. 44C). The consumer may then use the property 166 in accordance with the control set 188 and generate usage/audit trail information 302 based on the consumer's usage (see FIG. 44D). The consumer's electronic appliance 100 may report this usage information to usage clearinghouse 300, and may delete and/or release as "pending" the internally stored usage information once it receives a release signal from the appropriate clearinghouse (see FIG. 44E).

Rights Templates

FIGS. 45A and 45B show example rights templates 450, and FIG. 45C shows an example corresponding control set 188. Rights template 450 may be analogous in some respects to "fill in the blank" forms. Rights holders can use rights templates 450 to efficiently and effectively define the rights associated with a particular digital property. Such templates 450 are useful in framing the general purpose capabilities of the virtual distribution environment technology described in the Ginter et al. patent disclosure in terms that are sensible for a particular content industry, provider, content type or the like. This allows a user such as a provider to be presented with a focused menu of resources that be applicable or useful for a particular purpose.

For example, templates 450 may make some assumptions about the character of the content or other information being controlled, how it is partitioned or otherwise organized and/or the attributes those organizational entities have. Templates 450 simplify the process of defining permissions, and reduce or eliminate the need for specialized knowledge and substantial investments of time to exploit the underlying capabilities of the virtual distribution environment. It may be possible in this example for a user to avoid using templates 450 altogether and instead define permissions 188 in terms of a rights management language (for example, a natural or computer-based language)—but a large percentage of users will prefer the easy-to-use graphics interface that templates 450 may provide—and won't mind giving up the additional flexibility and associated complexities when undertaking the day-to-day business of defining permissions for a large number of different pieces of content.

Example rights template 450 shown in FIG. 45A (which may be appropriate for text and/or graphics providers for example) defines a number of different types of usage/ actions relevant to a particular digital property, such as, for example, "view title," "view abstract," "modify title," "redistribute," "backup," "view content," and "print content." Rights template 450 may further provide a "menu" or list of options corresponding to each type of usage. These various options allow the rights holder to define rights that others may exercise in connection with the property. For example, the rights may comprise:

Unconditional permission,
Permission conditional on payment,
Permission based on content,
Unconditional prohibition, and
Prohibitions and/or permissions based on other factors.

Rights holders may "fill in" or select between these various options to define a "rights profile" corresponding to their particular property. In this example, rights template 450 may further models and/or levels for rights to be exercised conditional on payment. Such pricing models and levels may flexibly define a variety of different sorts of business pricing, such as, for example, one time charges, pay per view, declining cost, etc. See FIG. 45B for an example of how pricing models and levels might be specified using a graphical interface.

Rights template 450 in this example can be self executing and/or can be "translated" or compiled automatically into one or more control sets 188 providing the necessary controls for implementing the rights holder's selections. FIG. 45B, for example, has a "view title" control 188a that allows unconditional viewing of the title as specified by the FIG. 45A rights template 450. Similarly, the FIG. 45B example controls 188 includes further control set elements 188(2) . . . 188(N) corresponding to other rights and permissions 188 the rights holder has defined based upon the FIG. 45A rights template 450.

In this example, rights template 450 can be extensible. For example, as new technology enables and/or creates new operations, rights template 450 can be extended to accommodate the new operations while still being "upward compatible" with preexisting rights templates. Different rights templates 450 can be used for different types of properties, different value chain participants, etc.—and at the same time, certain rights templates might apply to multiple objects or properties, multiple value chain participants, etc. Some rights templates 450 can be supersets of other rights templates. For example, an overall rights permissions template 450 could define all of the possible rights that might apply to a particular property or class of properties, and sub-templates could be further defined to define rights associated with different consumers, classes of consumers, or rights holders. Thus, for example, an author might use a sub-template that is different from the one used by a distributor. Templates can also be recursive, i.e., they can be used to refer to other templates (and similarly, the control sets they define can refer to other control sets).

Rights and permissions clearinghouse 400 might-partially fill in rights template 450—or an automatic process could be used (based, for example, on rights holder's pre-existing instructions) for completing and/or duplicating rights templates. Rights holders could use a graphical user interface to complete rights template 450 (e.g., by displaying a list of options on a computer screen and pointing and clicking with a mouse pointing device to fill in the options desired). In another example, a rights holder could define his or her preferences using a rights management language that a computer could automatically compile or otherwise process to fill in rights template 450 and/or construct associated control set(s) 188.

FIG. 46 shows an example rights and permissions clearing process using rights template 450. In this example, rights and permissions clearinghouse 400 and/or individual rights holders define rights template 450 (FIG. 46, block 452(1)). The rights are then filled in the rights template 450 to define permissions granted and withheld, and associated pricing models and levels (block 452(2)). The rights holder associates the permissions defined by the rights template with the object (e.g., by creating one or more control sets 188 that reference and/or apply to the property being controlled) (block 452(3)). The rights holder may then convey the permissions (control set 188) with or separately from the object (block 452(4)). Rights holders may send these control sets 188 directly to consumers 95 (block 452(5)), and/or they may sent them to a rights and permissions clearinghouse 400 for registration and storage in a database (block 452(6)). Rights and permissions clearinghouse 400 may provide such preauthorized permissions to consumers (block 452(7)) on demand upon receiving consumer requests (block 452(8)).

As described above, providers may control distribution of such pre-authorized permissions by rights and permission clearinghouse 400 by the mechanism of providing additional, "distribution controls" directing and/or controlling the distribution process.

Certifying Authority

Figure 47:
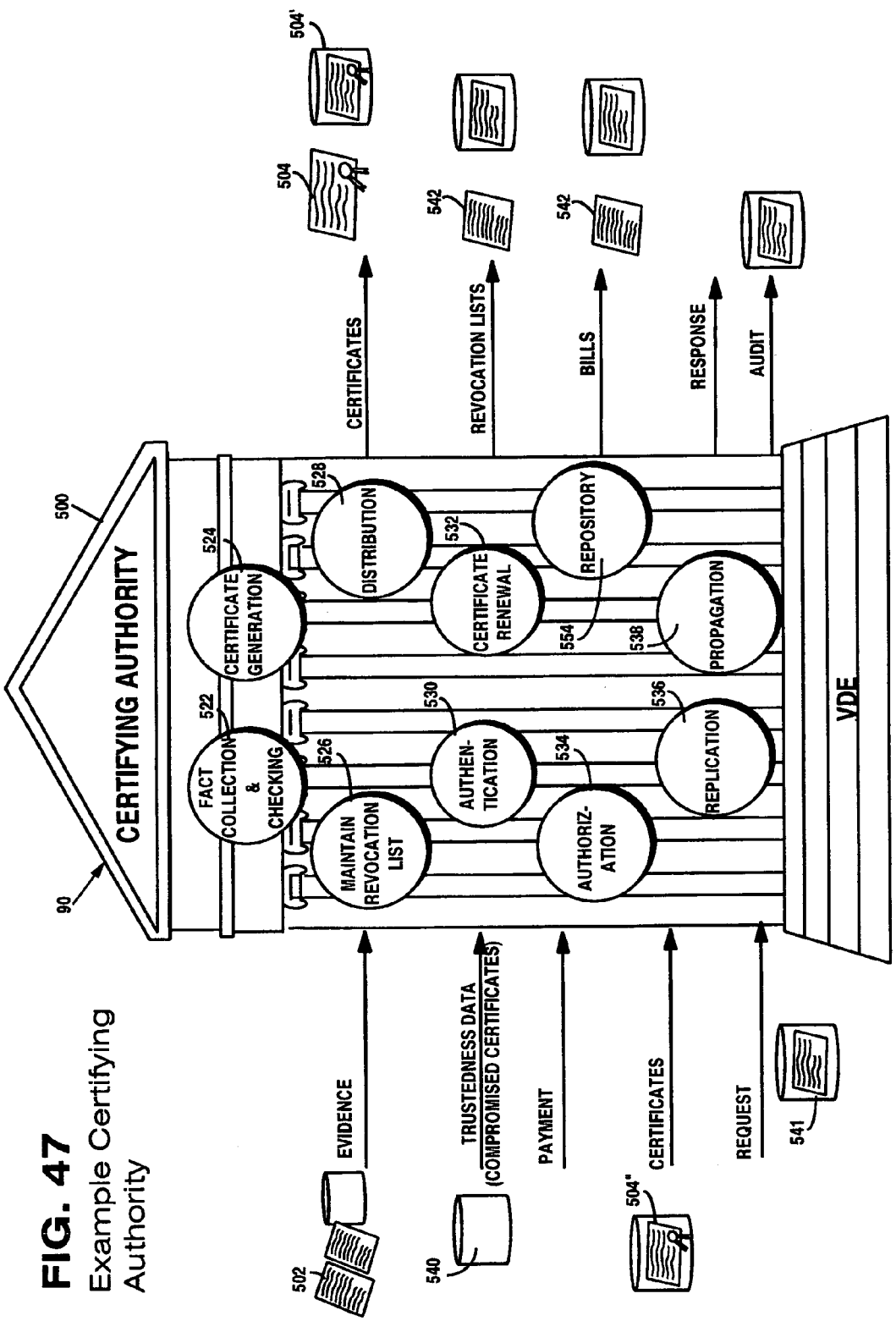
FIG. 47 shows an example certifying authority Commerce Utility System.

FIG. 47 shows an example certifying authority Commerce Utility System 500. Certifying authorities and services may, in general, create digital documents that "certify," warrant, and/or attest to some fact. Facts include, for example, identification and/or membership in a particular class, e.g., such as an organization; age group, possession of a certain credential type; being subject to one or more certain jurisdictions; and/or having a certified one or more rights to use content and/or processes for a fixed time period or terminating at a specific time.

In more detail, a certifying authority in accordance with these inventions may provide any combination of the following advantageous features and functions, for example in the form of certificates:

Electronically certifying information used with or required by rules and/or controls such as authenticating, identity, class membership and/or other attributes of identity and/or context, and including automatically certifying said information based upon the source (for example, one or more certified provider identities) and/or class of said information.

Providing trusted verification that a consumer or other value chain participant is who she says she is and/or is a member of one or more particular groups, classes and/or organizations.

Providing trusted verification that a group of value chain participants are collectively who they say they are, wherein a plurality of certificates from different parties ate tested as an aggregate and where such aggregate of certain certificates is required under certain circumstances to use content and/or execute one or more control processes.

Automatically producing a certificate, representing authentication of a value chain or value chain portion, as a result of the confluence of a plurality of certain certificates.

Anticipating, through the use of rules and controls, allowable collections of certificates from plural parties that can form a certificate that virtually represents a specific group of certified parties and in the presence of certain certificates identifying two or more anticipated parties and/or parties who have met a certain criterion—e.g., sufficient transaction revenue, sufficient credit worthiness, etc.—a new certificate may be automatically generated and act as a composite certificate certifying the plural parties collective and coordinated presence, and wherein said certificate can be associated with certain rules and controls allowing certain electronic activities such as usage of content and/or control processes in, for example, multiparty EDI, content distribution, trading system, and/or financial transaction systems.

Generating one or more certificates at least in part as a result of rules and controls governance of certificate creation, wherein such generated one or more certificates are produced, for example, as a result of secure rules and controls based one or more instructions after the satisfaction of certain required criteria such as certain specific activities by each of plural parties—e.g. provision of one or more certificates and/or authorizations and/or usage activity and/or credit and/or payment activity and/or reporting activity and/or VDE supported electronic agreement activity (including, for example, electronic negotiation activity).

Certifying other support services (e.g., financial clearinghouses, usage clearinghouses, rights and permissions clearinghouses, transaction authorities, and other certifying authorities, etc.).

Certifying based on another certificate (e.g., identity) and an automatic secure database lookup which may be performed locally, across a distributed database arrangement, or remotely.

Providing non-automatic (i.e., at least in part human provided or assisted) services issuing more fundamental certificates (e.g., identity certificates) based on physical evidence in addition to automatic services for issuing dependent certificates.

May use public key cryptography, private key, and/or secure VDE virtual networks to support, e.g. create, digital certificates.

Can issue certificates that support the context for rights usage in an automatic, trusted, distributed, peer-to-peer secure electronic environment that supports chain of handling and control.

As with other Distributed Commerce Utility services, supporting an unlimited variety of different business models and scenarios through general purpose, reusable, programmable, distributed, modular architecture.

Can issue certificates that support control sets having elements whose use is dependent on presence and/or absence of specific, and/or class and/or non-specific, one or more digital certificates attesting to certain facts and where differing requirements may coexist regarding the presence or absence of certificates related to differing issues.

Can issue one or more certificates that cooperate with conditional electronic control sets to grant certain rights only to certain consumers and/or other value chain participants, including, for example, consumers.

Issuing replacements for expired certificates and supporting sophisticated time and/or usage and/or other event driven expiration (including termination) of certificates—for example, where criteria for such expiration may variety based upon specific certificates, classes of certificates, specific and/or classes of users, user nodes, etc.

Maintaining and distributing, including selectively distributing to distributed nodes revocation list information, based, for example, upon node distributed profiles and/or rules and controls.

Distributing revocation list information among interoperable, peer-to-peer networked, Distributed Commerce Utility nodes on a time based, other event based manner, wherein information is selectively distributed to certain one or more nodes in accordance with agreed to revocation information requirements and/or where revocation information is non-selectively distributed to certain one or more nodes.

Receiving authority from secure chain of handling and control embodied in electronic control sets.

Distributing certificate authority functions across a network or other system (for example, every consumer node is potentially a certificate authority with respect to certain kinds of certificates; parents may be empowered to issue certificates for their children).

Organizing certificate authorities hierarchically, including allowing automatic verification of some certificate authorities (that is, their issued certificates and associated determinations regarding trustedness, appropriateness, etc.) through reliance on certificates issued by other certificate authorities at least in part for such purpose.

Granting authority and/or providing services to, or in conjunction with, one or more distributed certificate authority sub-clearinghouses whose operations may be located logically and/or physically elsewhere, such as within a company or government agency and/or within one or more jurisdictions and/or serving subsets of the overall business focus area of a senior certificate authority clearinghouse distributing and/or otherwise authorizing rights clearing functions across a system or network.

Every consumer and/or certain or all other value chain participant nodes can potentially support a distributed certificate authority clearing service initiating its own, secure certificates and function in the context of the overall clearinghouse network, including, clearinghouse interoperation with one or more other participants interoperable nodes, and as elsewhere in this list, all activities employing VDE techniques as appropriate.

Providing liability acceptance control (i.e., for insuring digital certificates based on the amount of liability accepted by the issuer(s)), and may include securely maintaining information regarding such liability acceptance and providing notices to recipients of such certificates regarding the liability protection afforded by such certificates, and may further include recipients of such insured certificates accepting, for example, through explicit VDE managed electronic acceptance or through implied acceptance by continuing, any liability above the insured amounts.

May be organized hierarchically, peer-to-peer, or in a combined mode where responsibility for certificate authority activities may be distributed in differing fashions for differing commerce models and/or activities and/or value chains and where certain one or more parties may be, for example, hierarchically more senior to other parties in one or more instances and hierarchically a peer or less senior in one or more other instances, that is the relationship among participants is programmable and may be set (and later modified) to represent one or more desired specific certificate authority arrangements for given commerce activities, value chains, or models.

FIG. 47 shows an example certifying authority 500 from a process viewpoint. In this example, certifying authority 500 creates digital documents called certificates 504 that "certify" some fact, such as identity or class membership. For example a trusted third party certifying authority 500 can provide a secure digital assurance that a consumer is who she claims to be or has certain characteristics, attributes, class memberships, or the like. For example, some attributes may signify membership in a particular class (e.g., all employees of a certain company), those born before a certain date, those having a certain physical disability, members of the faculty, administration or student body of a college, or retired members of the armed forces.

In this example, digital certificates 504 issued by certifying authority 500 are used as a conveyor of the context of rights usage and transaction authorizations. As described in the Ginter et al. patent disclosure, certificates 504 are particularly powerful in the virtual distribution environment because they provide contexts for rights usage. For example, class-based certificate use and automated, distributed governance of commerce rights may fundamentally enhance the efficiency of trusted networks. Suppose, for example, that a content publisher wants to charge commercial prices for a scientific journal subscription to all those but in higher education and is willing to give college and university students and professors a 20% discount. Digital certificates 504 issued by a trusted certifying authority 500 can be used to automatically provide assurances—within the context of distributed electronic network—that only people who are truly entitled to the discount will be able to exercise it (in this example, that only those certified as affiliated with an institution of higher education).

In the FIG. 47 example, certifying authority 500 may perform the following overall functions:
Fact collection and checking 522,
Certification generation 524,
Maintaining revocation lists 526,
Certificate and revocation list distribution 528,
Authentication 530,
Certificate renewal 532,
Authorization 534,
Replication 536,
Propagation 538, and
Archive 554.

Certifying authority 500 may gather evidence 502 as a basis for which to issue digital certificates 504. In this example, evidence 502 may include other digital certificates 504' (e.g., so that one certificate can build on another). The fact collection and checking function 522 may accept this evidence 502 as well as additional trustedness data 540 (e.g., information concerning compromised or previously misused certificates) Certificate generation function 524 may generate new digital certificates 504 based upon this fact collection and checking process 522. Distribution function 528 may then distribute the new digital certificates 504, and issue bills 542 to compensate a certifying authority for undertaking the effort and liability that may be associated with issuing the certificate.

Certifying authority 500 may also maintain a revocation list 542 based on trustedness data 540 indicating, for example, certificates that have been compromised or that previously certified facts are no longer true (for example, Mr. Smith used to be a Stanford University professor but has since left the University's employ). The maintained revocation list function 526 is important for providing a mechanism to ensure that "bad" certificates cannot continue to be used once they are known to be bad. Certificates 504 issued by certifying authority 500 can expire, and the certifying authority can (for example, for a fee) renew a previously issued certificate by performing certificate renewal function 532. The certifying authority 500 may maintain a record or database of the certificates it has issued, and this database can be distributed—which can benefit from replication function 536 and propagation function 538 to accurately and efficiently distribute the database across a number of different locations.

Figure 48:
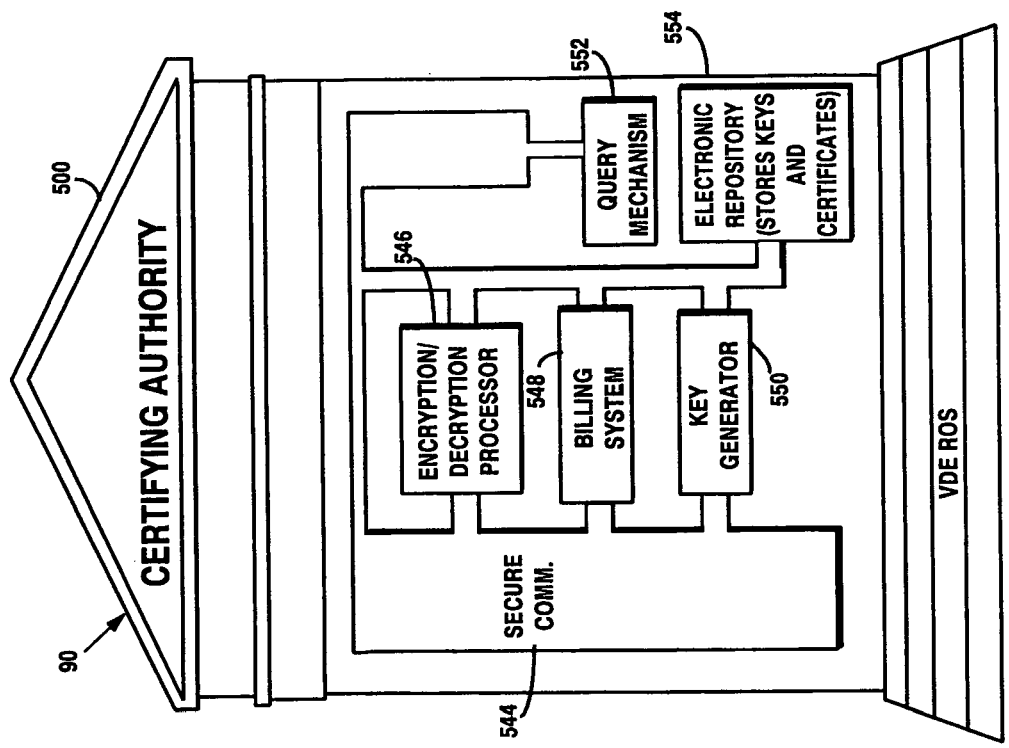
FIG. 48 shows an example certifying authority architecture.

FIG. 48 shows an example architecture for certifying authority 500. In this example, certifying authority 500 may include a secure communications facility 544, an encryption/decryption processor 546, a billing system 548, a key generator 550, a query mechanism 552, and an electronic archive 554. In this example, secure communications 544 is used to communicate with other electronic appliances 100 and/or other Commerce Utility Systems 90. Electronic archive 554 stores keys, certificates 504 and other information required to maintain the operation of certifying authority 500. Encryption/decryption processor 546 is used to create digital certificates 504 by using strong cryptographic techniques. Billing system 548 issues bills 542. Query mechanism 552 is used to query electronic archive 554. Key generator 550 is used to generate cryptographic keys the certifying authority 500 needs for its own operation.

FIG. 49 shows an example certifying authority process. In this example, a publisher may send an electronic secure container 152 to a consumer 95. To use certain permissions 188a in secure container 152, the consumer 95 may require a certificate from certifying authority 500 that certifies as to a particular fact about the consumer (e.g., the consumer is a United States citizen, the consumer is a retired member of the armed forces, the consumer is over 18 years of age, etc.). The consumer may generate a request 502 to certifying authority 500 for issuance of an appropriate certificate. Certifying authority may check the evidence 502 the consumer 95 provides, or that some third party may provide, and—once the certificate authority 500 is satisfied—issue the consumer the required digital certificate 504. This digital certificate 504 may be used not only with the publisher's control set 188a, but with control sets from other rights holders that require certification of the same fact and that have agreed to trust certificate authority 500 as an issuer of certificates.

Certifying authority 500 may communicate with consumer 95 using secure containers 152. It may generate and provide a control set 188b with certificate 504. This control set 188b may control some aspect of usage of the certificate 504 (e.g., it may not be redistributed and/or modified) and/or to define a chain of handling and control for the issuance of further dependent certificates (e.g., parents give authority to issue certificates about their offspring).

One certificate authority 500 may be "proxied" to issue certificates on behalf of another—such as for example in a chain of handling and control defined by one or more electronic control sets 188. Distributing the certifying authority 500 across a number of different electronic appliances has certain advantages in terms of efficiency for example. FIG. 50 shows one useful example of this distributed certificate issuance scenario.

FIG. 50 shows that a rightsholder 164 (and/or a rights and permissions clearinghouse 400) may request (e.g., by issuing electronic controls 188a within a secure container 1552a) a certifying authority 500 to issue digital certificates 504(1) to accredited institutions of higher learning such as institution 1060. Control set 188a may establish the policies and procedures necessary to ascertain whether in fact a particular institution is duly accredited. Based on electronic controls 188a and evidence 502 submitted by the institution 1060, the certifying authority 500 may issue a digital certificate 504A attesting to the fact of accreditation.

In order to take advantage of certificate 504A, a student, faculty member and/or staff member of institution 1060 may need to provide a further certificate attesting to the fact that he or she is affiliated with institution 1060. Instead of having certifying authority 500 issue a further certificate 504 to each student, faculty member and staff member of institution 1060, it may be efficient and/or desirable for each institution 1060 holding a certificate 504A to issue dependent certificates 504(2) to its own faculty, staff and students. For example, institution 1060 may maintain a current list of all students, faculty and employees. Rather than requesting certifying authority 500 to issue a separate certificate 504(1) to each student, faculty member and employee of institution 1060, the institution may undertake this responsibility itself.

For example, institution 1060 may elect to operate its own, distributed certifying authority 500A. In one example, certifying authority 500 may issue electronic controls 188b (subject to controls 188a issued by rights holder 164, for example) that delegate, to the institution's certifying authority 500A, the authority and responsibility to issue dependent certificates 504(2) within certain limits (e.g., attesting to a limited universe of facts such as for example "This person is officially associated with the institution 1060"). Such dependent certificates 504(2) could, for example, be copies of certificate 504(1) with an addendum stating that a particular person is associated with the institution 1060 and stating a particular expiration date (e.g., the end of the current academic term). The institution's certifying authority 500A may then issue such dependent certificates 504(2) to each faculty member, student and staff member on its current roster.

Recipients of certificates 504(2) may need a still further certificate 504(1) attesting to their identity. This is because certifying authority 500A issues certificates 504(2) attesting to the fact that a certain named person is affiliated with institution 1060—not to the fact that a particular recipient of such a certificate is that person. The recipient may need to obtain this further "identity" certificate 504(1) from a governmentally operated certifying authority 500 such as a state or federal government.

Rightsholder 164 (and/or a rights and permissions clearinghouse 400 not shown) may issue control sets 188c for digital properties 166 that grant discounts or that provide other benefits to those who can provide a combination of valid digital certificates 504 attesting to their membership in the class "accredited higher education institution." Each student, faculty member and staff member of the institution 1060 who has received a certificate 504(2) may take advantage of these discounts or other benefits. FIG. 50A illustrates how such different digital certificates can be used to support certificate-conditional controls 188—that is, control sets whose elements are dependent on the presence or absence of certificates 504 that attest to certain facts.

In this FIG. 50A example, one or more control sets 188c include a number of discrete controls 188(1) . . . 188(N) applying to the same digital property 166 or group of properties, for example. Control 188(3) may provide additional and/or different rights to all students, faculty and staff members of Stanford University. In the FIG. 50A example, multiple certificates can be used together to provide the requested certifications. For example, the certificates 504(1), 504(2), 504A shown in the FIG. 50 example can be used together to allow a particular person to take advantage of a discount offered to students, faculty and staff members of accredited institutions of higher learning. For example:

a certificate 504(1) may attest to the fact that a certain person John Alexander is who he says he is.

another certificate 504A may attest to the fact that Stanford University is an accredited institute of higher learning, another certificate 504(2) may attest to the fact that John Alexander is a student at Stanford University for the current academic semester.

Each of these various certificates 504 can be issued by different certifying authorities 500. For example, one certifying authority 500 (e.g., operated by a governmental entity) might issue a certificate 504(1) certifying the consumer's identity, while another certifying authority may issue certificate 504(2) attesting as to student status, and a third certifying authority may issue the certificate attesting to the fact that Stanford is an accredited University (see FIG. 50).

As an additional example, a control set element 188(1) shown in FIG. 50A may provide a certain benefit for California residents. Its condition may be satisfied by the consumer presenting a digital certificate 504(3) certifying residency (e.g., in combination with the "identity" certificate 504(1)). A still further permission 180(N) shown in FIG. 50A might be satisfied by presenting a certificate 504(5) indicating U.S. citizenship. Such certificates 504(3), 504(5) that warrant that a given person is subject to one or more jurisdictions (for example, a resident of, or doing business in a particular city, state, nation, or other political unit—and therefore, subject to that unit's sales, income, or other taxes, or subject to certain administrative fees) are particularly useful for interstate and/or international commerce transactions. For example, a certifying authority 500 might issue a certificate 504 to a financial clearinghouse 200 in the United Kingdom. This certificate 504 could be used in conjunction with control sets 188 distributed by rightsholders and/or a rights and permissions clearinghouse 400 specifying that only United Kingdom financial clearinghouses 200 are authorized to accept payment in pounds sterling. A customer wishing to pay in pounds sterling will only be able to complete the payment transaction if the financial clearinghouse being used has the appropriate UK certificate. This UK clearinghouse might then pay appropriate UK taxes—relieving the provider from the burden of having to determine which of his or her transactions were subject to UK tax payments and which were not.

FIG. 50A also shows a further certificate 504(4) certifying that a certain person is married to a certain other person. To use certificate 504(4), it may also be necessary to present the first certificate 504(1) certifying identity. Such certificates attesting to relationship between individual people or between people and organizations are useful in allowing, for example, family members to use the certificates of other family members (e.g., a person can obtain a benefit based on his or her spouse's or parents' certified credential(s)).

FIGS. 51–51D show example detailed formats of various digital certificates 504. The FIG. 51A digital certificate 504(1) may certify that a person is who he says he is. This certificate 504(1) might include, for example:

a field 560(1) stating the person's name, a field 560(2) specifying the person's date of birth, an expiration field 560(3) specifying when the digital certificate expires, a public key 560(4) corresponding to the person's public key, an ID code 560(5) (which in this example could be a hash of the public key field 560(4)), and a check sum field 560(6) providing an error checking ability.

Digital certificate 504(1) is encrypted in this example by the certifying authority 500 using the certifying authority's private key of a public key-private key cryptosystem pair, such as RSA or El Gamal. The certifying authority 500's corresponding public key can be made public (e.g., by publishing it in several publicly accessible sites on the World Wide Web or in another widely distributed context), or it could remain secret and never be exposed outside of protected processing environments 154. In either case, successful decryption of the digital certificate 504(1) to reveal the original clear text information provides a high degree of assurance that the digital certificate was issued by certifying authority 500 (presuming that the certifying authority's private key has not been compromised).

Expiration field 560(3) is useful because people who skip checks of revocation lists have at least some assurance that a certificate is good if it must be renewed periodically. Expiration date field 560(3) provides an additional safeguard by insuring that certificates do not last forever—allowing certifying authorities 500 to use different cryptographic key pairs for example to provide overall integrity and trustedness of the certification process. Changing the certifying authority 500's key pair reduces the incentives for an adversary to break a given key, because the amount of information protected by that key is limited, and the fraudulent use of a compromised key will only have a limited time of effectiveness. Furthermore, (currently) unexpected advances in mathematics may render some cryptographic algorithms useless, since they rely on (currently) theoretically intractable computations. A built in mechanism for changing the certifying authority 500's keys allows the impact of such breakdowns to be limited in duration if new algorithms are used for reissued certificates (alternatively, this risk can also be addressed by using multiple asymmetric key pairs generated in accordance with different algorithms to sign and validate keys, at the cost of additional decryption time).

FIGS. 51B, 51C and 51D show additional digital certificate examples containing different sorts of information (e.g., professional credential field 560(7) in the case of certificate 504(5), address field information 560(8) in the case of certificate 504(3), and student credentials field 504(9) in the case of student certificate 504(2)). These certificates 504(2), 504(3), 504(5) are tied to identity certificate 504(1) via the common ID field 560(5), and both the identity certificate and the independent certificate would generally need to be presented together.

FIG. 51E shows how an example digital certificate issued by one certifying authority can—in conjunction with a trusted database—be the basis for another certifying authority to grant another certificate. One certifying authority 500A can, for example, validate user identity and create the identity certificate 504(1) shown in FIG. 51A. The user can submit this identity certificate 504(1) to another certifying authority 500B that has a data base 554a of people and/or organizations who have a particular attribute. For example, certifying authority 500B may be operated by a professional organization that maintains an internal database 554a. Certifying authority 500B will trust the contents of this internal database 554a because the certifying authority 500B maintains it and keeps it accurate.

By comparing the identity information in the FIG. 51A certificate with the contents of the trusted database 554a, certifying authority 500B can issue the FIG. 51B certificate without requiring any physical evidence from the owner of the FIG. 51A certificate. This solves an important problem of requiring the user to "show up" each time he needs a highly trusted certificate—and also allows the second certificate-generating the process to be automated.

FIG. 51E also shows that the certificate 504(2) issued by certifying authority 500B may be (along with identity certificate 504(1)) a sufficient basis for a further certifying authority 500C to issue a further certificate 504(3) based on its own lookup in a trusted database 554b.

Another example would be a corporation that has proven its identity to the Secretary of State in the jurisdiction in which it is organized. If this corporation has passed muster to handle hazardous material it could submit its certificate of identity 504(1) from the Secretary of State (which in this case would comprise certifying authority 500A) to the agency (certifying authority 500B responsible for maintaining the database 554a of which companies are currently qualified and authorized to handle hazardous materials. The certifying authority 500B could then issue a certificate 504(2) attesting to this fact in an entirely automated way if desired.

Figure 52:
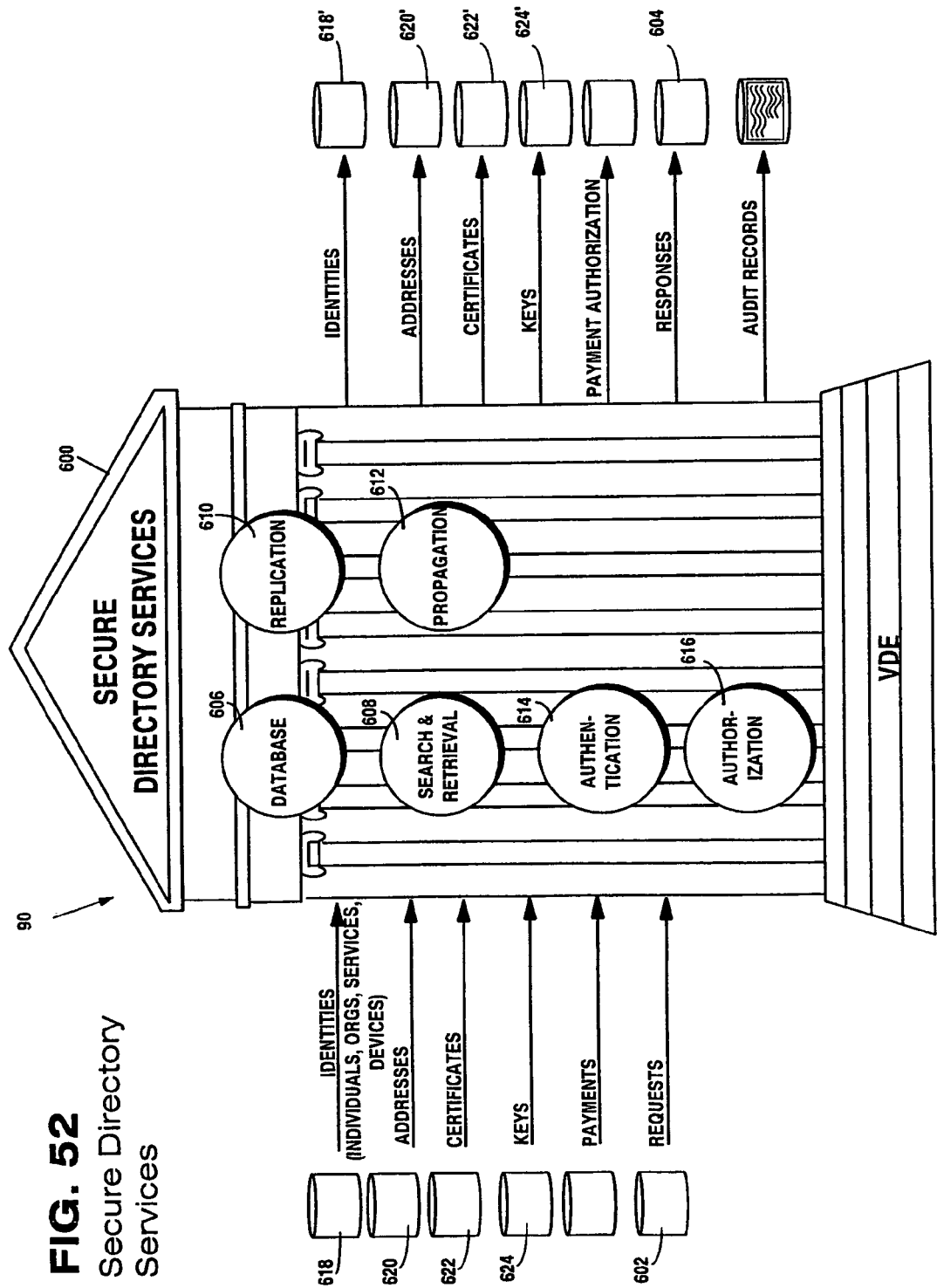
FIG. 52 shows an example secure directory services Commerce Utility System.

Insert before heading on p 219 Secure Directory Services (FIG. 52 shows)

Certification to Allow Participants to Act as Agents of an Entity

Sometimes, one or more participants in a particular value chain, or having a particular relationship with other participants, need to be authorized to act on behalf of the collection of participants. For example, several parties may wish to act based on authorization from the partnership or joint venture of which they are a member—or all participants within a particular value chain may need to act for the value chain as a whole. Each of the participants receiving such authority from the entity may need authorization from the entity to act.

The present invention provides a mechanism in which digital certificates 504 may be used to create a "virtual entity" that can grant any combination of participants any combination of the same or different powers to exercise defined powers under controlled conditions of use. More particularly, a digital certificate grants each participant in a virtual entity the power to act on behalf of the entity—within the constraints of the conditions of use and further with any consequences defined in the conditions of use specified by electronic controls associated with the container.

Figure 51F:
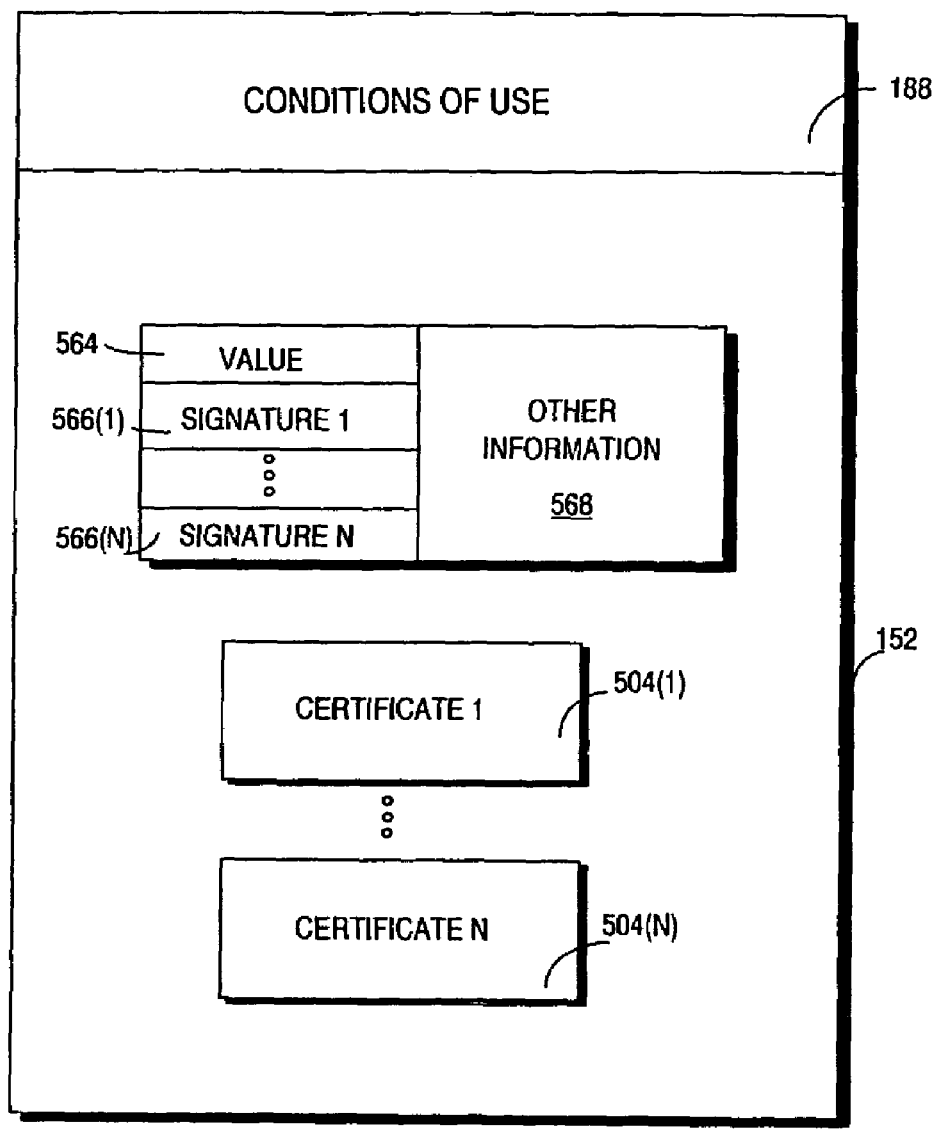
FIGS. 51F–51H show an example technique for defining a virtual entity.

FIG. 51F shows an example electronic container 152 that encases the following information:

a value 564 that identifies the "virtual entity,"

signatures 566(1)–566(N)—one for each member of the entity, other information 568 pertaining to the entity, digital certificates 504(1)–504(N)— one for each member of the entity, and control information 188 that specifies powers (e.g., rights or permissions) and "conditions of use."

Value 564 provides an identifier that uniquely identifies the entity. The "other information" field 568 may provide further information concerning the entity (e.g., the name of the entity, the name and address of each participant, the expiration date on which the entity ceases to exist, and other information). Signatures 566(1)–566(N) are like signatures on a partnership agreement—each member of the virtual entity affixes his or her "signature" to indicate assent to be a member of the entity and assent to the conditions being granted to each participant.

Container 152 in this example further includes an electronic control set 188 describing conditions under which the power may be exercised. Controls 188 define the power(s) granted to each of the participants—including (in this example) conditions or limitations for exercising these powers. Controls 188 may provide the same powers and/or conditions of use for each participant, or they may provide different powers and/or conditions of use for each participant.

For example, controls 188 may grant each participant in a virtual entity the power to act as a certifying authority 500 on behalf of the entity. In this particular example, controls 188 may allow each party of the virtual entity to make certificates on behalf of the virtual entity—within the constraints of the conditions of use and further with the consequences defined in the conditions of use specified by controls. As discussed above, the right to grant certificates is only an example—any type of electronic right(s) or permission(s) could be granted based on any type of electronic condition(s) of use.

Figure 51G:
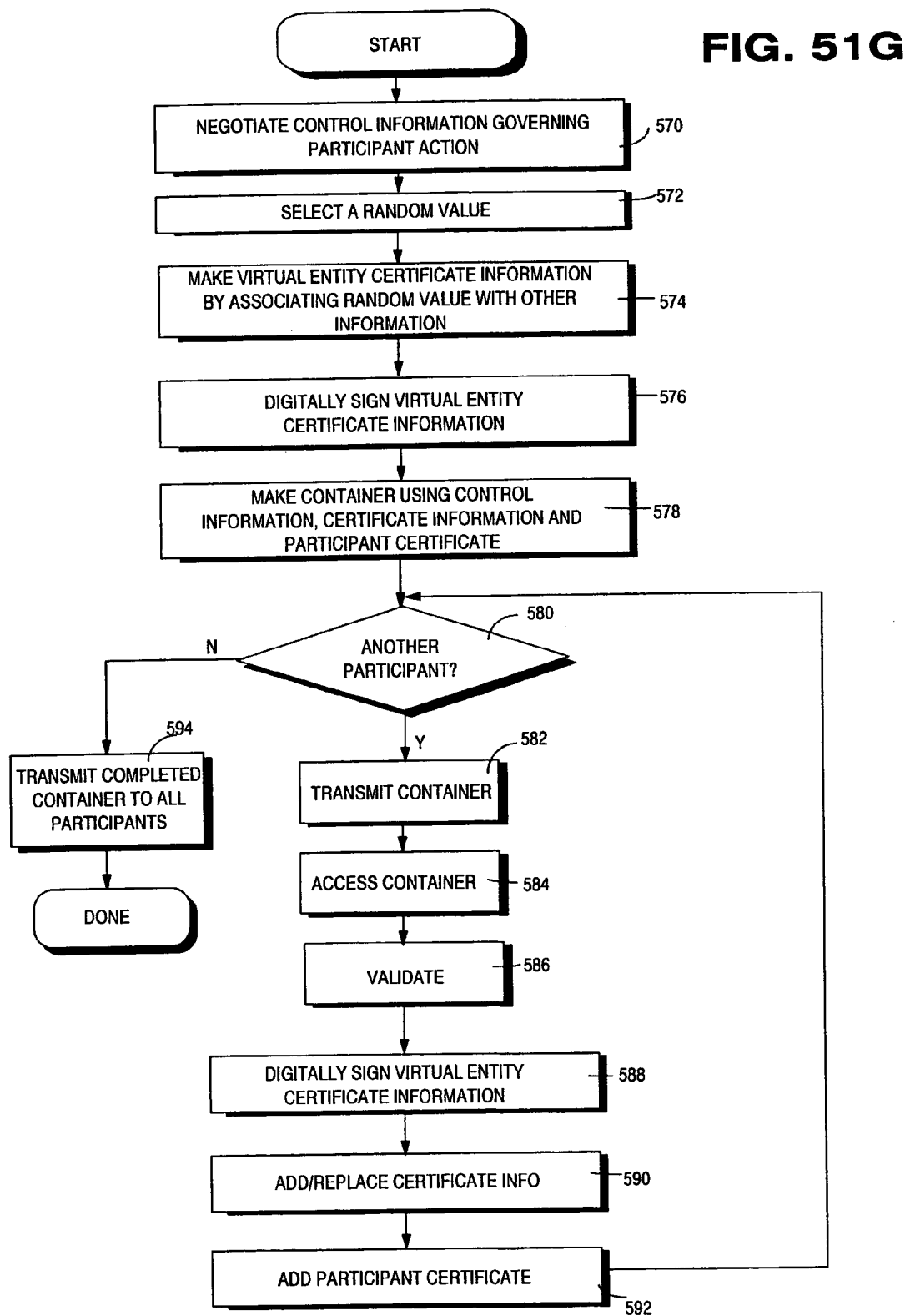

FIG. 51G shows one example process for creating the FIG. 51F container 152. In this example, the parties to the virtual entity may negotiate control information governing collective action based on, for example, the electronic negotiation techniques shown in FIGS. 75A–76B of the Ginter et al. patent specification (FIG. 51G, block 570). The resulting control information 188 specifies "conditions of use" such as the rights that may be exercised by each participant in the entity, and limitations on each of those rights (which may be defined on a participant-by-participant basis).

The participant initiating issuance of digital container 152 (actually, the participant's protected processing environment 154) may select a random value for use as entity identifier value 564 (FIG. 51G, block 572). The participant's PPE 154 may next create the certificate information for the virtual entity by associating the entity identifier value 564 with other information 568 (FIG. 51G, block 574). The participant's PPE 154 may next sign the virtual entity certificate information to indicate the participant's assent to be a member of the virtual entity and assents to the conditions of use control information 188 (FIG. 51G, block 576).

The participant's PPE 154 may then make electronic container 152, and place into it the control information 188, the virtual entity certificate information 564, 566, 568, and the participant's own certificate 504 specifying a cryptographic key the participant may use to exercise rights (FIG. 51G, block 578). The participant may then determine whether any more participants need to be added to the entity certificate (FIG. 51G, decision block 580). If yes, the container 152 may be transmitted (FIG. 51G, block 582) to another participant member of the virtual entity and accessed and validated by that next participant (FIG. 51G, blocks 584, 586). The next participant may similarly sign the virtual entity certificate information by adding his signature 566(2) to the list—indicating the she also agrees with the controls 188 and agrees to join the virtual entity (FIG. 51G, block 588). This new information is used to add to and/or replace the entity certificate information 564, 566, 568 (FIG. 51G, block 590). This next participant also adds their own certificate 504(2) to the container 152 (FIG. 51G, block 592).

Steps 580–592 may be repeated until container 152 has been signed by each participant within the virtual entity ("no" exit to decision block 580). The completed container 152 may then be transmitted to all participants (FIG. 51G, block 594).

Figure 51H:
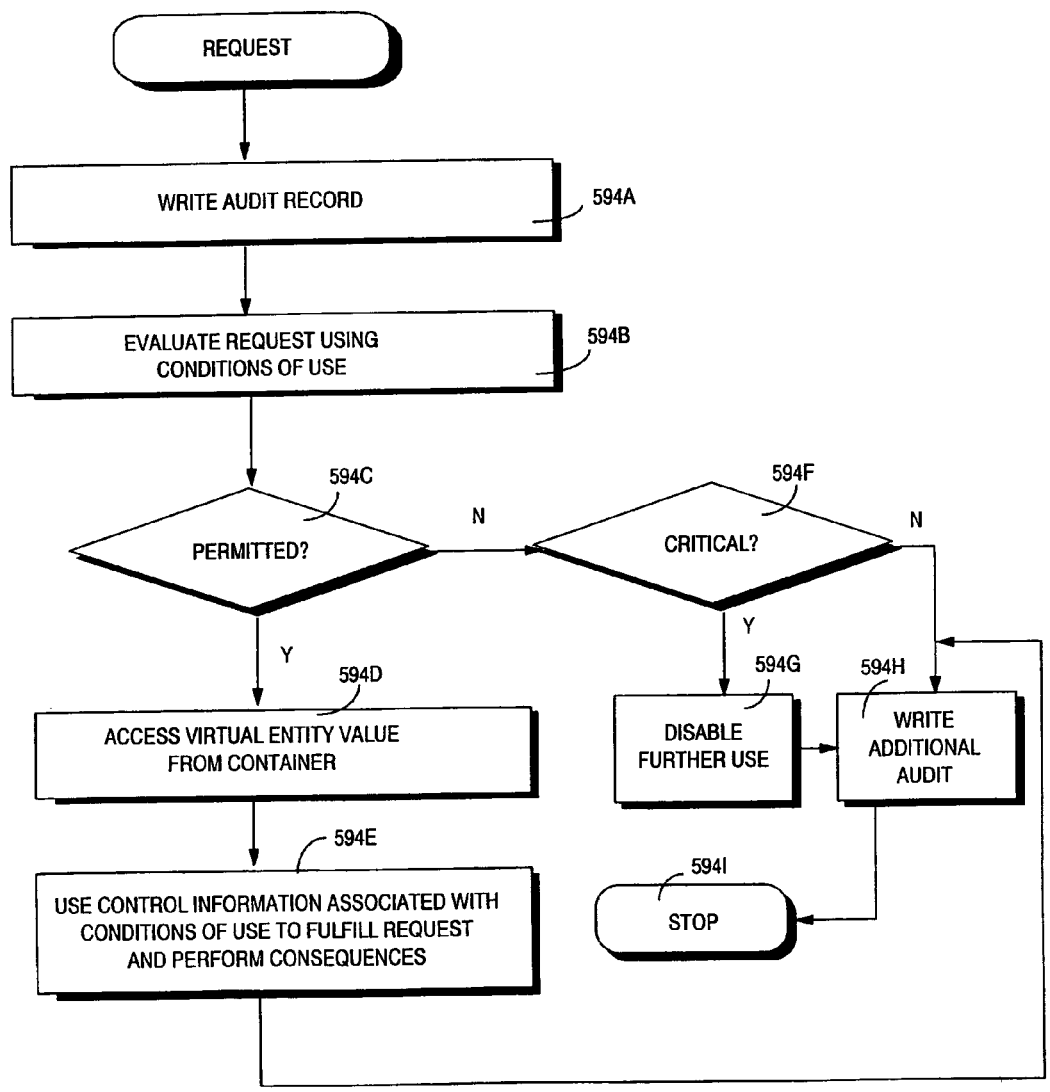

FIG. 51H shows an example process a virtual entity participant may use to exercise powers on behalf the virtual entity based on the controls 188 shown in FIG. 51F. The FIG. 51H example process is performed by the participant's protected processing environment 154 based on a request. The participant's protected processing environment 154 writes an audit record (FIG. 51H, block 594a) and then evaluates the request using the conditions of use specified by controls 188 (FIG. 51H, block 594b). If the request is permitted by the controls 188 ("yes" exit to decision block 594c, FIG. 51H), the participant's protected processing environment 154 accesses the virtual entity value 564 from container 152 (FIG. 51H, block 594d) and uses the control information 188 associated with conditions of use to fulfill the request and perform appropriate consequences (FIG. 51H, block 594e). In one example, the participant's protected processing environment 154 may act as a certifying authority 500 on behalf of the virtual entity by issuing a digital certificate 504 in accordance with the conditions of use—digitally signing the digital certificate by encrypting the entity identifier value 564 with a cryptographic key corresponding to the participant's own certificate 504 within container 152, and making the digital certificate part of the newly issued certificate. The example may then write additional audit information 594H reporting on the action it has taken.

If the requested action is not permitted by controls 188 (FIG. 51H, "no" exit to decision block 594c), the example FIG. 51H process determines whether the error is critical (decision block 594f). If the error is critical ("yes" exit to decision block 594f), the process may disable further use of the information within container 152 (block 594g), writes additional audit information (block 594h), and then stops (FIG. 51H, block 594i). If the error is not critical ("no" exit to decision block 594f), the protected processing environment 154 writes additional audit information (block 594h) and may then end this task (FIG. 51H, block 594i).

The processes and techniques shown in FIGS. 51F–51H have a variety of different uses. As one example, suppose that a first publisher publishes a derivative work including his own content and content provided by a second publisher. The two publishers may form a virtual entity that allows the first publisher to act on behalf of the entity—but only in accordance with the conditions of use negotiated and agreed upon by both partners. For example, the second publisher may be willing to allow the first publisher to republish the second publisher's content and to allow excerpting and anthologizing of that content by consumers 95—but only if the consumers present an appropriate certificate 504 issued by the virtual entity attesting to the fact that the consumer is permitted to exercise that right. For example, only special subscribers having certain characteristics may be entitled to receive a certificate 504. The techniques above allow the first publisher to issue certificates 504 to subscribers on behalf of the virtual entity comprising both the first and second publishers. The second publisher can be confidant that the first publisher will only issue certificates in accordance with the conditions of use negotiated and agreed by both publishers.

Another example is a manufacturing process comprising multiple participants. The conditions of use provided by controls 188 may allow any of the value chain participants in the manufacturing process value chain to perform certain actions on behalf of the value chain as a whole. For example, a materials manufacturer, a finished goods supplier and the shipping company that transports materials between them may for a virtual entity. This virtual entity may then submit a control set to a transaction authority that describes a process that describes all three participants acting in concert. For example, the control set created in accordance with the conditions of use applicable to their virtual entity might permit a unified presentation of materials requirements, finished appearance and delivery schedule, as one simple example.

In another example, a semiconductor company, a systems integrator, and three different suppliers of software may form a virtual entity supporting the semiconductor company's chip design, simulation, and design testing applications. In this example, certificates may be issued to each company comprising this example entity and to particular individuals within each of the companies. Rules and controls negotiated among the companies may specify who has access to which parts of the software applications and associated databases and who may make modifications to the software and/or data. In this way, the semiconductor company can authorize access to outside contractors and/or suppliers and to specific individuals representing those outside companies. These individuals may be authorized just enough access to solve typical problems and perform system maintenance tasks. Also, they may be granted additional rights (authorizations) for a limited period of time in order to resolve specific problems requiring for resolution access to certain executables and/or data not included in their default permissions.

The virtual entity feature of the present invention represents, in part, an extension that builds upon the chain of handling and control techniques disclosed in Ginter et al. For example, certificates produced in accordance with this aspect of the present invention can use capabilities of a VDE chain of handling and control to manage a chain of certificates.

Secure Directory Services

FIG. 52 shows an example of a secure directory services Commerce Utility System 600. Secure directory services may securely provide electronic and/or other directory information such as names, addresses, public keys, certificates and the like. Transmittal of such information securely (e.g., through the use of, in the preferred embodiment, the Virtual Distribution Environment) helps prevent eavesdropping, helps ensures confidentiality, and provides significant infrastructure support by enabling important participant interaction efficiencies.

In more detail, secure directory services provided in accordance with these inventions may provide the following example advantageous features and functions:

Securely and reliably providing directory information based on a variety of different parameters, including various classification information.

May securely provide consumer's, content provider's, clearinghouse's and/or other party's electronic address (es) and/or other communication pathway(s) based on name, function, physical location, and/or other attributes.

May provide consumer's, content provider's, clearinghouse's and/or other party's public key(s) and/or certificate(s) based on, for example, name, function, physical location, and/or other attributes.

Protects, and where appropriate may conceal, identity related information while efficiently managing and/or automating the confidential communicating of requests and responses in secure containers.

Using secure containers and rules and controls to guarantee integrity and non-reputability of content.

Receiving authority from secure chain of handling and control embodied in electronic control sets.

Distributing secure directory services functions across a network or other system (for example, every consumer and/or other value chain participant node is potentially a distributed secure directory service initiating its own, secure directory service transactions directly with one or more other participants using VDE as described in the Ginter, et al. patent specification).

Granting authority and/or providing services to, or in conjunction with, one or more distributed secure directory services sub-clearinghouses whose operations may be located logically and/or physically elsewhere, such as within a company or government agency and/or within one or more jurisdictions and/or serving subsets of the overall business focus area of a senior directory service authority distributing and/or otherwise authorizing secure directly service functions across a system or network.

Every consumer and/or certain or all other value chain participant nodes can potentially support a secure directory services authority providing naming and related services and function in the context of the overall naming services network, including interoperation with one or more other participants interoperable nodes, and as elsewhere in this list, all activities employing VDE techniques as appropriate.

May be organized hierarchically to delegate responsibility for, and operation of secure directory services for a subset of the overall directory based on name, function, physical location, and/or other attributes.

May be organized hierarchically to provide a directory of directories, for example.

May be organized hierarchically, peer-to-peer, or in a combined mode where responsibility for directory services may be distributed in differing fashions for differing commerce models and/or activities and/or value chains and where certain one or more parties may be, for example, hierarchically more senior to other parties in one or more instances and hierarchically a peer or less senior in one or more other instances, that is the relationship among participants is programmable and may be set (and later modified) to one or more desired specific directory service arrangements for given commerce activities, value chains, and/or models.

FIG. 52 shows an example secure directory services 600 from a process point of view. In this example, secure directory services 600 is an archive that securely keeps track of directory information relating to consumers, value chain participants and/or electronic appliances, and securely provides this information upon qualified demands. In this example, secure directory services 600 may provide the following functions:

Database management 606,
Database search/retrieval 608,
Database replication 610,
Database propagation 612,
Authentication 614, and
Authorization 616.

Database 606 may be accessed by search and retrieval engine 608 which takes consumer-provided input information as a source and uses it to retrieve records that are relevant. For example, secure directory services 600 may receive identities 618 of individuals, organizations, services and/or devices; electronic addresses 620; certificate 622; and/or keys 624. This information may be stored in database 606.

In response to requests 602, secure directory services search and retrieval engine 608 may access database 606 to retrieve additional information (for example, the electronic mail address of a certain individual or organization, the public key of a certain individual, the identity of a person having a certain electronic mail address, the identity and address of a person having a certain public key, etc.).

Additionally, secure directory services 600 may return access controls, audit requirements and the like. For example, a user may be required to present valid credentials (e.g., a certificate 504) to access the internal email addresses of a corporation. Certain fields of information known to the database 606 may not be available to all corners (e.g., the office location or a particular employee, their home directory (ies) on the company's servers, etc.; or a consumer's physical address may be available to people that present a certificate 504 issued by the consumer acting as his own certificate authority 500, but no one else. These controls can be specified in secure containers that carry the information to the secure directory service 600.

When the information is provided to requesters, they may be required to use the information only in authorized ways. For example, they may be allowed to use the information to formulate email messages, but not excerpt a physical address for a mailing list. These restrictions can be enforced by controls 188b the secure directory services 600 associates with the information it provides.

Figure 53:
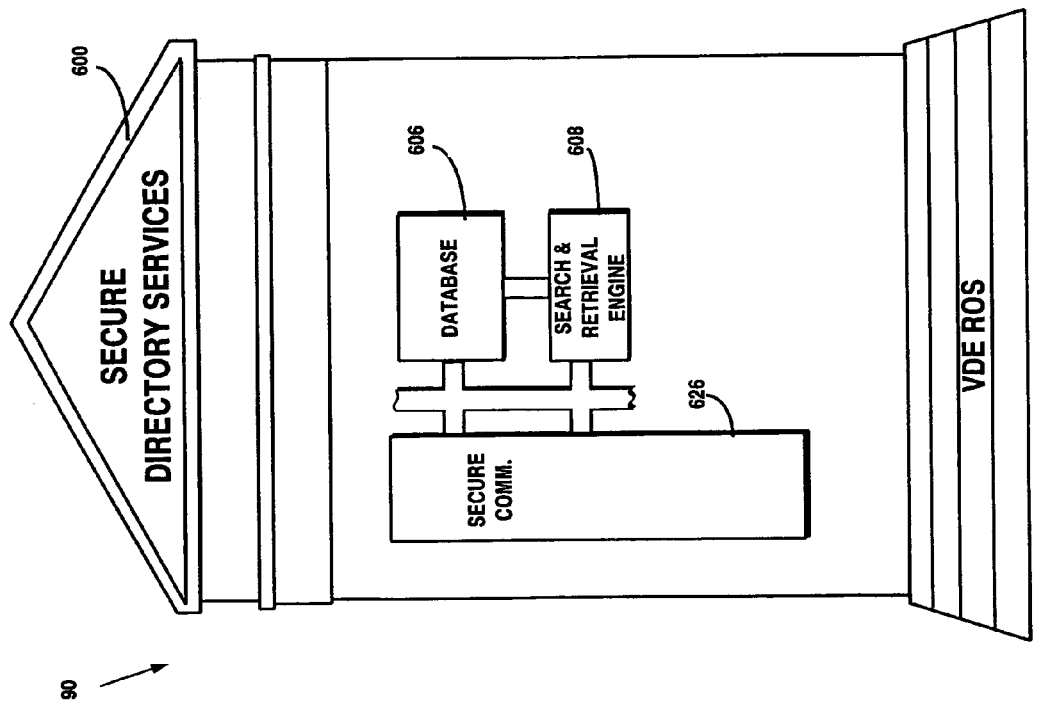
FIG. 53 shows an example secure directory services architecture.

As shown in FIG. 53, secure directory services 600 may provide a database 606 and search and retrieval engine 608 in addition to a secure communications facility 626. The architecture of secure directory services 600 may be based on FIGS. 12 and 13 of the Ginter et al. patent disclosure.

Figure 54:
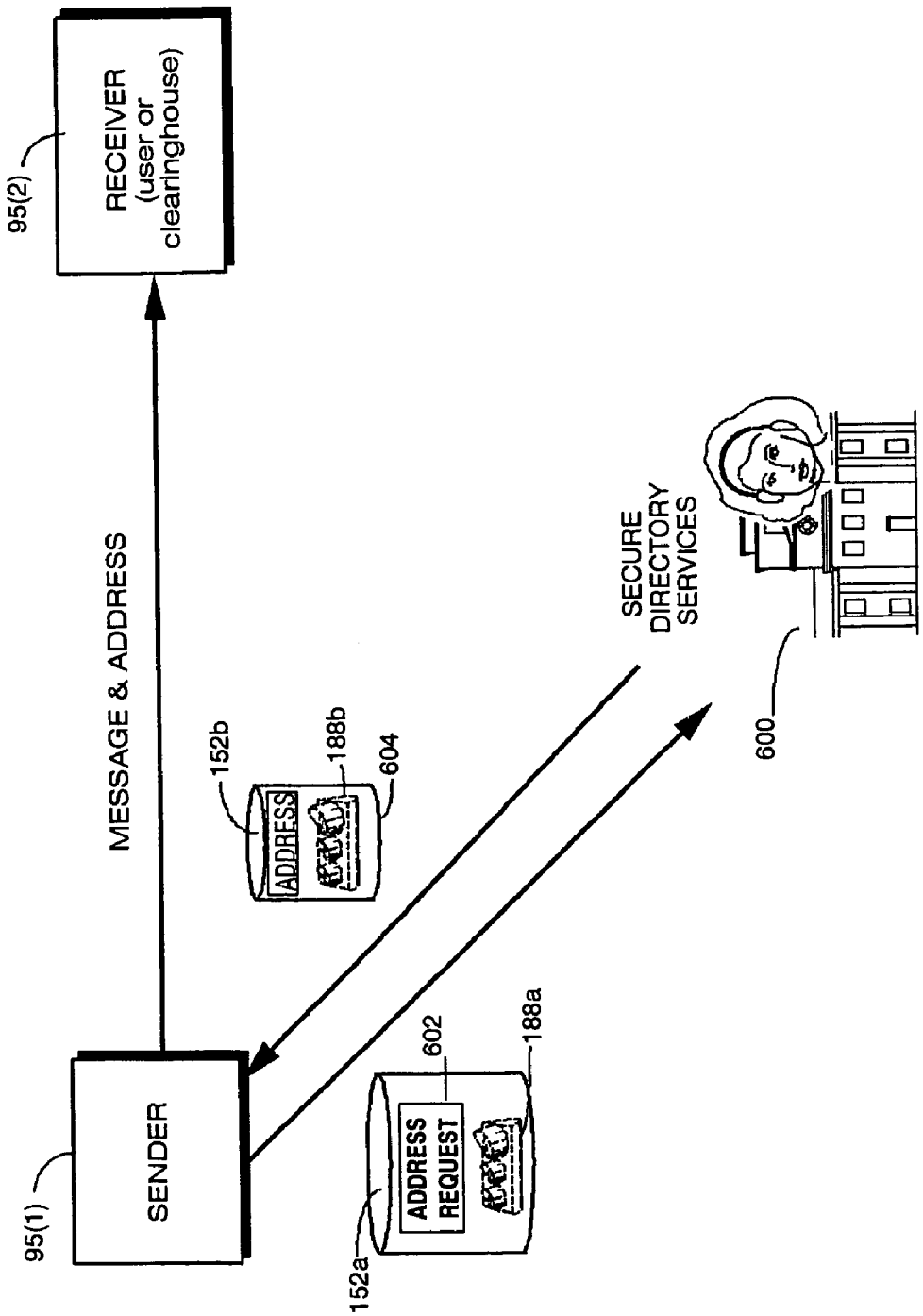
FIG. 54 shows an example secure directory services process.

FIG. 54 shows an example secure directory service process performed by secure directory services 600. In this example, a sender 95(1) wants to send a message to a receiver 95(2). The senders and receivers could be electronic appliances 100 owned by consumers, clearinghouses, or the like. Sender 95(1) may send an address request 602 to secure directory services 600 providing certain information and requesting other information. In response, secure directory services 600 provide the requested information to sender 95(1)—who may use the information to send a message to receiver 95(2). In this example, both the address request 602 and the responsive information 604 are contained within secure electronic containers 152 in order to maintain the confidentiality and integrity of the requests and responses. In this way, for example, outside eavesdroppers cannot tell who sender 95(1) wants to communicate with or what information he or she needs to perform the communications—and the directory responses cannot be "spoofed" to direct the requested messages to another location. In addition, as discussed above, directory services 600 can include controls 188 along with its responses and/or request or require controls 188 as part of its input.

Transaction Authority 700

Figure 55:
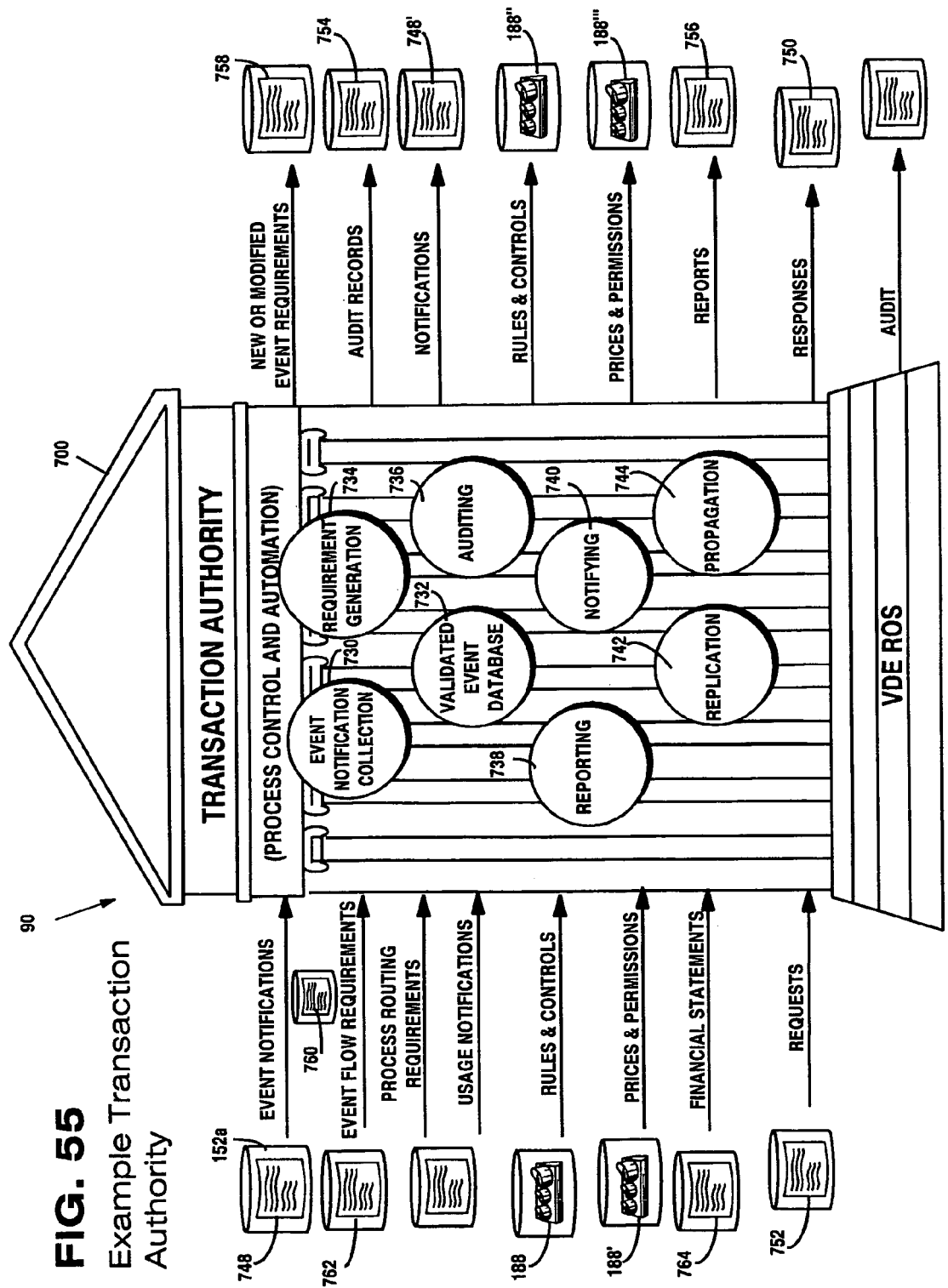
FIG. 55 shows an example transaction authority Commerce Utility System.

FIG. 55 shows an example Transaction Authority Commerce Utility System 700. These inventions also enable secure "transaction authority" capabilities providing the following overall functions:

Securely validating, certifying, and/or auditing events (including, for example, authenticating, and, for example, for non-repudiation purposes) in an overall multi-event transaction or chain of handling and control process;

Securely storing, validating, certifying, and/or distributing control sets (including, for example, authenticating, and, for example, for non-repudiation purposes) for multi-event transaction or chain of handling and control processes;

Issuing requirements for any or all of the transaction and/or process steps; and If desired, actively participating in the transaction or process (e.g., through managing, directing, intermediating, arbitrating, initiating, etc., including participating in models employing reciprocal control methods and distributed, automated events for, for example, distributed computing, process management, EDI, reference to currency, etc.)

Can certify steps and/or pathways, including certifying proper routing for electronic information through transaction authority telecommunication switches adapted to certify certain information and wherein certificates certify that a required route was followed and/or the sending of such electronic information was pursuant to certain stipulated rules and controls, for example acquiring certain archiving information and/or not exceeding budget and/or other limits and/or restrictions for, for example: numbers of "shipped" information containers in a given period of time, value of electronic currency contained within (represented by) a current container and/or by containers over a certain period of time, financial amount committed in purchase order, proper ordering authority, etc.

The transaction authority may simply be a secure, watchful bystander to, and certifier of, the electronic transaction and/or transaction step (in a sequence of overall transaction steps), it may be a secure facilitator of a secure plural-party electronic transaction, and/or it may actively and directly participate in the electronic transaction.

In more detail, a transaction authority in accordance with these inventions may provide the following advantageous features and/or functions:

Securely maintaining and validating event notification information pertaining to a multi-stage transaction and/or chain of handling and control process(es).

May enforce, through requirements for its certification or authentication, a sequence of required transaction and/or chain of handling and control processes steps based on component representation of elements of a business process, where, for example, one or more transaction authorities respectively certify and/or authenticate one or more specific events at one or more step "locations" in a transaction sequence.

May form an overall transaction control set from a number of discrete sub-control sets contributed, for example, by a number of different participants.

Using reciprocal methods to coordinate required transaction events, including for example, sequence of events, between value chain participants.

Receiving authority from secure chain of handling and control embodied in electronic control sets.

May intervene to actively manage transactions and/or chain of handling and control processes.

Can coordinate workflow and/or chain of handling and control processes and/or other business processes.

Can provide automatic and efficient management based on a trusted, secure distributed electronic commerce environment, including certifying and/or authenticating steps in distributed proprietary information, EDI, financial transaction, and/or trading system value chain activities that very substantially improves security for distributed rights management, wherein such security can meet or exceed the security available with centralized, online commerce models.

May manage at least a portion of the transactions within and/or between value chain participants (e.g., organizations, individual consumers, virtual groupings).

May specify and/or monitor, at least in part through the use of rules and controls, conditions of satisfaction for, and/or consequences of, atomic transactions.

May direct what happens based on error conditions and/or transaction profile analysis (e.g., through use of an inference engine and/or expert system).

Can provide confidential coordination of security, routing, prioritizing, and negotiating processes allowing different, distributed parties to work efficiently together through a confidential, trusted interface.

Providing notarization, validation, certification, and/or delivery, as appropriate, for secure document and/or process control.

Can certify steps and/or pathways, including certifying proper routing for electronic information through transaction authority telecommunication switches adapted to certify certain information and wherein certificates certify that a proper route was followed and the sending of such electronic information was pursuant to certain stipulated rules and controls, for example not exceeding budget or other limits for: numbers of "shipped" information containers in a given period of time, value of electronic currency represented by current container and/or by containers over a certain period of time, financial amount committed in purchase order, proper ordering authority, etc., are issued to satisfy requirements regarding receiving a proper such certification or authentication at a node receiving such routed information.

Distributing transaction authority functions across a network or other system (for example, every consumer and/or other value chain participant node is potentially a distributed usage clearing service at least in part initiating its own, transaction authority functions, and wherein said participant node may communicate usage information directly to one or more other participants) and in accordance with rules and controls and other. VDE techniques as described in the Ginter, et al patent specification.

May provide arbitration, mediation and negotiation services, electronic or otherwise.

FIG. 55 shows a particular example transaction authority 700 from an overall function viewpoint. Transaction authority 700 provides, among other things, a secure auditing facility for maintaining the current state of an overall transaction or process based upon event notifications it receives from the participants in the transaction.

In this specific example, transaction authority 700 performs the following functions:

Event notification collection 730,
Validated event database management 732,
Requirement generation 734,
Secure authenticated auditing 736,
Reporting 738,
Notifying 740,
Replication 742, and
Propagation 744.

In this example, transaction authority 700 receives notifications that events have occurred in the form of event notifications 748 which may be carried in one or more secure electronic containers 152. Event notification collection process 730 collects these event notifications 748 and may store them in a validated event database 732. Transaction authority 700 may generate additional notifications 748' based on its validated event database 732, and may also issue responses 750 indicating the current status of a transaction or process in response to requests 752 and/or based on other requirements. In addition, transaction authority 700 may generate and output audit records 754 indicating the progress and status of transactions or processes based upon the contents of its validated events database 732 as analyzed by auditing function 736. Transaction authority 700 may also issue reports 756 based on its reporting function 738. Validated event database 732 may be a distributed event notification database, in which case replication process 742 and propagation process 744 are used to maintain and update the database in a distributed manner.

Another major function of transaction authority 700 in this example is to issue new or modified event requirements 758 that can be used to control or influence an overall process or transaction. Transaction authority 700 may receive control set 188, prices and permissions 188', event flow requirements 760 and/or process routing requirements 762. Both event flow requirements 760 and process routing requirements 762 can be specified in one or more control sets. In response to this information and the validated event database 732 contents, transaction authority 700 may use its requirement generation process 734 to create new or modified event requirements 758. Transaction authority 700 may also create new or modified control sets 188" and new or modified prices and/or permissions 188'''. Transaction authority 700 may use financial statements 764 as an input to its secure auditing function 736.

Figure 56:
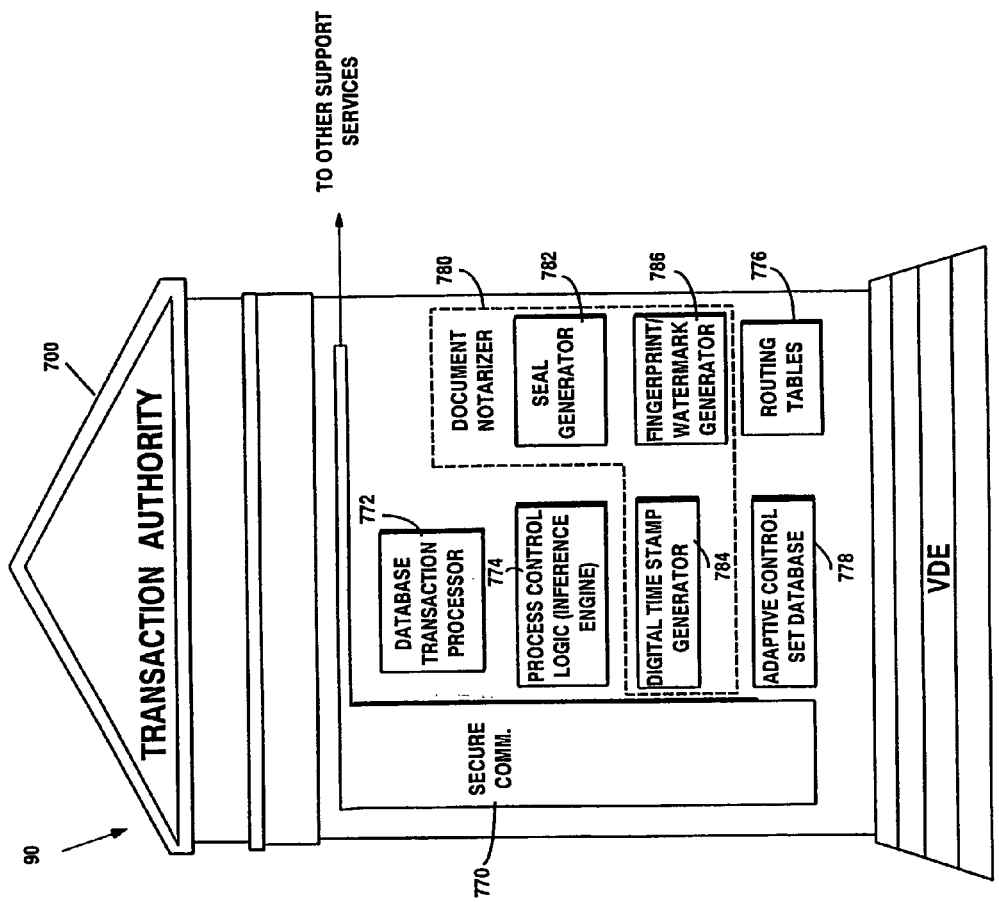
FIG. 56 shows an example transaction authority architecture.

FIG. 56 shows an example architecture for transaction authority 700. In this example, transaction authority 700 (which may be based on the VDE rights operating system ("ROS") architecture shown in Ginter et al. FIGS. 12 and 13) includes a secure communications facility 770, a database and transaction processor 772, process control logic 774, routing tables 776, and an adaptive control set database 778 (these functions could be performed by methods at one or more control sites). In addition, transaction authority 700 may also include a document notarizer 780 including a seal generator 782, a digital time stamp generator 784, and a fingerprint/watermark generator 786.

Secure communications facility 770 permits transaction authority 700 to communicate in a secure manner over electronic network 150 (for example, via secure electronic containers 152). Database and transaction processor 772 performs most of the processes shown in FIG. 55. Adaptive control set database 778 may perform the validated event database function. Routing tables 776 may be used as part of requirement generation function 734 to route appropriate messages to appropriate entities.

Process control logic 774 may include an inference engine or expert system for use in handling error conditions not fully anticipated or specified by the event flow requirements 760 and/or process routing requirements 762. Process control logic 774 might operate based on rule based principles, fuzzy logic, neural networks, or a combination of some or all of these—or any other method of process control logic. Process control logic 774 determines the next event that is to occur within the overall transaction or process.

Document notarizer 780 may be used to provide authenticated document generation, for example, to affix digital seals and/or stenographic information to written and/or digital documents.

Figure 57:
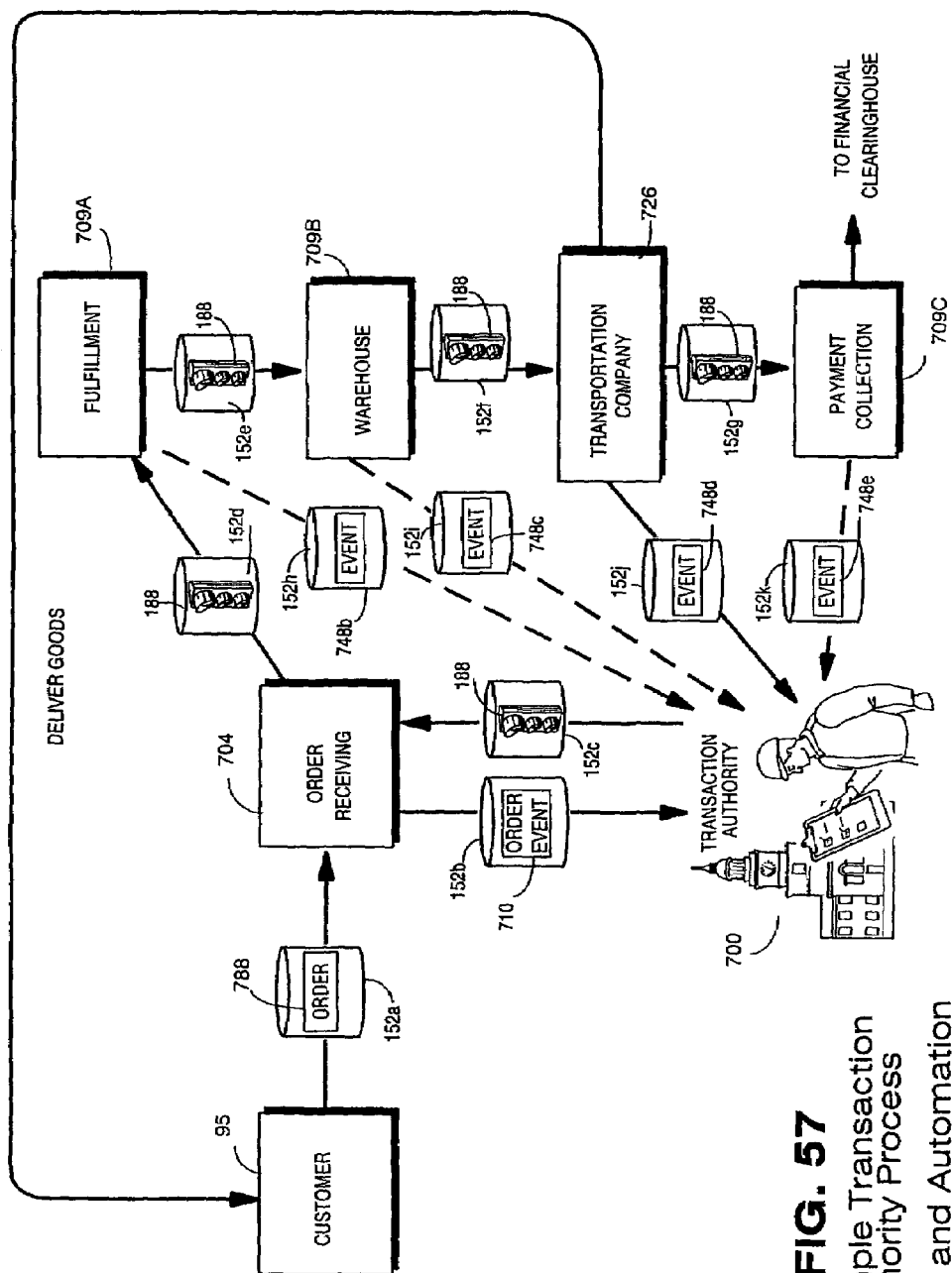
FIG. 57 shows an example transaction authority process.

FIG. 57 shows an example transaction authority process. In this simplified example, transaction authority 700 may be an entity internal to a corporation used to securely audit and direct an overall goods delivery process. In this example, a customer 95 issues an order 788 for goods. This order 788 is received by an order receiving department 704 which issues an order event 710 to transaction authority 700. In response to this order event 710, transaction authority 700 may issue rules and/or requirements in the form of one or more electronic control sets 188 specifying how the order receiving department 704 is to handle the order. These rules 188 may specify, for example, a sequence of chain and handling that also directs the activities of a fulfillment department 709A, a warehouse 709B, a transportation company 726, and a payment collection department 709C. The rules 188—which may be passed from one department to the other within secure electronic containers 152—thus specifies the requirements and overall process flow of the transaction that is to occur. Each department may then pass the secure controls 188 along to the next department, with routing being directed by the rules themselves and/or by transaction authority 700. Each department may also issue event notifications 748 alerting transaction authority 700 of the current status of the overall process. Transaction authority 700 may store this status information within its secure validated event database 732 for auditing purposes and/or to permit the transaction authority to direct the next step in the process.

Transaction authority 700 can, for example, use the interaction models shown in FIGS. 17E-1 through 17E-4 to interaction with an ongoing transaction or process. One particularly useful scenario for transaction authority 700 is to manage a process performed by multiple parties, such as corporations working on a joint venture or other common objective. In this type of business scenario, multiple corporations may be working toward a common overall goal but may themselves have their own objectives internally such as, for example, protecting their own confidential trade secret information. Transaction authority 700 can be used as an independent third party mediator/arbitrator to coordinate activities between the multiple corporations without requiring any of the corporations to expose detailed process information to anyone other than transaction authority 700.

For example, transaction authority 700 can generate control sets specifying event flow and/or process routing requirements 758 and/or control sets 188 that mean different things in different contexts. As an example, a control set that transaction authority 700 issues might cause one corporation to perform one step and another corporation to perform another step—with each corporation never learning the particular step or sequence of steps being performed by the other corporation. Thus, transaction authority 700 can develop control sets 188 that can be used to provide only partial disclosure between different individual or corporate actors.

Figure 58A:
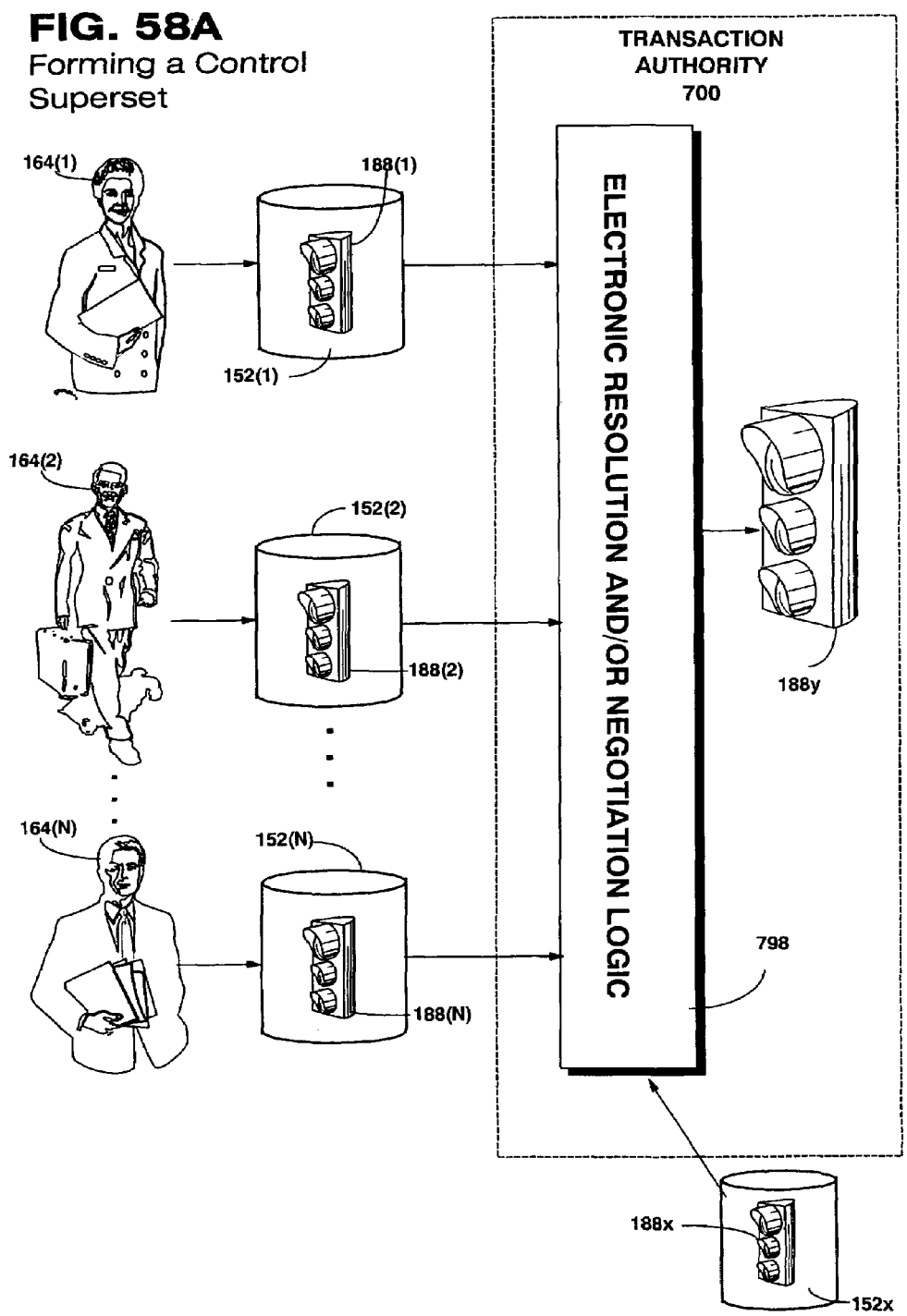
FIG. 58A shows an example of how the transaction authority creates a control superset.

FIGS. 58A and 58B show example steps and processes performed by transaction authority 700 to perform an "atomic transaction". In this example, transaction authority 700 performs a role that is somewhat analogous to the coach of a football team. By accepting the skill set and requirements of each individual "player" and linking them together into an overall "game plan," the transaction authority 700 can involve any number of value chain participants in an overall "atomic" transaction.

In this example, each value chain participant 164(1), . . . 164(N) in a process administered by transaction authority 700 could contribute a control set 188(1), . . . 188(N) specifying or governing the participant's own business requirements, limitations and processes for the transaction (FIGS. 58A and 58B, block 750). These individual control sets 188(1), 188(N) specify how each individual participant performs its own role. Each participant 164(1). . . 164(N) knows its own role in the overall transaction, but may have no idea what roles others may play or have any clear idea how to form a "team" of other participants—and so these individual control sets 188(1), 188(N) typically describe only sub-transactions and may not take overall transaction considerations into account.

Transaction authority 700 also receives another control set 188X specifying how to link the various participants' control sets together into overall transaction processes with requirements and limitations (FIGS. 58A and 58B, block 752). This overall transaction control set 188Y specifies how to resolve conflicts between the sub-transaction control sets 188(1), 188(N) provided by the individual participants (this could involve, for example, an electronic negotiation process 798 as shown in FIGS. 75A–76A of the Ginter et al. patent disclosure). The transaction authority 700 combines the participant's individual control sets—tying them together with additional logic to create an overall transaction control superset 188Y (FIGS. 58A and 58B, block 752). Transaction authority stores the resulting control superset 188Y in local storage (FIG. 58B, block 754). This overall control superset controls how transaction authority 700 processes events to perform an "atomic" transaction.

Upon receipt of an incoming event requiring processing (FIG. 58B, block 756), transaction authority 700 may activate the overall transaction control superset 188Y (FIG. 58B, block 758). The transaction authority 700 may then deliver corresponding reciprocal control sets corresponding to portions of the overall transaction control superset 188Y to each participant in the transaction—thereby enabling each participant to communicate with the superset (FIG. 58B, block 760). Alternatively, each participant in this example may—at the time it contributes its control set 188(1), 188(N) to transaction authority 700—maintain a reciprocal control set that can communicate with the control set the participant sent to transaction authority 700.

Transaction authority 700 may then begin monitoring events received using the activated control superset (FIG. 58B, block 762). If the incoming event is not an error condition ("N" exit to FIG. 58B decision block 764), then transaction authority 700 determines whether the event indicates that the atomic transaction is complete (FIG. 58B, block 765). If the atomic transaction is not complete ("N" exit to FIG. 58B, decision block 765), control returns to block 762 to monitor events. If the atomic transaction is complete ("Y") exit to decision block 765), the transaction authority 700 determines that the transaction is finished (FIG. 58B, block 774).

If the incoming event is an error condition ("Y" exit to FIG. 58B decision block 764), transaction authority 700 processes the error event in the control superset 188Y (FIG. 58B, block 766). If the error is not critical (FIG. 58B, decision block 767, "N" exit), then control returns to block 762 to wait for the next event notification to arrive.

If the error is critical (FIG. 58B, decision block 767, "Y" exit), transaction authority 700 may call a critical error handing routine (FIG. 58B, block 768). Critical error handling routine 768 may attempt to resolve the error based on the rules within the control superset 188Y and/or on an inference engine 774 or other process control logic. Such an inference engine or other process control logic 774 may be programmed concerning the business model of the overall transaction so it has enough information to select appropriate actions based on error conditions.

The process shown in FIG. 58B can be nested. For example, the sub-transaction defined by one "participant" may itself be an atomic transaction based on the contributions of a number of participants—all of which are managed by the same or different transaction authority 700.

Security Checkpoint Commerce Utility System

A Commerce Utility System 90 can include service functions that enable it to perform as a "Security Checkpoint System 6000" (see FIG. 58C) that provides security, archiving, and non-repudiation services that can certify and/or authenticate communicated information in certain ways. Security Checkpoint Systems 6000 can:

provide a distributed, highly efficient, and automated auditing and archiving layer for electronic commerce interactions, and enhance the depth of security of a distributed security environment such as VDE and the Distributed Commerce Utility layer.

Thus, Security Checkpoint System 6000 may perform security and/or administrative functions. This Commerce Utility System capability takes the positive benefits of centralized security models (e.g., ability to have a central authority physically control the processing node) and deploys these capabilities into a distributed "user space" model that can achieve maximum efficiency and flexibility, support secure and manageable scalability (a principal weakness of centralized systems), and provide the enhanced security benefits of multiple, independent, secure environment layers. The latter capability is particularly adapted for highly sensitive communications desiring extra security assurance. These security layers are enabled by the required participation and security processing of one or more independent security checkpoint protected processing environments that reinforces the foundation distributed security environment.

Information that passes through one or more Security Checkpoint Systems 6000 can be certified and/or authenticated to assure an information recipient (e.g., a party receiving information in a container) that certain communications functions and/or security steps (processes) occurred prior to receiving the information. This certification and/or authentication can include, for example, certifying or authenticating proper communication routing through required and/or authorized protected processing Security Checkpoint Systems 6000. Such checkpoints may be, for example, distributed throughout a telecommunications network, and "local" to the physical and/or logical location of end-user VDE nodes (see FIG. 58C).

Security Checkpoint Systems 6000 may employ telecommunication switches adapted to certify and/or authenticate certain information and processes. For example, certificates issued by a Security Checkpoint System 6000 may certify that a required route was followed and that a required checkpoint examined a communicated secure electronic container, and/or that the sending of such a container or other electronic information was performed pursuant to certain stipulated rules and controls. For example, such a service can help ensure and/or certify and/or authenticate, that certain budgets, other limits, and/or restrictions are not exceeded, and/or certain other requirements are met.

For example, a Security Checkpoint System 6000 may help ensure requirements (including that limits or other restrictions are not exceeded) for: the number of "shipped" information containers in a given period of time; the value of electronic currency contained within (or represented by) a given container and/or by containers over a certain period of time (very important to reduce improper electronic currency activities); the financial amount committed in a purchase order, including that proper ordering authority is present; and so on. Such requirement assessment may be in reference to, for example, container (or other digital information communication) activity communicated from a certain logical and/or physical area, node, node group, user or user organization, and/or other user grouping, wherein said reference is determined through referencing secure node and/or individual user and/or organization and/or area identification information as, for example, a VDE secure container travels through said adapted one or more telecommunication switches.

These Commerce Utility System "communications checkpoint" capabilities can provide useful security features by, for example, providing one or more "independent" distributed security "check points" along a telecommunication route that substantially increases security reliability by requiring the presence of a proper certificate and/or authentication securely provided by such checkpoint and securely associated with and/or inserted within said container by a process managed by said checkpoint (or a group of checkpoints). This presence can be tested by a receiving node—and a proper certificate or authentication can be required to be present, for example according to rules and controls, before such receiving node will process at least a portion of the content of one or more classes of received containers. Such container classes may include, for example, containers from specific individuals and/or groups and/or containers and/or container contents that have certain one or more specific attributes.

Security Checkpoint Systems 6000 may be "independent" of end-user Virtual Distribution Environment nodes from a security perspective. Such nodes may, for example, be independent from a security perspective because they use key management to maintain multiple secure execution compartments within their protected processing environments for checkpoint management, such that a security breach in end-user nodes shall not directly comprise the security of checkpoint operation, and to help ensure that a breach related to a secure execution compartment will not comprise other such compartments.

Security Checkpoint Systems 6000 may also gather audit information including, for example, retrieving identity information of intended container recipient(s), class(es) of container information, checksum and/or other information employed for future validation (e.g., non-repudiation), and/or archiving of some or all portions of said container's content. Some of this information may be at least in part in encrypted such that one or more portions of such information may not be decrypted without the cooperation of one or more of the container sender, the intended and/or actual container recipient(s), and/or a government body having authority to access such information.

Figure 58C:
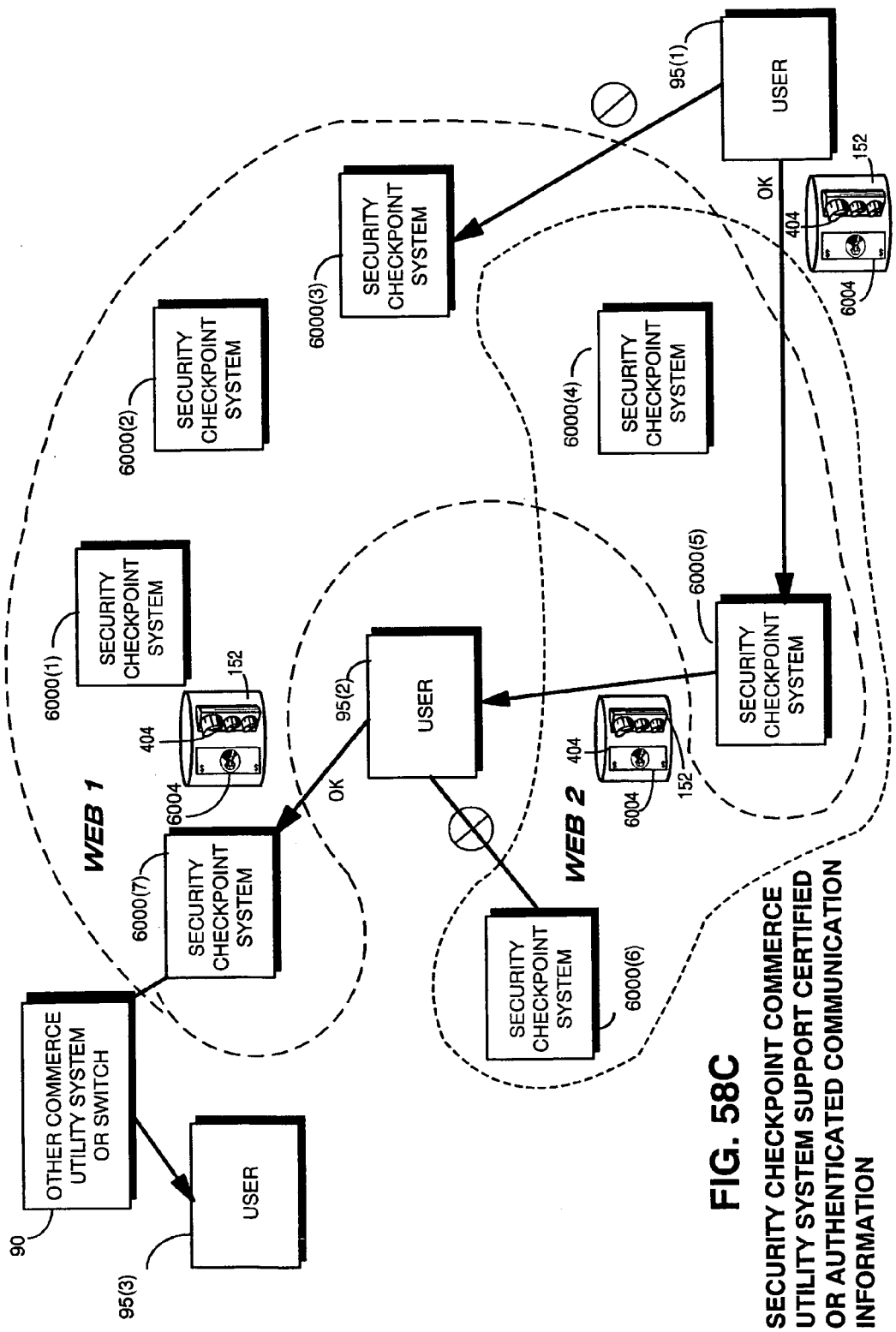
FIGS. 58C and 58D show an example secure checkpoint Commerce Utility System.
Figure 58D:
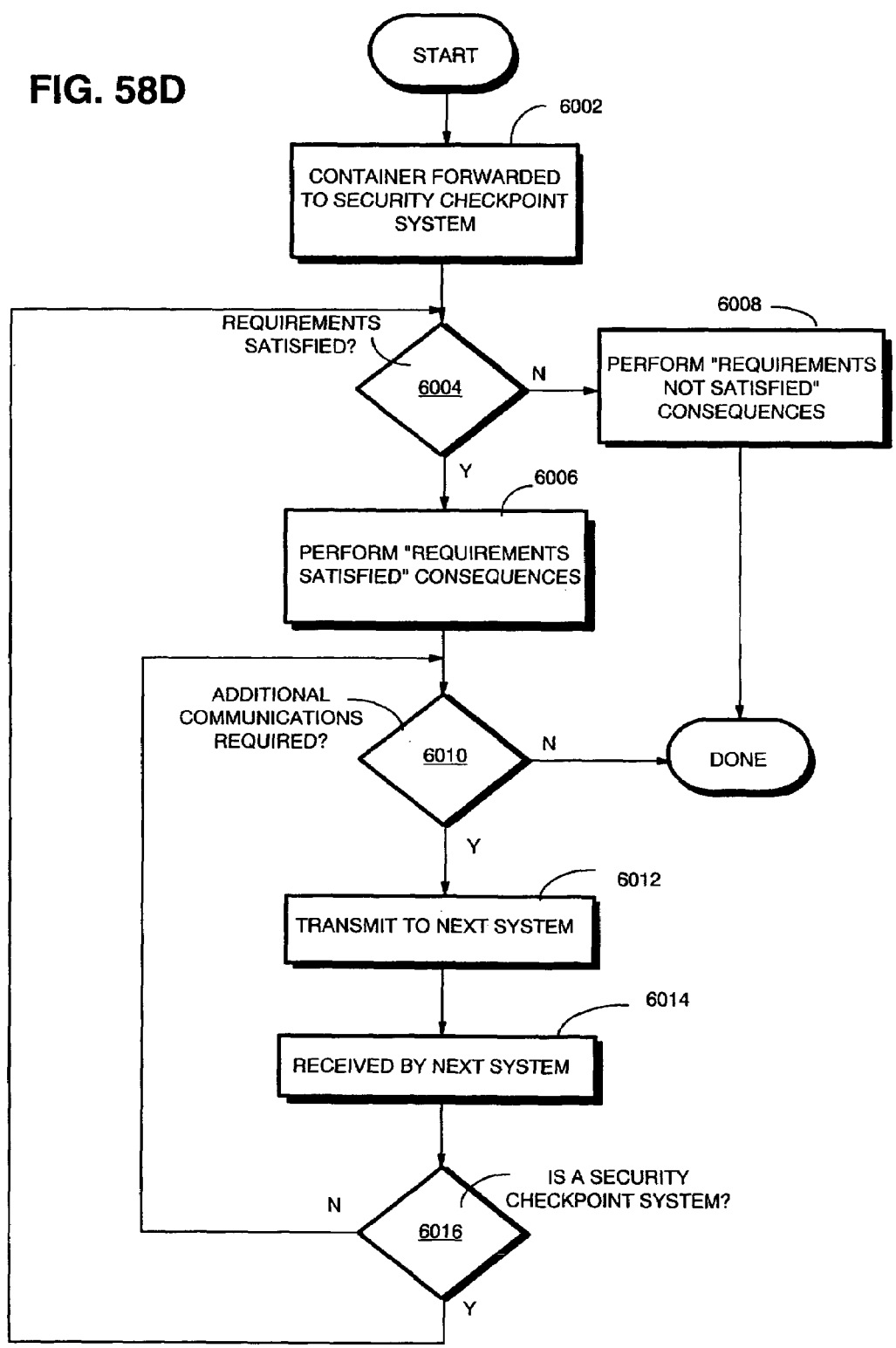

FIGS. 58C and 58D show an example of a "checkpoint security" Commerce Utility System 6000 arrangement that provides communication checkpoint security, non-repudiation, and archiving services within the context of a telecommunications network connecting users 95(1), 95(2), 95(3). In this example, the security checkpoint systems 6000 may be part of the telecommunications infrastructure. For example security checkpoint systems 6000 may be part of one or more telecommunications switches or other equipment that has been designed to detect secure electronic containers 152 based, for example, on the header information they contain.

Security checkpoint systems 6000 in this example have the secure ability to control whether or not a secure container 152 transmitted through the communications infrastructure will be permitted to pass—and the consequences of routing the container through the communications infrastructure. In one example, controls operating with a user 95(1)'s protected processing environment may require certain kinds of containers 152 (e.g., containers that carry electronic currency) to include controls 404 that require them to be routed through a security checkpoint systems 6000 (or a certain class of security checkpoint systems). Such controls 404 can prevent the container 152 or its content (e.g., currency it contains) from being used unless it is routed through the appropriate security checkpoint system 6000.

For example, suppose that user 95(1) wishes to send a secure container 152 to user 95(2). In this example, the user 95(1) transmits the container 152 to user 95(2) through the telecommunications infrastructure. That infrastructure may detect that the information being sent is a container, and may route the container for interception by the a security checkpoint system (system 6000(5), for example).

Security checkpoint system 6000(5) may, after intercepting the container 152, examine the control information within the container to determine whether requirements for further communicating the container to user 95(2) have been satisfied. Security checkpoint system 6000(5) may forward the container to user 95(2) only if those requirements have been met—or it may modify the container to permit user 95(2) to open and use the container subject to the container's controls 404 (which may limit use, for example). The security checkpoint system 6000 may be authorized to modify at least a portion of the container's controls 404—for example to add further use limitations.

This FIG. 58C example shows two "webs" of security checkpoint systems 6000. In this example, these "webs" represent collections of security checkpoint systems 6000 that have each been certified (by a Certifying Authority 500 for example) as being:

(1) a security checkpoint system, and
(2) a member of the particular class.

Hence, in this example "web 1" represents the class of certified security checkpoint systems 6000(1)–6000(5), 6000(7); and Web 2 represents the class of security checkpoint systems 6000(4)–6000(6). As one example, "web 1" security checkpoint systems 6000 may be certified as being capable of handling containers containing electronic currency 6004.

One of the requirements specified within the control information associated with the container 152 may be that it must pass through a "web 2" security checkpoint system (e.g., system 6000(5))—for example, to enable certain secure auditing functions such as trusted electronic currency tracking. A "web 1" security checkpoint system (e.g., system 6000(3)) may refuse to pass the container 152 to user 95(2) based on these controls 404—or it may refuse to modify the container 152 to make it usable by user 95(2).

By way of further example, suppose user 95(2) wishes to pass the container 152 along to another user 95(3). The controls 404 associated with the container 152 may require, in this particular example, that further communication of the container 152 must be through a "web 1" security checkpoint system 6000(7). This routing requirement may be been present in the controls 404 provided by user 95(1), or it may be added by security checkpoint system 6000(5) or the user 95(2)'s protected processing environment.

In the particular example shown, the controls 404 may enable the "web 1" security checkpoint system 6000(7) to pass the container 152 along to user 95(3) via a further routing that does not include a security checkpoint system 6000 (e.g., via another type of commerce utility system and/or a non-secure telecommunications switch).

FIG. 58D shows an example process performed by an example security checkpoint system. In this example process, the security checkpoint system 6000 receives a container 152 (FIG. 58D, block 6002) and determines whether the requirements specified by its associated controls 404 have been satisfied (FIG. 58D, decision block 6004). If the requirements have been satisfied, the security checkpoint system 6000 may perform "requirements satisfied" consequences, e.g., modifying controls 404 to satisfy the routing requirement mentioned above (FIG. 58D, block 6006). If the requirements are not satisfied (FIG. 58D, "N" exit to decision block 6004), the security checkpoint system may perform "requirements not satisfied" consequences (FIG. 58D, block 6008).

Each set of consequences may involve some form of secure auditing, for example. If the security checkpoint 6000 passes a container 152 containing electronic currency for example, the security checkpoint 6000 may record one or more of the following auditing information:

sender identity,
sender node identity,
receiver identity,
receiver node identity,
certificate(s) on which the currency is based,
other security checkpoints 6000 the currency has passed through,
the identity of prior handlers of the currency,
date, time, and location of transmission,
date, time, and location of receipt,
how long the currency has been in transit, and
other secure auditing information.

If the security checkpoint system 6000 refuses to pass and/or modify a container 152, it may produce an audit report including available tracking information, for example:

sender name,
nature of deficiency,
intended receiver, and
other tracking information.

It may also notify the sender, the intended receiver, a government agency, or other authority. It may further charge a "failed communication" overhead fee to the sender, for example.

The security checkpoint system 6000 may then determine whether additional communications are required (FIG. 58D, decision block 6010). If not, the process may complete. If additional communications are required ("Y" exit to decision block 6010), the security checkpoint system 6000 may transmit the container 152 to the next system (FIG. 58D, block 6012). The next system may be an additional security checkpoint system 6000 that performs additional processing (FIG. 58D, blocks 6016, 6004, 6006, 6008).

EXAMPLES

Example

Electronic Content Distribution Value Chain

FIG. 59 shows how example Distributed Commerce Utility 75 can be used to support an example electronic content distribution value chain 162. In the FIG. 59 example, an author 164 may create a valuable work, such as a novel, television program, musical composition, or the like. The author provides this work 166 (for example, in electronic digital form) to a publisher 168.

The publisher may use his own branding, name recognition and marketing efforts to distribute the work to a consumer 95. The publisher 168 may also provide the work 166 to a content "aggregator" 170—someone who provides customers access to a wide range of content from multiple sources. Examples of aggregators include, for example, traditional on-line information database services and World Wide Web sites that host content from many diverse sources. Typically, consumers use an aggregator's services by searching for information relevant to one or more consumer-defined topics. An aggregator 170 may provide the search tools to the consumer 95 who will make their own selections.

The aggregator 170 might distribute the work 172 containing some or all of the original work 166 directly to consumer 95. Aggregator 170 may also distribute the work 172 to a "repackager" 174. Repackager 174 may, for example, take content from several sources on related matters and combine them into mixed source products, such as multimedia combinations, newsletter publications, or "current awareness" packages. In these services, the repackager makes the selection of content and organizes based on audience-indicated interest. A consumer 95 may subscribe to an electronic newsletter on a particular topic or the consumer may give the repackager 174 a short list of topics they are interested in. The repackager 174 will select relevant information and communicate the information to the customer. Here the repackager is doing the selecting for the consumer.

For example, repackager 174 might be the publisher of a newsletter and might republish some or all of the author's work 166 in this newsletter 176. Repackager 174 could directly distribute newsletter 176 to consumer 95, or the newsletter could pass through still additional channels. Repackager 174 could use a search engine provided by aggregator 170 to find articles of interest to consumer 95 and combine those articles into an electronic newsletter that has both the aggregator 170's brand and the repackagers 174's brand, and then send the newsletter to the consumer 95.

Distributed Commerce Utility 75 may support the FIG. 59 value chain in a number of ways. For example:

1. Certifying authority 500 can issue certificates that allow each of the value chain participants to identify who they are and to demonstrate that they are members of one or more particular classes. For example, author 164 and/or publisher 168 might specify that any certified aggregator or repackager is entitled to excerpt or anthologize work 166 so long as appropriate payment is made. Certifying authority 500 could issue digital certificates 504 supporting this desired business objective, the certificates certifying that aggregator 170 is in fact a reputable aggregator and that repackager 174 in fact a reputable repackager. So long as author 164 and/or publisher 168 trust the security of the overall system 50 and the certificates 504 issued by certifying authority 500, they will have no fear that the work 166 will be excerpted or anthologized by anyone other than the appropriate types of people they specify.

In another example, certifying authority 500 could issue a certificate 504 to aggregator 170 or other user. Certifying authority 500 could issue this certificate 504 at the direction of author 164 or publisher 168. The certificate 504 may attest to the fact that author 164 or publisher 168 agree that aggregator 170 or other user is authorized to modify certain permissions 404. Author 164 or publisher 168 may have specified permissions 404 so that that will allow themselves to be modified only on the condition that an "authorized aggregator" certificate is present.

In another example, certifying authority 500 could issue a certificate to one or more classes of users, enabling, for example, utilization of content and/or specific portions of content and/or modification of permissions, which such enabling may be limited to specific utilization and/or modification by employing certain VDE rules and controls put in place by the author or publisher or certificate authority (as allowed by in place rules and controls).

2. Rights and permissions clearinghouse 400 in this particular example may be used to register work 166 and issue appropriate permissions 404 consistent with authorizations and instructions provided by each value chain participant. For example, the author 164 could register work 166 with rights and permissions clearinghouse 400, and specify an electronic control set 404 defining the rights of every other value chain participant.

For example:

This control set 404 could specify, as one example, that publisher 168 can distribute an unlimited number of copies of the work 166 so long as the publisher pays the author 164 a certain dollar amount for each copy distributed.

The control set 404 might permit publisher 168 to add his own additional controls that allow consumer 95 to read the work 166 an unlimited number of times but prevents the consumer from copying or redistributing the work.

Although the electronic control set may travel in an electronic container 152 with the work 166, it may also be provided separately. For example, rights and permissions clearinghouse 400 might, upon request, supply a control set associated with work 166 to anyone who requests a control set.

Rights and permissions clearinghouse 400 might maintain different versions of the control set 404 for different user classes so that, for example, consumers 95 might receive one control set 404a, aggregators 170 might receive another control set 404b, and repackagers 174 might receive a still further, different control set 404c. Each of these control sets can be provided in advance by author 164 or other rights holders, providing a "pre-approved permissioning" system that makes widespread usage of work 166 extremely efficient and yet highly secure, and further, such control sets may interact with VDE distributed template applications in a seamless manner—one or more template applications may be distributed with a control set by such distributors of such control sets (or may be otherwise made available) to such control set recipients. In one particular "superdistribution" business model, work 166 is allowed to be distributed as widely as possible, and rights and permissions clearinghouse 400 does the work of providing current control sets 404 authorizing particular value chain participants to use the work in particular ways under particular conditions.

3. Usage clearinghouse 300 in this particular example may support the value chain by collecting usage information from each value chain participant. The usage clearinghouse 300 may thus provide a secure auditing function, generating, for example, reports that track how many times the work 166 has been used and how it has been used.

As one example, usage clearinghouse 300 might analyze usage information to determine how many consumers 95 have read the work. Usage clearinghouse 300 can, for example, report consumption information in varying amounts of detail and/or specific kinds of information, to various value chain participants consistent with privacy concerns and the accepted business rights of each party. As one example, the usage clearinghouse 300 might give consumer 95 a very detailed report about his or her own particular usage of work 166, while providing author 164 or publisher 168 with only summary report information that may, for example, not include the consumer name, address, or other direct, identifying information.

As another example, reports could also flow directly from the repackager 174 to the aggregator 170, publisher 168 and author 164. Reports may be directed along any logical pathway, directly, or through any sequence of parties, and containing whatever mix of information for each party as is acceptable to the value chain and as may be enforced, for example, at least in part by VDE rules and controls.

4. Financial clearinghouse 200, in this example, may provide secure clearing of financial details of the transaction—ensuring that appropriate value chain participants compensate other appropriate value chain participants. As one example, financial clearinghouse 200 may receive payments from consumer 95 based on the consumer's use of work 166, and distribute parts of the payments appropriately to author 164, publisher 168, and other appropriate value chain participants in an automated, efficient process managed at least in part by VDE rules and controls. For example, financial clearinghouse 200 might interface with other banks or financial institutions to accomplish an automation of payment transfers, and/or it might assist in managing electronic money maintained within the overall value chain shown. Financial clearinghouse 200 may also assist in ensuring that itself and the other Commerce Utility Systems 90 are appropriately compensated for the administrative and support services they provide, that is, for example, secure VDE processes operating within Commerce Utility Systems 90 may automatically ensure the payment to such administrative and support service providers.

5. Secure directory services 600, in this example, may support the example value chain by facilitating electronic communications between value chain participants and/or between Commerce Utility Systems 90. For example, secure directory services 600 can, upon request, provide electronic address and/or routing information allowing one value chain participant to electronically contact another. As one example, suppose a consumer 95 wants to obtain the latest addition of work 166 but discovers that the electronic address of publisher 168 has changed. Consumer 95 can electronically contact secure directory services 600, which can provide current address information. Of course, in commercial trading system applications, for example, secure directory services may provide much more elaborate services for the identification of desired parties, such as multi-dimensional searching of directory resources for identifying parties based on class attributes. Secure directory services 600 may also provide services that enable the identification of content, for example based upon content type and/or rules and controls associated with such content (pricing, allowed usage parameters such as redistribution rights, etc.).

6. Transaction authority 700 in this example might be used to assist repackager 174 in developing newsletter 176. For example, transaction authority 700 might help in automating a process in which a number of different works created by a number of different authors were all aggregated and excerpted for publication in the newsletter. Transaction authority 700 can securely maintain the current status of an overall multi-step process, specifying which steps have already been performed and which steps have yet to be performed. Transaction authority 700 can also, for example, help arbitrate and mediate between different participants in such a multi-step process, and can in some cases actively influence or control the process (for example, by issuing new instructions or requirements based upon error or other conditions).

Example

Manufacturing Chain

FIG. 60 shows an example manufacturing value chain supported by Distributed Commerce Utility 75. In this particular example, a customer 95 places an order with a manufacturer 180 and receives an order confirmation. The manufacturer may order parts and supplies from a number of different suppliers 182(1)–182(N). Suppliers 181(1)–182(N) may, in turn, order additional parts or sub-assemblies from additional suppliers 182(a1). . . . A bank 184 may supply funds to suppliers 182 based on proofs of order and assurances that the manufacturer will pay back the advances. A transportation/warehousing company 186 may provide transportation and warehousing for supplies and/or final products.

In this value chain, certifying authority 500 and transaction authority 700 can assist with secure flow of electronic orders, confirmations, terms and conditions, and contracts, and can also help to ensure that each value chain participant can maintain the desired degree of confidentiality while exchanging necessary information with other value chain participants. Usage clearinghouse 300 may assist in secure auditing of the overall process, tracking of physical and electronic parcels between the value chain participants, and other usage related operations. Financial clearinghouse 200 may handle the financial arrangements between the value chain participants, for example, assisting in coordinating between the world of electronic network 150 and a paper-oriented or other world of bank 184. Rights and permissions clearinghouse 400 may provide a secure archive for electronic controls 404 defining parts or all of the transaction. Transaction authority 700 may securely monitor the overall progress of transactions occurring among value chain participants, and provide periodic status reports as appropriate to each value chain participant. In addition, transaction authority 700 can assist in directing or arbitrating the overall transactions to ensure that all steps and requirements are fulfilled. Secure directory services 600 can assist in routing information electronically between the different value chain participants. Of course, as previously stated for the present inventions and as applicable throughout this specification, VDE chain of handling and control and other capabilities, including rules and controls and secure communication techniques, would preferably be used as a foundation for the above activities.

Examples of how Commerce Utility Systems can Support One Another

FIGS. 16A–16E described above show how different Commerce Utility Systems 90 can support one another. In more detail, FIG. 16A shows that a financial clearinghouse 200 may provide services to one or more other Commerce Utility Systems 90, including, for example, the usage clearinghouse 300, the rights and permissions clearinghouse 400, the certifying authority 500, the secure directory services 600, the transaction authority 700 and another financial clearinghouse 200'. Under such circumstances, the plural Commerce Utility Systems constitute both a virtual clearinghouse and a higher order Commerce Utility System.

In each instance, the financial clearinghouse 200 may collect funds due the support services and deposit these funds to at least one provider account employing at least one payment method. The financial clearinghouse 200 may also provide VDE audit records confirming the source and amount of the funds and the provider account in which the funds were deposited by the financial clearinghouse 200. The financial clearinghouse 200 may provide assistance to one or more other support services in establishing provider accounts and communicating to such one or more support services the account number and/or numbers and terms and conditions that may apply. Both the support service request to the financial clearinghouse 200 and its responses to the requesting support service can be communicated in VDE secure containers (as mentioned earlier) to take advantage of their substantial security, confidentiality, flexible control architecture, and trustedness, and can be processed at each location by one or more VDE Protected Processing Environments. Financial and account information may be provided in the form of VDE control sets and/or be incorporated in VDE control sets by the financial clearinghouse 200 and/or by one or more other support services. Financial clearinghouses 200 may also provide services to each other to promote further operating and administrative efficiencies. For example, one financial clearinghouse 200 may provide services to its counterparts in other countries or in other geographic regions. In another example, one financial clearinghouse 200 may provide another financial clearinghouse 200 access to one or more payment methods not directly supported by the second financial clearinghouse 200.

FIG. 16B shows that the usage clearinghouse 300 may also provide services to other Commerce Utility Systems 90. In one example, the usage clearinghouse 300 may provide raw data, aggregated data, at least in part derived information, and/or reports to other electronic commerce support services such as financial clearinghouses 200, rights and permissions clearinghouses 400, certifying authorities 500, secure directory services 600, transaction authorities 700, and other usage clearinghouses 300'. These other infrastructure services may use this information as independent third party verification of certain transactions and their details, for market research on behalf of their own services, and/or to resell this information, perhaps in conjunction with their own usage information. In one example, a rights and permissions clearinghouse 400 might sell reports to a publisher containing a combination of their own information, and that from the financial clearinghouse 200 and usage clearinghouse 300 plus secure directory service 600 and certifying authority 500. More specifically, a report might contain a list of objects registered at the rights and permissions clearinghouse 400 by a particular publisher, the number of requests to the rights and permissions clearinghouse for updated or additional rights and permissions, financial clearinghouse 200 summary revenue numbers for each digital property, the number of certificates by the certifying authority 500 on behalf of the publisher indicating that the user had been certified and had a valid subscription to the publisher's digital works, and the number of requests to the secure directory service 600 seeking information about the network addresses of the publisher's online web servers. In each case, a support service provided the information to the rights and permissions clearinghouse for incorporation in this report to the publisher.

Example

Distributed Commerce Utility 75 can Support Digital Property Purchasing, Licensing and/or Renting Transactions Distributed Commerce Utility 75 provides significant trustedness, security, convenience, and efficiencies for instances in which customers pay for digital information. Moreover, information creators and distributors can price this information-indeed, any digital property in any digital format—in various ways and in different ways in different markets.

Figure 61:
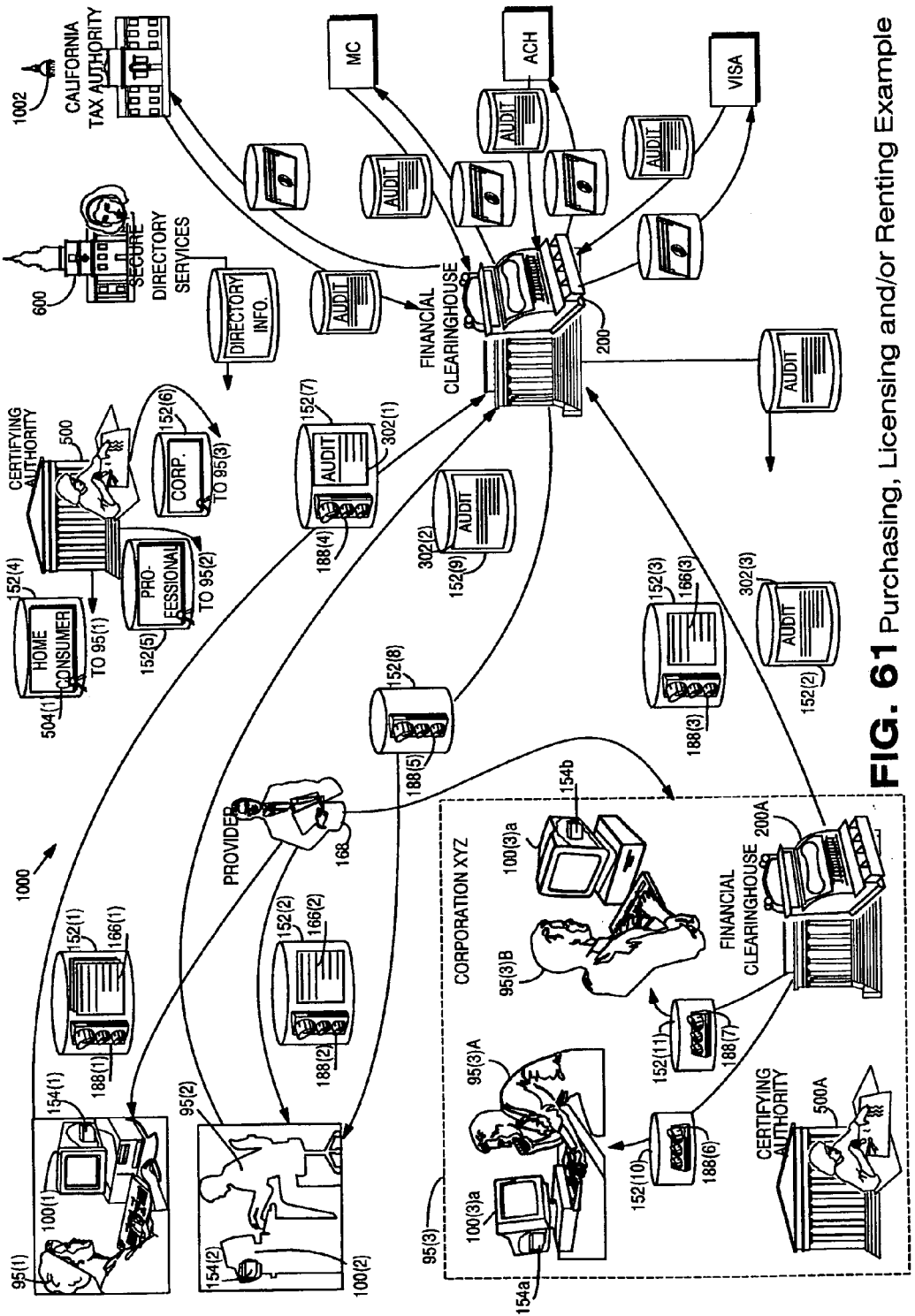
FIG. 61 shows a purchase, licensing and/or renting example.

FIG. 61 shows an example of an information delivery service arrangement 1000 in which an information provider 168 provides electronic content for purchase, rental and/or licensing. In this example, an information services company 168 distributes information 166 to several global markets, including individuals, Their market areas include professionals, home office users, and the small office marketplace, as well as medium and large companies and consumers at home. For example, provider 168 may deliver content 166 in electronic form to a home consumer 95(1), a professional such as a lawyer 95(2), and to a corporation or other organization 95(3). In one example:

- an individual consumer 95(1) buys under subscription pricing three articles 166(1) from an online encyclopedia;
- a lawyer 95(2) buys three chapters 166(2) from a treatise on patent law; and
- two product marketing managers in a large company 95(3) receive a proprietary market research report 166(3).

Prior to information delivery transactions, the consumer 95(1), professional 95(2) and company 95(3) may use a secure directory service 600 to locate the network address of the information provider 168 as well as assist in identifying the content they wish to work with. Subsequently, these parties 95 may send an electronic message to provider 168 requesting the specific information they want to receive. Provider 168 may deliver this information 166 within VDE secure electronic containers 152 along with associated rules and controls 188 that control pricing and permissions. Each of parties 95 has an electronic appliance 100 including a protected processing environment 154 that enforces these controls 188.

The provider 168 can price information differently for different markets. For example:

- professionals 95(2) and SOHO (small office/home office) pay transaction fees;
- large companies 95(3) pay a mixture of subscription and transaction fees (e.g., company 95(3) may pay $10 per page printed or excerpted from a larger report, and may also pay a subscription fee); and
- Individual consumers 95(1) pay a flat subscription rate.

In each of these cases, local, state, and/or federal sales taxes, as appropriate, are included in the retail price. Payment methods may be provided within electronic control sets 188 delivered in electronic containers 152 with, and/or independently of, the associated content 166 (for example, as provided in Ginter, et al).

A financial clearinghouse 200 ensures that provider 168 receives payment through any authorized payment method. The information delivery service 168 accepts a broad range of payment methods. Some forms of payment are more popular in certain markets than in others. For example:

- In the professional, SOHO, and consumer markets, credit (MasterCard and Visa) and charge (American Express) are popular.
- Consumers 95(1) also like credit cards, and are making increasing use of bank debit cards.
- Large companies 95(3) also use credit and charge cards, payment through Automated Clearinghouses (ACHs), and billing and payment through traditional and VDE secure Electronic Data Interchange (EDI) transactions based, for example, on X.12 protocols.

A financial clearinghouse 200 makes payment more efficient in several ways. For example, financial clearinghouse 200 furnishes provider 168 with a convenient, "one stop shopping" interface to the several payment methods, and keeps track of the at least one account number associated with a given provider.

In this particular example, a certifying authority 500 may deliver digital certificates to each of consumers 95 specifying a consumer's one or more classes. For example, certifying authority 500 may deliver:

one or more certificates 504(1) attesting to the fact that consumer 95(1) is an individual consumer subscriber to information service 1000 and further attesting to the fact that the consumer is a registered college student and is a resident (for the taxation purposes related to the transaction) of California, a certificate 504(2) attesting to the fact that professional 95(2) is a lawyer admitted before the bar of the State of California, and one or more certificates 504(3) attesting to the fact that corporation 95(3) is a legally incorporated entity and has a certain credit worthiness.

Control sets 188 may activate the different payment methods based on the presence of an appropriate digital certificate 504. For example, control set 188(1) delivered to consumer electronic appliance 100(1) authorizes consumer 95(1) to use each of the three articles 166(1). Control set 188(1) may, for example, contain a requirement that the consumer 95(1) must have a certificate 504(1) from an independent certifying authority 500 (or from the information distributor or other party acting in a certifying authority capacity under authorization from a more senior certifying authority) attesting to the fact that the consumer 95(1) has a subscription that has not yet expired to the online encyclopedia. This certificate 504(1) may, for example, be used in conjunction with other certificates issued by the certifying authority 500 (e.g., perhaps run by, or authorized by, the US government or other governing body) attesting to the fact that the consumer 95(1) is a US citizen, resides within the US, and is a legal resident of the State of California.

The Individual Consumer

The consumer 95(1) pays the information provider 168 for the subscription through a transaction transmitted to the financial clearinghouse 200 in a VDE electronic container 152. The payment transaction may involve, for example, the consumer appliance 100 sending to financial clearinghouse 200 an electronic container 152(7) including rules and controls 188(4) and audit records 302(1). The audit records 302(1) may indicate, for example:

who should be paid,
the amount of the transaction,
the particular payment method (a VISA card, for example),
the subscriber's VISA card number and expiration date,
an identifier of the information subscription, and
the number of the provider's account to which the payment should be credited.

The secure container 152(7) may also contain rules and controls 188(4) indicating that municipal, California and US federal sales taxes should also be collected. The financial clearinghouse 200 collects the appropriate sales taxes and deposits the funds in the appropriate accounts, for example certain funds would be deposited in the account belonging to the appropriate State of California tax collection agency 1002.

In exchange for the payment, the subscribing customer 95(1) may receive from certifying authority 500 a certificate 504(1) indicating she is in fact a subscriber and the expiration date of the current subscription.

The Professional

The lawyer 95(2) in this example may be located in the United Kingdom. He purchases the three chapters 166(2) from a treatise on patents using a MasterCard, but pays in pounds sterling rather than in dollars. To perform the purchase transaction, the lawyer 95(2) may first be preauthorized by the financial clearinghouse 200 for purchases each month of up to $500 US (or the equivalent in pounds). The pre-authorization may be sent from the financial clearinghouse 200 to the lawyer's appliance 100(2) in the form of a budget control 188(5) in a secure container 152(8). The protected processing environment 154(2) within the lawyer's appliance 100(3) may open the container 152(8), authenticate the budget record 188(5), and store the control within an associated secure database maintained by PPE 154(2).

Upon receiving opening each of the three chapters 166(1), the lawyer's protected processing environment 154(2) may create an associated audit record, and may decrement available credit in the budget record by the amount of the purchase. At month end, or when the $500 preauthorized credit has been exhausted, the lawyer's PPE 154(2) may send to the financial clearinghouse 200, a secure container 152(9) with audit records 302(2) indicating all the purchases, their amounts, and the provider account or accounts to be credited, this supporting efficient automation of clearing processes. The financial clearinghouse 200 may open the secure container 152(9), debit the lawyer's credit card account, and pay the appropriate provider accounts their due.

The Company

Preliminary to content transactions, a distributed corporate financial clearinghouse 200A within the company 95(3), while operating under the authority of the financial clearinghouse 200, sends to each of managers 95(3)A, 95(3)B a secure container 152 a budget record 188 indicating their currently approved monthly information and market research budget. A corporate distributed certifying authority 500A (in the same trust hierarchy as the certifying authority 500, in this example) may also issue digital certificates 504 (not shown) to employees of the company.

In this example, each product manager 95(3)A, 95(3)B prints selected portions of the report and the budget on his or her local appliance 100, which is decremented by $10 for each page printed. The protected processing environment 154(3) within the local electronic appliance 100(3) securely performs this process, conditioning it on controls 188(3) that may require appropriate digital certificates 504(3) issued by certifying authority 500 and/or the distributed corporate certifying authority 500A.

According to controls 188(3) supplied by the information provider, for example, at the end of the month, or when the budget for that month is exhausted, the corporation's appliance 100(3) sends to the corporate internal financial clearinghouse 200A audit records (not shown) indicating any purchases that might have been made during the reporting interval and the amounts and provider account numbers for those purchases. The distributed, local corporate financial clearinghouse 200A aggregates the sums in the audit records and sends in a secure container 152(12) at least one audit record 302(3) to the external financial clearinghouse 200 to authorize payment of the total amount owed the provider of the market research reports through an Automated Clearinghouse (ACH). Also in the secure container 152(11) (e.g., as part of audit record 302(3)) are the account number of the company 95(3) from which the funds should be debited and the account number of the market research company that issued the report into which the funds should be credited. The financial clearinghouse 200 completes the payment process through the ACH and sends a VDE secure container (providing at least one audit record) back to the internal, corporate financial clearinghouse 200A as confirmation. Distributed clearinghouse 200A may, in turn, send, using a secure container (not shown), at least one confirming audit record to each of the product managers 95(3)A, 95(3)B.

Example

Distributed Commerce Utility 75 can Support Transactions where a Consumer Purchases and Pays for a Tangible Item A significant portion of electronic commerce will entail the sale, purchase, distribution management, and/or payment for intangibles of all kinds. Commerce in tangibles has many of the same security, trustedness, and efficiency requirements as commerce in intangibles (e.g., digital information). For the computer to become a true commerce appliance, a distributed, secure, trusted rights/event management software layer (e.g., rights operating system or middleware) such as the Virtual Distribution Environment described in the Ginter et al. specification is a necessity. Thus, even when tangibles rather than digital properties are the object of secure electronic commerce, Distributed Commerce Utility 75 can play an important role.

Figure 62:
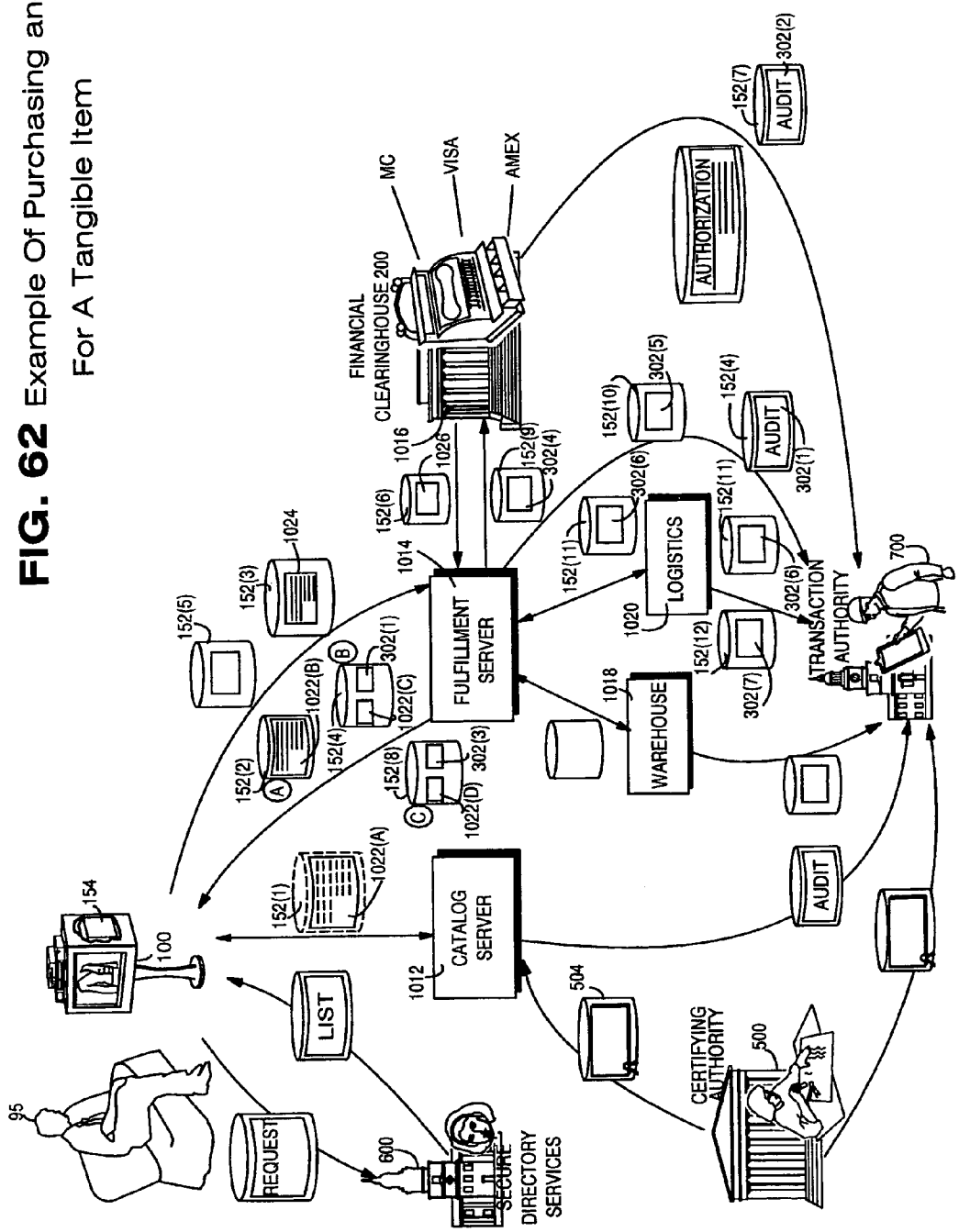
FIG. 62 shows a tangible item purchasing and paying example.

FIG. 62 shows an example tangible goods purchasing and payment system 1010. In the FIG. 62 example, imagine a well-known provider of clothing and certain related household items, for example, L.L. Bean or Lands' End, offers their wares over a digital network such as the Internet/World Wide Web. In this example, the company creates:
  a Web catalog server 1012 to offer a line of clothing to consumers 95,
  a web fulfillment server 1014 that is an interface to the fulfillment function, and
  a third web server 1016 that acts as a secure financial clearinghouse 200 and as an interface to several payment methods (e.g., MasterCard ("MC"), VISA, and American Express ("AMEX").
The company also in this one example
  registers the service with the secure directory service provider 600, and
  through the financial clearinghouse 200, establishes a provider account with at least one payment method, such as a credit card, debit card, and/or bank, and
  registers several transactions with a transaction authority 700.
In this example, the company registers with the transaction authority 700, which may be a distributed transaction authority within the company selling the goods, an atomic transaction comprising at least one electronic control set that describes, for example:
  sending the order to the fulfillment processing one or more organizations such as a warehouse 1018 and logistics 1020 (which may or may not be the same company),
  receiving confirmation that the desired merchandise is in fact in stock,
  receiving confirmation of the order,
  receiving payment pre-authorization from a payment method for the particular customer placing the order,
  shipping instructions for the merchandise,
  confirmation that the merchandise was actually shipped, and
  controls for completing the payment transaction.

In this one example, the company also obtains at least one digital certificate 504 from a certifying authority 500 attesting to at least one fact, for example, that
  the company is a legitimate corporation registered in the State of Delaware;
  the company is not in bankruptcy and/or the company has a certain degree of creditworthiness;
  the company has been assigned a particular Federal tax Identification Number; and
  that the company has State tax Identification Numbers in each of several states, the specific states and their corresponding Identification Numbers, A customer 95 uses his or her electronic appliance 100 with Web browsing capabilities to access the catalog server 1012 over the Internet's World Wide Web. The catalog server 1012 sends the customer 95 a web page 1022 providing a page from an electronic catalog. Web page 1022 may be sent in one or more secure electronic containers 152(1). The customer 95 displays the web page 1022A using his or her electronic appliance 100, and clicks on the part of the web page showing a men's short sleeve Oxford button down shirt selling for $15.95. The current Web page is replace by a web page 1022B from the fulfillment server 1014. This second web page 1022B may be sent in a secure container 152(2).

The customer's electronic appliance 100 has a protected processing environment 154. PPE 154 opens the secure container 152, and displays the page 1022B on the screen. The page 1022B being displayed is a form that has several fields including the catalog number and description of the shirt and retail price. The customer 95 fills in fields for color, neck size, normal or tall person, normal or trim fit, and quantity. The customer 95 also indicates where the shirt(s) are to be delivered, the class of delivery service desired, and the customer's address.

Upon the customer 95 completing the required information, the electronic appliance 100 puts the form field information 1024 in a secure container 152(3) and sends the container back to the fulfillment service 1014. Fulfillment server 1014 opens the container 152(3) and reads the field information 1024. Fulfillment server 1014 creates a VDE audit record indicating receipt of information 1024. Fulfillment server 1014 may also create a control set 188 and/or an event notification that initiates a purchase transaction.

Fulfillment server 1014 may communicate with warehouse 1018 directly or through transaction authority 700. The fulfillment server 1014 then determines whether the required items are in stock and available to be shipped. If fulfillment server 1014 determines that the required items are in stock and available to be shipped, and if the information 1024 provided by the consumer is sufficient to proceed, the fulfillment service sends back to the consumer another Web page 1022C indicating:
  that the purchase can be fulfilled,
  what are the various sales taxes and delivery charges,
  the address provided and class of delivery service chosen,
  new fields for payment related information, and
  a query asking whether the consumer wishes to proceed.

The fulfillment service 1014 also sends audit records 302(1) to the consumer's PPE 154 and to the transaction authority 700 indicating which parts of the larger, atomic transaction have been fulfilled.

If the customer 95 determines he or she does not wish to continue with the transaction after viewing fulfillment details, his or her appliance 100 can send a secure VDE container 152(5) to the fulfillment service 1014 and to the transaction authority 700 indicating that the transaction is canceled. If the customer 95 says yes, please continue with the transaction, the customer is prompted to pick a payment method from among the list provided. In this example, the list corresponds to payment methods supported by both the merchandise provider and by the financial clearinghouse 200. The customer 95 fills in credit or charge card number, for example, expiration date, and billing address.

Upon completion of the required information, the customer's appliance 100 can send the information, using his or her secure PPE, in a secure VDE container 152(5) to the financial clearinghouse 200, and may send a separate VDE container (not shown) with an audit record to the transaction authority 700.

The financial clearinghouse 200 gets pre-authorization from the credit card processing company, and, for example, using a secure VDE container 152(6) returns the pre-authorization approval information 1026 to the fulfillment server 1014. Financial clearinghouse 200 may send another VDE container 152(7) to the transaction authority 700 with an audit record 302(2) indicating completion of the pre-authorization step.

The fulfillment server 1014 may send a further VDE secure container 152(8) to the customer 95 with a new Web page 1022D and audit record information 302(3) indicating that:
  the order process is complete, the sale has been approved by payment method,
  when the goods are shipped, the customer's credit card will be charged the total amount, and
  a transaction confirmation number for further reference in order to be able to make inquiries with the fulfillment service 1014 and/or with the transaction authority 700

The fulfillment service 1014 (e.g., in cooperation with warehouse 1018) packages the goods, hands them off to an express delivery service 1020, and, for example, sends VDE secure containers 152(9), 152(10) with audit records 302(4), 302(5) indicating shipment to the financial clearinghouse 200 and the transaction authority 700, respectively. In this example, the express delivery service ("logistics") 1020 also sends a VDE secure container 152(11) to the transaction authority 700 and to the fulfillment service (and also, if desired, to the customer 95) indicating that the express service 1020 has taken possession of the package.

Upon delivery of the package with the merchandise, in this example, the express delivery service 1020 sends a VDE secure container 152(12) containing an audit record 302(7) indicating that delivery of the package has been completed to the transaction authority 700 which then marks the transaction completed and then may send additional VDE secure containers 152 indicating completion to the financial clearinghouse 200, to the express delivery service 1020, to the fulfillment service 1014, and in some examples to the customer 95.

Example

Distributed Commerce Utility 75 can Support Transactions in which Customers Pay for Services A hallmark of advanced Western economies, especially the economy of the United States at the end of the present century, has been the transition from a largely manufacturing, "smoke stack" economy to not only an "information economy" but to a "service economy" as well. Distributed Commerce Utility 75 can support transactions in which customers pay for, and in many examples, consume or otherwise make use of services.

Figure 63:
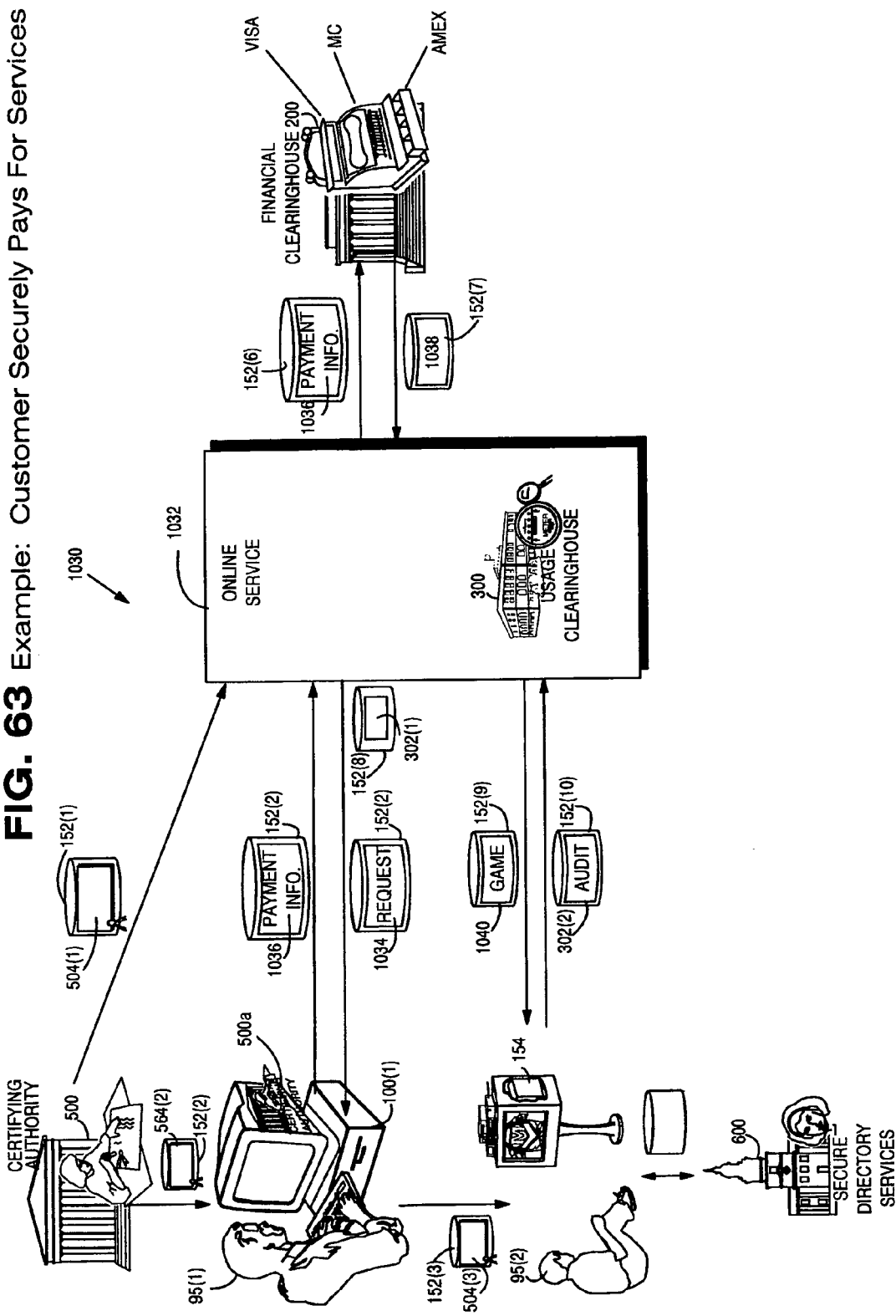
FIG. 63 shows an example of a customer securely paying for services.

FIG. 63 shows an example online service system 1030. In one example, an online service 1032 registers with the secure directory service 600 and obtains a digital certificate 504(1) from a certifying authority 500 attesting to identity of the online service. The online service also agrees to trust certificates 504 issued by the certifying authority 500 and by parties certified by the certifying authority 500 to issue certificates for specified facts.

For example, the online service 1032 agrees to accept certificates 504(3) issued by a distributed certifying authority 500A from parents certified by the certifying authority 500 (through certificate 504(2)) to issue certificates attesting to the facts that they have children and that these children are currently minor children. In turn, the online service 1032 will not allow children so certified to access certain subject matter materials distributed by the online service nor to accept digital signatures based on those certificates for purchase transactions, unless the adult person responsible for the child has issued another certificate attesting to their willingness to be financially responsible (e.g., unconditionally or for purchases up to some specified limit per transaction or some aggregate level of spending in a specified time period, in one example, so much per month). These certificates 504(2), 504(3) may be sent from the certifying authority 500 to the parent and/or to at least one child in a VDE secure container 152.

Now suppose the child 95(2) subscribes to an online game called "chat." Online service 1032 has a Web interface specifically designed for school aged children. This service 1032 offers a subscription that must be renewed quarterly. Using an electronic appliance 100 such as a personal computer or TV and settop box with bi-directional communications and a protected processing environment 154, the child 95(2) uses secure directory services 600 to locate the online service 1032, and sends a message requesting a subscription. In response, the online service 1032 sends to the parent 95(1) or guardian in a VDE secure container 152(4), a request 1034 for payment, membership, and member information. The parent or guardian and/or other paying individual 95(1) provides his or her (or their) credit card number(s), expiration date(s), and billing address information 1036 in one or more other secure containers 152(5) to the online service 1032.

In this example, the online service 1032 communicates the customer's service account, credit card and/or other payment information 1036 to the financial clearinghouse using a VDE secure container 152(6) (in a variation on this example, the parent 95(1) may have provided this financial and related information directly to the financial clearinghouse 200 in a VDE secure container 152(5)). The online service provider 1032 also provides to the financial clearinghouse 200 the clearinghouse network address and provider account number. Within a protected processing environment (which may, for example, comprise a general purpose computer locked in a physically secure vault or other secure installation), the financial clearinghouse 200 opens the secure container 152(6), extracts the payment information 1036, and completes the payment transaction with the credit card company.

For this example, the financial clearinghouse 200, in turn, communicates the following information 1038 (this list is for illustrative purposes only and does not detract from the general case in which any available set of information might have been communicated) to the online service 1032 in at least one secure VDE container 152(7):
  VDE audit record for this transaction,
  transaction authorization number,
  provider account number,
  account number of the customer at the service, and
  amount of the payment.

In turn, the online service 1032 sends a secure container 152(8) to the customer 95(1) indicating that payment has been accepted. In one example, online service 1032 may instruct certifying authority 500 to issue a certificate 504 attesting to the validity of the subscription until a specified date. Online service 1032 may also provide audit records 302(1) derived from the information 1038 provided by the financial clearinghouse 200.

Each time the child 95(2) logs on to the online information service 1032, the child's PPE 154 checks to determine if any certificates 504 are present or known and if so, whether:

these digital certificates attest to an current, unexpired subscription to the online service, and any minor child certificates are present and valid (for example, have not expired because the child has not yet reached their 18$^{th}$ birthday).

Having ascertained through these certificates 504 that the child 95(2) is authorized to use the online service 1032 and is prohibited from accessing certain "adult" content, the online service grants selective access, that is to authorized portions.

Among the features of this online service are distributed, multiperson interactive games. The child 95(2) in this example plays the game with at least one other authorized and certified minor child—adults are precluded by underlying VDE rules and controls from playing this game in this particular example. At least one portion of the software (e.g., executable code and/or interpretable code, such as Java) that implements at least one portion 1040 of the at least one game can be download from the online service 1032 to the child's information appliance 100(2) using at least one VDE secure container 152(9).

Using methods described in the Ginter et al. disclosure, these programs and/or portions of programs 1040 are determined to be authentic and unmodified. At least one of the keys used to calculate the one way hash function that produces the digital signature used for determining the integrity of the at least one program 1040 or at least one part of a program is bound to the identity of the online service 1032 by a certificate 504 issued by certifying authority 500.

As the child 95(2) in this example plays the game, at least a portion of his or her activities are metered according to methods disclosed in the co-pending Ginter et al. application and audit records 302(2) are created that indicate this child's usage. At certain times, these audit records 302(2) are transmitted to the online service 1032 which may, in this example, include a usage clearinghouse 300. Usage clearinghouse 300 analyzes these usage records 302(2), and may use them to determine how much to charge child 95(2).

Example

Figure 64:
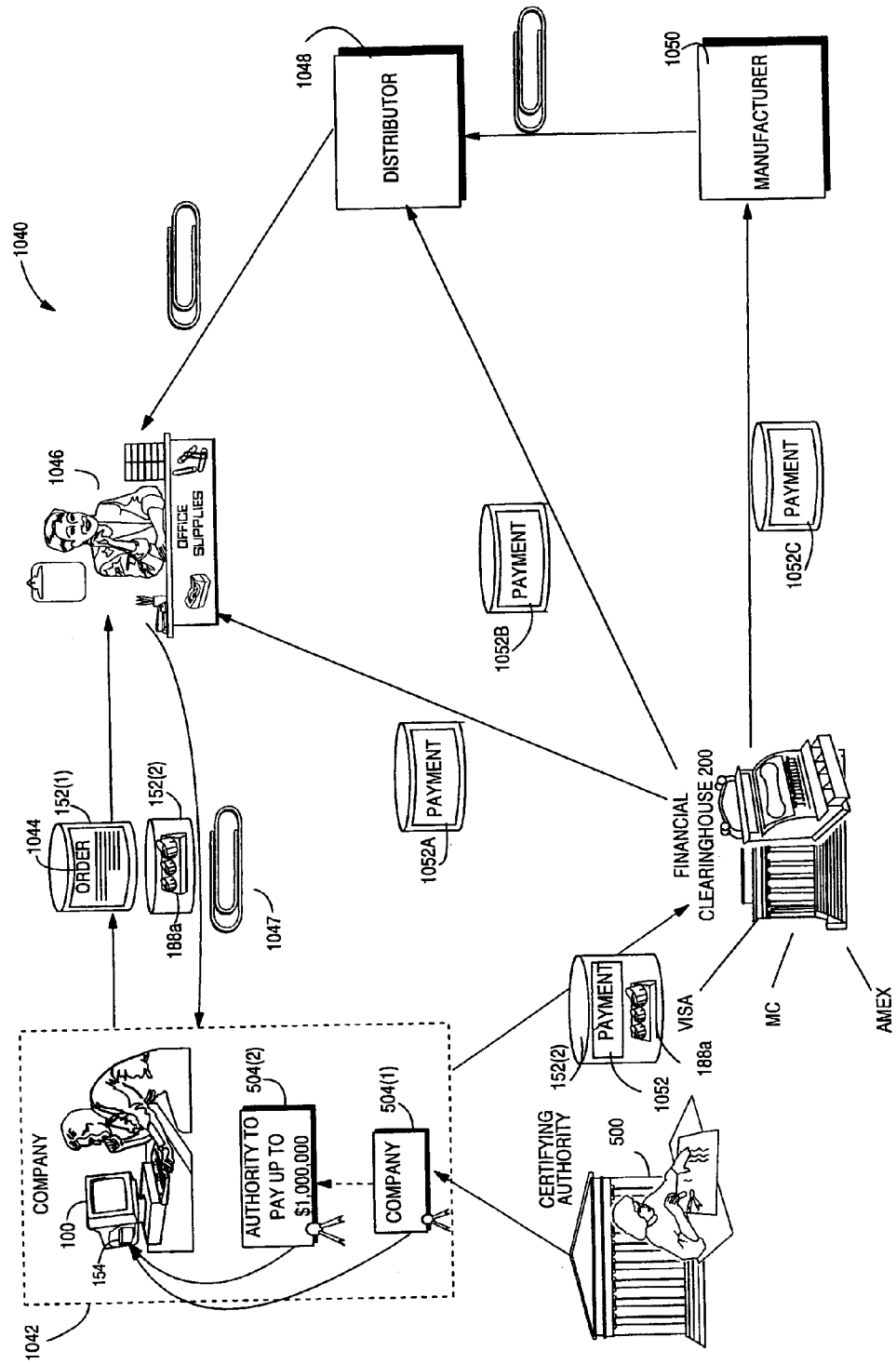
FIG. 64 shows example value chain disaggregation for purchase of tangibles.

Distributed Commerce Utility 75 can be Used to Provide Value Chain Disaggregation for Purchase and/or Use of Tangible Items Distributed Commerce Utility 75 can be used to facilitate a purchase or other type of transaction relating to tangible goods. FIG. 64 shows an example tangible goods delivery system 1040. For example, a company 1042 places an order for office supplies using an electronic appliance 100 including a PPE 154. The order is for a box of paper clips, a stapler, staples, a case of 8.5×11 inch copy paper, and a dozen yellow legal size note pads. The items are manufactured by a manufacturer 1050, distributed by a distributor 1048, and sold to the company by a retailer 1046.

In this example, a financial clearinghouse 200 receives a payment 1052 from the company 1042, and disaggregates the payment by dividing it up into disaggregated payments 1052A, 1052B, 1052C which it delivers to each of retailer 1046, distributor 1048 and manufacturer 1050.

For example, the company 1042 sends its order 1044 within a VDE electronic container 152(1) to a retailer 1046. In this example, retailer 1046 provides a fulfillment service that receives the order 1044 and, in response, provides a control set 188 indicating the provider account number of the distributor 1048 and/or manufacturer 1050 of each item and the percent of the retail price to be received by each. If desired, retailer 1046 may provide a different control set 188 for each item ordered (regardless of quantity)—allowing different payment disaggregation to be performed on an item-by-item basis. Retailer 1046 may provide this control set 188a to company 1042.

Control set 188a may be conditioned on the presence of one or more digital certificates 504 issued by certifying authority 500. For example, control set 188a may require company 1042 to provide a digital certificate 504(1) issued by the certifying authority 500. Certificate 504(1) attests to the identity of the ordering company 1042. The company 504(1) may provide another certificate 504(2) in the same chain of trust hierarchy as the certifying authority 500 warranting that the person placing the order is authorized to place orders up to a specified spending limit per order. Company 1042 may provide the same or different certificate 504(2) also indicating that the purchaser employee within the company is authorized to make use of a corporate charge card.

In this example, the company 1042 pays with a corporate charge card. The financial clearinghouse 200 first gets payment authorization from the credit card company prior to the retailer 1046 shipping the merchandise. Upon receiving notification of preauthorization, retailer 1046 may ship the goods 1047 to the company 1042. Following delivery of the merchandise 1047, the retailer 1046 creates at least one VDE audit and/or billing record 1052 in at least one VDE secure container 152(2), and transmits the container to the financial clearinghouse 200 (audit information may also or alternatively be sent to retailer 1046).

The financial clearinghouse 200 then completes the charge card transaction by allocating the total payment amount to each of the value chain participants represented by control set 188a (which it may have received, for example, directly from retailer 1046 and/or through company 1042). In this way, the distributors 1048 and/or manufacturers 1050 receive their payments at the same time the retail seller 1046 receives its payment. Control set information 188a may also indicate shares of the total payment and provider account numbers for local, state, and federal taxes, if any, and, for example, for delivery charges, such as to an overnight express company, if any.

This FIG. 64 example shows that value chain disaggregation can apply for both tangibles and for intangibles. Similar techniques can also be used much further back through the manufacturer's 1050 supply chains if so desired (e.g., to the providers of the metal from which the paper clips were fabricated).

Example

Distributed Commerce Utility 75 can Help Distribute Digital Properties by Providing Object Registry and Other Services Distributed Commerce Utility 75 can assist the electronic community in efficiently distributing electronic or digital properties or content. For example, using an electronic appliance 100 equipped with a protected processing unit 154, a creator or other rights holder 400 sends a digital object in a secure container to a rights and permissions clearinghouse 400 to be registered.

The rights and permissions clearinghouse 400 opens the container using, for example, its own VDE protecting processing unit, and assigns a uniform object identifier indicating the identity of the creator, the type of object being registered—software, video, sound, text, multimedia, etc., and the digital signature for the object. The uniform object identifier may be globally unique or may be unique only in the namespace domain of the creator or some other entity, such as an online service, digital library, or specific jurisdiction, such as a specific country.

In this example, using its protected processing environment, the rights and permissions clearinghouse 400 digitally signs the uniform object identifier with the rights and permissions clearinghouse private key and returns the object and identifier to the person or organization registering it in a VDE secure container. The rights and permissions clearinghouse 400 may retain a copy of the object or may retain only the uniform object identifier for the object, and the signatures for the object and its uniform object identifier. In another example, the rights and permissions clearinghouse 400 digitally signs a new object comprised of the original object and its uniform file identifier, and stores both the new object and/or its signature in the rights and permissions clearinghouse 400 archive.

The creator may have also sent in a VDE secure container a permissions and pricing template 450 (see FIGS. 45A–45C) indicating which permissions are granted, the prices to be charged upon exercising those permissions, and if applicable, the individual, class and/or jurisdiction to which those prices and permissions apply. More than one permission and pricing template 450 may be sent in a single VDE secure container 152, or separate VDE secure containers 152 may be used for each permission and pricing template.

In this example, using a VDE secure container 152, the object is then transmitted from the creator to a distributor 168 (see FIG. 16). Using a certificate 504, the distributor 168 can prove to the VDE instance (PPE 154) interpreting the creator's control set that the distributor is indeed authorized to selectively alter permissions and prices of the object and creates a new permissions and pricing template. The distributor 168 then sends a VDE secure container to the rights and permissions clearinghouse 400 containing the uniform object identifier together with the new controls. In the preferred embodiment, if the object remains unmodified, the distributor 168 has the option of leaving the uniform object identifier unmodified; however, if the distributor has modified the object, perhaps to add its own brand, then the uniform object identifier must be modified to reflect the distributor's version. The digital signature is recomputed using the private key of the distributor. As before, the object registry has the option of storing only the digital signature or both the signature and the actual object.

Example

Distributed Commerce Utility 75 can be Used to Facilitate Copyright Registration As a value added service, the rights and permissions clearinghouse 400 can provide a copyright registration service (see FIG. 43). The rights and permissions clearinghouse 400 can send a copy of the object to the appropriate online copyright registration service of the appropriate government agency 440, for example, the US Copyright Office. The object and uniform object identifier may be sent in a VDE secure container together with controls indicating the mode of payment, if a registration or processing is being charged.

In this example, the copyright registration service can send at least one VDE secure container to the financial clearinghouse 200 with at least one audit record indicating the amount to be paid, the payment method and account of the registering party, and the account of the government to receive the funds, and receives in return in a VDE secure container an audit record indicting that the transaction has been pre-authorized (or that for whatever reason, the proposed transaction has not been authorized).

If the transaction has been pre-authorized by the financial clearinghouse 200, a VDE enabled computer located, in this one example, in US Copyright office opens the secure container and adds the uniform object identifier and the object to the registration database. Under a chain of trust emanating from the certifying authority 500—which in this example may be operated by, or on behalf of the US government—the copyright registration service issues at least one digital certificate 504 attesting to the facts that an object with a specified uniform object identifier and with a specified digital signature has been in fact registered with the registration authority and that the at least one person is in fact the owner of the copyright at the time the object was registered. This certificate 504 is sent in a VDE secure container to the person who registered the object (and/or who was named as the person to be notified) and to the rights and permissions clearinghouse 400 who, in turn, may provide copyright registration information upon request in a secure VDE container.

The copyright registration service sends at least one VDE secure container to the financial clearinghouse 200 with at least one audit record instructing the clearinghouse 200 to proceed with fulfillment of the pre-authorized transaction (if all necessary information was part of the pre-authorization process) and/or providing information to the clearinghouse 200 regarding, for example, the amount to be paid, the payment method and account of the registering party, the account of the US government to receive the funds, and that the payment transaction should be completed, and receives in return from the financial clearinghouse in a VDE secure container an audit record indicting that the transaction has been completed and funds deposited in the appropriate account or accounts, or that the payment transaction fail and the reason why it failed to be completed.

Example

Distributed Commerce Utility 75 can Support Renewal or Modification of Permissions and Prices Distributed Commerce Utility 75 can further facilitate the distribution of electronic and digital properties by providing a mechanism for renewing rights and permissions that have expired. See FIG. 42A.

In one example, suppose an employee of a Fortune 1000 company has a control set for a digital property, perhaps a piece of software or a Java applet, that has expired. The VDE protected processing environment on the employee's computer can send a VDE secure container to the rights and permissions clearinghouse 400.

Distributed Commerce Utility 75 can also facilitate the distribution of electronic and digital properties by providing a mechanism for distributing rights, permissions and prices that have been changed by one or more participants in a distribution chain. In one example, suppose a customer has a digital object on her hard disk and its VDE control set as distributed by the publisher. The permissions and prices originally indicated a pay per use model in which the user pays 10 cents for each operation on the object, such as printing or viewing.

To determine if new rights and prices are now available, the protected processing environment on the customer's PC can send a VDE secure container to the Rights and Permissions clearinghouse 400 using its network address obtained from the control set together with MIME-compliant electronic mail. The customer obtained the address of the rights and permissions clearinghouse from the secure directory service 600, having, for example, sent a query in a VDE secure container and having received a response in a VDE secure container.

The VDE secure container sent to the rights and permissions clearinghouse 400 contains the object identifier plus a request for the current controls including prices. The protected processing environment at the rights and permission clearinghouse 400 server opens the VDE secure container, retrieves the most recent control set from the database of controls, and sends via return electronic mail another VDE secure container with the desired controls. The customer's protected processing environment opens this container, and replaces and/or augments the expired controls with the new ones. The customer is now able to use the content according to the rules and controls specified in the control set just received from the rights and permissions clearinghouse and processed by the instance of VDE on the local computer or other appliance. In this example, these new rules and controls have reduced the pay per use price from ten cents per operation to five cents per operation.

Example

Distributed Commerce Utility 75 can Support Models to Distribute New Rights

Distributed Commerce Utility 75 can also support transactions in which some or all rights are not initially distributed to the ultimate consumer with the content, but must be requested instead. In one example, suppose a lawyer decides to go into the publishing business by combining her/his own articles with other materials obtained from legal information distributors. The legal information distributors have chosen a rights and permissions clearinghouse 400 to be their distributor of control set information for their many properties. With each object they register at the rights and permissions clearinghouse 400 they also register two control sets in the formats described in the Ginter et al. disclosure:
- one control set specifies default controls including prices for retail customer, and
- a second control set conveys rights and prices seldom of interest to the retail customer, for example, the anthologizing right.

The attorney newsletter publisher obtains a chapter from a treatise on patent law and wants to include a 1000 word excerpt in the newsletter in addition to other articles. Having already obtained the treatise chapter and its retail control set, the newsletter publisher sends an inquiry in a VDE secure container using Internet MIME-compliant e-mail to the rights and permissions clearinghouse 400 asking for the excerpting right and the anthologizing right for the chapter identified by the enclosed uniform object identifier. The lawyer found the rights and permissions clearinghouse 400 using a secure directory service 600 (alternatively the rights and permissions clearinghouse 400 address may be contained in the original retail version received by the lawyer).

The rights clearinghouse 400 checks the object database, locates the control set information for the object named in the universal object identifier, and determines that both the excerpting and anthologizing rights are available along with the prices for each. The excerpting right does not convey the right to modify the excerpted portion. The anthologizing right is conveyed along with controls that set the price to a 30% discount from retail prorated for the length of an excerpt if the whole chapter is not anthologized.

Using a VDE aware page composition application, the newsletter publisher combines several works, including the 1000 word excerpt into a new work, and registers the new object with the rights and permissions clearinghouse together with its control set(s). The newsletter publisher also registers the new object with a copyright registration function, for example, the US Patent and Copyright Office. The newsletter publisher distributes the new work in a VDE secure container, which also contains control sets for each of the separate anthologized works, and for the whole, complete newsletter as well. The local VDE protected processing environment on the appliance of the user keeps track of usage according to the controls that apply to the composite object and to the controls of each of its parts for which there are separate rules. At some time, the VDE instance sends audit records to the usage clearinghouse 300 and to the financial clearinghouse 200.

Example

Distributed Commerce Utility 75 can Support Electronic Rights Negotiations

Distributed Commerce Utility 75 can support electronic rights negotiations. In one example, suppose a professor is creating a "course pack": a compilation of many different works to be used by students in a particular course that in this example, lasts only one semester. In this example, the professor sends a VDE secure container with a query to the appropriate rights and permissions clearinghouse 400 and gets back control sets for the digital properties listed in the query. Upon reviewing the permissions and prices, the professor notes that a chapter from a book carries a price large enough to make the overall price of the course pack higher than the maximum s/he desires.

Using the negotiation mechanisms disclosed in Ginter et al. (see, for example, FIGS. 75A–76B), the professor attempts a negotiation with the rights and permission clearinghouse 400. The rights and permissions clearinghouse 400, in turn, automatically determines it lacks the authority to negotiate and redirects the negotiation to the publisher.

Having obtained an appropriate certificate 504 from a certificate authority 500 by providing credentials indicating membership in the class "higher education", the protected processing environment of the publisher's Web server makes an offer of a new, modified control set for the property targeted for this professor. The controls have a discounted price, require that the copies be printed on a VDE enabled authorized printer that will keep track of the number of copies printed, and report back to the various parties to the transaction using VDE techniques. Still unhappy with the price, the professor sends a VDE negotiation counter-offer in a secure container to the publisher. The publisher's VDE instance negotiates with the professor's negotiation counter-offer control set and an agreement is reached that and provides a new control set with the new, agreed-upon prices and terms and conditions to the professor, who then goes ahead to produce the course pack. The rights and permissions clearinghouse 400 is willing to grant the reduced price in part because the professor in this example is able to provide a digital certificate attesting to the fact that she has a full-time appointment at the University of California, Los Angeles and has a certain, minimum number of students who will employ the materials. This authentication meets requirements stated by the publisher to the rights and permissions clearinghouse 400.

Example

Certification of Executables

One valuable use of certifying authorities 500 is for the issuance of digital certificates on behalf of the government. In addition to issuing certificates attesting to identity, legal status, etc., government certifying authorities 500 might issue certificates certifying executables, for example load modules. For example, government certifying authorities 500 at all levels might certify the set of executables that represents the laws and trade practices of their administrative districts. For example, Saudi Arabia might insist that all appliances in their administrative control have load modules certified by the government that examine attributes of containers to insure that only appropriate content is released. The State of California might certify a load module that calculates state tax, etc.

Example

Entertainment Distribution

Distributed Commerce Utility 75 can be used to efficiently and flexibly support models for film distribution to the consumer market. For example, suppose that a film and entertainment company such as Disney wants to provide electronic Distributed Commerce Utility 75 to support distribution of its films to consumers 95. Disney could open a Commerce Utility System 90 itself, or it might contract with a neutral third party to provide Commerce Utility Systems 90 on its behalf. The purpose of the Commerce Utility Systems 90 in this example is to support secure pay-per-view/pay-per-use, rental, lease and other film distribution transactions to consumers.

The films themselves could be distributed in digitized linear form—for example, on Digital Versatile Disk (DVDs) or other high capacity media. Such media would store, in addition to the films themselves, one or more secure containers including control sets for controlling use of the films. Consumers 95 could play the films using a media player 104 (see FIG. 1) having a network 150 connection or other "back channel" (e.g., the ability to read from, and write to a smart card or the like).

Media player 104 has a protected processing environment 154 such as a secure processing unit for use in managing rights and manipulating the electronic containers. The storage media might also be played by a personal computer 124 equipped with a protected processing environment and a network connection.

Set top box 104 may be controlled by electronic controls distributed on the media and/or via the back channel. The controls require the set top box 104 to record customer usage and payment information for each property the consumer decides to view. For example, a consumer 95 might place a media such as an optical DVD disk into media player 104 and hit the "play" button. The consumer's media player 104 might next display (e.g., on television set 102) a message telling the consumer how much it will cost to view that particular film (e.g., $2.95), and ask the consumer if she wants to proceed. If the consumer answers "yes", media player 104 will play the film on the consumer's television set 102—recording usage and payment information for reporting to Commerce Utility Systems 90. The protected processing environment 154 within media player 104 may, under secure control of one or more associated electronic control sets delivered to it—monitor and collect information that can ultimately be used to ensure the consumer pays for watching the film and to provide a secure usage audit. The secure usage audit may be used, for example, to allow Disney, the film's actors and director, and others involved in making the film to securely verify how many consumers watched the film (and also potentially to provide demographic information for targeting advertising or the like). For example, the media player 104's protected processing environment may securely collect and record, for example, the following information within meter, billing and/or budget audit trails associated with particular controls:

name of film
digital identifier of film
time and date property played
number of times property played
who played the property.

In one example, consumers 95 would have to possess a digital certificate 122 issued by an appropriate certifying authority that attests to certain facts. Such a digital certificate 122 can be used to provide a context for the electronic control set(s) delivered to media player 104. Such a certificate might need to be present before the consumer would be permitted to play the film and/or to prevent the film from playing under certain conditions and/or to effect the controls that apply when the film is played.

For example, the parents could obtain a digital certificate 122 indicating that the household has children. This "child present" digital certificate 122 could be used to prevent media player 104 from playing any films other than those that have "G", "PG" ratings. Such certificates 122 could be issued by the same organization that provides the other administrative and support services in connection with this example if desired.

The electronic controls provided with a particular film on a media such as an optical disk may also specify a particular value chain disaggregation to be applied in connection with payment arrangements. For example, the media player 104 would "know" from the electronic rules and controls delivered to it that the film distributor, studio and the Distributed Commerce Utility 75 are to receive particular percentages of the $2.95 usage fee, and that a state government authority must receive a certain tax payment in the form of a sales tax or VAT. Because this information is maintained within the protected processing environment 154 within media player 104, the consumers 95 may never be exposed to the payment disaggregation scheme and/or its details. (Typically, consumers do not care what the distributor "cut" is as opposed to the studio revenue. The protected processing environment within media player 104 may provide this payment disaggregation locally or through a distributed or centralized financial clearing function 200 as described above.)

Media player 104 can report the usage containment information it has collected on a real time (online) and/or periodic event-driven basis. In one example, media player may report at the end of each month the information it has collected over the preceding month. It may report collected payment information (including disaggregation data provided by the control set) to a financial clearinghouse 200 run by Disney (or, for example, such information may be reported directly to clearinghouse 200). Financial clearinghouse 200 ensures that the consumer's account is appropriately debited and that the various payees (e.g., Disney, the film's distributor, and others in the value chain) receive appropriate "splits" of the consumer's payment. The financial clearinghouse 200 may also provide consumer credit checks and authorizations, helping to ensure that the consumer doesn't run up a big bill she can't pay.

Media player 104 may report the usage information it has collected to a usage clearinghouse 300 operated by an independent auditor (the film's producer and actors may insist that an independent third party auditor—not Disney— performs this function) or, for example, may report such information to Disney and/or clearinghouse 200—certain of such information may be concealed from Disney if required by rules and controls to ensure other value chain party rights and Disney may not be able to identify, alter, and/or remove such information due, for example, to VDE protection mechanisms. The usage clearinghouse 300 may analyze the usage data and issue reports indicating total number of views, market share, etc. Usage clearinghouse 300 may also further analyze the information to provide demographic and/or other marketing research information. This type of information can be very useful to advertisers and marketers.

Disney may also operate a rights and permissions clearinghouse 400. Even though permissions are distributed on the optical media in this example, the rights and permissions clearinghouse can provide supplemental control sets for various reasons. For example, the control sets distributed on the media may expire on a certain date. Rights and permissions clearinghouse 400 may issue new control sets in lieu of the expired ones. Rights and permissions clearinghouse 400 may also issue permissions to provide "sales" and/or to otherwise change prices (e.g., to reduce the price of an older film). Rights and permissions clearinghouse 400 can also issue special permissions (e.g., an extracting or anthologizing right that multi-media developers or advertisers might be able to request, and/or, for example, redistribution rights to certain frames such as an approved image of Mickey Mouse for printing purposes). Disney could "pre-approve" some of these special permissions so that the rights and permissions clearinghouse could automatically provide them on demand. Digital certificates 122 might be used to interact with the permissions—thereby assuring that the user receiving the control set is entitled to take advantage of it.

Example: Distributed Commerce Utility 75 can Support the Collection, Analysis, and Repurposing of Usage Information Prior to the inventions disclosed in the Ginter et al. specification, the electronic community lacked general purpose, reusable, distributed, peer-to-peer technologies that could, among other things, efficiently and effectively monitor and measure usage on the local computer or protected processing environment. Collecting, analyzing, and reporting usage data provides significant value to rightsholders and to other distribution chain participants, to infrastructure Distributed Commerce Utility 75, to customers, and to other interested parties. Understanding what has happened can often be a fundamental determinant or contributor to what might or should happen. In addition, usage information can be repurposed to support a wide range of other commercial activities, including advertising and merchandising models.

Suppose one or more customers in each of several companies have information appliances 100, in this one example such as personal computers, with VDE protected processing environments (PPEs) 154 as described in Ginter et al. Suppose further that over some time period, perhaps a month in this example, that VDE has been keeping track of detailed usage information and storing this information in the encrypted database on each hard drive on each computer that is a logical extension and under the control of each consumer PPE. These consumers have each been purchasing different combinations of information and entertainment from generally different sources. Each instance of VDE keeps track of usage information according to the controls associated with the content and/or service being purchased or otherwise used.

On or shortly after the first of each month, and/or any other required (or, if supported, allowed) reporting intervals, each instance of VDE communicates the usage records to the usage clearinghouse 300 according to the controls associated with each of the digital properties they have used during the previous month. In turn, the usage clearinghouse 300 provides reports to each of the rightsholders regarding any use of a property during the previous month or other reporting interval (e.g., daily, weekly, quarterly, annually, etc.).

In one example these reports contain information identifying both the individual customer and the company that employees them. In another example, the reports contain detailed usage information, but the identities of the individual customers has been removed by the usage clearinghouse 300. Alternatively, both the individual and corporate identities may be removed. Instead, the usage information may be aggregated by any one or more certain classes, such as by industry, geography, and/or by country, and/or any other useful classes.

In another useful example, a particular company or individual customer may have not permitted VDE (subject, of course, to this right being available through in place rules and controls) to communicate identity information to the usage clearinghouse 300 from their information appliances in the first place. The user may have established VDE controls prohibiting disclosure of such identifying information. In another example, the user may have used the negotiation mechanisms disclosed in the Ginter et al. application to negotiate additional levels of privacy and confidentiality other than those required in the various control sets associated with the information being purchased or otherwise used by each customer, that is, the electronic negotiation process generates a modified or new rules and controls set reflecting the additional levels of privacy and confidentiality. In yet another example, a rightsholder, rights and permissions clearinghouse 400 or usage clearinghouse 300 or other party, may have used the same negotiation mechanisms to negotiate, through the use of VDE rules and controls sets alternative levels of privacy and confidentiality.

As illustrated in FIGS. 11 and 33–39, the usage clearinghouse functions that may remove identifying information, aggregate data, analyze data, generate reports, and/or transmit those reports to rightsholders and other interested parties may exist in one or more logical and physical locations. For example, a distributed usage clearinghouse 300 executing on the local computer (or other information appliance) may perform any or all of these usage clearinghouse functions. One or more usage clearinghouses may exist within a given company or within a given collection of companies comprising a vertical industry, healthcare, for example, trading group, or family of companies ("keiretsu"). Similarly these usage clearinghouse functions may be performed by usage clearinghouses within each country or other jurisdiction or defined by any other class and/or geographic variable.

Usage clearinghouse 300 may also provide raw data, aggregated data, and/or customized reports to rightsholders, distribution chain participants, and/or other interested parties. These parties include: for example, content creators, publishers, repackagers, repurposers, advertising agencies and their clients, trade associations, market research and consulting companies, circulation audit and audience measurement bureaus, the sales, marketing, and advertising functions of companies with an interest in one or more markets, and government agencies.

In another example the usage clearinghouse 300 may also sell information to advertisers indicating exposure to particular ads and/or classes of ads by individuals, customers within a company and/or group of companies, markets, and/or other analysis groupings and categories.

Example: Secure Directory Services Protect Confidentiality and Privacy

Personal and business confidentiality and privacy are often essential aspects of the modern experience. Individuals may not want others to know with whom they are associating. In many aspects of business, firms may not wish to reveal their interest in communicating or interacting or conducting business with other parties. In today's Internet, for example, it is possible for those with certain kinds of access to determine the nature of queries between a given person and a directory service. Such information may provide important clues regarding existing or pending business arrangements that have not yet been publicly announced, a merger or acquisition, for instance.

VDE secure containers provide one basis for secure directory services 600 in which confidentiality and privacy are preserved. In one example, the Corporation Counsel in a Fortune 100 company wishes to obtain the email address of the investment banker in the firm handling a proposed acquisition—but without revealing her interest to anyone else. The attorney sends a query in a VDE secure container to the secure directory service 600 with the name and company of the person she wishes to contact. The secure directory service then sends the response in another VDE secure container back to the attorney. Both the query and the response can make use of certificates issued by the certifying authority 500 authenticating both the attorney and the secure directory service 600. Payment for the query can be handled by the financial clearinghouse 200 who deposits payment in the provider account of the secure directory service 600 while debiting the account of the company that employs the attorney.

Because these transactions are conducted using VDE and VDE secure containers, those observing the communications learn no more than the fact that these parties are communicating. Security analysts have developed techniques for "traffic analysis", in which the frequency of communications among two or more parties is observed and changes in the frequency of communications are correlated with other information to make inferences regarding the content and/or purpose of these communications.

Using VDE and VDE secure containers, it is possible to defeat traffic analysis, however at some added expense. In this one example, the company could send a VDE container to the secure directory service 600 with an empty or "null" query that would generate in the average amount of elapsed time a return message in a VDE container with a null response. The instance of VDE on the attorney's computer would generate a payment transaction destined for the financial clearinghouse, but would aggregate these payment records with others to eliminate correlations between the pattern of queries and payments. While inefficient from a commerce standpoint, this method of using VDE and VDE secure containers to defeat traffic analysis attacks can in principle be used among plural parties wishing to hide the pattern of communications among them while taking advantages of the secure, trusted, efficient distributed transaction capabilities disclosed in the Ginter et al. application.

Figure 65:
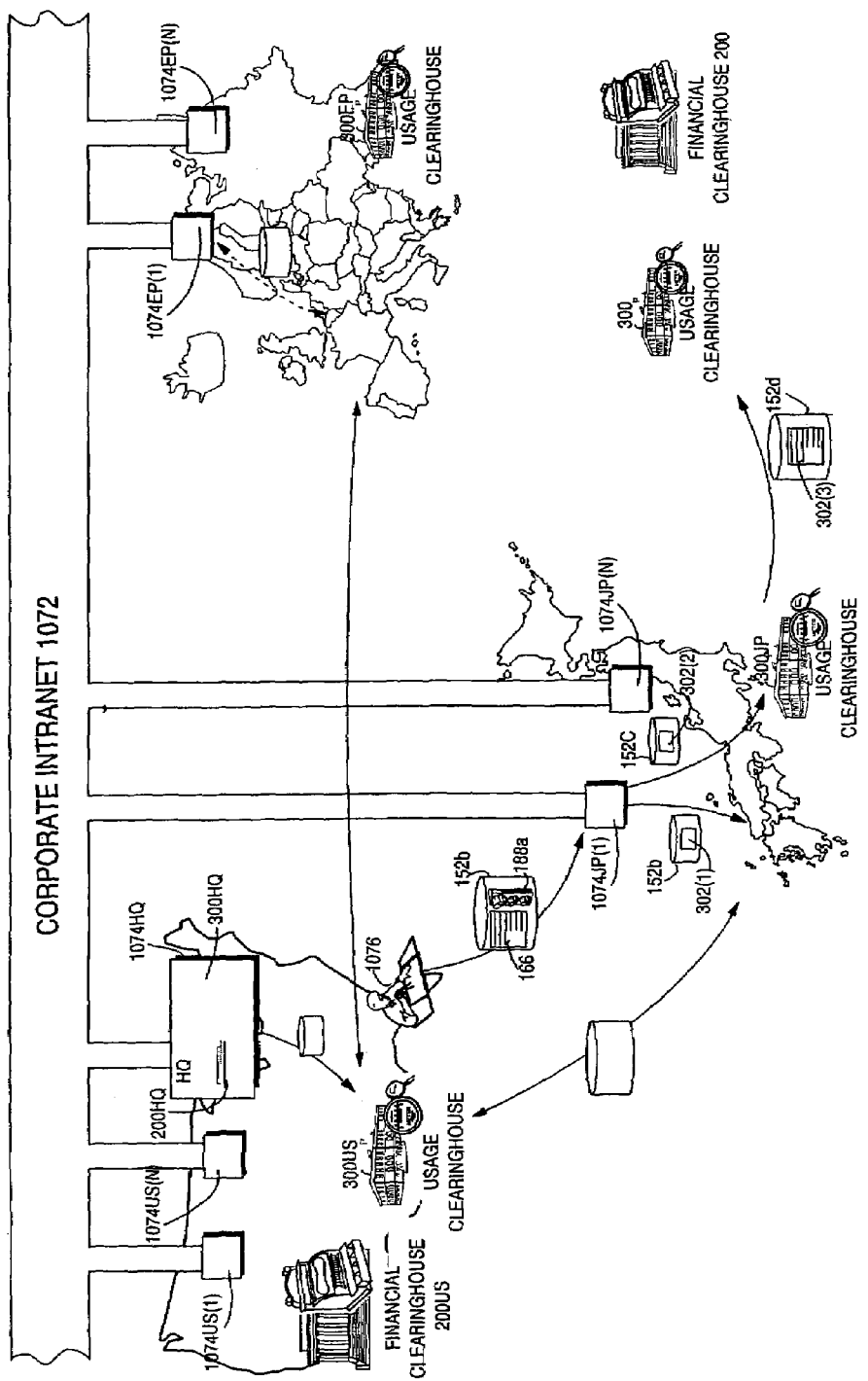
FIG. 65 shows an example of cooperation between Commerce Utility Systems internal and external to an organization.

Example: Cooperation Among Clearinghouses Internal and External to an Organization The various Commerce Utility Systems 90 may be distributed to varying degrees and in varying combinations as illustrated in FIGS. 2A–2E and 3A–3C). In one example shown in FIG. 65, an American Fortune 100 company 1070 with operations in several countries (e.g., the United States, Japan and Europe) and within many of those, in multiple locations within each country, has found it desirable to internationally distribute VDE Distributed Commerce Utility 75. To increase the efficiency of purchasing external information, and to maximize its leverage with information providers, the company 1070 has chosen to negotiate with several providers, agreements that treat all purchases as having been made from within the US and being in US dollar currency. In this example, the company 1070 maintains its own global Intranet 1072. Intranet 1072 connects company headquarters 1074HQ (shown here as being located within the United States) with company US employee electronic appliances 1074US(1), . . . , 1074US (N), company Japanese employee electronic appliances 1074JP(1), . . . , 1074JP(N), and company European employee electronic appliances 1074EU(1), 1074EU(N). Intranet 1072 also permits each of these employees 1074 to communicate with one another. VDE-based transactions between the company 1070 and its information suppliers are also routed through one or another of the company's US gateways to the Internet.

To provide efficient administrative and support services, the company 1070 has deployed in each country at least one distributed financial clearinghouse 200 and at least one distributed usage clearinghouse 300. For example, company 1070 may operate a financial clearinghouse 200A and a usage clearinghouse 300A in the United States, a financial clearinghouse 200B and a usage clearinghouse 300B in Japan, and a financial clearinghouse 200C and usage clearinghouse 300C in western Europe. In countries with multiple sites and within the United States, several of these distributed clearinghouses may exist. In addition to negotiating agreements with information providers, the company 1070 may also have negotiated agreements with a large commercial usage clearinghouse 300 and with a major financial clearinghouse 200. These centralized clearinghouses could be located anywhere, and may communicate with company 1070 via the Internet and the corporate Intranet 1072. Neither of these clearinghouses 200, 300 are affiliated with the company 1070 other than through this business arrangement. Each of the distributed clearinghouses within the company 1070 operates under the simultaneous authority of both the company and the external clearinghouses with which the company has a business arrangement.

In this one example, a product marketing manager 1074JP (1) employed by this company 1070 in Japan acquires a market research report 166 from an American distributor 1076. The report and associated controls are sent from the American distributor 1076 to this employee 1074JP(1) in a VDE secure container 152*a*. The instance of VDE on the manager's appliance 1074JP(1) keeps track of usage and the payment due the information provider. Periodically, these audit records 302(1), 302(2) are transmitted in VDE secure containers 1052*b*, 1052*c* to distributed usage clearinghouse (private usage clearinghouse) 300B and to the internal financial clearinghouse 200B—both of which are located in Japan on the company's internal, private corporate network (or Intranet) 1072. From time to time and in accordance with VDE controls associated with the content purchased, the private usage clearinghouse 300B removes, in this example, individual identifying information in accordance with VDE rules and controls managing protected processing environment processes and sends in a VDE secure container the audit records 302(3) to the external, commercial usage clearinghouse 300. All of the company's internal, distributed usage clearinghouses 300A, 300B, 300C send periodic communications in VDE secure containers 152 to the commercial usage clearinghouse 300. In turn, the master usage clearinghouse 300 creates and sells, licenses, and/or otherwise distributes reports to rightsholders and other parties (e.g., third parties having a commercial interest in obtaining the information) in which the identities of individuals are removed, and which in many circumstances company names, in accordance with VDE rules and control, have also been removed.

From time to time and in accordance with VDE controls 188*a* associated with the content 166 purchased, copies of the complete usage records (with employee identification information) are also sent to the company's master usage clearinghouse 300HQ (which may be located at corporate headquarters), as are audit records from all the company's distributed usage clearinghouses 300A, 300B, 300C. These are then aggregated and combined for further analysis, reporting, and auditing.

The internal, distributed financial clearinghouses 200A, 200B, 200C also receive audit records 302 in VDE secure containers 152 in accordance with VDE controls sets for the purchased information from each of the VDE protected processing environments 1074 reporting to them. Each internal financial clearinghouse 200A, 200B, 200C aggregates the payments and from time to time sends a VDE secure container 152 with audit records 302 indicating the aggregate sums to be transferred to the information providers as a result of transactions. The company may also provide update information regarding the accounts from which the company's funds are to be transferred and/or the provider accounts that are to receive such funds. In turn, the external master financial clearinghouse 200 completes these payment transactions and sends audit records back to the company 1070 and to the information providers confirming the payment transactions. In the preferred embodiment, these activities occur securely under the control of distributed VDE nodes, and are automated at least in part through the use of VDE containers and chain of handling and control managing multi-nodal, multi-party, sequence of processes. As an alternative example, the calculation for the amount of payment and the completion of the payment transactions is performed at the external master financial clearinghouse 200 from usage information received from the usage clearinghouse 300 (of course, if usage clearinghouse 300 and financial clearinghouse 200 are the same party, the financial clearinghouse already has received such information). The external and internal financial might then, in this example, compare payment information.

This example does not depend on the extent to which administrative and support services are distributed. In a related example, the usage and financial clearinghouse functions could have been distributed to each VDE-aware protected processing environment 1074 as illustrated in FIGS. 2A–2E and 3A–3C. In this example, each protected processing environment 1074 could report directly to the master external clearinghouses 200, 300, to distributed external clearinghouses, and/or to internal clearinghouse functions organized differently than described just above, for example, by continent (North America, South and Central America, Australia, Europe, etc.) rather than by country and company 1070 location.

In one further example, the corporate headquarters 1074HQ and its associated headquarters-based clearinghouses 200HQ, 300HQ provide a centralized clearinghouse system through which all usage and financial information must flow. In this particular, more centralized example, all user appliances 1074 report their usage and financial transactions to headquarters-based clearinghouses 200HQ, 300HQ in secure containers 152 over Intranet 1072. Company headquarters financial clearinghouse 200HQ may interface directly into VDE compliant general purpose payment systems that directly support the use of VDE chain of handling and control for ensuring the enforcement of automated, secure, financial transaction fulfillment in accordance with rules and controls governing payment related variables such as payment amounts, parties, locations, timing and/or other conditions. These headquarters-based clearinghouses 200HQ, 300HQ, (which may function as a single, integrated Commerce Utility System) in turn, may communicate appropriate aggregated and/or other audit trail and/or payment information to the individual clearinghouses 200A, 200B, 200C, 300A, 300B, 300C within each country. While less efficient than the less hierarchical example described above, this arrangement may appeal to large corporations who wish to exert centralized control over usage and financial information by acting as the central administrator for the provision of credit and/or electronic currency to distributed internal financial clearinghouses and by efficiently managing in-house collection of transaction related information.

Example: Transaction Authorities can be Used within and Between Organizations

Figure 66:
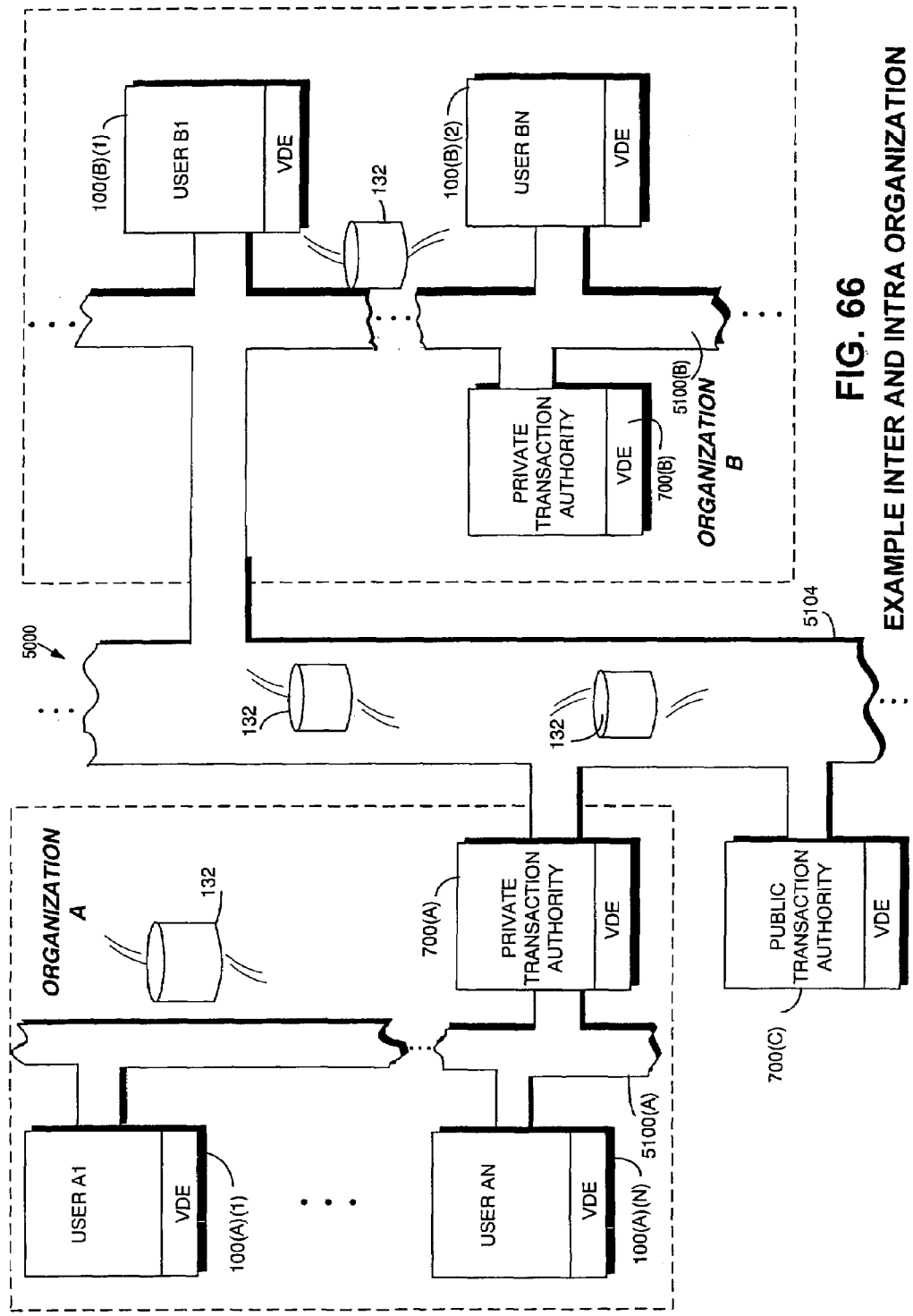
FIG. 66 shows an example inter and intra organization transaction authority example.

FIG. 66 shows an example use of transaction authority 700 for inter and intra organizational communications. FIG. 66 shows an organization A (left-hand side of the drawing) as having an "Intranet" (a private data network within a particular organization) 5100(A). Intranet 5100(A) may be a local and/or wide area network for example. User electronic appliances 100(A)(1), . . . , 100(A)(N) (for example, employees of organization A) may communicate with one another over Intranet 5100(A).

FIG. 66 also shows another organization B that may have its own Intranet 5100(B), user electronic appliances 100(B) (1), . . . , 100(B)(N), and private transaction authority 700(B). In addition, FIG. 66 shows a public data network 5104 (such as the Internet for example) and a public transaction authority 700(C). FIG. 66 shows that in this example, organizations A and B communicate with the outside world through trusted transaction authority 700(A), 700(B) (which may, if desired, also include "gateways", "firewalls" and other associated secure communications components). In other examples, trusted transaction authority 700(A), 700(B) need not be the actual "gateway" and "firewall" to/from Internet 5104, but could instead operate wholly internally to the respective organizations A, B while potentially generating electronic containers 302 for transmission over Internet 5104.

In this example, organization A user protected processing environments 100(A)(1), . . . , 100(A)(N) each have an instance of a virtual distribution environment protected processing environment, and can communicate with one another over Intranet 5100(A) via secure electronic containers 302. Similarly, organization A user electronic appliances 100(B)(1), . . . , 100(B)(N) each have an instance of a virtual distribution environment protected processing environment, and can communicate with one another over Intranet 5100 (B) via secure electronic containers 302. In addition, organization A and organization B can communicate with one another over Internet 5104 via secure electronic containers 302.

Organization A's private trusted transaction authority 700(A) may be used for facilitating organization A's internal communications and processes. Private trusted transaction authority 700(A) might be used, for example, to carefully track items sent from one user to another within organization A. The public transaction authority 700(C), meanwhile, can be used to coordinate between organization A and organization B without, for example, revealing confidential information of either organization to the other organization. Below are more detailed examples of how the FIG. 66 arrangement might be advantageously used to conduct business transactions.

Suppose a confidential memo needs to be approved by users 100(A)(1), 100(A)(3) and 100(A)(5) (who can each revise the memo) before being distributed to each of users 100(A)(2), 100(A)(7)–100(A)(10) and 100(A)(12) (none of whom can change the memo), with copies to users 100(A) (1), 100(A)(3) and 100(A)(5) (who also can't change the memo after all three of them have signed off on it) and to no one else. Private transaction authority 700(A) can maintain a rule set that specifies these requirements. Transaction authority 700(A) can:

send the memo (in secure containers) in "round robin" fashion to each of users 100(A)(1), 100(A)(3) and 100(A)(5) for approval.

If any one of these users changes the memo, then transaction authority 700(A) can circulate the revised memo to the other two for additional comments and revisions.

Once all three of users 100(A)(1), 100(A)(3) and 100(A) (5) approve the memo, transaction authority 700(A) may be empowered to place each of their digital and/or handwritten signatures or initials on the memo, place it into one or more secure containers with a control set specifying it is read only and can only be read by users 100(A)(1)–100(A)(3), 100(A)(5), 100(A)(7)-100(A) (10) and 100(A)(12).

Transaction authority 700(A) may then send a copy of the memo in a container to each of these users, or could require the same container to circulate from one to another.

The transaction authority 700 may require the electronic controls to maintain a secure audit trail indicating where the container has been, who has opened it, who has accessed the memo it contains, and when. Transaction authority 700(A) might thus increase personal accountability by evidencing whether a particular person had seen a particular document, when, and for how long.

Organization A's Intranet 5104 might also be used to exchange and/or distribute highly confidential design specifications. Transaction authority 700(A) can, for example, maintain, in digital form, a detailed record of who has "signed off" on the design specifications—thus ensuring personal accountability and providing a high degree of efficiency.

As mentioned above, private transaction authorities 700 (A), 700(B) can also provide a "firewall" function to protect confidential information from escaping to outside of the respective organizations A, B. Suppose for example that organization A is an integrated circuit design house and organization B is an integrated circuit foundry. Organization A designs and specifies the circuit layout of a chip, producing a "tape out" that it sends to organization B. Organization B manufactures an integrated circuit based on the "tape out", and delivers chips to organization A.

Transaction authority 700 can be used to facilitate the above business transaction while protecting confidentiality within each of organizations A and B. For example:

organization A's private transaction authority 700(A) can supervise an overall design and specification development effort within organization A. All communications take place in secure containers 302 over organization A's Intranet 5100(A) to maintain confidentiality. Transaction authority 700(A) can maintain a secure archive of historical design documents, works in progress, and specification versions as the design process progresses.

Organization A's private transaction authority 700(A) can manage the final design specification development—ensuring that all conditions required to finalize the design specifications are followed.

Once the design specification has been finalized, transaction authority 700(A) can circulate it within secure containers 152 to those individuals within organization A that need to "sign off" on it. Their respective appliances 100(A)(1), . . . 100(A)(k) can affix and/or embed digital signatures, handwritten signatures, seals and/or fingerprints as described above to indicate specification approval.

Upon being satisfied that the specification has been "signed off" by the appropriate people, transaction authority 700(A) can send it over Internet 1104 within a secure container 302 to public transaction authority 700(C). Public transaction authority 700(C) may be a commercial transaction authority retained by organizations A and B to act as a liaison between them. Organization A's private transaction authority 700(A) can filter (or protect) all information it sends to public transaction authority 700(C) to ensure that organization B can access only that information intended for it. For example, private transaction authority 700(A) might provide additional electronic controls within the container to prevent organization B from seeing any detailed audit information showing where the specification has been within organization A.

The public transaction authority 700(C) might act as an independent trusted third party, notarizing and/or certifying the design specification to later evidence that organization A delivered it on a particular date and time in accordance with a contract.

Public transaction authority 700(C) could then forward the design specification (still within a secure container) over Internet 5104 to organization B's private transaction authority 700(B).

Organization B's private transaction authority 700(B) could automatically send a copy of the design specification over organization B's Intranet 5100(B) to the appropriate users 100(B)(1), 100(B), (N) within organization B. No one outside of organization B would need to know who received a copy of the specification. On the other hand, organization A's transaction authority 700(A) could, if desired, include electronic controls restricting access to only certain engineers within organization B—and these secure controls would be carried along into organization B and securely enforced by electronic appliances 100(B)(1), . . . , 100(B)(N).

Organization B's transaction authority 700(B) could manage the chip manufacturing process, ensuring that all steps and conditions required to manufacture chips in accordance with organization A's design specification are followed.

Example

Transaction Authority can Facilitate International Commerce

Figure 67:
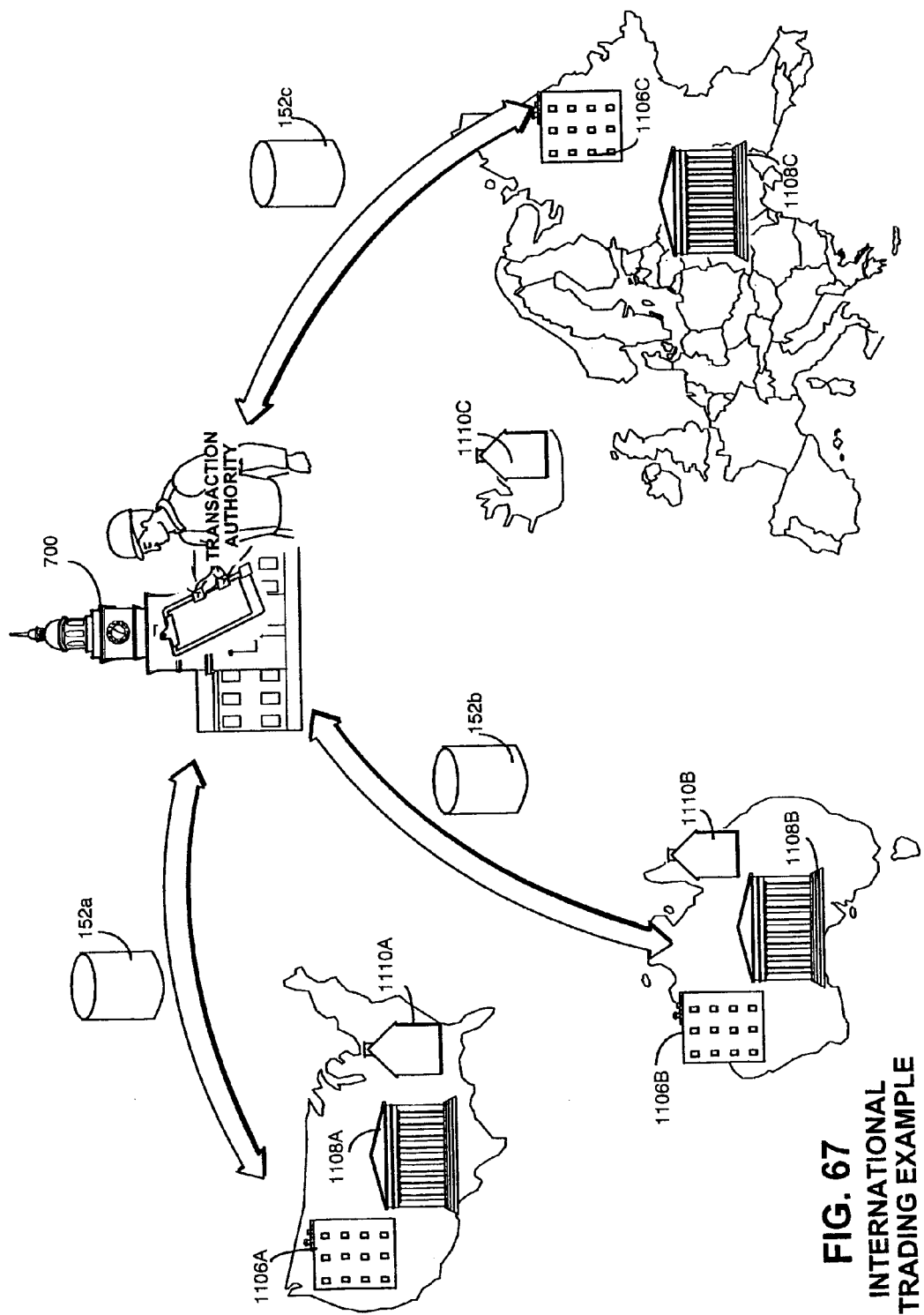
FIG. 67 shows an international trading example.

FIG. 67 shows an example of how transaction authority 700 can be used to conduct international commerce. In this particular example, a transaction authority 700 coordinates a complex multi-national transaction between companies 1106A, 1106B and 1106C located in their own respective countries (e.g., the United States, Australia and Europe). Company 1106A has its own bank 1108A and lawyers 1110A. Similarly, company 1106B has its own bank 1108B and lawyers 1110B, and company 1106C has its own bank 1108C and lawyers 11110C.

The transaction authority 700 may assist in forming agreements between the international parties, by for example passing offers and counteroffers back and forth in secure containers and using the contract forming techniques described above to establish some or all of the terms and provide non-repudiation. Once a contract is formed, transaction authority 700 may maintain a master set of rules and controls specifying all the conditions that must be satisfied to complete the transaction—and may thus provide consequences for different events. Alternatively, once the contract is executed, the transaction authority role may be virtual, particularly in simpler models, that is the value chain rules and controls can be carried by VDE containers whose rules and controls may, as a whole, specify all processes and conditions that must fulfilled, including their sequence of operation. Rules and controls provided by a transaction authority 700 may take international law into account—with differing rules applying to different countries. The rules could take into account various import and export requirements and restrictions, international tax treaties between nations, contain upfront and/or ongoing customs related routing and filing requirements, identify reputable currency transaction authorities, assist in filing contracts or certain contract terms with relevant national and international authorities, manage any shipping or other transportation requirements, assist in establishing conclusive translation services for contract terms (particularly standard terms and conditions), manage differences in international certifying authority requirements and formats, impose societal regulations required by applicable governing bodies, and collect applicable governing body taxes, such as taxes for both national and regional governing entities, etc. Transaction authority 700 may communicate between the various international parties using secure electronic containers, and may securely validate and authentic various event notifications provided by the international parties.

Example: Distributed Transaction Authorities

Complex business interactions under the control of a transaction authority 700 may also be distributed within and among, for example, organizations and/or jurisdictions. Suppose a complex international real estate transaction requires participation of several functions within the purchasing and selling companies, several financial institutions, insurance companies, and law firms, and perhaps government agencies in a few countries. Suppose further that each of the organizational and individual parties to the transaction has computers that are VDE-aware, and that within each organization or agency there is at least one distributed transaction authority that performs services for this real estate transaction under an authority granted by a master transaction authority 700.

In this one example, each of the parties to the real estate transaction has contributed commerce rules and parameters representing their business relationships in the form of VDE rules and controls that define each parties role in the overall transaction. For instance, the insurance company must insure the property at a value and cost that the purchaser finds acceptable and that is also approved by the mortgage lender(s). Also, suppose that these transaction VDE rules and controls have already been mutually agreed upon using negotiation mechanisms described in the Ginter et al. application, and that the negotiated rules and controls together with the history of negotiating these rules and controls have all been stored at the master transaction authority for this real estate transaction. The most senior transaction authority may be a master transaction authority 700 or might be any mutually agreed upon distributed transaction authority. In this one example we assume the former. In short, in short, all parties have agreed to the rules and controls that govern the transaction. The negotiation process may have been simplified because the transaction authority 700 may have distributed a distributed template application for international real estate sales, the template being based on the transaction authority 700's past experience or that were created by the transaction authority 700 especially for this transaction as a value added service to its important customers.

Each of the parties to the transaction is, according to the VDE control sets that define this atomic transaction, responsible for seeing that certain pieces of the transaction are completed prior to the closing and consummation of the overall transaction. In some cases, plural parties are jointly responsible for completing part of the over all transaction. For example, the buyer and seller must have agreed on a purchase price. In this example, they contribute their business requirements, including, for example, their price and other variables, and they use the VDE negotiation mechanisms to arrive at an agreement that represents a fair balance of interests. If the electronic negotiation is unsuccessful, the parties may directly negotiate, or VDE secure containers with audit records indicating failure are sent to the transaction authority who, in turn, notifies each of the other parties authorized to participate in the overall transaction.

If the buying and selling parties do agree, in this one example, notification is sent by the VDE protected processing environment that completes the negotiation (or receives negotiation completion instructions digitally signed by both parties through the use of VDE techniques) to a distributed transaction authority, which in turn, notifies other parties, including other participating transaction authorities, that price has been agreed upon. Based on VDE controls for subtransactions, VDE may securely notify a party or parties that certain other subtransactions are now to be completed. In this example, the title search company may now perform their task; an insurance company may now begin negotiations with the buyer for coverage using the VDE negotiation mechanisms. An attorney in the Counsel's office for the purchaser may begin negotiations with his counterpart in the seller's company; both in-house attorneys may interact with their outside counsel using VDE and VDE secure containers in creating and negotiating the various documents whose execution completes parts or the overall transaction.

In this example, each of the parties may have one or more digital certificates issued by the certifying authority 500 to authenticate each of the parties to this transaction and its subtransactions. The financial clearinghouse 200 provides a payment vehicle for various value added services, in one example, those provided by the transaction authority 700. The usage clearinghouse 300 collects audit records sent from time to time in VDE secure containers from each of the participating VDE protected processing environments and provides an independent third party audit of these transactions. The secure directory services 600 helps participants locate each other's electronic addresses while maintaining confidentiality and privacy.

As each of the subtransactions is completed, a distributed transaction authority within the organization within which the subtransaction is completed notifies the master authority for this transaction 700 of completion of that subtask. According to the previously agreed upon VDE rules and controls sets, some or all of the persons participating in the transaction may also be notified by audit records and/or messages that are securely sent from, and authenticated by, at least one participating VDE protected processing environment, including, for example, PPEs at nodes for individuals, distributed Commerce Utility Systems, a distributed transaction authority, and/or the master authority for this transaction.

When all the component elements of the overall transaction have completed, a transaction authority, in this example, the master transaction authority for this real estate sale, notifies each of the participants and each of the participating distributed transaction authorities, that the preconditions have all been met and settles the overall transaction. Optionally, the transaction authority may give seller and purchase a last opportunity to proceed to completion or to hold up the transaction.

This one example shows that Commerce Utility Systems 90, including transaction authority 700, may be distributed to intermediate VDE protected processing environments that support one or more Commerce Utility Systems 90.

Example

Digital Broadcasting Network

Amortizing infrastructure and other resources across many users, building critical mass more rapidly than competitors, supporting specialization to tailor and deliver the most appealing products and services to customers, maximizing negotiating leverage power for purchasing, and building the most comprehensive infrastructure to serve as the best "one-stop" resource for a given business activity— these are all central concepts in building successful, modern businesses. VDE and Distributed Commerce Utility provide a foundation for creating highly competitive and successful cyberspace businesses that demonstrate these attributes. Many of these businesses will reflect the character of the Internet and the World Wide Web. Like VDE and Distributed Commerce Utility, they will comprise a distributed community that realizes maximum advantage by supporting electronic commerce partnerships. They will provide different layers of services and complementary products and services, and will realize great advantage in coordinating their activities to their mutual benefit.

The Digital Broadcasting Network ("DBN") will be just such an innovative commercial enterprise. Comprised of many different World Wide Web ("WEB") based sites and services, DBN participants will gain greater leverage and operating efficiency by sharing resources, experiencing maximum buying power, generating marketing and customer information, and supporting a rational administrative overlay that ties together their many, frequently complementary, activities. Much like the consistent rules that enable and underlie both the World Wide Web and the design of VDE and Distributed Commerce Utility, and layered upon the capabilities of both these architectures, the Digital Broadcasting Network employs their inventions to support a highly efficient, largely automated and distributed community that maximizes business efficiencies. In a similar manner, other examples would include other groupings of entities that function together as Virtual Enterprises (e.g. corporations or other organizations). The distributed nature of VDE and the Commerce Utility Systems are particularly important in providing an effective infrastructure for these modern, potentially large scale, cyberspace business activities.

The Digital Broadcasting Network may function as a cooperative of WEB sites and, for example, service providers, with a central and perhaps regional and logical (e.g. market based) headquarters groups, or it may function as a for profit, shareholder corporation in a business model reminiscent of television broadcast companies (e.g., NBC), or it may function as a cooperative or virtual corporation that has some mix or combination of mixes of the above attributes and employ distributed peer to peer, hierarchical, and centralized administrative business relationships and activities. In one example, a plurality of corporations may join together to provide the advantages of size and coordination with individual participants providing some degree of specialty expertise and the body of entities coordinating together in some fashion in a "higher" level cooperative or corporation.

In one example, the Digital Broadcasting Network may be a single corporation that has many licensed franchisees. The licensed franchisees may comprise WEB sites that serve geographically and/or logically specialized market areas and/or serve other WEB sites in a hierarchy and/or peer-to-peer context of Distributed Commerce Utility services as described above. On behalf of itself and its franchisees, this corporation may, for example:

negotiate optimal rates for exposure time with advertisers and their agents,
obtain the lowest costs for content provided by third parties,
resell market analysis and user profiling information,
share its revenue with its franchisees which themselves may share revenue with DBN and/or other franchisees,
provide advertising to franchisees in response to franchisee and/or franchisee user base profiles,
guarantee a certain number of "eyes" (exposures and/or other interactions) with respect to advertiser materials,
provide a secure virtual network employing VDE and Distributed Commerce Utility capabilities so that the overall organization can operate in a secure and highly efficient manner, including using common user application tools, interfaces, and administration operations,
do advertising for the network to the benefit of the network and the franchisees,
purchase and/or otherwise supply content to franchisees in response to franchisee needs as demonstrated by their requests and/or usage profiles,
collect and analyze content (including advertising) usage, cyberspace purchasing, and other data as allowed under its agreement with franchisees,
allow franchisees to perform many of the network functions on a local basis—that is acquire and make available geographically and/or logically local (consistent with there focus) content (and/or other content of particular interest to its user base), negotiate agreements regarding advertising materials that are of commercial value given the franchisees physical and/or logical market focus, control at least a portion of its WEB "broadcasting" space—that is exercise local control over at least some portion of the content—with the remainder of the control, by agreement, and, for example, enforced by rules and controls, being under the control of DBN and/or some one or more other network participants, and perform other administrative, support and/or service functions on behalf and/or for the network.

In one example, DBN may employ many of the security and administrative capabilities of VDE and many of the service functions provided by the present inventions to manage and automate the distributed relationships and activities that are central to the DBN business model. For example:

Transaction Authority 700 can provide the overall administrative context for managing the network community. For example, the transaction authority 700 may manage (through the use of VDE rules and controls in the preferred embodiment) the routing of content to appropriate franchisees. It may also manage the chains of handling and control related to reporting usage information.

The transaction authority 700 may obtain and/or derive its electronic control sets from the agreement relationships between DBN and its franchisees. Electronic negotiations may be used to create these agreement relationships. The transaction authority 700 may also receive controls reflecting bilateral or other networked relationships directly among franchisees and other participants.

Rights and Permissions Clearinghouse 400 can extend commercial rights related to content to network franchisees. It acts as a repository of rights related to content that is supplied by network entities to customers—including content rights held by network entities themselves, and made available to other network entities. Such content rights may include, for example, displaying, vending, redistributing, repurposing, and for advertising. It can provide additional rights (e.g., redistribution rights or specialized repurposing rights) upon request and/or automated profiling based, for example, upon usage.

Usage Clearinghouse 300 can collect usage data in support of market analysis, user profiling, and advertising. It may also analyze that information and derive reports. It may distribute those reports internally to the DBN as appropriate, and sell reports and/or other usage based information externally based upon commercial opportunity.

Financial Clearinghouse 200 can ensure proper compensation fulfillment throughout the network. It may collect payments due to DBN from franchisees for content. It may distribute to franchisees payments due them as a result of advertising and reselling of usage information. It can collect payments from franchisees for support of generally DBN infrastructure and services such as, for example, network advertising. It connects to general purpose financial clearinghouse infrastructure to transmit and receive payment related information.

The secure directory services 600 may maintain directory services based upon unique identity and/or class attribute(s). There may be a very large number of franchisees globally. Directory services 600 could also maintain directory information on customers, including unique identifier and profiling information. Secure directory services 600 may maintain directory infrastructure for content owned, managed and/or available to the network.

A certifying authority 500 may certify the roles of all participants in the network. It would issue a certificate to each franchisee, for example. It may also issue certificates certifying commercial relationships of groupings of network entities to facilitate efficient, secure relationships with third parties. They may also issue certificates to customers to represent certain specialized customer rights regarding customer commercial activities with outside parties (for example, discounts, or being a member of the greater "DBN" community).

Portions or all of specific service functions (e.g., as described above) may be highly distributed and may operate significantly, primarily or even exclusively on franchise and service network web servers.

While the inventions have been described in connection with what is presently considered to be the most practical and preferred embodiment, it is to be understood that the inventions are not to be limited to the disclosed embodiment, but on the contrary, are intended to cover various modifications and equivalent arrangements included within the spirit and scope of the appended claims.

What is claimed is:

1. A rights-management method comprising the steps of:
   receiving, at a first computer system, a request from a user to access electronic content, the electronic content having associated with it a control set specifying two or more alternative conditions for governing access to or other use of the electronic content;
   in accordance with the control set, automatically using at least one digital certificate associated with the user to select one of the conditions;
   satisfying the condition; and
   granting the user access to the electronic content.

2. A method as in claim 1, in which the two or more alternative conditions include alternative requirements that payment information be sent to a second computer system before granting access to the electronic content.

3. A method as in claim 1, in which the two or more alternative conditions comprise a specification of two or more alternative payment mechanisms.

4. A method as in claim 3, in which one payment mechanism comprises a subscription.

5. A method as in claim 1, in which a first condition comprises a first price for accessing the electronic content, and a second condition comprises a second price for accessing the electronic content.

6. A method as in claim 5, in which the first condition further comprises an indication of a first class of users authorized to access the electronic content upon payment of the first price, and the second condition further comprises an indication of a second class of users authorized to access the electronic content upon payment of the second price.

7. A method as in claim 1, in which a first condition comprises an indication of a first class of users authorized to access the electronic content upon satisfaction of the first condition, and a second condition comprises an indication of a second class of users authorized to access the electronic content upon satisfaction of the second condition.

8. A method as in claim 7, in which the step of using at least one digital certificate associated with the user to select at least one of the conditions comprises:
examining a first digital certificate to determine whether the user belongs to the first class of users.

9. A method as in claim 7, in which the step of using at least one digital certificate associated with the user to select at least one of the conditions comprises:
examining at least a first digital certificate and a second digital certificate to determine whether the user belongs to the first class of users.

10. A method as in claim 7, in which the first class of users comprises members of a first department in an organization, and in which the second class of users comprises members of a second department in an organization.

11. A method as in claim 1, in which a first condition comprises an indication of a first tax that must be paid to a first governmental entity upon purchase of access to the electronic content by a member of a first class of users, and a second condition comprises an indication of a second tax that must be paid to a second governmental entity upon purchase of access to the electronic content by a member of a second class of users.

12. A method as in claim 11, in which the step of satisfying the condition comprises sending a payment information to a second computer system, the payment information including authorization to debit an account by an amount sufficient to pay the first tax.

13. A method as in claim 12, in which the second computer system is operable to receive the payment information and send the first tax to the first governmental entity and a payment to an author or distributor of the electronic content.

14. A computer-readable medium encoded with a computer program product including instructions that, when executed by a computer system, cause the computer system to perform steps comprising:
evaluating a control set associated with a piece of electronic content, the control set specifying two or more conditions for governing access to the electronic content, each of the conditions being capable of being selected upon detection of a respective digital certificate;
evaluating at least one digital certificate associated with a user of the computer system;
based on said evaluation of the at least one digital certificate associated with a user of the computer system, automatically selecting a first condition from the two or more conditions for governing access to the electronic content; and
granting the user access to the piece of electronic content upon satisfaction of the first condition.

15. A medium as in claim 14, in which at least some of the two or more conditions relate to payment.

16. A medium as in claim 15, in which a first at least one condition comprises a first price for accessing the electronic content, and a second at least another condition comprises a second price for accessing the electronic content.

17. A medium as in claim 16, in which the at least one condition further comprises an identification of a first class of users authorized to access the electronic content upon payment of the first price, and the at least another condition further comprises an identification of a second class of users authorized to access the electronic content upon payment of the second price.

18. A medium as in claim 15, in which the at least one condition comprises an identification of a first clearinghouse for accepting payment for access to the electronic content, and the at least another condition comprises an identification of a second clearinghouse for accepting payment for access to the electronic content.

19. A medium as in claim 14, in which a first at least one condition comprises an identification of a first class of users authorized to access the electronic content upon satisfaction of the first at least one condition, and a second at least another condition comprises an identification of a second class of users authorized to access the electronic content upon satisfaction of the second at least another condition.

20. A medium as in claim 19, in which the instructions that cause the computer system to perform the step of evaluating at least one digital certificate associated with the user include instructions operable to cause the computer system to perform steps comprising:
evaluating a first digital certificate to determine the identify of the user;
evaluating a second digital certificate to determine whether the user belongs to the first class of users.

21. A method comprising:
receiving a piece of electronic content;
receiving a control set including at least two controls for governing access to or other use of the piece of electronic content, the control set specifying at least a first digital certificate or class of digital certificates required to make use of a first of the at least two controls, the control set further specifying at least a second digital certificate or class of digital certificates required to make use of a second of the at least two controls;
receiving a request from a user to access the piece of electronic content;
in accordance with the control set, automatically using at least one digital certificate associated with the user to select between the first and second controls; and
granting the user access to the piece of electronic content in accordance with the selected control.

22. A method as in claim 21, in which automatically using at least one digital certificate associated with the user to select between the first and second controls comprises:
determining whether the digital certificate associated with the user falls within the first class of digital certificates or the second class of digital certificates.

23. A method as in claim 21, in which the first control comprises a first payment method, and in which the second control comprises a second payment method.

24. A method as in claim 21, in which the control set specifies a requirement that the user have a certificate from a predefined certifying authority.

25. A method as in claim 21, in which the electronic content and the control set are received in a secure container.

26. A method as in claim 21, in which the step of automatically using at least one digital certificate associated with the user to select between the first and second controls is performed within a protected processing environment.

27. A method comprising:
receiving a piece of electronic content;
receiving a control set for governing access to or other use of the piece of electronic content, the control set specifying two or more alternative prices for accessing or otherwise using the electronic content, each of the alternative prices being associated with a respective user or class of users;
receiving a request from a first user to access the piece of electronic content;

using at least one digital certificate associated with the first user to automatically select a first price from the two or more alternative prices; and granting the first user access to the piece of electronic content for the first price.

28. A method as in claim 27, further comprising:

receiving a request from a second user to access the piece of electronic content;

using at least one digital certificate associated with the second user to automatically select a second price from the two or more alternative prices; and granting the second user access to the piece of electronic content for the second price.

29. A method as in claim 27, in which the electronic content and the control set are received together in a secure container.

30. A method as in claim 29, in which the step of using at least one digital certificate associated with the first user to automatically select a first price from the two or more alternative prices is performed within a protected processing environment.

* * * * *

UNITED STATES PATENT AND TRADEMARK OFFICE
CERTIFICATE OF CORRECTION

| | | |
|---|---|---|
| PATENT NO. | : 7,133,846 B1 | Page 1 of 1 |
| APPLICATION NO. | : 09/398665 | |
| DATED | : November 7, 2006 | |
| INVENTOR(S) | : Karl L. Ginter et al. | |

It is certified that error appears in the above-identified patent and that said Letters Patent is hereby corrected as shown below:

On the Title Page, Item (75), in the Inventors, line 4, "David M. Van Wie, Sunnyvale, CA" should read --David M. Van Wie, Eugene, OR--.

On the Title Page, Item (57), in the Abstract, line 31, "can combined" should read --can be combined--.

Column 134, lines 19-20, "identify" should read --identity--.

Signed and Sealed this

Sixth Day of March, 2007

JON W. DUDAS
*Director of the United States Patent and Trademark Office*